(12) United States Patent
Cao et al.

(10) Patent No.: US 11,501,489 B2
(45) Date of Patent: Nov. 15, 2022

(54) CROSS REALITY SYSTEM FOR LARGE SCALE ENVIRONMENT RECONSTRUCTION

(71) Applicant: Magic Leap, Inc., Plantation, FL (US)

(72) Inventors: Yilun Cao, San Jose, CA (US); Mohan Babu Kandra, San Ramon, CA (US); David Geoffrey Molyneaux, San Jose, CA (US); Daniel Olshansky, Mountain View, CA (US); David Paul Pena, Los Altos, CA (US); Frank Thomas Steinbrücker, Mountain View, CA (US); Rafael Domingos Torres, Boca Raton, FL (US)

(73) Assignee: Magic Leap, Inc., Plantation, FL (US)

( * ) Notice: Subject to any disclaimer, the term of this patent is extended or adjusted under 35 U.S.C. 154(b) by 60 days.

(21) Appl. No.: 17/185,558

(22) Filed: Feb. 25, 2021

(65) Prior Publication Data
US 2021/0279949 A1    Sep. 9, 2021

Related U.S. Application Data

(60) Provisional application No. 62/982,694, filed on Feb. 27, 2020.

(51) Int. Cl.
*G06T 17/00* (2006.01)
*G06F 3/01* (2006.01)
(Continued)

(52) U.S. Cl.
CPC .............. *G06T 17/00* (2013.01); *G06F 3/012* (2013.01); *G06T 7/55* (2017.01); *G06T 19/006* (2013.01);
(Continued)

(58) Field of Classification Search
CPC ......... G06T 17/00; G06T 7/55; G06T 19/006; G06T 2207/10028; G06T 2219/024; G06F 3/012
See application file for complete search history.

(56) References Cited

U.S. PATENT DOCUMENTS

| 2012/0194516 A1 | 8/2012 | Newcombe et al. |
| 2012/0194644 A1* | 8/2012 | Newcombe ............... G06T 7/74 348/46 |

(Continued)

OTHER PUBLICATIONS

Da, Feipeng, "3D reconstruction of human face based on an improved seeds-growing algorithm", "Machine Vision and Learning Applications", Sep. 2011, SpringerLink, pp. 879-887. (Year: 2011).*

(Continued)

*Primary Examiner* — Terrell M Robinson
(74) *Attorney, Agent, or Firm* — Vista IP Law Group, LLP

(57) ABSTRACT

An extended or cross reality system includes a computing device communicably connected to a plurality of portable electronic devices via a network component, a repository accessible by the computing device and the plurality of portable electronic devices, and a dense map merge component. The extended or cross reality system determines a representation for multiple portions of a 3D environment based at least in part upon on a set of dense maps received from the plurality of portable devices, wherein the set of dense maps is grouped into multiple subgroups based at least in part upon pose data pertaining to the set of dense maps or surface information in the set of dense maps. The extended or cross reality system storing the representation as at least a portion of a shared persistent dense map.

24 Claims, 81 Drawing Sheets

(51) Int. Cl.
*G06T 19/00* (2011.01)
*G06T 7/55* (2017.01)

(52) U.S. Cl.
CPC ............ *G06T 2207/10028* (2013.01); *G06T 2207/20221* (2013.01); *G06T 2219/024* (2013.01)

(56) References Cited

U.S. PATENT DOCUMENTS

| | | | |
|---|---|---|---|
| 2013/0271625 A1* | 10/2013 | Gruber | G06V 20/20 382/284 |
| 2014/0206443 A1* | 7/2014 | Sharp | G06T 7/50 463/31 |
| 2015/0022521 A1* | 1/2015 | Loop | G06T 15/005 345/424 |
| 2016/0026253 A1 | 1/2016 | Bradski et al. | |
| 2017/0109422 A1 | 4/2017 | Satkunarajah et al. | |
| 2017/0243352 A1* | 8/2017 | Kutliroff | G06T 19/006 |
| 2017/0287225 A1 | 10/2017 | Powderly et al. | |
| 2018/0348856 A1 | 12/2018 | Abovitz | |
| 2020/0273190 A1* | 8/2020 | Ye | G06T 7/579 |

OTHER PUBLICATIONS

Aharchi, M. "A Review on 3D Reconstruction Techniques from 2D Images", "Innovations in Smart Cities Applications", SpringerLink, Feb. 1, 2020, pp. 510-522 (Year: 2020).*

PCT International Search Report and Written Opinion for International Appln. No. PCT/US2021/019693, Applicant Magic Leap, Inc., dated May 6, 2021 (18 pages).

Kuchera-Morin et al. "Immersive full-surround multi-user system design." Computers & Graphics 40 (2014): 10-21. Jan. 18, 2014 (Jan. 18, 2014) Retrieved on Apr. 18, 2021 (Apr. 18, 2021) from https://www.sciencedirect.com/science/article/abs/pii/S0097849314000090 entire document.

* cited by examiner

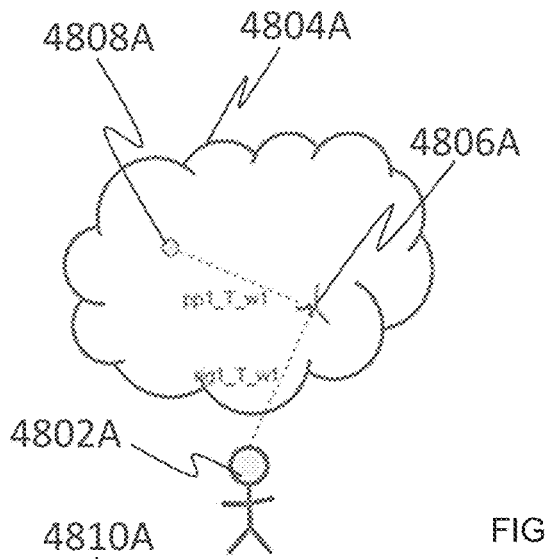
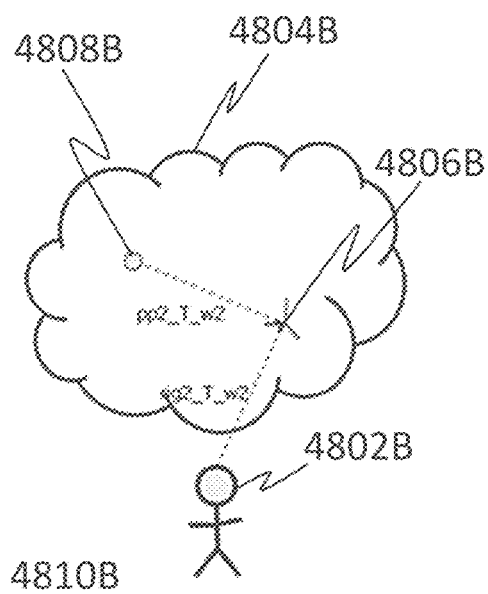
FIG. 20A
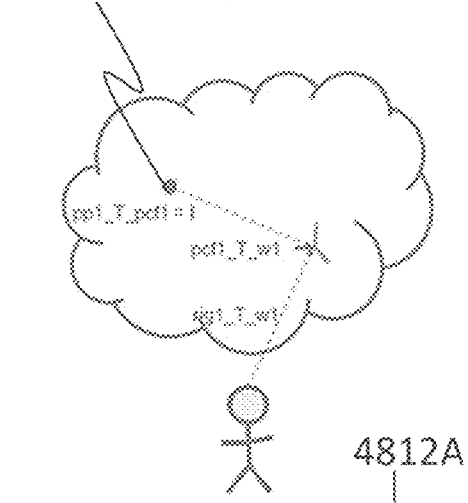
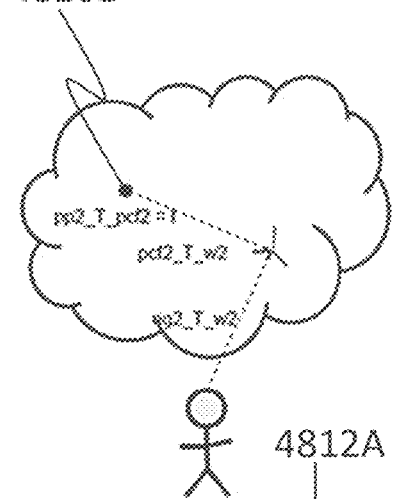
FIG. 20B
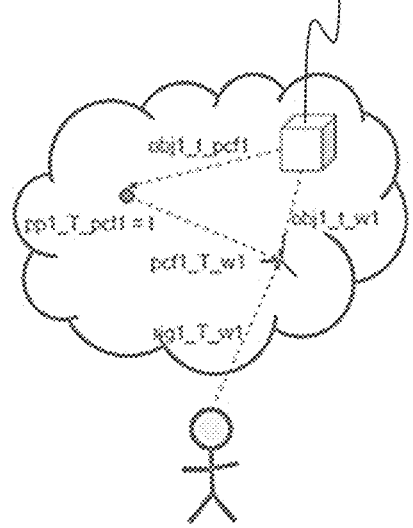
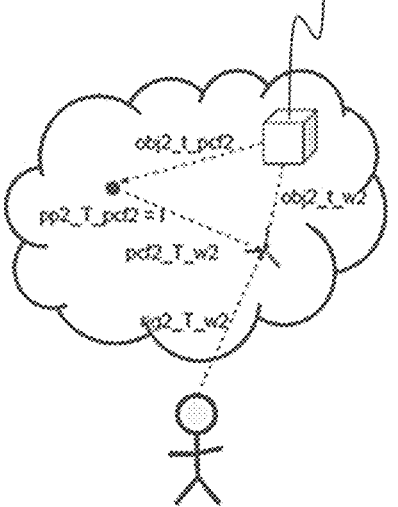
FIG. 20C

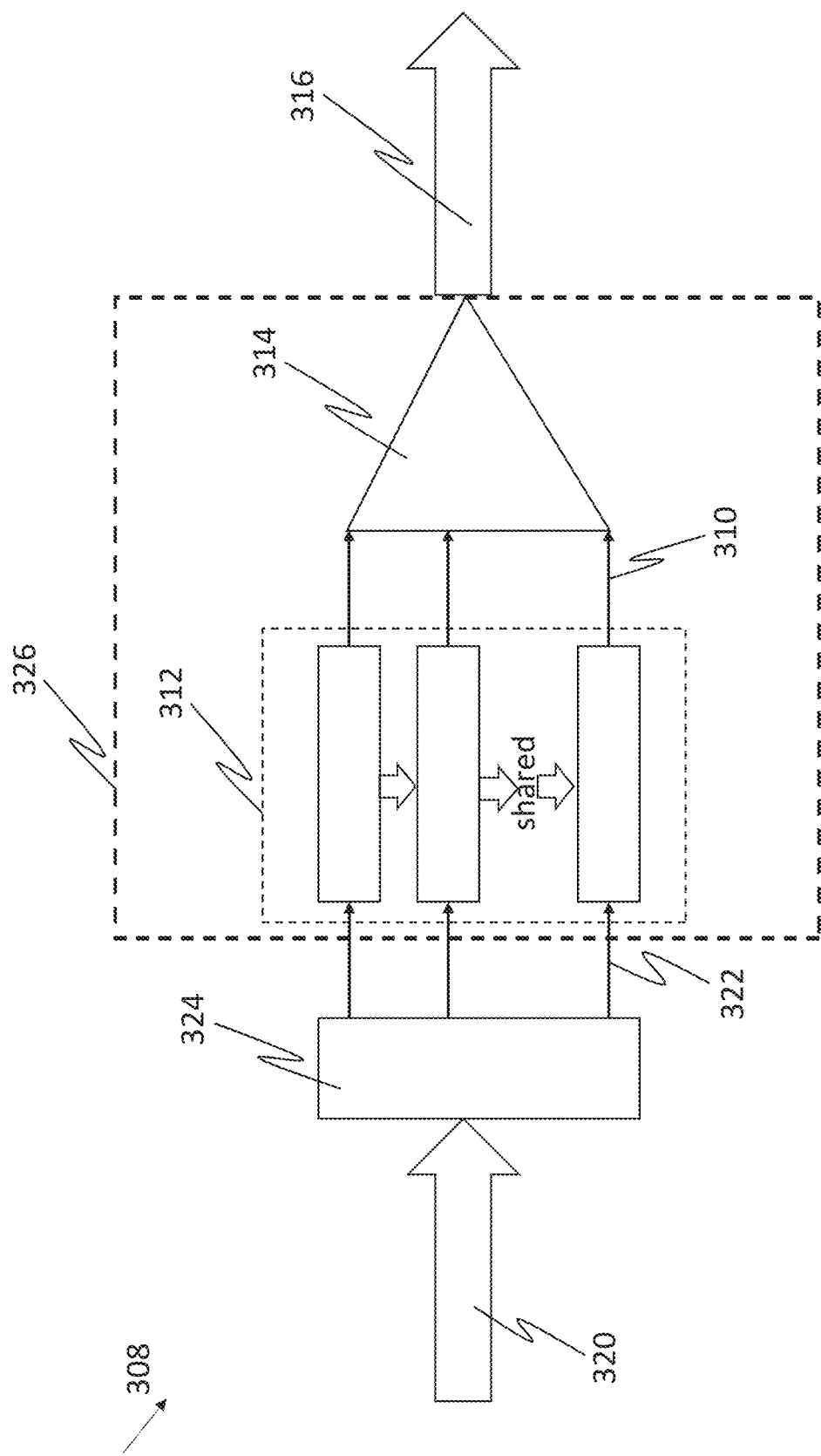

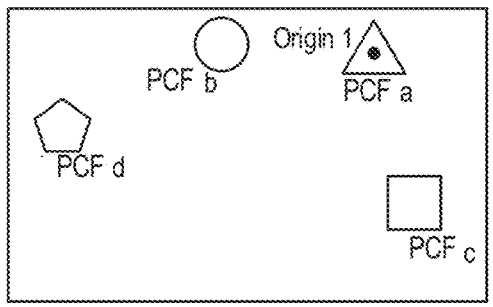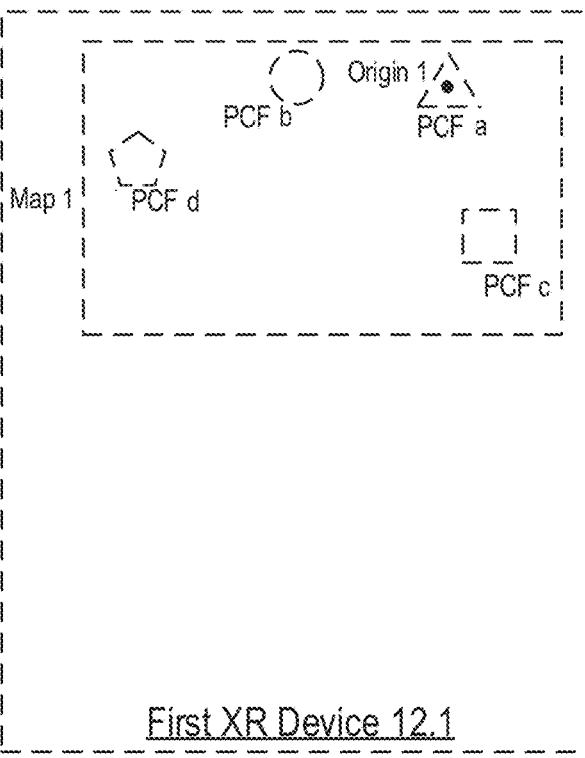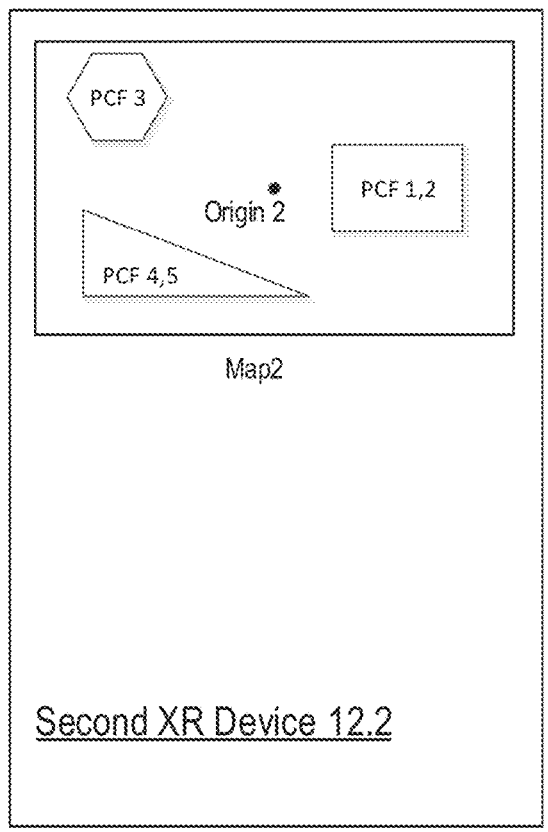
FIG. 43B

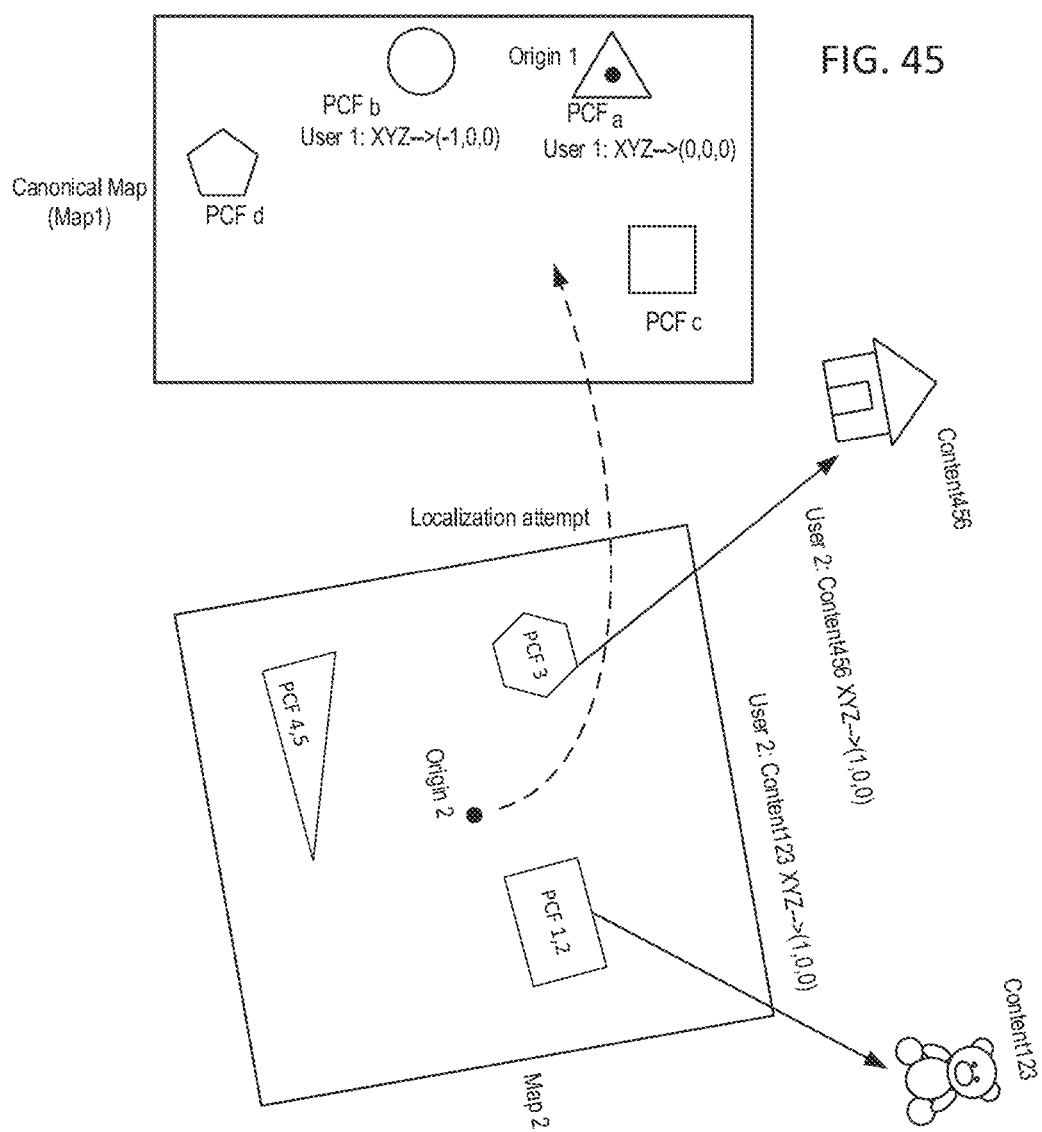

Second XR Device 12.2
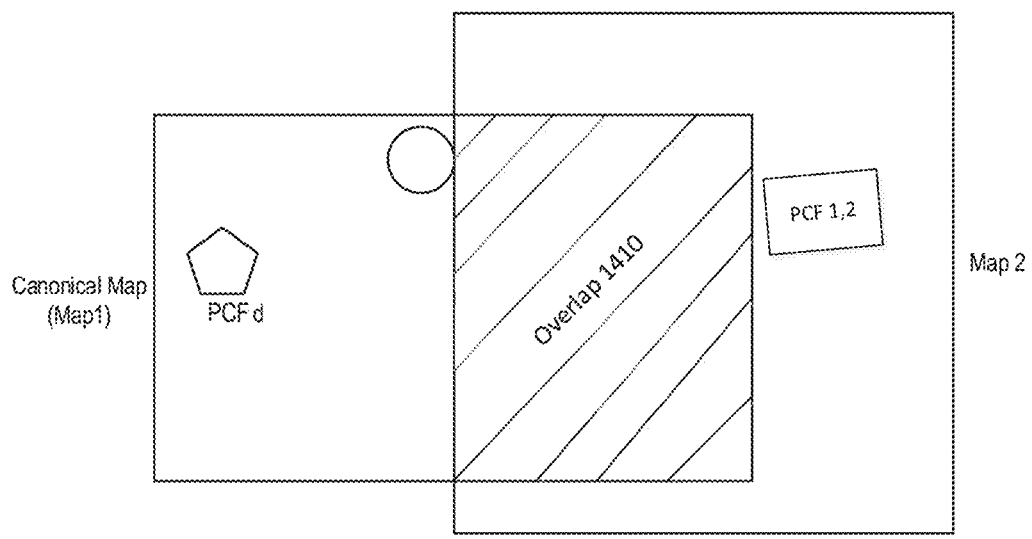
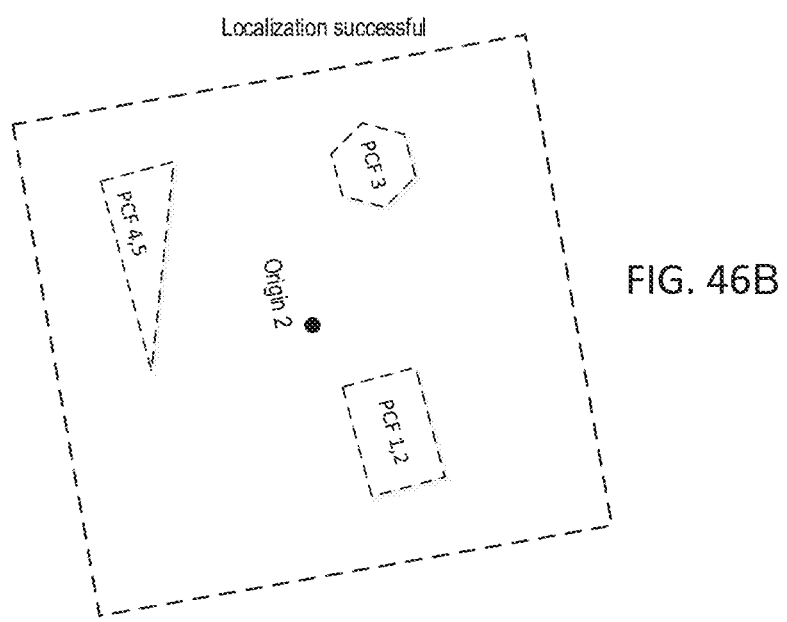
FIG. 46B

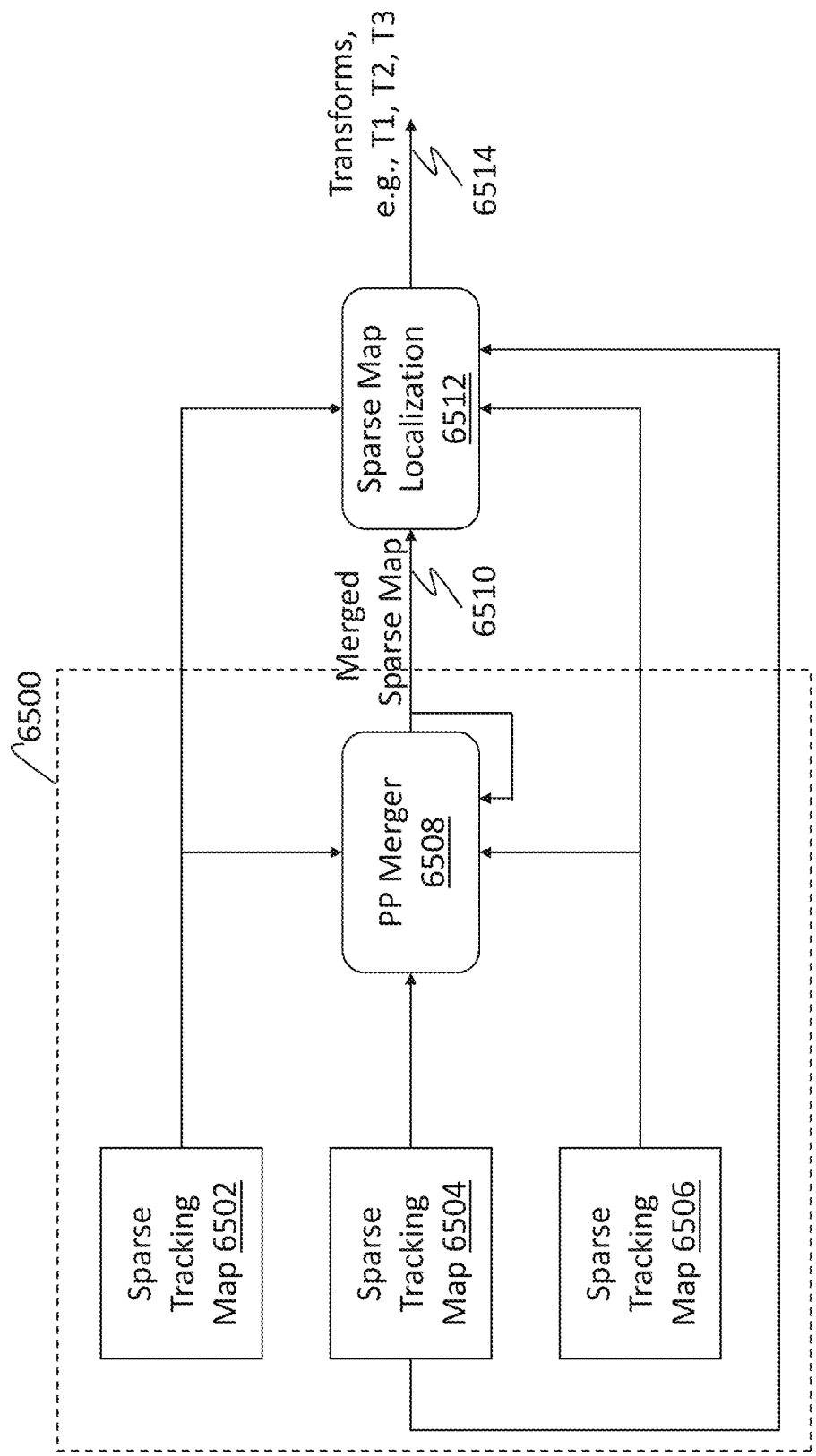

CROSS REALITY SYSTEM FOR LARGE SCALE ENVIRONMENT RECONSTRUCTION

CROSS REFERENCE TO RELATED APPLICATIONS

This application claims the benefit of U.S. Prov. Pat. App. Ser. No. 62/982,694 having the title "CROSS REALITY SYSTEM FOR LARGE SCALE ENVIRONMENT RECONSTRUCTION" and filed on Feb. 27, 2020. This application is related to U.S. patent application Ser. No. 17/180,453 having the title "CROSS REALITY SYSTEM WITH WIFI/GPS BASED MAP MERGE" and filed on Feb. 19, 2021 under Atty. Dkt. No. ML-1016US, International Application No. PCT/US21/18893 having the title "CROSS REALITY SYSTEM WITH WIFI/GPS BASED MAP MERGE" and filed on Feb. 19, 2021, and U.S. patent application Ser. No. 17/185,706 having the title "CROSS REALITY SYSTEM WITH BUFFERING FOR LOCAL-IZATION ACCURACY". The content of the aforementioned U.S. patent applications and U.S. provisional patent application is hereby explicitly incorporated by reference in its entirety for all purposes.

TECHNICAL FIELD

This application relates generally to a cross reality system.

BACKGROUND

Computers may control human user interfaces to create a cross reality or extended reality (XR) environment in which some or all of the XR environment, as perceived by the user, is generated by the computer. These XR environments may be virtual reality (VR), augmented reality (AR), and mixed reality (MR) environments, in which some or all of an XR environment may be generated by computers using, in part, data that describes the environment. This data may describe, for example, virtual objects that may be rendered in a way that users' sense or perceive as a part of a physical world such that users can interact with the virtual objects. The user may experience these virtual objects as a result of the data being rendered and presented through a user interface device, such as, for example, a head-mounted display device. The data may be displayed to the user to see, or may control audio that is played for the user to hear, or may control a tactile (or haptic) interface, enabling the user to experience touch sensations that the user senses or perceives as feeling the virtual object.

XR systems may be useful for many applications, spanning the fields of scientific visualization, medical training, engineering design and prototyping, tele-manipulation and tele-presence, and personal entertainment. AR and MR, in contrast to VR, include one or more virtual objects in relation to real objects of the physical world. The experience of virtual objects interacting with real objects greatly enhances the user's enjoyment in using the XR system, and also opens the door for a variety of applications that present realistic and readily understandable information about how the physical world might be altered.

To realistically render virtual content, an XR system may build a representation of the physical world around a user of the system. This representation, for example, may be constructed by processing images acquired with sensors on a wearable device that forms a part of the XR system. In such a system, a user might perform an initialization routine by looking around a room or other physical environment in which the user intends to use the XR system until the system acquires sufficient information to construct a representation of that environment. As the system operates and the user moves around the environment or to other environments, the sensors on the wearable devices might acquire additional information to expand or update the representation of the physical world.

An XR device may reconstruct a representation of the physical world around a user by determining, based on sensor data, the location of surfaces relative to the XR device. Surfaces in a reconstruction of the physical world may be represented in one or more formats. One such format is a "mesh." A mesh may be represented by multiple, interconnected triangles. Each triangle has edges joining points on a surface of an object within the physical world, such that each triangle represents a portion of the surface. Information about the portion of the surface, such as color, texture or other properties may be stored in associate within the triangle. In operation, an XR device may process image information to detect points and surfaces so as to create or update the mesh. Surfaces may be represented in other ways, such as by planes or by voxels at locations with respect to the device with values assigned to voxels indicating whether a surface was detected between the device and the location represented by the voxel.

BRIEF SUMMARY

Aspects of the present application relate to methods and apparatus for providing cross reality (XR) scenes. Techniques as described herein may be used together, separately, or in any suitable combination.

Some embodiments relate to an XR system that supports rendering of virtual content based on stored maps sharing a coordinate frame. The stored maps comprise at least a sparse map and a dense map. The sparse map comprises one or more persistent poses. The dense map comprises volumetric data. The system comprises one or more computing devices configured for network communication with a plurality of portable electronic devices. The one or more computing devices comprise a communication component configured to receive from each of the one or more portable electronic devices a collection of posed surface information. The one or more computing devices comprise a dense map merge component configured to compute representations of a plurality of portions of a 3D environment based on the collections of posed surface information received from the plurality of portable devices, and store the representation of at least a portion of the 3D environment as at least a portion of a stored dense map in the database of stored maps. The representation of each of the plurality of portions is computed from collections of posed surface information grouped by poses of the surface information.

In some embodiments, the communication component is further configured to receive from each of the one or more portable electronic devices a sparse tracking map comprising one or more persistent poses.

In some embodiments, each of the one or more collections of surface information received from a portable electronic device is posed with respect to a persistent pose of a respective sparse tracking map of the portable electronic device.

In some embodiments, the one or more computing devices comprise a sparse map merge component configured to merge the sparse tracking maps received from the one or more portable electronic devices, the merged sparse map comprising a merged persistent pose table computed based on the one or more persistent poses of the sparse tracking maps; and a sparse map localization component configured to compute a transformation for a selected sparse tracking maps with respect to the merged sparse map.

In some embodiments, the sparse map merge component is configured to store the merged persistent pose table as at least a portion of the stored sparse map in the database of stored maps.

In some embodiments, the dense map merge component comprises a 3D reconstruction component configured to compute the representation of at least a portion of the 3D environment based on the merged persistent pose table, and a subset of the one or more collections of surface information, the subset being selected based on that the subset is associated with persistent poses in the merged persistent pose table.

In some embodiments, the one or more collections of surface information each comprises a depth image.

In some embodiments, the stored dense map comprises metadata comprising a size of volumetric data contained by the stored dense map, and a map unique identifier comprising a map universally unique identifier (map UUID) and a map version identifier.

In some embodiments, each sparse tracking map comprises a map unique identifier comprising a map universally unique identifier (map UUID) and a map version identifier; and a table of the one or more persistent poses. Each persistent pose comprises a pose universally unique identifier (pose UUID), and a pose comprising six degrees of freedom. The table of the one or more persistent poses indicating correspondences between the pose universally unique identifiers and the poses.

In some embodiments, for a same portion of the 3D environment, a dense map for the portion and a sparse map for the portion have a same map universally unique identifier.

In some embodiments, the same map universally unique identifier is 128-bit.

In some embodiments, the one or more collections of surface information comprise collections of objects information. The dense map merge component comprises a sparse map selection component configured to select the sparse tracking map based on that the selected sparse tracking map comprises a same map identifier as a dense map comprising the collection of objects information.

In some embodiments, the collections of objects information comprise planar surfaces.

In some embodiments, the representation of at least a portion of the 3D environment is segmented in cubics.

In some embodiments, the stored dense map comprises volumetric data comprising a plurality of voxels. Each voxel comprises a signed distance function indicating a distance to a nearest surface in the at least a portion of the 3D environment.

In some embodiments, for individual collections of surface information associated with a persistent pose in the merged persistent pose table, the volumetric data is computed separately.

Some embodiments relate to an electronic device configured to operate within a cross reality system. The electronic device comprises one or more sensors configured to capture information about a three-dimensional (3D) environment, the captured information comprising a plurality of images; a mapping component configured to compute a sparse tracking map based on the plurality of images; a reconstruction component configured to compute collections of surface information based on the captured information; a communication component configured to, through a network: transmit one or more of the collections of surface information and pose information for the collections of surface information, and receive metadata of a dense map, the metadata indicating a portion of the 3D environment represented by the dense map; and at least one processor configured to execute computer executable instructions, wherein the computer executable instructions comprise instructions for determining, based at least in part on the sparse tracking map and the received metadata, whether to obtain at least a portion of the dense map.

In some embodiments, the dense map is a first dense map. The electronic device comprises a filesystem comprising metadata of one or more dense maps.

In some embodiments, for each dense map, the metadata comprises a quality metric indicating a number of mesh blocks in the dense map, and a timestamp indicating the time when a last depth image has been fused into the dense map. Determining whether to obtain at least a portion of the first dense map is based, at least in part, on the quality metric of the first dense map and the quality metrics of the one or more dense maps.

In some embodiments, the computer executable instructions comprise instructions for: when it is determined to obtain at least a portion of the dense map, computing a locally merged map based, at least in part, on the obtained at least a portion of the dense map and locally generated collections of surface information, the local merged map being used for AR functions such as visual occlusion and/or virtual objects physics.

In some embodiments, the locally generated collections of surface information are not represented in the obtained at least a portion of the dense map.

In some embodiments, the locally merged dense map comprises sub-regions corresponding to identified locations.

In some embodiments, the locations are identified based on persistent poses in a sparse tracking map.

In some embodiments, the determining, based at least in part on the sparse tracking map and the received metadata, whether to obtain at least a portion of the dense map comprises determining an area the electronic device is moving into based at least in part on a pose of the electronic device, and downloading surface information of the area when it is determined that the surface information of the area is available in the dense map but not on the device.

In some embodiments, the dense map comprises a plurality of sub-regions associated with persistent poses in a sparse tracking map, and sub-regions corresponding to the area is downloaded in an order based, at least in part, on distances between the pose of the electronic device and the persistent poses associated with the sub-regions.

Some embodiments relate to an electronic device configured to operate within a cross reality system. The electronic device comprises one or more sensors configured to capture information about a three-dimensional (3D) environment, the captured information comprising a plurality of images; a mapping component configured to compute a sparse tracking map based on the plurality of images; a reconstruction component configured to compute collections of surface information based on the captured information; a communication component configured to, through a network: transmit one or more of the collections of surface information and pose information for the collections of surface information, and receive metadata of a dense map, the metadata comprising a map ID transfer table indicating correspondences between unique IDs for objects of the dense map and local IDs of the objects to devices from which the objects were obtained; and at least one processor configured to execute computer executable instructions, wherein the computer executable instructions comprise instructions for matching the unique IDs for at least a portion of the objects of the dense map to local IDs of corresponding objects to the electronic device.

In some embodiments, the matching comprises determining, based on the map ID transfer table and a local object ID history, any of the objects of the dense map that have historical local IDs to the electronic device, and generating new local IDs for the objects of the dense map that are determined not to have historical local IDs to the electronic device.

In some embodiments, the matching comprises for each of the objects of the dense map that are determined to have historical local IDs to the electronic device, removing all historical local IDs except for a historical local ID generated most recently.

The foregoing summary is provided by way of illustration and is not intended to be limiting.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIGS. 20A to 20C are schematic diagrams illustrating an example of creating PCFs, according to some embodiments;

FIG. 21 is a block diagram illustrating a system for generating global descriptors for individual images and/or maps, according to some embodiments;

FIG. 43B is a block diagram illustrating the creation of a tracking map for the second XR device of FIG. 42, according to some embodiments;

FIG. 45 is a schematic diagram illustrating a localization attempt to localize to a canonical map the second tracking map (Map 2) of FIG. 44, which may be further developed and with XR content associated with PCFs of Map 2, according to some embodiments;

FIGS. 46A-46B are a schematic diagram illustrating a successful localization of Map 2 of FIG. 45 to the canonical map, according to some embodiments;

FIG. 65A is a block diagram of a cloud sparse map merge component of the XR system of FIG. 64, according to some embodiments;

DETAILED DESCRIPTION

Figure 1:
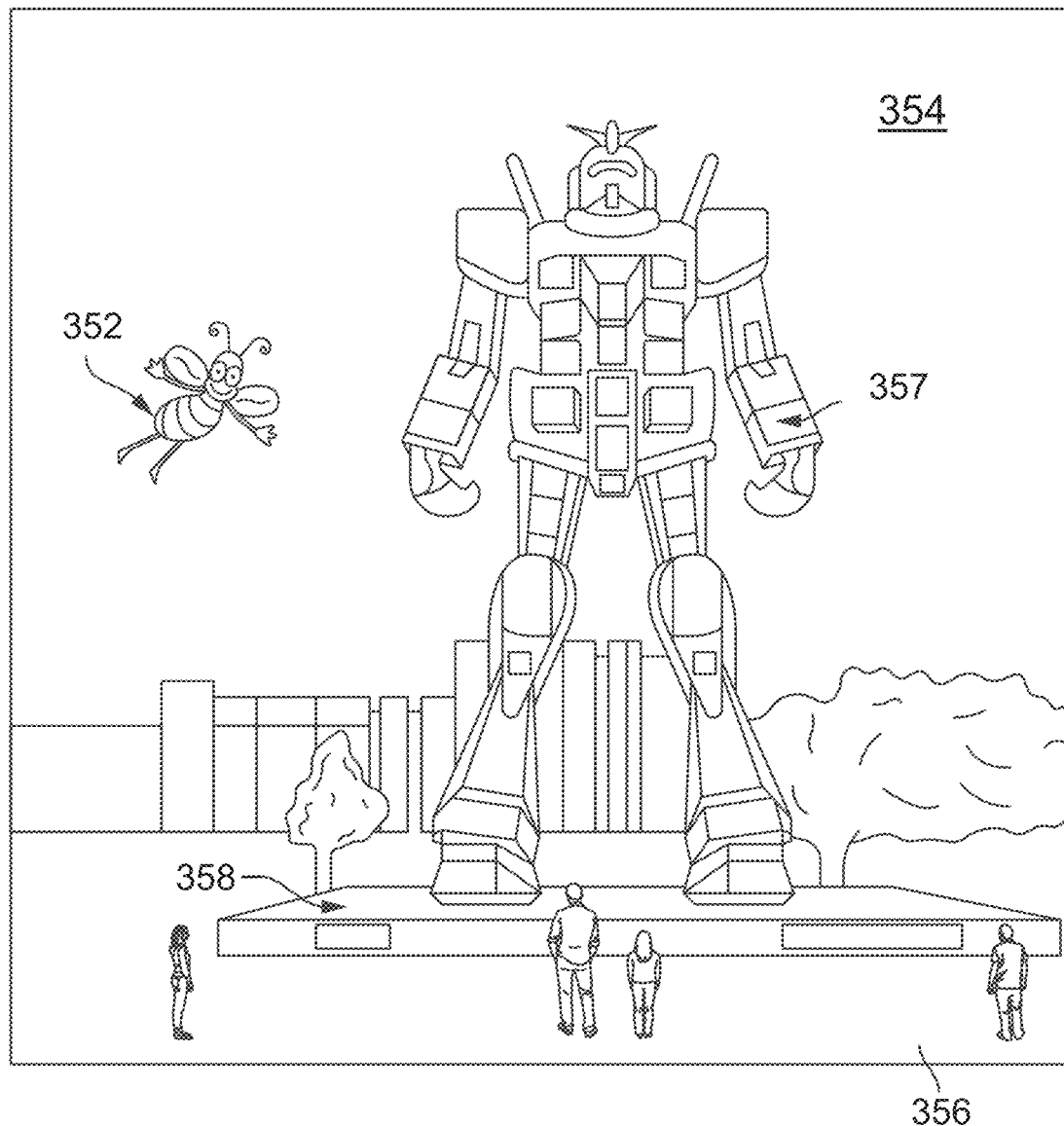
FIG. 1 is a sketch illustrating an example of a simplified augmented reality (AR) scene, according to some embodiments.

Described herein are methods and apparatus for providing XR scenes. To provide realistic XR experiences to multiple users, an XR system may provide information on users' locations within the physical world and the shape and location of objects within the physical world. Such information may enable the system to correctly correlate locations of virtual objects in relation to real objects. The inventors have recognized and appreciated methods and apparatus that generate and share 3D representations of large and very large-scale environments (e.g., a neighborhood, a city, a country, the globe) with computation resources and network bandwidth suitable for portable devices including, for example, AR system 580 (FIG. 4), XR device 12.1 (FIG. 8), and smartphones.

An XR system may build representations of a 3D environment, which may be created from image and/or depth information collected with sensors that are part of XR devices worn by users of the XR system. The 3D environment representations may be used by any components of XR devices in the XR system. For example, the 3D environment representation may be used by components that perform visual occlusion processing, compute physics-based interactions, or perform environmental reasoning.

Occlusion processing identifies portions of a virtual object that should not be rendered for and/or displayed to a user because there is an object in the physical world blocking that user's view of the location where that virtual object is to be perceived by the user. Physics-based interactions are computed to determine where and/or how a virtual object appears to the user. For example, a virtual object may be rendered so as to appear to be resting on a physical object, moving through empty space or colliding with a surface of a physical object.

Environmental reasoning may also use the 3D environment representations in the course of generating information that can be used in computing how to render virtual objects. For example, environmental reasoning may involve identifying clear surfaces by recognizing that they are window panes or glass table tops. From such an identification, regions that contain physical objects might be classified as not occluding virtual objects but might be classified as interacting virtual objects. Environmental reasoning may also generate information used in other ways, such as identifying stationary objects that may be tracked relative to a user's field of view to compute motion of the user's field of view.

The 3D environment representations provide a model from which information about objects in the physical world may be obtained for such calculations. However, there are significant challenges in providing such a system that provides a real-time, immersive XR experience. Substantial processing may be required to compute the 3D environment representations. Further, the 3D environment representations are often required to be updated as objects move in the physical world (e.g., a cup moves on a table). Updates to the data representing the environment that the user is experiencing must be performed quickly without using so much of the computing resources of the device generating the XR environment because the device may be unable to perform other functions while generating and updating the 3D environment representations.

The inventors have realized and appreciated an XR system enables any of multiple devices to efficiently and accurately access previously persisted representations of very large-scale environments and render virtual content specified in relation to those representations. Shared computing resources accessible to multiple devices over a network, such as a cloud service, may generate and store 3D representations of large-scale environments using data captured by one or more devices, and enable any device in the XR system to access the persisted 3D representations.

The persisted 3D representations may be divided into smaller volumes such that a device can quickly access the volumes visible from the device's position, with a network bandwidth suitable for the device. A device in the XR system assessing persisted 3D representations may update the persisted 3D representations with fresh data captured by the device such that the device has 3D representations reflecting an up-to-date physical world geometry. A device may manage the smaller volumes of such that a suitable 3D representation can be accessed with low latency and low computational overhead. For example, some of the smaller volumes of the 3D representations may be stored in a filesystem for future use, for example, when the device re-enters a previously explored space. Further, the 3D representations may be formatted to facilitate combining and persisting information on surfaces in the 3D environment. For example, the surface information may include object information indicating locations of real objects, such as planes, identifiable by unique descriptors such that virtual content may be persisted by being associated with the object information. Alternatively or additionally, surfaces may be represented by meshes or by volumetric data, such as voxels, for example.

Various embodiments described herein employ one or more of maps that may include, without limitation, one or more sparse maps, one or more dense maps, one or more tracking maps, one or more canonical maps, and/or one or more environment maps.

A tracking map may be local to the device (e.g., an XR device) that originally created or subsequently updated the tracking map. A tracking map may serve as a dense map although a tracking map may start as a sparse map. A tracking map may include data such as headpose data of a device (e.g., the location, orientation, and/or pose of an XR device creating or updating the tracking map) in some embodiments. Such data may be represented as a point or a point node in a tracking map in some of these embodiments.

In some of these embodiments, a tracking map may further include surface information or data that may be represented as a set of meshes or depth information and/or other high-level data (e.g., location and/or one or more characteristics pertaining to one or more planes or surfaces or other objects) that may be derived from the surface or depth information. A tracking map may be promoted to a canonical map which will be described in greater details below. In some embodiments, a tracking map provides a floorplan of physical objects in the physical world. For example, a physical object or a feature thereof (e.g., a vertex, an edge, a plane or surface, etc. determined from image processing) may be represented as a point or point node in a tracking map.

In some of these embodiments, a tracking map may include data pertaining to a point or point node. Such data may include, for example, absolute and/or relative poses (e.g., absolute location, orientation, and/or gaze direction relative to a known, fixed reference, relative location, orientation, and/or gaze direction relative to an XR device at a particular location, orientation, and/or gaze direction). A feature representing a physical object or a portion thereof may be derived from, for example, image processing of one or more images containing the physical object or the portion thereof and may be used as a persistent pose that in turn may be transformed into a persistent coordinate frame (PCF). In some embodiments, a persistent coordinate frame comprises a local coordinate frame (e.g., a coordinate frame local to a reference point or coordinate system of an XR device) that allows content persistence—placement of digital contents in a virtual or mixed-reality environment and have the placed digital contents stay in the same location(s) in, for example, the virtual- or mixed-reality environment (e.g., a passable world model, a shared world model, and/or one or more maps described herein), without drifts or deviations beyond a predefined threshold across multiple user sessions (for one or more XR devices) even after closing, re-opening an application or rebooting of XR device(s).

A PCF may be placed in, for example, a canonical map described herein at a specific location, in a specific orientation, and/or in a particular gaze direction from the perspective of the viewing XR device that first creates the PCF to represent an object or a portion thereof. When an XR device enters a physical environment that the XR device or another collaborating XR device has already seen before (e.g., via one or more images captured by the XR device or another collaborating XR device), the persistent coordinate frames placed for this physical environment may be restored in the correct location(s) by the XR device by retrieving one or more corresponding canonical maps created for at least a portion of the physical environment.

In some embodiments, a PCF corresponds to a predefined position in the physical world and has a unique identifier which a user may store in a browser session, on the portable computing device (e.g., an XR device), or on a remote server. This unique identifier may be shared among multiple users. For example, when a digital content is placed in a virtual- or mixed-reality session, the nearer or nearest PCF may be requested, and the unique identifier of the nearer or the nearest PCF as well as the location corresponding to the PCF may be stored.

When the PCF is reused in a different session for a user at a different location, this stored location corresponding to the PCF may be transformed (e.g., translation, rotation, mirroring, etc.) with respect to the current coordinate system for the different location for the different virtual- or mixed-reality session so that the digital content is placed at the correct location relative to the user in the different session. A PCF may store persistent spatial information in some embodiments. In some of these embodiments, a PCF may further include a transformation relative to a reference location, orientation, and/or gaze direction as well as information derived from one or more images at a location that corresponds to the PCF. For example, a PCF may include or may be at least associated with a transformation between a coordinate frame of a map (e.g., a tracking map, a canonical map, an environment map, a sparse map, and/or a dense map, etc.) and the PCF.

In some of these embodiments, a PCF may include geographic or spatial information indicating a location within a 3D environment of a keyframe or image frame from which the persistent coordinate frame is created. In some embodiments, the transformation may be determined between a coordinate frame local to the portable computing device (e.g., an XR device) and a stored coordinate frame.

In some embodiments, all PCFs are sharable and can be transmitted among multiple users at respective, different locations. In some other embodiments, one or more PCFs are only known to an XR device that first created these one or more PCFs. In some embodiments, information about the physical world, for example, may be represented as persistent coordinate frames (PCFs). A PCF may be defined based on one or more points that represent features recognized in the physical world. The features may be selected such that they are likely to be the same from user session to user session of the XR system. PCFs may exist sparsely, providing less than all of the available information about the physical world, such that they may be efficiently processed and transferred. Techniques for processing persistent spatial information may include creating dynamic maps based on one or more coordinate systems in real space across one or more sessions, and generating persistent coordinate frames (PCF) over the sparse maps, which may be exposed to XR applications via, for example, an application programming interface (API). These capabilities may be supported by techniques for ranking and merging or stitching multiple maps created by one or more XR devices. Persistent spatial information may also enable quickly recovering and resetting head poses on each of one or more XR devices in a computationally efficient way. In some embodiments, an XR system may assign a coordinate frame to a virtual content, as opposed to attaching the virtual content in a world coordinate frame. Such configuration enables a virtual content to be described without regard to where it is rendered for a user, but it may be attached to a more persistent frame position such as a persistent coordinate frame (PCF) to be rendered in a specified location. When the locations of the objects change, the XR device may detect the changes in the environment map and determine movement of the head unit worn by the user relative to real-world objects.

In some embodiments, spatial persistence may be provided through persistent coordinate frames (PCFs). A PCF may be defined based on one or more points, representing features recognized in the physical world (e.g., corners, edges). The features may be selected such that they are likely to be the same from a user instance to another user instance of an XR system. In addition or in the alternative, drift during tracking, which causes the computed tracking path (e.g., camera trajectory) to deviate from the actual tracking path, can cause the location of virtual content, when rendered with respect to a local map that is based solely on a tracking map to appear out of place. A tracking map for the space may be refined to correct the drifts as an XR device collects more information of the scene overtime. However, if virtual content is placed on a real object before a map refinement and saved with respect to the world coordinate frame of the device derived from the tracking map, the virtual content may appear displaced, as if the real object has been moved during the map refinement. PCFs may be updated according to map refinement because the PCFs are defined based on the features and are updated as the features move during map refinements.

In some embodiments, a PCF may comprise six degrees of freedom with translations and rotations relative to a map coordinate system. A PCF may be stored in a local and/or remote storage medium. The translations and rotations of a PCF may be computed relative to a map coordinate system depending on, for example, the storage location. For example, a PCF used locally by a device may have translations and rotations relative to a world coordinate frame of the device. A PCF in the cloud may have translations and rotations relative to a canonical coordinate frame of a canonical map. In some embodiments, PCFs may provide a sparse representation of the physical world, providing less than all of the available information about the physical world, such that they may be efficiently processed and transferred. Techniques for processing persistent spatial information may include creating dynamic maps based on one or more coordinate systems in real space across one or more sessions, generating persistent coordinate frames (PCF) over the sparse maps, which may be exposed to XR applications via, for example, an application programming interface (API).

In some embodiments, a tracking map may include one or more image frames, keyframes, etc. and/or data derived from one or more image frames, keyframes, etc. It shall be noted that not all features and image frames (or keyframes) may be retained as a part of a tracking map. Rather, feature points or image frames that provide meaningful information (e.g., non-redundant information, information with sufficiently high accuracy and/or resolution beyond a predefined threshold value, etc.) may be retained in a tracking map. Therefore, a tracking map may be constructed with data collected or gathered by one or more cameras, image sensors, depth sensors, GPS (global positioning) devices, wireless devices (e.g., a Wi-Fi or a cellular transceiver), etc.

A tracking map may be stored as or merged or stitched with an environment map which will also be described in greater details below. A tracking map may be refined to correct, for example, any deviations or drifts of a computed tracking path (e.g., a computed camera trajectory) that deviates from the actual tracking path. In some embodiments, images providing meaningful information to a tracking map may be selected as keyframes that may further be integrated within (e.g., embedded within a tracking map) or associated with (e.g., stored separated yet linked with a tracking map) a tracking map. In some embodiments, a tracking map may be connected to or associated with a pose and a PCF (persistent coordinate frame) transformer.

A sparse map may include data that indicates a location of a point or structure of interest (e.g., a corner, an edge, a surface, etc.) instead of all the locations of features in some embodiments. That is, certain points or structures in a physical environment may be discarded from a sparse map. A sparse map may be constructed with a set of mapped points and/or keyframes of interest by, for example, image processing that extracts one or more points or structures of interest. One example of a sparse may include a tracking map described above. In this example, the tracking map may be deemed as a headpose sparse map although it shall be noted that other sparse maps may not always include headpose data. A sparse map may include information or data that may be used to derive a coordinate system in some embodiments. In some other embodiments, a sparse map may include or may be associated with a coordinate system. Such a coordinate system may be used to define the position and/or orientation of an object or a feature thereof in a dense map that will be described in greater details below.

A dense map may include, for example, data or information such as surface data represented by mesh or depth information in some embodiments. In some of these embodiments, a dense map may include high-level information that may be derived from surface or depth information. For example, a dense map may include data pertaining to the location and/or one or more characteristics of a plane and/or other object(s). A dense map may be augmented from a sparse map by augmenting the original data of the sparse map with any of the aforementioned data or information although it shall be noted that sparse maps may be created independently of the creation of dense maps, and vice versa, in some embodiments.

An environment map may include data or information of a piece of a physical world. For example, an environment may include locations, orientations, and/or gaze directions (when perceived with an XR device) of physical objects in a physical environment (e.g., a portion of a room) as well as other data pertaining to the physical objects (e.g., surface textures, colors, etc.) An environment map may be created with data from, for example, images from camera(s) and/or depth data from depth sensor(s). An environment may thus include much more details about the physical environment than any other maps described herein and may be used to construct a passable 3D world that may be collaborated upon (e.g., created by multiple XR devices moving around the physical world) and shared among multiple XR devices. An environment map may be transformed or stripped into a canonical map by, for example, removing unneeded data or information in some embodiments. An environment map may also be associated with multiple area or volume attributes such as one or more parameters, strengths of received signals, etc. of wireless networks, or any other desired or required parameters.

A canonical map may include data or information so that the canonical map may be localized and oriented to each of a plurality of computing devices so that each computing device may reuse the canonical map. A canonical map may thus originate as a tracking map or a sparse in some embodiments or as an environment map in some other environment.

A canonical map may include or may be associated with just enough data that determines a location of an object represented in the canonical map in some embodiments. For example, a canonical map may include or may be associated with persistent pose(s) and/or persistent coordinate frame(s) of an object of interest or a portion thereof. A canonical map, like any other maps described herein, may be merged or stitched with, for example, the persistent coordinate frame(s) in another map to render a new canonical map (e.g., by using a map merge or stitch algorithm). In some embodiments, a canonical map includes one or more structures (e.g., objects) that include one or more persistent coordinate frames (PCFs) that are stored within the canonical map or are otherwise stored separately in a data structure and are associated with the one or more structures. A structure (e.g., object) represented in a canonical map may include a single PCF node having the persistent coordinate frame information and representing an object in some embodiments. In some other embodiments, a structure represented in a canonical map may include multiple PCFs each of which is a local coordinate frame relative to, for example, a reference system of coordinates of a device that generated or updated the canonical map. Moreover, these multiple PCFs may respectively represent multiple corresponding features of the object. In some embodiments, the morphism or one or more functions defined for and/or included in a canonical frame may further comprise one or more operations that receive an input (e.g., input location, orientation, pose, surface, coordinate system, and/or depth information) from, for example, a tracking map, a sparse map, a dense map, etc. and generate an output for the input by performing a transformation (e.g., a matrix operation for translation, rotation, mirroring, etc.) In some embodiments, a canonical map includes only a morphism (or one or more functions) and one or more structure each represented by one or more persistent coordinate frames but no other data or information. In some other embodiments, a canonical map includes a morphism, one or more structures each represented by one or more persistent coordinate frames, and data or metadata corresponding to a description or characteristic of the structure. More details about a persistent coordinate frame are further described below.

A canonical map that has been localized to a specific XR device may be referred to as a promoted map. In some embodiments, a canonical map includes coordinate information (e.g., coordinates of a point, a coordinate system, etc.) and may also include one or more structures that include, for example, at least one PCF (persistent coordinate frame). For localizing a tracking map, an image frame or a keyframe pertaining to the tracking map may be associated with the at least one PCF pertaining to the canonical map; and the pose of the image may then be used to localize the tracking map that stores the pose information.

Canonical maps may be ranked with respective rankings that may indicate canonical maps that have regions similar to a region of the tracking map such that, upon attempting to merge or stitch the tracking map into the canonical map, it is like that there will be a correspondence between at least a portion of the tracking map and at least a portion of the canonical map. A canonical map may have one or more tiles or defined areas; and merging or stitching the canonical map with another map may be limited to one or more tiles or defined areas to conserve computing resource consumption.

A canonical map may include a set of features that defines one or more persistent coordinate frames (PCFs) in some embodiments although there is no requirement that the set of features be associated with a single persistent location in either the canonical map or the tracking map. In some embodiments, a transformation of the set of feature points in the tracking map to align with the candidate set of features in the canonical map. This transformation may be applied to the entire tracking map, enabling overlapping portions of the tracking map and the canonical map to be identified.

Multiple canonical maps may be merged or stitched to render a new canonical map. In some embodiments, the attributes of a canonical map may be derived from the attributes of a tracking map or maps used to form an area of the canonical map. In some embodiments in which a persistent coordinate frame of a canonical map is defined based on a persistent pose in a tracking map that was merged or stitched into the canonical map, the persistent coordinate frame may be assigned the same attributes as the persistent pose. In some embodiments, a canonical map may include a plurality attributes serving as canonical map identifiers indicating the canonical map's location within a physical space, such as somewhere on the planet earth or in the space.

In some embodiments, multiple canonical maps may be disposed geographically in a two-dimensional pattern as these multiple canonical maps may exist on a surface of the earth (or in the space). These canonical maps may be uniquely identifiable by, for example, corresponding longitudes and latitudes or positions relative to earth. In these embodiments, these canonical maps may provide a floorplan of reconstructed physical objects in a corresponding physical world, represented by respective points. A map point in a canonical map may represent a feature of a physical object that may include multiple features. In some embodiments where a server stores no canonical map for a region of the physical world represented by the tracking map, the tracking map may be stored as an initial canonical map that may further be processed to become a canonical map having the pertinent data, when available.

In an XR system, each XR device may develop a local dense map of its physical environment by integrating information from one or more images collected as the device operates. The local dense map may include 3D representations of the environment in one or more forms including, for example, voxels, meshes, or planes. U.S. patent application Ser. No. 16/229,799 describes generating 3D representations on device and is hereby incorporated herein by reference it its entirety.

In some embodiments, dense information, regardless of its format, may be posed with respect to a coordinate frame defined in a sparse map. A device, for example, may maintain a local sparse tracking map, which may be constructed with sets of features, forming persistent poses in the tracking map. The location and orientation of a surface, for example, may be expressed relative to such a persistent pose.

The local coordinate frames defined by sparse maps in each device may be related to each other through a shared frame of reference provided by a shared sparse map. Such a shared sparse map may be formed by merging or stitching tracking maps from multiple devices into larger sparse maps that are shared across multiple devices. Each device may localize its position, expressed relative to its tracking map, with respect to a shared sparse map—enabling each of multiple devices to use its local tracking maps to identify a location and orientation in the 3D environment specified in a coordinate frame of the shared map.

The devices may use shared location information derived through sparse maps for defining the pose of dense information, such that dense information may be spatially correlated. With such spatial correlation dense information may be aggregated from multiple devices and shared with multiple devices, each of which may have a different local coordinate frame.

The XR system may implement one or more techniques so as to enable operation based on spatial information provided by shared sparse maps. The shared spatial information may be represented by a persistent map. The persistent map may be stored in a remote storage medium (e.g., a cloud). For example, the wearable device worn by a user, after being turned on, may retrieve from persistent storage, such as from cloud storage, an appropriate map that was previously created and stored. That previously stored map may have been based on data about the environment collected with sensors on the user's wearable device during prior sessions. Retrieving a stored map may enable use of the wearable device without completing a scan of the physical world with the sensors on the wearable device. Alternatively or additionally, the system/device, upon entering a new region of the physical world, may similarly retrieve an appropriate stored map.

The stored map may be represented in a canonical form to which a local frame of reference on each XR device may be related. In a multidevice XR system, the stored map accessed by one device may have been created and stored by another device and/or may have been constructed by aggregating data about the physical world collected by sensors on multiple wearable devices that were previously present in at least a portion of the physical world represented by the stored map.

In some embodiments, persistent spatial information may be represented in a way that may be readily shared among users and among the distributed components, including applications. Canonical maps may provide information about the physical world, for example, as persistent coordinate frames (PCFs). A PCF may be defined based on a set of features recognized in the physical world. The features may be selected such that they are likely to be the same from user session to user session of the XR system. PCFs may exist sparsely, providing less than all of the available information about the physical world, such that they may be efficiently processed and transferred. Techniques for processing persistent spatial information may include creating dynamic maps based on the local coordinate systems of one or more devices across one or more sessions. These maps may be sparse maps, representing the physical world based on a subset of the feature points detected in images used in forming the maps. The persistent coordinate frames (PCF) may be generated from the sparse maps, and may be exposed to XR applications via, for example, an application programming interface (API). These capabilities may be supported by techniques for forming the canonical maps by merging or stitching multiple maps created by one or more XR devices.

The relationship between the canonical map and a local map for each device may be determined through a localization process. That localization process may be performed on each XR device based on a set of canonical maps selected and sent to the device. Alternatively or additionally, a localization service may be provided on remote processors, such as might be implemented in the cloud.

To support these and other functions, the XR system may include components that, based on data about the physical world collected with sensors on user devices, develop, maintain, and use persistent spatial information, including one or more stored maps. These components may be distributed across the XR system, with some operating, for example, on a head mounted portion of a user device. Other components may operate on a computer, associated with the user coupled to the head mounted portion over a local or personal area network. Yet others may operate at a remote location, such as at one or more servers accessible over a wide area network.

Sharing data about the physical world among multiple devices may enable shared user experiences of virtual content. Two XR devices that have access to the same stored map, for example, may both localize with respect to the stored map. Once localized, a user device may render virtual content that has a location specified by reference to the stored map by translating that location to a frame of reference maintained by the user device. The user device may use this local frame of reference to control the display of the user device to render the virtual content in the specified location.

When the stored maps include dense maps that are posed with respect to the sparse information, a device may efficiently obtain dense information, representing surfaces in the 3D environment. The device may, in connection with its motion through the physical world, which may be tracked through sparse maps, access the stored maps to maintain an up-to-date dense representation of the 3D environment.

Techniques as described herein may be used together or separately with many types of devices and for many types of scenes, including wearable or portable devices with limited computational resources that provide an augmented or mixed reality scene. In some embodiments, the techniques may be implemented by one or more services that form a portion of an XR system.

AR System Overview

Figure 2:
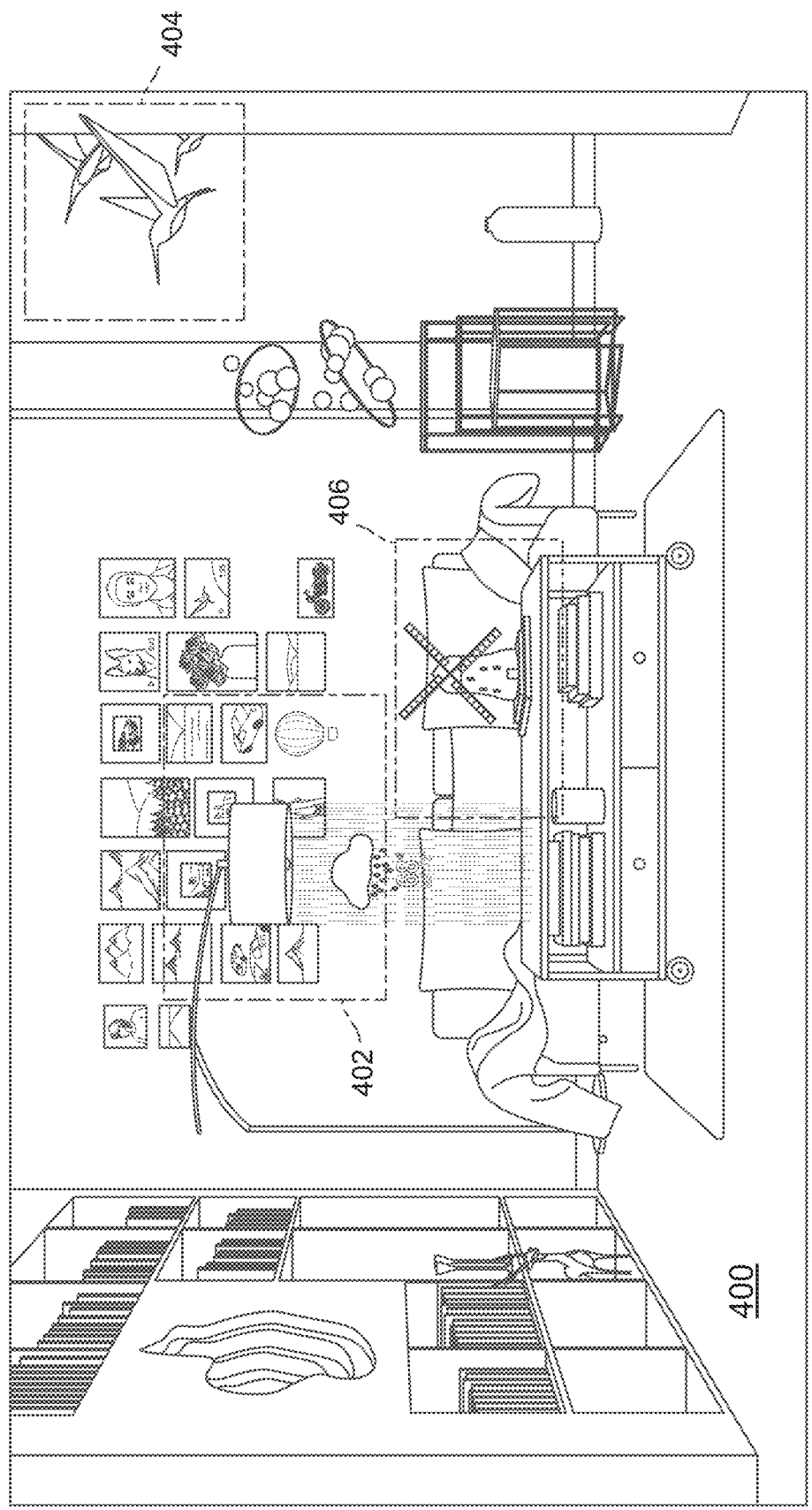
FIG. 2 is a sketch of an exemplary simplified AR scene, showing exemplary use cases of an XR system, according to some embodiments.

FIGS. 1 and 2 illustrate scenes with virtual content displayed in conjunction with a portion of the physical world. For purposes of illustration, an AR system is used as an example of an XR system. FIGS. 3-6B illustrate an exemplary AR system, including one or more processors, memory, sensors and user interfaces that may operate according to the techniques described herein.

Referring to FIG. 1, an outdoor AR scene 354 is depicted in which a user of an AR technology sees a physical world park-like setting 356, featuring people, trees, buildings in the background, and a concrete platform 358. In addition to these items, the user of the AR technology also perceives that they "see" a robot statue 357 standing upon the physical world concrete platform 358, and a cartoon-like avatar character 352 flying by which seems to be a personification of a bumble bee, even though these elements (e.g., the avatar character 352, and the robot statue 357) do not exist in the physical world. Due to the extreme complexity of the human visual perception and nervous system, it is challenging to produce an AR technology that facilitates a comfortable, natural-feeling, rich presentation of virtual image elements amongst other virtual or physical world imagery elements.

Such an AR scene may be achieved with a system that builds maps of the physical world based on tracking information, enable users to place AR content in the physical world, determine locations in the maps of the physical world where AR content are placed, preserve the AR scenes such that the placed AR content can be reloaded to display in the physical world during, for example, a different AR experience session, and enable multiple users to share an AR experience. The system may build and update a digital representation of the physical world surfaces around the user. This representation may be used to render virtual content so as to appear fully or partially occluded by physical objects between the user and the rendered location of the virtual content, to place virtual objects, in physics-based interactions, and for virtual character path planning and navigation, or for other operations in which information about the physical world is used.

FIG. 2 depicts another example of an indoor AR scene 400, showing exemplary use cases of an XR system, according to some embodiments. The exemplary scene 400 is a living room having walls, a bookshelf on one side of a wall, a floor lamp at a corner of the room, a floor, a sofa, and coffee table on the floor. In addition to these physical items, the user of the AR technology also perceives virtual objects such as images on the wall behind the sofa, birds flying through the door, a deer peeking out from the book shelf, and a decoration in the form of a windmill placed on the coffee table.

For the images on the wall, the AR technology requires information about not only surfaces of the wall but also objects and surfaces in the room such as lamp shape, which are occluding the images to render the virtual objects correctly. For the flying birds, the AR technology requires information about all the objects and surfaces around the room for rendering the birds with realistic physics to avoid the objects and surfaces or bounce off them if the birds collide. For the deer, the AR technology requires information about the surfaces such as the floor or coffee table to compute where to place the deer. For the windmill, the system may identify that is an object separate from the table and may determine that it is movable, whereas corners of shelves or corners of the wall may be determined to be stationary. Such a distinction may be used in determinations as to which portions of the scene are used or updated in each of various operations.

The virtual objects may be placed in a previous AR experience session. When new AR experience sessions start in the living room, the AR technology requires the virtual objects being accurately displayed at the locations previously placed and realistically visible from different viewpoints. For example, the windmill should be displayed as standing on the books rather than drifting above the table at a different location without the books. Such drifting may happen if the locations of the users of the new AR experience sessions are not accurately localized in the living room. As another example, if a user is viewing the windmill from a viewpoint different from the viewpoint when the windmill was placed, the AR technology requires corresponding sides of the windmill being displayed.

A scene may be presented to the user via a system that includes multiple components, including a user interface that can stimulate one or more user senses, such as sight, sound, and/or touch. In addition, the system may include one or more sensors that may measure parameters of the physical portions of the scene, including position and/or motion of the user within the physical portions of the scene. Further, the system may include one or more computing devices, with associated computer hardware, such as memory. These components may be integrated into a single device or may be distributed across multiple interconnected devices. In some embodiments, some or all of these components may be integrated into a wearable device.

Figure 3:
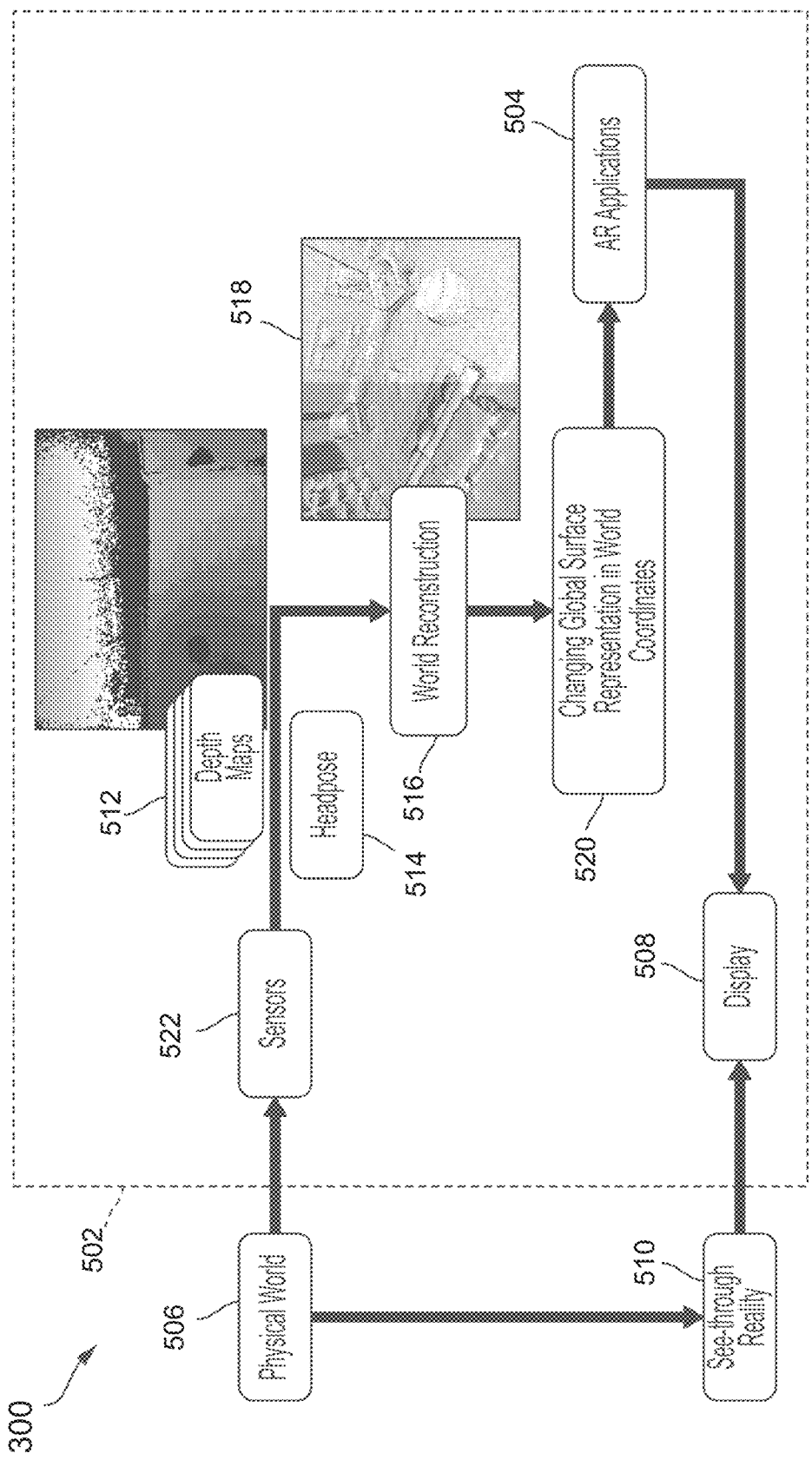
FIG. 3 is a schematic diagram illustrating data flow for a single user in an AR system configured to provide an experience to the user of AR content interacting with a physical world, according to some embodiments.

FIG. 3 depicts an AR system 502 configured to provide an experience of AR contents interacting with a physical world 506, according to some embodiments. The AR system 502 may include a display 508. In the illustrated embodiment, the display 508 may be worn by the user as part of a headset such that a user may wear the display over their eyes like a pair of goggles or glasses. At least a portion of the display may be transparent such that a user may observe a see-through reality 510. The see-through reality 510 may correspond to portions of the physical world 506 that are within a present viewpoint of the AR system 502, which may correspond to the viewpoint of the user in the case that the user is wearing a headset incorporating both the display and sensors of the AR system to acquire information about the physical world.

AR contents may also be presented on the display 508, overlaid on the see-through reality 510. To provide accurate interactions between AR contents and the see-through reality 510 on the display 508, the AR system 502 may include sensors 522 configured to capture information about the physical world 506.

The sensors 522 may include one or more depth sensors that output depth maps 512. Each depth map 512 may have multiple pixels, each of which may represent a distance to a surface in the physical world 506 in a particular direction relative to the depth sensor. Raw depth data may come from a depth sensor to create a depth map. Such depth maps may be updated as fast as the depth sensor can form a new image, which may be hundreds or thousands of times per second. However, that data may be noisy and incomplete, and have holes shown as black pixels on the illustrated depth map.

The system may include other sensors, such as image sensors. The image sensors may acquire monocular or stereoscopic information that may be processed to represent the physical world in other ways. For example, the images may be processed in world reconstruction component 516 to create a mesh, representing connected portions of objects in the physical world. Metadata about such objects, including for example, color and surface texture, may similarly be acquired with the sensors and stored as part of the world reconstruction.

The system may also acquire information about the headpose (or "pose") of the user with respect to the physical world. In some embodiments, a headpose tracking component of the system may be used to compute headposes in real time. The headpose tracking component may represent a headpose of a user in a coordinate frame with six degrees of freedom including, for example, translation in three perpendicular axes (e.g., forward/backward, up/down, left/right) and rotation about the three perpendicular axes (e.g., pitch, yaw, and roll). In some embodiments, sensors 522 may include inertial measurement units that may be used to compute and/or determine a headpose 514. A headpose 514 for a depth map may indicate a present viewpoint of a sensor capturing the depth map with six degrees of freedom, for example, but the headpose 514 may be used for other purposes, such as to relate image information to a particular portion of the physical world or to relate the position of the display worn on the user's head to the physical world.

In some embodiments, the headpose information may be derived in other ways than from an IMU, such as from analyzing objects in an image. For example, the headpose tracking component may compute relative position and orientation of an AR device to physical objects based on visual information captured by cameras and inertial information captured by IMUs. The headpose tracking component may then compute a headpose of the AR device by, for example, comparing the computed relative position and orientation of the AR device to the physical objects with features of the physical objects. In some embodiments, that comparison may be made by identifying features in images captured with one or more of the sensors 522 that are stable over time such that changes of the position of these features in images captured over time can be associated with a change in headpose of the user.

The inventors have realized and appreciated techniques for operating XR systems to provide XR scenes for a more immersive user experience such as estimating headpose at a frequency of 1 kHz, with low usage of computational resources in connection with an XR device, that may be configured with, for example, four video graphic array (VGA) cameras operating at 30 Hz, one inertial measurement unit (IMU) operating at 1 kHz, compute power of a single advanced RISC machine (ARM) core, memory less than 1 GB, and network bandwidth less than 100 Mbp. These techniques relate to reducing processing required to generate and maintain maps and estimate headpose as well as to providing and consuming data with low computational overhead. The XR system may calculate its pose based on the matched visual features. U.S. patent application Ser. No. 16/221,065 describes hybrid tracking and is hereby incorporated herein by reference in its entirety.

In some embodiments, the AR device may construct a map from the feature points recognized in successive images in a series of image frames captured as a user moves throughout the physical world with the AR device. Though each image frame may be taken from a different pose as the user moves, the system may adjust the orientation of the features of each successive image frame to match the orientation of the initial image frame by matching features of the successive image frames to previously captured image frames. Translations of the successive image frames so that points representing the same features will match corresponding feature points from previously collected image frames, can be used to align each successive image frame to match the orientation of previously processed image frames. The frames in the resulting map may have a common orientation established when the first image frame was added to the map. This map, with sets of feature points in a common frame of reference, may be used to determine the user's pose within the physical world by matching features from current image frames to the map. In some embodiments, this map may be called a tracking map.

In addition to enabling tracking of the user's pose within the environment, this map may enable other components of the system, such as world reconstruction component 516, to determine the location of physical objects with respect to the user. The world reconstruction component 516 may receive the depth maps 512 and headposes 514, and any other data from the sensors, and integrate that data into a reconstruction 518. The reconstruction 518 may be more complete and less noisy than the sensor data. The world reconstruction component 516 may update the reconstruction 518 using spatial and temporal averaging of the sensor data from multiple viewpoints over time.

The reconstruction 518 may include representations of the physical world in one or more data formats including, for example, voxels, meshes, planes, etc. The different formats may represent alternative representations of the same portions of the physical world or may represent different portions of the physical world. In the illustrated example, on the left side of the reconstruction 518, portions of the physical world are presented as a global surface; on the right side of the reconstruction 518, portions of the physical world are presented as meshes.

In some embodiments, the map maintained by headpose component 514 may be sparse relative to other maps that might be maintained of the physical world. Rather than providing information about locations, and possibly other characteristics, of surfaces, the sparse map may indicate locations of interest points and/or structures, such as corners or edges. In some embodiments, the map may include image frames as captured by the sensors 522. These frames may be reduced to features, which may represent the interest points and/or structures. In conjunction with each frame, information about a pose of a user from which the frame was acquired may also be stored as part of the map. In some embodiments, every image acquired by the sensor may or may not be stored. In some embodiments, the system may process images as they are collected by sensors and select subsets of the image frames for further computation. The selection may be based on one or more criteria that limits the addition of information yet ensures that the map contains useful information. The system may add a new image frame to the map, for example, based on overlap with a prior image frame already added to the map or based on the image frame containing a sufficient number of features determined as likely to represent stationary objects. In some embodiments, the selected image frames, or groups of features from selected image frames may serve as key frames for the map, which are used to provide spatial information.

In some embodiments, the amount of data that is processed when constructing maps may be reduced, such as by constructing sparse maps with a collection of mapped points and keyframes and/or dividing the maps into blocks to enable updates by blocks. A mapped point may be associated with a point of interest in the environment. A keyframe may include selected information from camera-captured data. U.S. patent application Ser. No. 16/520,582 describes determining and/or evaluating localization maps and is hereby incorporated herein by reference in its entirety.

The AR system 502 may integrate sensor data over time from multiple viewpoints of a physical world. The poses of the sensors (e.g., position and orientation) may be tracked as a device including the sensors is moved. As the sensor's frame pose is known and how it relates to the other poses, each of these multiple viewpoints of the physical world may be fused together into a single, combined reconstruction of the physical world, which may serve as an abstract layer for the map and provide spatial information. The reconstruction may be more complete and less noisy than the original sensor data by using spatial and temporal averaging (i.e., averaging data from multiple viewpoints over time), or any other suitable method.

In the illustrated embodiment in FIG. 3, a map represents the portion of the physical world in which a user of a single, wearable device is present. In that scenario, headpose associated with frames in the map may be represented as a local headpose, indicating orientation relative to an initial orientation for a single device at the start of a session. For example, the headpose may be tracked relative to an initial headpose when the device was turned on or otherwise operated to scan an environment to build a representation of that environment.

In combination with content characterizing that portion of the physical world, the map may include metadata. The metadata, for example, may indicate time of capture of the sensor information used to form the map. Metadata alternatively or additionally may indicate location of the sensors at the time of capture of information used to form the map. Location may be expressed directly, such as with information from a GPS chip, or indirectly, such as with a wireless (e.g., Wi-Fi) signature indicating strength of signals received from one or more wireless access points while the sensor data was being collected and/or with identifiers, such as BSSID's, of wireless access points to which the user device connected while the sensor data was collected.

The reconstruction 518 may be used for AR functions, such as producing a surface representation of the physical world for occlusion processing or physics-based processing. This surface representation may change as the user moves or objects in the physical world change. Aspects of the reconstruction 518 may be used, for example, by a component 520 that produces a changing global surface representation in world coordinates, which may be used by other components.

The AR content may be generated based on this information, such as by AR applications 504. An AR application 504 may be a game program, for example, that performs one or more functions based on information about the physical world, such as visual occlusion, physics-based interactions, and environment reasoning. It may perform these functions by querying data in different formats from the reconstruction 518 produced by the world reconstruction component 516. In some embodiments, component 520 may be configured to output updates when a representation in a region of interest of the physical world changes. That region of interest, for example, may be set to approximate a portion of the physical world in the vicinity of the user of the system, such as the portion within the view field of the user, or is projected (predicted/determined) to come within the view field of the user.

The AR applications 504 may use this information to generate and update the AR contents. The virtual portion of the AR contents may be presented on the display 508 in combination with the see-through reality 510, creating a realistic user experience.

Figure 4:
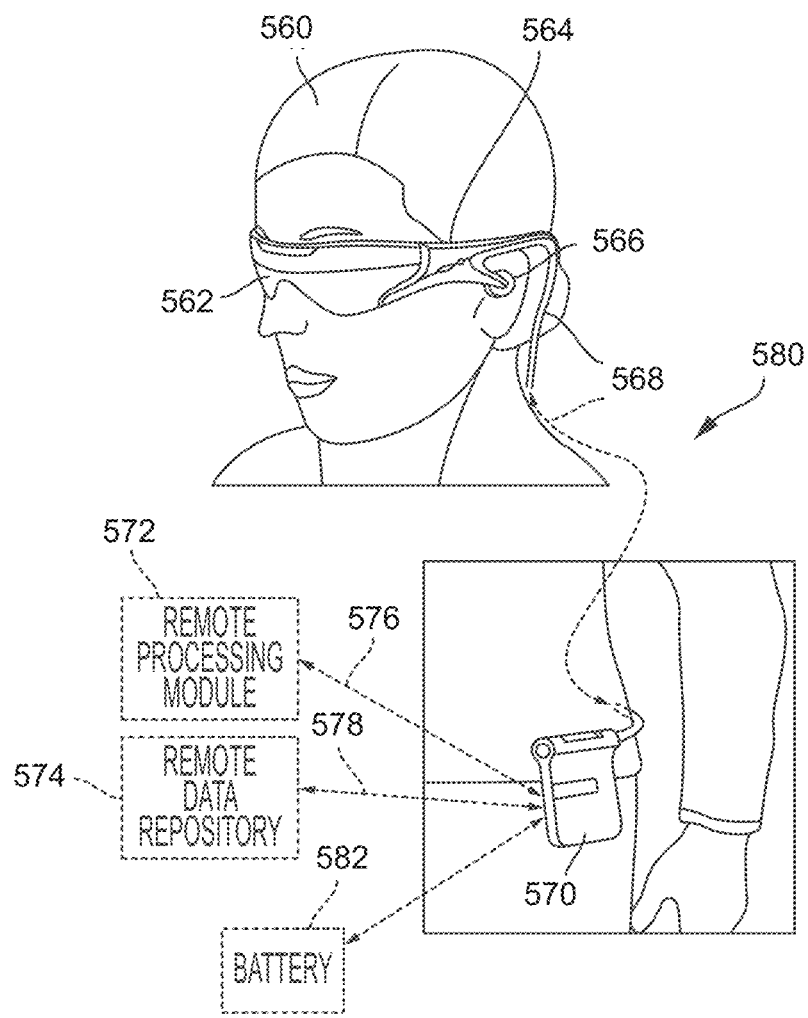
FIG. 4 is a schematic diagram illustrating an exemplary AR display system, displaying virtual content for a single user, according to some embodiments.

In some embodiments, an AR experience may be provided to a user through an XR device, which may be a wearable display device, which may be part of a system that may include remote processing and or remote data storage and/or, in some embodiments, other wearable display devices worn by other users. FIG. 4 illustrates an example of system 580 (hereinafter referred to as "system 580") including a single wearable device for simplicity of illustration. The system 580 includes a head mounted display device 562

(hereinafter referred to as "display device 562"), and various mechanical and electronic modules and systems to support the functioning of the display device 562. The display device 562 may be coupled to a frame 564, which is wearable by a display system user or viewer 560 (hereinafter referred to as "user 560") and configured to position the display device 562 in front of the eyes of the user 560. According to various embodiments, the display device 562 may be a sequential display. The display device 562 may be monocular or binocular. In some embodiments, the display device 562 may be an example of the display 508 in FIG. 3.

In some embodiments, a speaker 566 is coupled to the frame 564 and positioned proximate an ear canal of the user 560. In some embodiments, another speaker, not shown, is positioned adjacent another ear canal of the user 560 to provide for stereo/shapeable sound control. The display device 562 is operatively coupled, such as by a wired lead or wireless connectivity 568, to a local data processing module 570 which may be mounted in a variety of configurations, such as fixedly attached to the frame 564, fixedly attached to a helmet or hat worn by the user 560, embedded in headphones, or otherwise removably attached to the user 560 (e.g., in a backpack-style configuration, in a belt-coupling style configuration).

The local data processing module 570 may include a processor, as well as digital memory, such as non-volatile memory (e.g., flash memory), both of which may be utilized to assist in the processing, caching, and storage of data. The data include data a) captured from sensors (which may be, e.g., operatively coupled to the frame 564) or otherwise attached to the user 560, such as image capture devices (such as cameras), microphones, inertial measurement units, accelerometers, compasses, GPS units, radio devices, and/or gyros; and/or b) acquired and/or processed using remote processing module 572 and/or remote data repository 574, possibly for passage to the display device 562 after such processing or retrieval.

In some embodiments, the wearable deice may communicate with remote components. The local data processing module 570 may be operatively coupled by communication links 576, 578, such as via a wired or wireless communication links, to the remote processing module 572 and remote data repository 574, respectively, such that these remote modules 572, 574 are operatively coupled to each other and available as resources to the local data processing module 570. In further embodiments, in addition or as alternative to remote data repository 574, the wearable device can access cloud based remote data repositories, and/or services. In some embodiments, the headpose tracking component described above may be at least partially implemented in the local data processing module 570. In some embodiments, the world reconstruction component 516 in FIG. 3 may be at least partially implemented in the local data processing module 570. For example, the local data processing module 570 may be configured to execute computer executable instructions to generate the map and/or the physical world representations based at least in part on at least a portion of the data.

In some embodiments, processing may be distributed across local and remote processors. For example, local processing may be used to construct a map on a user device (e.g., tracking map) based on sensor data collected with sensors on that user's device. Such a map may be used by applications on that user's device. Additionally, previously created maps (e.g., canonical maps) may be stored in remote data repository 574. Where a suitable stored or persistent map is available, it may be used instead of or in addition to the tracking map created locally on the device. In some embodiments, a tracking map may be localized to the stored map, such that a correspondence is established between a tracking map, which might be oriented relative to a position of the wearable device at the time a user turned the system on, and the canonical map, which may be oriented relative to one or more persistent features. In some embodiments, the persistent map might be loaded on the user device to allow the user device to render virtual content without a delay associated with scanning a location to build a tracking map of the user's full environment from sensor data acquired during the scan. In some embodiments, the user device may access a remote persistent map (e.g., stored on a cloud) without the need to download the persistent map on the user device.

In some embodiments, spatial information may be communicated from the wearable device to remote services, such as a cloud service that is configured to localize a device to stored maps maintained on the cloud service. According to one embodiment, the localization processing can take place in the cloud matching the device location to existing maps, such as canonical maps, and return transforms that link virtual content to the wearable device location. In such embodiments, the system can avoid communicating maps from remote resources to the wearable device. Other embodiments can be configured for both device-based and cloud-based localization, for example, to enable functionality where network connectivity is not available or a user opts not to enable could-based localization.

Alternatively or additionally, the tracking map may be merged or stitched with previously stored maps to extend or improve the quality of those maps. The processing to determine whether a suitable previously created environment map is available and/or to merge or stitch a tracking map with one or more stored environment maps may be done in local data processing module 570 or remote processing module 572.

In some embodiments, the local data processing module 570 may include one or more processors (e.g., a graphics processing unit (GPU)) configured to analyze and process data and/or image information. In some embodiments, the local data processing module 570 may include a single processor (e.g., a single-core or multi-core ARM processor), which would limit the local data processing module 570's compute budget but enable a more miniature device. In some embodiments, the world reconstruction component 516 may use a compute budget less than a single Advanced RISC Machine (ARM) core to generate physical world representations in real-time on a non-predefined space such that the remaining compute budget of the single ARM core can be accessed for other uses such as, for example, extracting meshes.

In some embodiments, the remote data repository 574 may include a digital data storage facility, which may be available through the Internet or other networking configuration in a "cloud" resource configuration. In some embodiments, all data is stored and all computations are performed in the local data processing module 570, allowing fully autonomous use from a remote module. In some embodiments, all data is stored and all or most computations are performed in the remote data repository 574, allowing for a smaller device. A world reconstruction, for example, may be stored in whole or in part in this repository 574.

In embodiments in which data is stored remotely, and accessible over a network, data may be shared by multiple users of an augmented reality system. For example, user devices may upload their tracking maps to augment a database of environment maps. In some embodiments, the tracking map upload occurs at the end of a user session with a wearable device. In some embodiments, the tracking map uploads may occur continuously, semi-continuously, intermittently, at a pre-defined time, after a pre-defined period from the previous upload, or when triggered by an event. A tracking map uploaded by any user device may be used to expand or improve a previously stored map, whether based on data from that user device or any other user device. Likewise, a persistent map downloaded to a user device may be based on data from that user device or any other user device. In this way, high quality environment maps may be readily available to users to improve their experiences with the AR system.

In further embodiments, persistent map downloads can be limited and/or avoided based on localization executed on remote resources (e.g., in the cloud). In such configurations, a wearable device or other XR device communicates to the cloud service feature information coupled with pose information (e.g., positioning information for the device at the time the features represented in the feature information were sensed). One or more components of the cloud service may match the feature information to respective stored maps (e.g., canonical maps) and generates transforms between a tracking map maintained by the XR device and the coordinate system of the canonical map. Each XR device that has its tracking map localized with respect to the canonical map may accurately render virtual content in locations specified with respect to the canonical map based on its own tracking.

In some embodiments, the local data processing module 570 is operatively coupled to a battery 582. In some embodiments, the battery 582 is a removable power source, such as over the counter batteries. In other embodiments, the battery 582 is a lithium-ion battery. In some embodiments, the battery 582 includes both an internal lithium-ion battery chargeable by the user 560 during non-operation times of the system 580 and removable batteries such that the user 560 may operate the system 580 for longer periods of time without having to be tethered to a power source to charge the lithium-ion battery or having to shut the system 580 off to replace batteries.

Figure 5A:
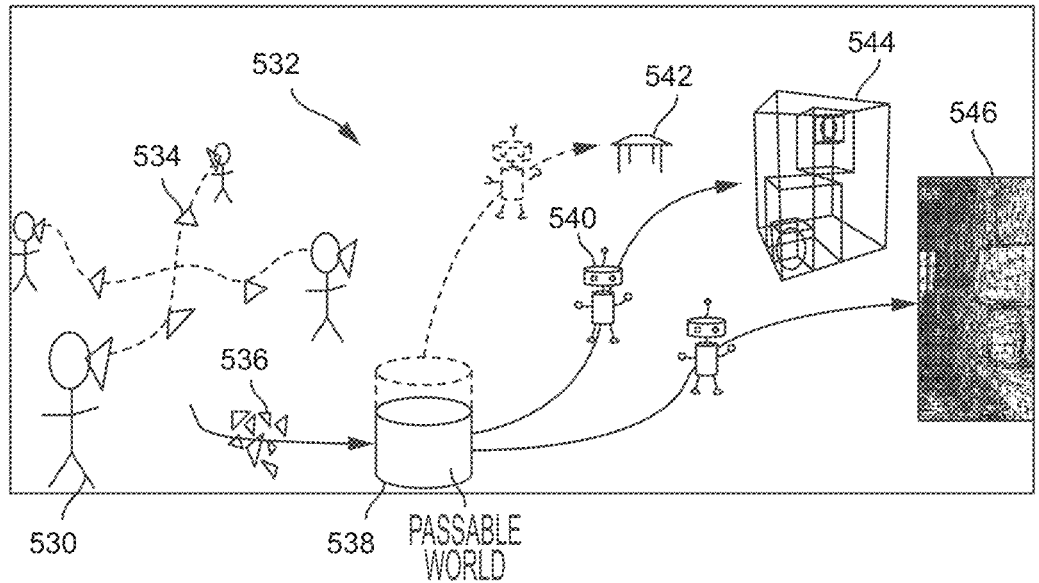
FIG. 5A is a schematic diagram illustrating a user wearing an AR display system rendering AR content as the user moves through a physical world environment, according to some embodiments.

FIG. 5A illustrates a user 530 wearing an AR display system rendering AR content as the user 530 moves through a physical world environment 532 (hereinafter referred to as "environment 532"). The information captured by the AR system along the movement path of the user may be processed into one or more tracking maps. The user 530 positions the AR display system at positions 534, and the AR display system records ambient information of a passable world (e.g., a digital representation of the real objects in the physical world that can be stored and updated with changes to the real objects in the physical world) relative to the positions 534. That information may be stored as poses in combination with images, features, directional audio inputs, or other desired data. The positions 534 are aggregated to data inputs 536, for example, as part of a tracking map, and processed at least by a passable world module 538, which may be implemented, for example, by processing on a remote processing module 572 of FIG. 4. In some embodiments, the passable world module 538 may include the headpose component 514 and the world reconstruction component 516, such that the processed information may indicate the location of objects in the physical world in combination with other information about physical objects used in rendering virtual content.

The passable world module 538 determines, at least in part, where and how AR content 540 can be placed in the physical world as determined from the data inputs 536. The AR content is "placed" in the physical world by presenting via the user interface both a representation of the physical world and the AR content, with the AR content rendered as if it were interacting with objects in the physical world and the objects in the physical world presented as if the AR content were, when appropriate, obscuring the user's view of those objects. In some embodiments, the AR content may be placed by appropriately selecting portions of a fixed element 542 (e.g., a table) from a reconstruction (e.g., the reconstruction 518) to determine the shape and position of the AR content 540. As an example, the fixed element may be a table and the virtual content may be positioned such that it appears to be on that table. In some embodiments, the AR content may be placed within structures in a field of view 544, which may be a present field of view or an estimated future field of view. In some embodiments, the AR content may be persisted relative to a model 546 of the physical world (e.g., a mesh).

As depicted, the fixed element 542 serves as a proxy (e.g., digital copy) for any fixed element within the physical world which may be stored in the passable world module 538 so that the user 530 can perceive content on the fixed element 542 without the system having to map to the fixed element 542 each time the user 530 sees it. The fixed element 542 may, therefore, be a mesh model from a previous modeling session or determined from a separate user but nonetheless stored by the passable world module 538 for future reference by a plurality of users. Therefore, the passable world module 538 may recognize the environment 532 from a previously mapped environment and display AR content without a device of the user 530 mapping all or part of the environment 532 first, saving computation process and cycles and avoiding latency of any rendered AR content.

The mesh model 546 of the physical world may be created by the AR display system and appropriate surfaces and metrics for interacting and displaying the AR content 540 can be stored by the passable world module 538 for future retrieval by the user 530 or other users without the need to completely or partially recreate the model. In some embodiments, the data inputs 536 are inputs such as geolocation, user identification, and current activity to indicate to the passable world module 538 which fixed element 542 of one or more fixed elements are available, which AR content 540 has last been placed on the fixed element 542, and whether to display that same content (such AR content being "persistent" content regardless of user viewing a particular passable world model).

Even in embodiments in which objects are considered to be fixed (e.g., a kitchen table), the passable world module 538 may update those objects in a model of the physical world from time to time to account for the possibility of changes in the physical world. The model of fixed objects may be updated with a very low frequency. Other objects in the physical world may be moving or otherwise not regarded as fixed (e.g., kitchen chairs). To render an AR scene with a realistic feel, the AR system may update the position of these non-fixed objects with a much higher frequency than is used to update fixed objects. To enable accurate tracking of all of the objects in the physical world, an AR system may draw information from multiple sensors, including one or more image sensors.

Figure 5B:
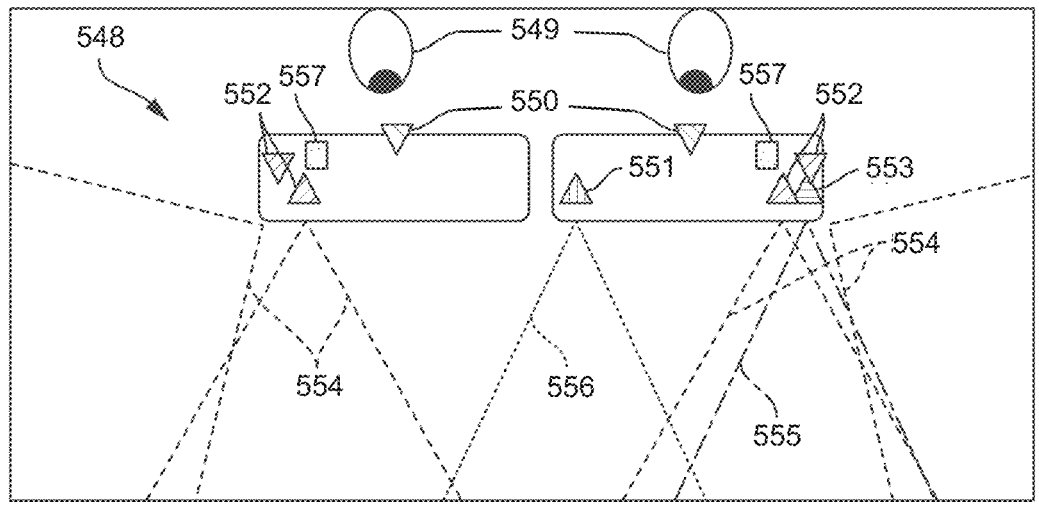
FIG. 5B is a schematic diagram illustrating a viewing optics assembly and attendant components, according to some embodiments.

FIG. 5B is a schematic illustration of a viewing optics assembly 548 and attendant components. In some embodiments, two eye tracking cameras 550, directed toward user eyes 549, detect metrics of the user eyes 549, such as eye shape, eyelid occlusion, pupil direction and glint on the user eyes 549.

In some embodiments, one of the sensors may be a depth sensor 551, such as a time-of-flight sensor, emitting signals to the world and detecting reflections of those signals from nearby objects to determine distance to given objects. A depth sensor, for example, may quickly determine whether objects have entered the field of view of the user, either as a result of motion of those objects or a change of pose of the user. However, information about the position of objects in the field of view of the user may alternatively or additionally be collected with other sensors. Depth information, for example, may be obtained from stereoscopic visual image sensors or plenoptic sensors.

In some embodiments, world cameras 552 record a greater-than-peripheral view to map and/or otherwise create a model of the environment 532 and detect inputs that may affect AR content. In some embodiments, the world camera 552 and/or camera 553 may be grayscale and/or color image sensors, which may output grayscale and/or color image frames at fixed time intervals. Camera 553 may further capture physical world images within a field of view of the user at a specific time. Pixels of a frame-based image sensor may be sampled repetitively even if their values are unchanged. Each of the world cameras 552, the camera 553 and the depth sensor 551 have respective fields of view of 554, 555, and 556 to collect data from and record a physical world scene, such as the physical world environment 532 depicted in FIG. 34A.

Inertial measurement units 557 may determine movement and orientation of the viewing optics assembly 548. In some embodiments, inertial measurement units 557 may provide an output indicating a direction of gravity. In some embodiments, each component is operatively coupled to at least one other component. For example, the depth sensor 551 is operatively coupled to the eye tracking cameras 550 as a confirmation of measured accommodation against actual distance the user eyes 549 are looking at.

It should be appreciated that a viewing optics assembly 548 may include some of the components illustrated in FIG. 34B and may include components instead of or in addition to the components illustrated. In some embodiments, for example, a viewing optics assembly 548 may include two world camera 552 instead of four. Alternatively or additionally, cameras 552 and 553 need not capture a visible light image of their full field of view. A viewing optics assembly 548 may include other types of components. In some embodiments, a viewing optics assembly 548 may include one or more dynamic vision sensor (DVS), whose pixels may respond asynchronously to relative changes in light intensity exceeding a threshold.

In some embodiments, a viewing optics assembly 548 may not include the depth sensor 551 based on time-of-flight information. In some embodiments, for example, a viewing optics assembly 548 may include one or more plenoptic cameras, whose pixels may capture light intensity and an angle of the incoming light, from which depth information can be determined. For example, a plenoptic camera may include an image sensor overlaid with a transmissive diffraction mask (TDM). Alternatively or additionally, a plenoptic camera may include an image sensor containing angle-sensitive pixels and/or phase-detection auto-focus pixels (PDAF) and/or micro-lens array (MLA). Such a sensor may serve as a source of depth information instead of or in addition to depth sensor 551.

It also should be appreciated that the configuration of the components in FIG. 5B is provided as an example. A viewing optics assembly 548 may include components with any suitable configuration, which may be set to provide the user with the largest field of view practical for a particular set of components. For example, if a viewing optics assembly 548 has one world camera 552, the world camera may be placed in a center region of the viewing optics assembly instead of at a side.

Information from the sensors in viewing optics assembly 548 may be coupled to one or more of processors in the system. The processors may generate data that may be rendered so as to cause the user to perceive virtual content interacting with objects in the physical world. That rendering may be implemented in any suitable way, including generating image data that depicts both physical and virtual objects. In other embodiments, physical and virtual content may be depicted in one scene by modulating the opacity of a display device that a user looks through at the physical world. The opacity may be controlled so as to create the appearance of the virtual object and also to block the user from seeing objects in the physical world that are occluded by the virtual objects. In some embodiments, the image data may only include virtual content that may be modified such that the virtual content is perceived by a user as realistically interacting with the physical world (e.g., clip content to account for occlusions), when viewed through the user interface.

The location on the viewing optics assembly 548 at which content is displayed to create the impression of an object at a particular location may depend on the physics of the viewing optics assembly. Additionally, the pose of the user's head with respect to the physical world and the direction in which the user's eyes are looking may impact where in the physical world content displayed at a particular location on the viewing optics assembly content will appear. Sensors as described above may collect this information, and or supply information from which this information may be calculated, such that a processor receiving sensor inputs may compute where objects should be rendered on the viewing optics assembly 548 to create a desired appearance for the user.

Regardless of how content is presented to a user, a model of the physical world may be used so that characteristics of the virtual objects, which can be impacted by physical objects, including the shape, position, motion, and visibility of the virtual object, can be correctly computed. In some embodiments, the model may include the reconstruction of a physical world, for example, the reconstruction 518.

That model may be created from data collected from sensors on a wearable device of the user. Though, in some embodiments, the model may be created from data collected by multiple users, which may be aggregated in a computing device remote from all of the users (and which may be "in the cloud").

Figure 6A:
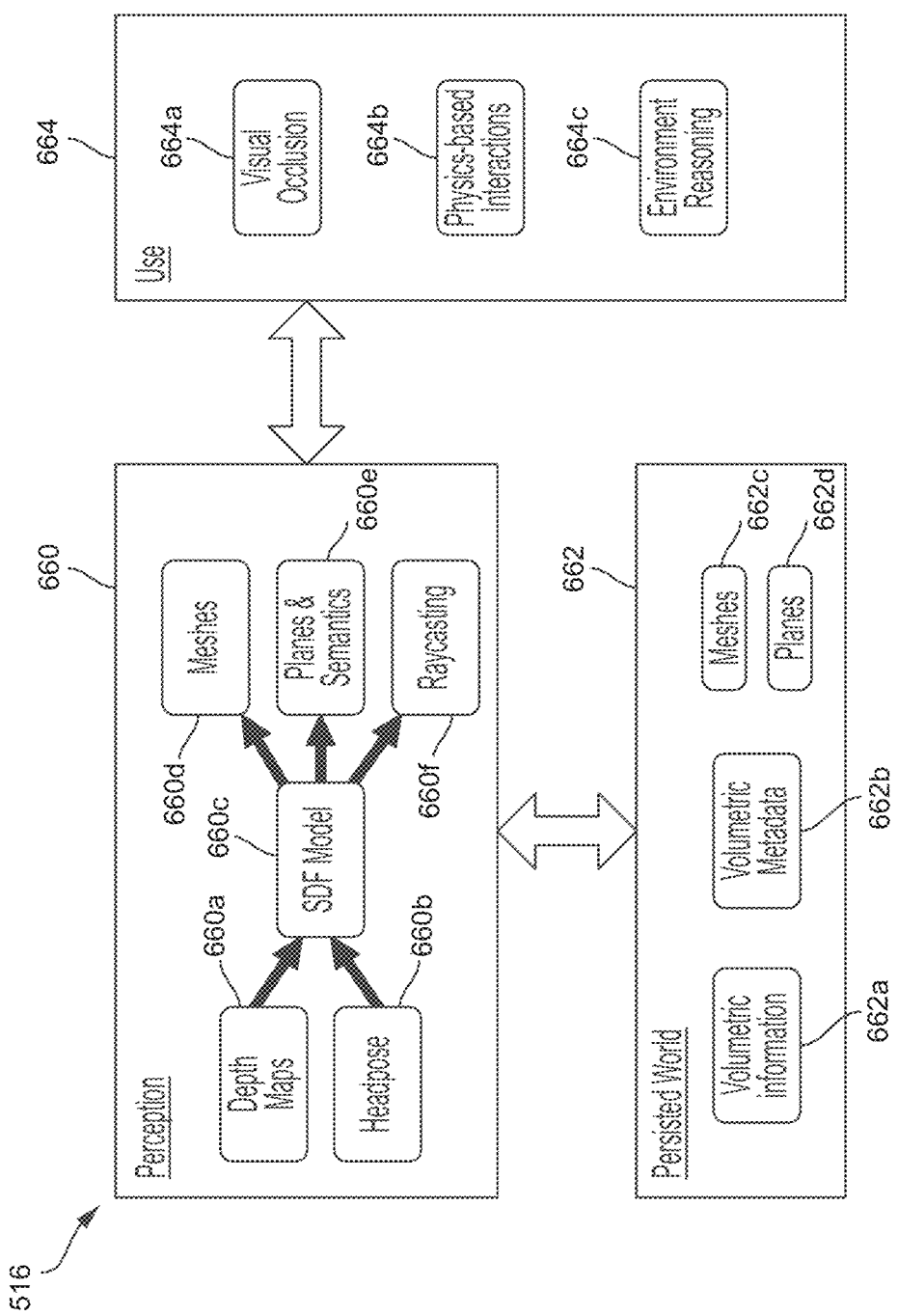
FIG. 6A is a schematic diagram illustrating an AR system using a world reconstruction system, according to some embodiments.

The model may be created, at least in part, by a world reconstruction system such as, for example, the world reconstruction component 516 of FIG. 3 depicted in more detail in FIG. 6A. The world reconstruction component 516 may include a perception module 660 that may generate, update, and store representations for a portion of the physical world. In some embodiments, the perception module 660 may represent the portion of the physical world within a reconstruction range of the sensors as multiple voxels. Each voxel may correspond to a 3D cube of a predetermined volume in the physical world, and include surface information, indicating whether there is a surface in the volume represented by the voxel. Voxels may be assigned values indicating whether their corresponding volumes have been determined to include surfaces of physical objects, determined to be empty or have not yet been measured with a sensor and so their value is unknown. It should be appreciated that values indicating that voxels that are determined to be empty or unknown need not be explicitly stored, as the values of voxels may be stored in computer memory in any suitable way, including storing no information for voxels that are determined to be empty or unknown.

In addition to generating information for a persisted world representation, the perception module 660 may identify and output indications of changes in a region around a user of an AR system. Indications of such changes may trigger updates to volumetric data stored as part of the persisted world, or trigger other functions, such as triggering components 604 that generate AR content to update the AR content.

In some embodiments, the perception module 660 may identify changes based on a signed distance function (SDF) model. The perception module 660 may be configured to receive sensor data such as, for example, depth maps 660a and headposes 660b, and then fuse the sensor data into a SDF model 660c. Depth maps 660a may provide SDF information directly, and images may be processed to arrive at SDF information. The SDF information represents distance from the sensors used to capture that information. As those sensors may be part of a wearable unit, the SDF information may represent the physical world from the perspective of the wearable unit and therefore the perspective of the user. The headposes 660b may enable the SDF information to be related to a voxel in the physical world.

In some embodiments, the perception module 660 may generate, update, and store representations for the portion of the physical world that is within a perception range. The perception range may be determined based, at least in part, on a sensor's reconstruction range, which may be determined based, at least in part, on the limits of a sensor's observation range. As a specific example, an active depth sensor that operates using active IR pulses may operate reliably over a range of distances, creating the observation range of the sensor, which may be from a few centimeters or tens of centimeters to a few meters.

The world reconstruction component 516 may include additional modules that may interact with the perception module 660. In some embodiments, a persisted world module 662 may receive representations for the physical world based on data acquired by the perception module 660. The persisted world module 662 also may include various formats of representations of the physical world. For example, volumetric information 662b such as voxels may be stored as well as meshes 662c and planes 662d. Volumetric metadata 662a may include a size of the volumetric information. In some embodiments, other information, such as depth maps could be saved.

In some embodiments, representations of the physical world, such as those illustrated in FIG. 6A may provide relatively dense information about the physical world in comparison to sparse maps, such as a tracking map based on feature points as described above.

In some embodiments, the perception module 660 may include modules that generate representations for the physical world in various formats including, for example, meshes 660d, planes and semantics 660e. The representations for the physical world may be stored across local and remote storage mediums. The representations for the physical world may be described in different coordinate frames depending on, for example, the location of the storage medium. For example, a representation for the physical world stored in the device may be described in a coordinate frame local to the device. The representation for the physical world may have a counterpart stored in a cloud. The counterpart in the cloud may be described in a coordinate frame shared by all devices in an XR system.

In some embodiments, these modules may generate representations based on data within the perception range of one or more sensors at the time the representation is generated as well as data captured at prior times and information in the persisted world module 662. In some embodiments, these components may operate on depth information captured with a depth sensor. However, the AR system may include vision sensors and may generate such representations by analyzing monocular or binocular vision information.

In some embodiments, these modules may operate on regions of the physical world. Those modules may be triggered to update a subregion of the physical world, when the perception module 660 detects a change in the physical world in that subregion. Such a change, for example, may be detected by detecting a new surface in the SDF model 660c or other criteria, such as changing the value of a sufficient number of voxels representing the subregion.

The world reconstruction component 516 may include components 664 that may receive representations of the physical world from the perception module 660. Information about the physical world may be pulled by these components according to, for example, a use request from an application. In some embodiments, information may be pushed to the use components, such as via an indication of a change in a pre-identified region or a change of the physical world representation within the perception range. The components 664, may include, for example, game programs and other components that perform processing for visual occlusion, physics-based interactions, and environment reasoning.

Responding to the queries from the components 664, the perception module 660 may send representations for the physical world in one or more formats. For example, when the component 664 indicates that the use is for visual occlusion or physics-based interactions, the perception module 660 may send a representation of surfaces. When the component 664 indicates that the use is for environmental reasoning, the perception module 660 may send meshes, planes and semantics of the physical world.

In some embodiments, the perception module 660 may include components that format information to provide the component 664. An example of such a component may be raycasting component 660f. A use component (e.g., component 664), for example, may query for information about the physical world from a particular point of view. Raycasting component 660f may select from one or more representations of the physical world data within a field of view from that point of view.

As should be appreciated from the foregoing description, the perception module 660, or another component of an AR system, may process data to create 3D representations of portions of the physical world. Data to be processed may be reduced by culling parts of a 3D reconstruction volume based at last in part on a camera frustum and/or depth image, extracting and persisting plane data, capturing, persisting, and updating 3D reconstruction data in blocks that allow local update while maintaining neighbor consistency, providing occlusion data to applications generating such scenes, where the occlusion data is derived from a combination of one or more depth data sources, and/or performing a multi-stage mesh simplification. The reconstruction may contain data of different levels of sophistication including, for example, raw data such as live depth data, fused volumetric data such as voxels, and computed data such as meshes.

In some embodiments, components of a passable world model may be distributed, with some portions executing locally on an XR device and some portions executing remotely, such as on a network connected server, or otherwise in the cloud. The allocation of the processing and storage of information between the local XR device and the cloud may impact functionality and user experience of an XR system. For example, reducing processing on a local device by allocating processing to the cloud may enable longer battery life and reduce heat generated on the local device. But, allocating too much processing to the cloud may create undesirable latency that causes an unacceptable user experience.

Figure 6B:
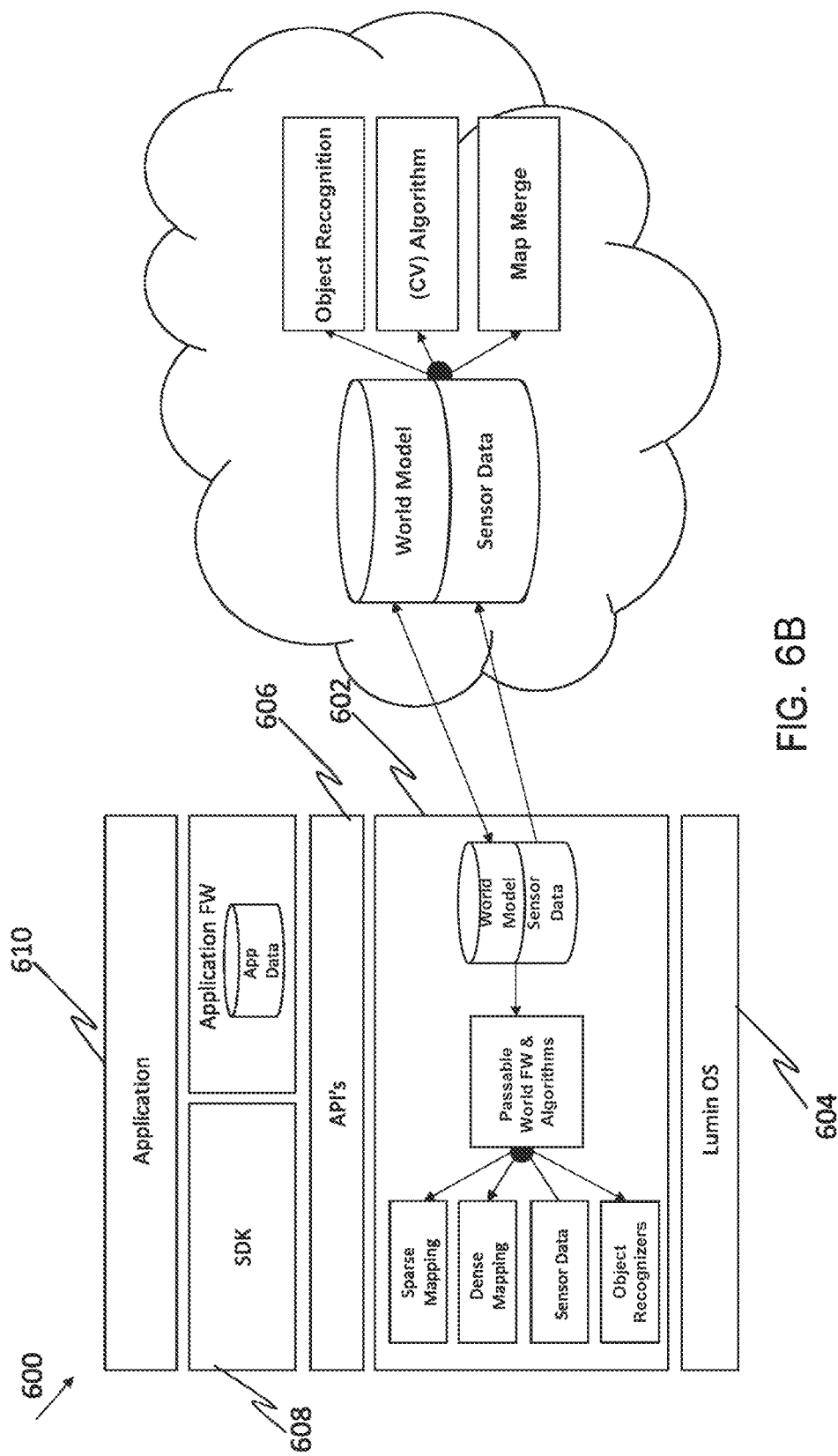
FIG. 6B is a schematic diagram illustrating components of an AR system that maintain a model of a passable world, according to some embodiments.

FIG. 6B depicts a distributed component architecture 600 configured for spatial computing, according to some embodiments. The distributed component architecture 600 may include a passable world component 602 (e.g., PW 538 in FIG. 5A), a Lumin OS 604, API's 606, SDK 608, and Application 610. The Lumin OS 604 may include a Linux-based kernel with custom drivers compatible with an XR device. The API's 606 may include application programming interfaces that grant XR applications (e.g., Applications 610) access to the spatial computing features of an XR device. The SDK 608 may include a software development kit that allows the creation of XR applications.

One or more components in the architecture 600 may create and maintain a model of a passable world. In this example sensor data is collected on a local device. Processing of that sensor data may be performed in part locally on the XR device and partially in the cloud. PW 538 may include environment maps created based, at least in part, on data captured by AR devices worn by multiple users. During sessions of an AR experience, individual AR devices (such as wearable devices described above in connection with FIG. 4 may create tracking maps, which is one type of map.

In some embodiments, the device may include components that construct both sparse maps and dense maps. A tracking map may serve as a sparse map and may include headposes of the AR device scanning an environment as well as information about objects detected within that environment at each headpose. Those headposes may be maintained locally for each device. For example, the headpose on each device may be relative to an initial headpose when the device was turned on for its session. As a result, each tracking map may be local to the device creating it and may have its own frame of reference defined by its own local coordinate system. In some embodiments, however, the tracking map on each device may be formed such that one coordinate of its local coordinate system is aligned with the direction of gravity as measured by its sensors, such as inertial measurement unit 557.

The dense map may include surface information, which may be represented by a mesh or depth information. Alternatively or additionally, a dense map may include higher level information derived from surface or depth information, such as the location and/or characteristics of planes and/or other objects.

Creation of the dense maps may be independent of the creation of sparse maps, in some embodiments. The creation of dense maps and sparse maps, for example, may be performed in separate processing pipelines within an AR system. Separating processing, for example, may enable generation or processing of different types of maps to be performed at different rates. Sparse maps, for example, may be refreshed at a faster rate than dense maps. In some embodiments, however, the processing of dense and sparse maps may be related, even if performed in different pipelines. Changes in the physical world revealed in a sparse map, for example, may trigger updates of a dense map, or vice versa. Further, even if independently created, the maps might be used together. For example, a coordinate system derived from a sparse map may be used to define position and/or orientation of objects in a dense map.

The sparse map and/or dense map may be persisted for re-use by the same device and/or sharing with other devices. Such persistence may be achieved by storing information in the cloud. The AR device may send the tracking map to a cloud to, for example, merge or stitch with environment maps selected from persisted maps previously stored in the cloud. In some embodiments, the selected persisted maps may be sent from the cloud to the AR device for merging or stitching. In some embodiments, the persisted maps may be oriented with respect to one or more persistent coordinate frames. Such maps may serve as canonical maps, as they can be used by any of multiple devices. In some embodiments, a model of a passable world may comprise or be created from one or more canonical maps. Devices, even though they perform some operations based on a coordinate frame local to the device, may nonetheless use the canonical map by determining a transformation between their coordinate frame local to the device and the canonical map.

A canonical map may originate as a tracking map (TM) (e.g., TM 1102 in FIG. 31A), which may be promoted to a canonical map. The canonical map may be persisted such that devices that access the canonical map may, once determining a transformation between their local coordinate system and a coordinate system of the canonical map, use the information in the canonical map to determine locations of objects represented in the canonical map in the physical world around the device. In some embodiments, a TM may be a headpose sparse map created by an XR device. In some embodiments, the canonical map may be created when an XR device sends one or more TMs to a cloud server for merging or stitching with additional TMs captured by the XR device at a different time or by other XR devices.

In embodiments in which tracking maps are formed on local devices with one coordinate of a local coordinate frame aligned with gravity, this orientation with respect to gravity may be preserved upon creation of a canonical map. For example, when a tracking map that is submitted for merging or stitching does not overlap with any previously stored map, that tracking map may be promoted to a canonical map. Other tracking maps, which may also have an orientation relative to gravity, may be subsequently merged or stitched with that canonical map. The merging or stitching may be done so as to ensure that the resulting canonical map retains its orientation relative to gravity. Two maps, for example, may not be merged or stitched, regardless of correspondence of feature points in those maps, if coordinates of each map aligned with gravity do not align with each other with a sufficiently close tolerance.

Figure 7:
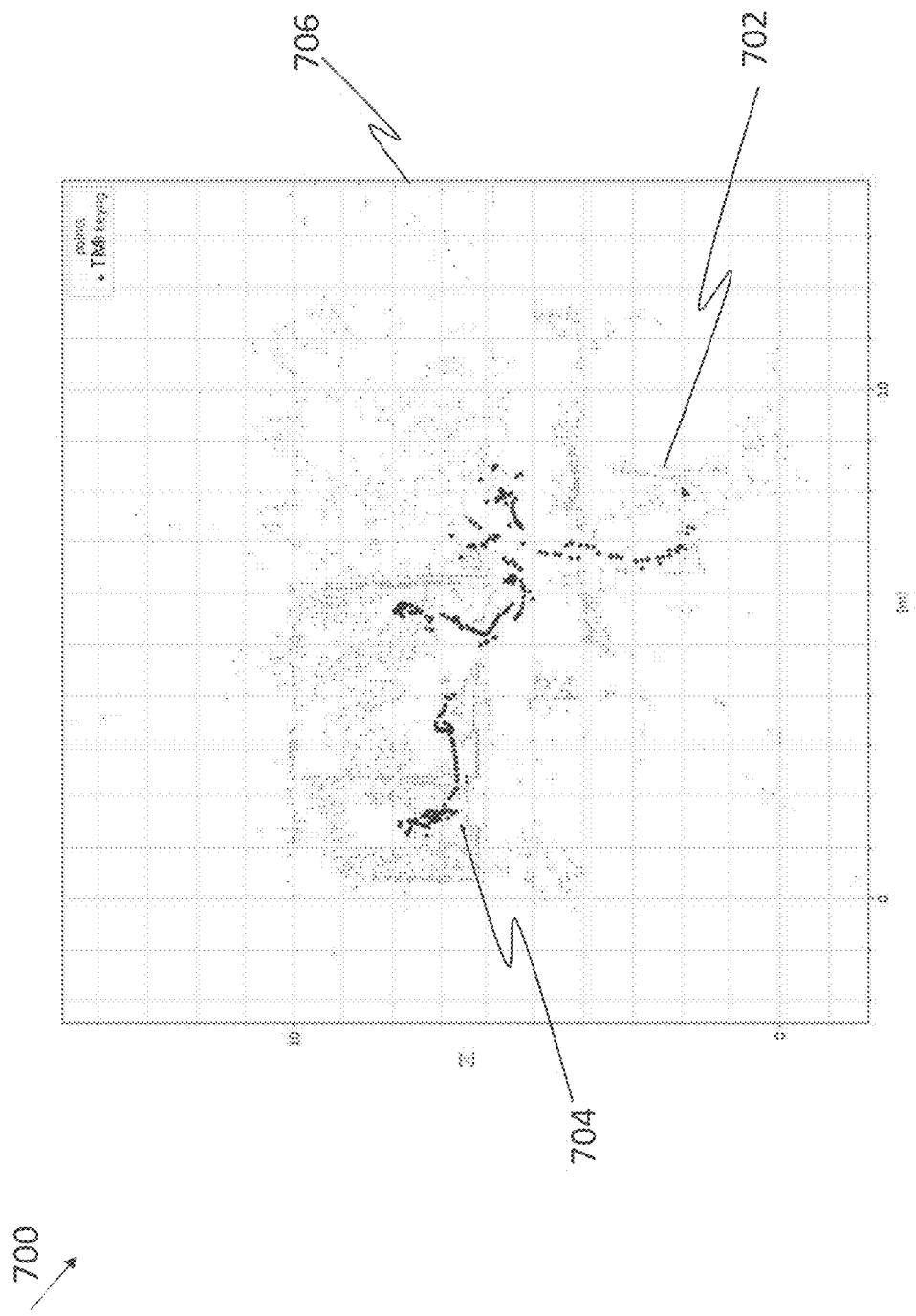
FIG. 7 is a schematic illustration of a tracking map formed by a device traversing a path through a physical world.

The canonical maps, or other maps, may provide information about the portions of the physical world represented by the data processed to create respective maps. FIG. 7 depicts an exemplary tracking map 700, according to some embodiments. The tracking map 700 may provide a floor plan 706 of physical objects in a corresponding physical world, represented by points 702. In some embodiments, a map point 702 may represent a feature of a physical object that may include multiple features. For example, each corner of a table may be a feature that is represented by a point on a map. The features may be derived from processing images, such as may be acquired with the sensors of a wearable device in an augmented reality system. The features, for example, may be derived by processing an image frame output by a sensor to identify features based on large gradients in the image or other suitable criteria. Further processing may limit the number of features in each frame. For example, processing may select features that likely represent persistent objects. One or more heuristics may be applied for this selection.

The tracking map 700 may include data on points 702 collected by a device. For each image frame with data points included in a tracking map, a pose may be stored. The pose may represent the orientation from which the image frame was captured, such that the feature points within each image frame may be spatially correlated. The pose may be determined by positioning information, such as may be derived from the sensors, such as an IMU sensor, on the wearable device. Alternatively or additionally, the pose may be determined from matching image frames to other image frames that depict overlapping portions of the physical world. By finding such positional correlation, which may be accomplished by matching subsets of features points in two frames, the relative pose between the two frames may be computed. A relative pose may be adequate for a tracking map, as the map may be relative to a coordinate system local to a device established based on the initial pose of the device when construction of the tracking map was initiated.

Not all of the feature points and image frames collected by a device may be retained as part of the tracking map, as much of the information collected with the sensors is likely to be redundant. Rather, only certain frames may be added to the map. Those frames may be selected based on one or more criteria, such as degree of overlap with image frames already in the map, the number of new features they contain or a quality metric for the features in the frame. Image frames not added to the tracking map may be discarded or may be used to revise the location of features. As a further alternative, all or most of the image frames, represented as a set of features may be retained, but a subset of those frames may be designated as key frames, which are used for further processing.

The key frames may be processed to produce keyrigs 704. The key frames may be processed to produce three dimensional sets of feature points and saved as keyrigs 704. Such processing may entail, for example, comparing image frames derived simultaneously from two cameras to stereoscopically determine the 3D position of feature points. Metadata may be associated with these keyframes and/or keyrigs, such as poses.

The environment maps may have any of multiple formats depending on, for example, the storage locations of an environment map including, for example, local storage of AR devices and remote storage. For example, a map in remote storage may have higher resolution than a map in local storage on a wearable device where memory is limited. To send a higher resolution map from remote storage to local storage, the map may be down sampled or otherwise converted to an appropriate format, such as by reducing the number of poses per area of the physical world stored in the map and/or the number of feature points stored for each pose. In some embodiments, a slice or portion of a high-resolution map from remote storage may be sent to local storage, where the slice or portion is not down sampled.

A database of environment maps may be updated as new tracking maps are created. To determine which of a potentially very large number of environment maps in a database is to be updated, updating may include efficiently selecting one or more environment maps stored in the database relevant to the new tracking map. The selected one or more environment maps may be ranked by relevance and one or more of the highest-ranking maps may be selected for processing to merge or stitch higher ranked selected environment maps with the new tracking map to create one or more updated environment maps. When a new tracking map represents a portion of the physical world for which there is no preexisting environment map to update, that tracking map may be stored in the database as a new environment map.

View Independent Display

Described herein are methods and apparatus for providing virtual contents using an XR system, independent of locations of eyes viewing the virtual content. Conventionally, a virtual content is re-rendered upon any motion of the displaying system. For example, if a user wearing a display system views a virtual representation of a three-dimensional (3D) object on the display and walks around the area where the 3D object appears, the 3D object should be re-rendered for each viewpoint such that the user has the perception that he or she is walking around an object that occupies real space. However, the re-rendering consumes significant computational resources of a system and causes artifacts due to latency.

The inventors have recognized and appreciated that head-pose (e.g., the location and orientation of a user wearing an XR system) may be used to render a virtual content independent of eye rotations within a head of the user. In some embodiments, dynamic maps of a scene may be generated based on multiple coordinate frames in real space across one or more sessions such that virtual contents interacting with the dynamic maps may be rendered robustly, independent of eye rotations within the head of the user and/or independent of sensor deformations caused by, for example, heat generated during high-speed, computation-intensive operation. In some embodiments, the configuration of multiple coordinate frames may enable a first XR device worn by a first user and a second XR device worn by a second user to recognize a common location in a scene. In some embodiments, the configuration of multiple coordinate frames may enable users wearing XR devices to view a virtual content in a same location of a scene.

In some embodiments, a tracking map may be built in a world coordinate frame, which may have a world origin. The world origin may be the first pose of an XR device when the XR device is powered on. The world origin may be aligned to gravity such that a developer of an XR application can get gravity alignment without extra work. Different tracking maps may be built in different world coordinate frames because the tracking maps may be captured by a same XR device at different sessions and/or different XR devices worn by different users. In some embodiments, a session of an XR device may span from powering on to powering off the device. In some embodiments, an XR device may have a head coordinate frame, which may have a head origin. The head origin may be the current pose of an XR device when an image is taken. The difference between headpose of a world coordinate frame and of a head coordinate frame may be used to estimate a tracking route.

In some embodiments, an XR device may have a camera coordinate frame, which may have a camera origin. The camera origin may be the current pose of one or more sensors of an XR device. The inventors have recognized and appreciated that the configuration of a camera coordinate frame enables robust displaying virtual contents independent of eye rotation within a head of a user. This configuration also enables robust displaying of virtual contents independent of sensor deformation due to, for example, heat generated during operation.

In some embodiments, an XR device may have a head unit with a head-mountable frame that a user can secure to their head and may include two waveguides, one in front of each eye of the user. The waveguides may be transparent so that ambient light from real-world objects can transmit through the waveguides and the user can see the real-world objects. Each waveguide may transmit projected light from a projector to a respective eye of the user. The projected light may form an image on the retina of the eye. The retina of the eye thus receives the ambient light and the projected light. The user may simultaneously see real-world objects and one or more virtual objects that are created by the projected light. In some embodiments, XR devices may have sensors that detect real-world objects around a user. These sensors may, for example, be cameras that capture images that may be processed to identify the locations of real-world objects.

In some embodiments, an XR system may assign a coordinate frame to a virtual content, as opposed to attaching the virtual content in a world coordinate frame. Such configuration enables a virtual content to be described without regard to where it is rendered for a user, but it may be attached to a more persistent frame position such as a persistent coordinate frame (PCF) described in relation to, for example, FIGS. 14-20C, to be rendered in a specified location. When the locations of the objects change, the XR device may detect the changes in the environment map and determine movement of the head unit worn by the user relative to real-world objects.

Figure 8:
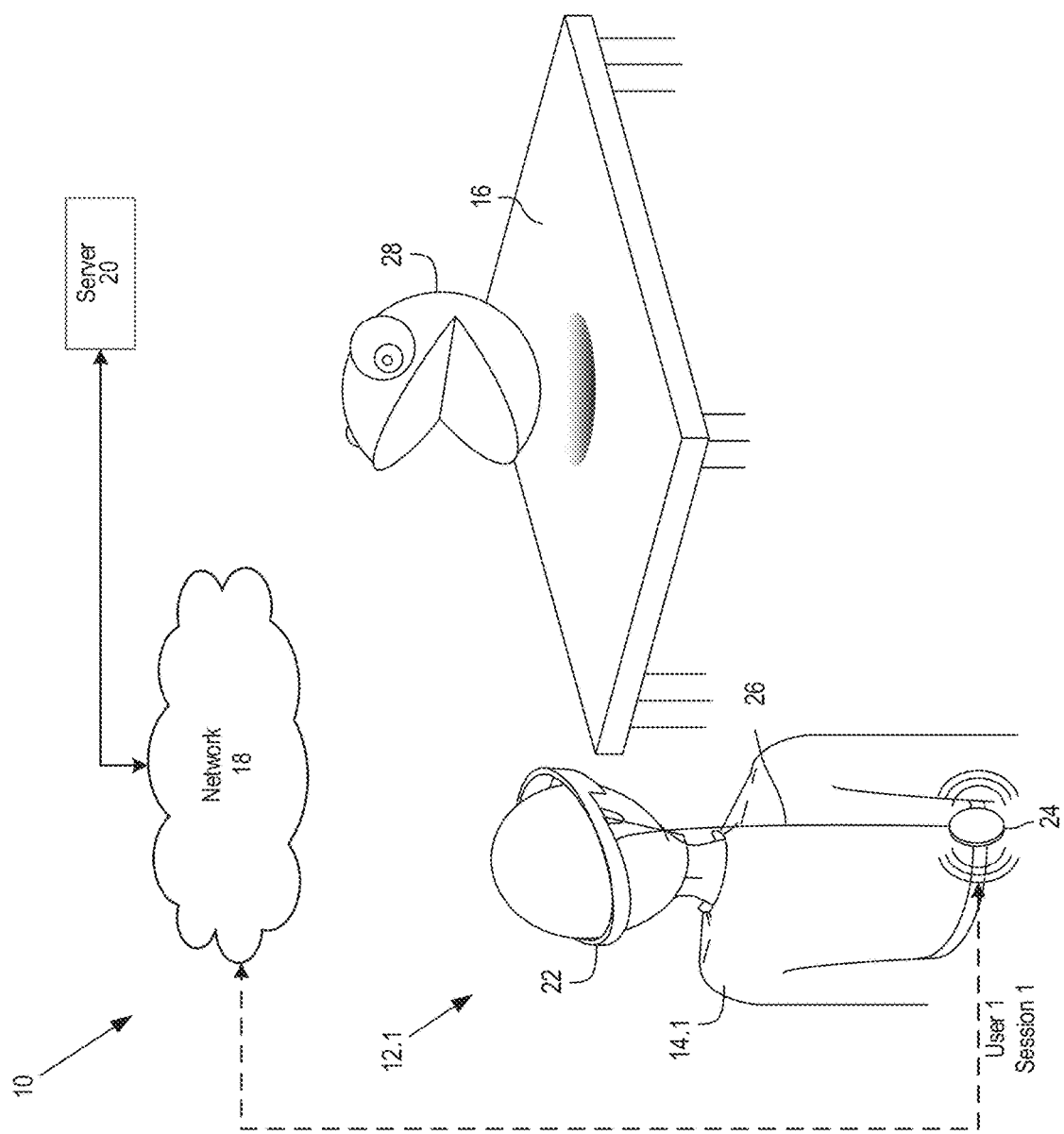
FIG. 8 is a schematic diagram illustrating a user of a cross reality (XR) system, perceiving virtual content, according to some embodiments.

FIG. 8 illustrates a user experiencing virtual content, as rendered by an XR system 10, in a physical environment, according to some embodiments. The XR system may include a first XR device 12.1 that is worn by a first user 14.1, a network 18 and a server 20. The user 14.1 is in a physical environment with a real object in the form of a table 16.

In the illustrated example, the first XR device 12.1 includes a head unit 22, a belt pack 24 and a cable connection 26. The first user 14.1 secures the head unit 22 to their head and the belt pack 24 remotely from the head unit 22 on their waist. The cable connection 26 connects the head unit 22 to the belt pack 24. The head unit 22 includes technologies that are used to display a virtual object or objects to the first user 14.1 while the first user 14.1 is permitted to see real objects such as the table 16. The belt pack 24 includes primarily processing and communications capabilities of the first XR device 12.1. In some embodiments, the processing and communication capabilities may reside entirely or partially in the head unit 22 such that the belt pack 24 may be removed or may be located in another device such as a backpack.

In the illustrated example, the belt pack 24 is connected via a wireless connection to the network 18. The server 20 is connected to the network 18 and holds data representative of local content. The belt pack 24 downloads the data representing the local content from the server 20 via the network 18. The belt pack 24 provides the data via the cable connection 26 to the head unit 22. The head unit 22 may include a display that has a light source, for example, a laser light source or a light emitting diode (LED), and a waveguide that guides the light.

In some embodiments, the first user 14.1 may mount the head unit 22 to their head and the belt pack 24 to their waist. The belt pack 24 may download image data representing virtual content over the network 18 from the server 20. The first user 14.1 may see the table 16 through a display of the head unit 22. A projector forming part of the head unit 22 may receive the image data from the belt pack 24 and generate light based on the image data. The light may travel through one or more of the waveguides forming part of the display of the head unit 22. The light may then leave the waveguide and propagates onto a retina of an eye of the first user 14.1. The projector may generate the light in a pattern that is replicated on a retina of the eye of the first user 14.1. The light that falls on the retina of the eye of the first user 14.1 may have a selected field of depth so that the first user 14.1 perceives an image at a preselected depth behind the waveguide. In addition, both eyes of the first user 14.1 may receive slightly different images so that a brain of the first user 14.1 perceives a three-dimensional image or images at selected distances from the head unit 22. In the illustrated example, the first user 14.1 perceives a virtual content 28 above the table 16. The proportions of the virtual content 28 and its location and distance from the first user 14.1 are determined by the data representing the virtual content 28 and various coordinate frames that are used to display the virtual content 28 to the first user 14.1.

In the illustrated example, the virtual content 28 is not visible from the perspective of the drawing and is visible to the first user 14.1 through using the first XR device 12.1. The virtual content 28 may initially reside as data structures within vision data and algorithms in the belt pack 24. The data structures may then manifest themselves as light when the projectors of the head unit 22 generate light based on the data structures. It should be appreciated that although the virtual content 28 has no existence in three-dimensional space in front of the first user 14.1, the virtual content 28 is still represented in FIG. 1 in three-dimensional space for illustration of what a wearer of head unit 22 perceives. The visualization of computer data in three-dimensional space may be used in this description to illustrate how the data structures that facilitate the renderings are perceived by one or more users relate to one another within the data structures in the belt pack 24.

Figure 9:
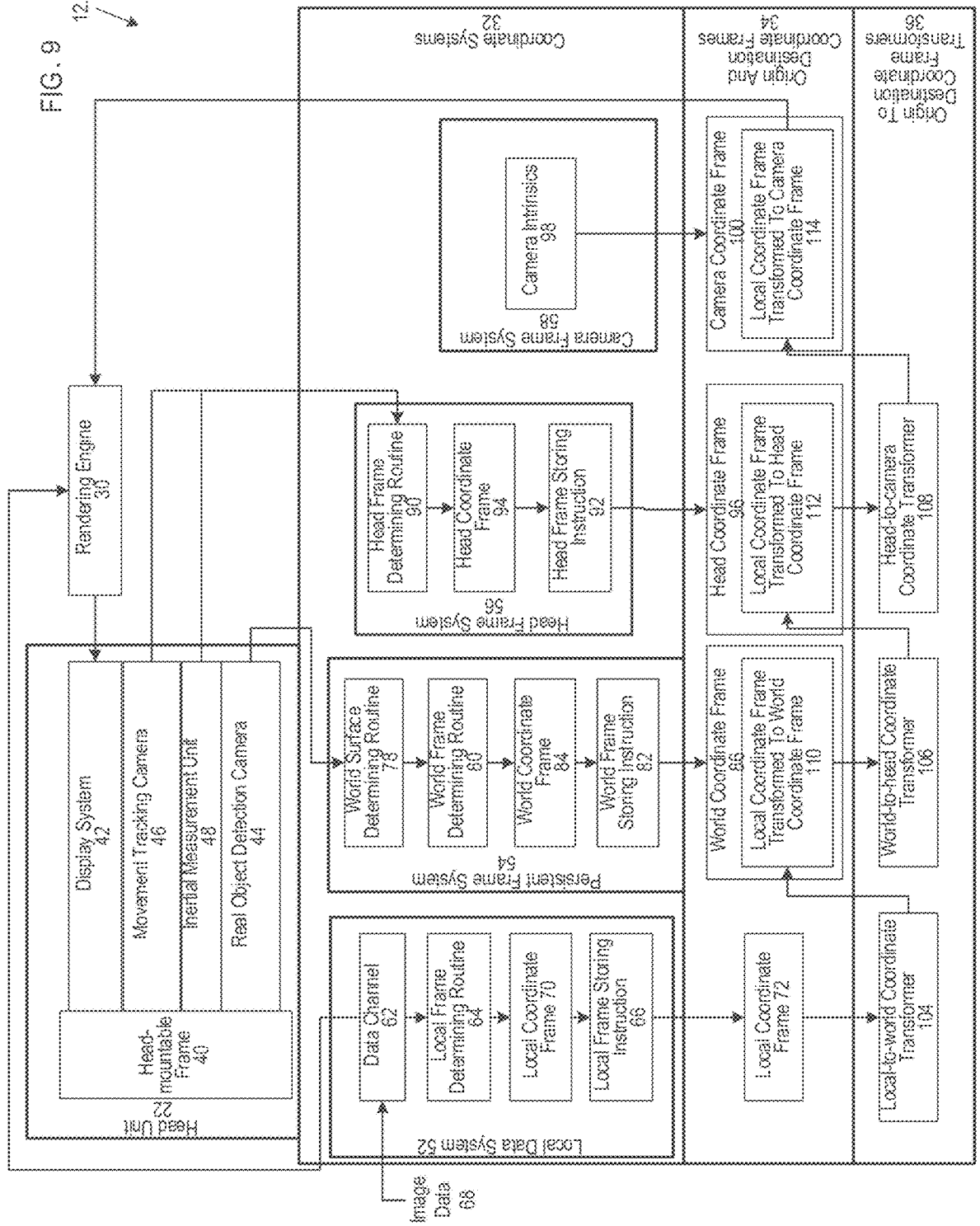
FIG. 9 is a block diagram of components of a first XR device of the XR system of FIG. 8 that transform between coordinate systems, according to some embodiments.

FIG. 9 illustrates components of the first XR device 12.1, according to some embodiments. The first XR device 12.1 may include the head unit 22, and various components forming part of the vision data and algorithms including, for example, a rendering engine 30, various coordinate systems 32, various origin and destination coordinate frames 34, and various origin to destination coordinate frame transformers 36. The various coordinate systems may be based on intrinsics of to the XR device or may be determined by reference to other information, such as a persistent pose or a persistent coordinate system, as described herein.

The head unit 22 may include a head-mountable frame 40, a display system 42, a real object detection camera 44, a movement tracking camera 46, and an inertial measurement unit 48.

The head-mountable frame 40 may have a shape that is securable to the head of the first user 14.1 in FIG. 8. The display system 42, real object detection camera 44, movement tracking camera 46, and inertial measurement unit 48 may be mounted to the head-mountable frame 40 and therefore move together with the head-mountable frame 40.

The coordinate systems 32 may include a local data system 52, a world frame system 54, a head frame system 56, and a camera frame system 58.

The local data system 52 may include a data channel 62, a local frame determining routine 64 and a local frame storing instruction 66. The data channel 62 may be an internal software routine, a hardware component such as an external cable or a radio frequency receiver, or a hybrid component such as a port that is opened up. The data channel 62 may be configured to receive image data 68 representing a virtual content.

The local frame determining routine 64 may be connected to the data channel 62. The local frame determining routine 64 may be configured to determine a local coordinate frame 70. In some embodiments, the local frame determining routine may determine the local coordinate frame based on real world objects or real-world locations. In some embodiments, the local coordinate frame may be based on a top edge relative to a bottom edge of a browser window, head or feet of a character, a node on an outer surface of a prism or bounding box that encloses the virtual content, or any other suitable location to place a coordinate frame that defines a facing direction of a virtual content and a location (e.g., a node, such as a placement node or PCF node) with which to place the virtual content, etc.

The local frame storing instruction 66 may be connected to the local frame determining routine 64. One skilled in the art will understand that software modules and routines are "connected" to one another through subroutines, calls, etc. The local frame storing instruction 66 may store the local coordinate frame 70 as a local coordinate frame 72 within the origin and destination coordinate frames 34. In some embodiments, the origin and destination coordinate frames 34 may be one or more coordinate frames that may be manipulated or transformed in order for a virtual content to persist between sessions. In some embodiments, a session may be the period of time between a boot-up and shut-down of an XR device. Two sessions may be two start-up and shut-down periods for a single XR device, or may be a start-up and shut-down for two different XR devices.

In some embodiments, the origin and destination coordinate frames 34 may be the coordinate frames involved in one or more transformations required in order for a first user's XR device and a second user's XR device to recognize a common location. In some embodiments, the destination coordinate frame may be the output of a series of computations and transformations applied to the target coordinate frame in order for a first and second user to view a virtual content in the same location.

The rendering engine 30 may be connected to the data channel 62. The rendering engine 30 may receive the image data 68 from the data channel 62 such that the rendering engine 30 may render virtual content based, at least in part, on the image data 68.

The display system 42 may be connected to the rendering engine 30. The display system 42 may include components that transform the image data 68 into visible light. The visible light may form two patterns, one for each eye. The visible light may enter eyes of the first user 14.1 in FIG. 8 and may be detected on retinas of the eyes of the first user 14.1.

The real object detection camera 44 may include one or more cameras that may capture images from different sides of the head-mountable frame 40. The movement tracking camera 46 may include one or more cameras that capture images on sides of the head-mountable frame 40. One set of one or more cameras may be used instead of the two sets of one or more cameras representing the real object detection camera(s) 44 and the movement tracking camera(s) 46. In some embodiments, the cameras 44, 46 may capture images. As described above these cameras may collect data that is used to construct a tacking map.

The inertial measurement unit 48 may include a number of devices that are used to detect movement of the head unit 22. The inertial measurement unit 48 may include a gravitation sensor, one or more accelerometers and one or more gyroscopes. The sensors of the inertial measurement unit 48, in combination, track movement of the head unit 22 in at least three orthogonal directions and about at least three orthogonal axes.

In the illustrated example, the world frame system 54 includes a world surface determining routine 78, a world frame determining routine 80, and a world frame storing instruction 82. The world surface determining routine 78 is connected to the real object detection camera 44. The world surface determining routine 78 receives images and/or key frames based on the images that are captured by the real object detection camera 44 and processes the images to identify surfaces in the images. A depth sensor (not shown) may determine distances to the surfaces. The surfaces are thus represented by data in three dimensions including their sizes, shapes, and distances from the real object detection camera.

In some embodiments, a world coordinate frame 84 may be based on the origin at the initialization of the headpose session. In some embodiments, the world coordinate frame may be located where the device was booted up, or could be somewhere new if headpose was lost during the boot session. In some embodiments, the world coordinate frame may be the origin at the start of a headpose session.

In the illustrated example, the world frame determining routine 80 is connected to the world surface determining routine 78 and determines a world coordinate frame 84 based on the locations of the surfaces as determined by the world surface determining routine 78. The world frame storing instruction 82 is connected to the world frame determining routine 80 to receive the world coordinate frame 84 from the world frame determining routine 80. The world frame storing instruction 82 stores the world coordinate frame 84 as a world coordinate frame 86 within the origin and destination coordinate frames 34.

The head frame system 56 may include a head frame determining routine 90 and a head frame storing instruction 92. The head frame determining routine 90 may be connected to the movement tracking camera 46 and the inertial measurement unit 48. The head frame determining routine 90 may use data from the movement tracking camera 46 and the inertial measurement unit 48 to calculate a head coordinate frame 94. For example, the inertial measurement unit 48 may have a gravitation sensor that determines the direction of gravitational force relative to the head unit 22. The movement tracking camera 46 may continually capture images that are used by the head frame determining routine 90 to refine the head coordinate frame 94. The head unit 22 moves when the first user 14.1 in FIG. 8 moves their head. The movement tracking camera 46 and the inertial measurement unit 48 may continuously provide data to the head frame determining routine 90 so that the head frame determining routine 90 can update the head coordinate frame 94.

The head frame storing instruction 92 may be connected to the head frame determining routine 90 to receive the head coordinate frame 94 from the head frame determining routine 90. The head frame storing instruction 92 may store the head coordinate frame 94 as a head coordinate frame 96 among the origin and destination coordinate frames 34. The head frame storing instruction 92 may repeatedly store the updated head coordinate frame 94 as the head coordinate frame 96 when the head frame determining routine 90 recalculates the head coordinate frame 94. In some embodiments, the head coordinate frame may be the location of the wearable XR device 12.1 relative to the local coordinate frame 72.

The camera frame system 58 may include camera intrinsics 98. The camera intrinsics 98 may include dimensions of the head unit 22 that are features of its design and manufacture. The camera intrinsics 98 may be used to calculate a camera coordinate frame 100 that is stored within the origin and destination coordinate frames 34.

In some embodiments, the camera coordinate frame 100 may include all pupil positions of a left eye of the first user 14.1 in FIG. 8. When the left eye moves from left to right or up and down, the pupil positions of the left eye are located within the camera coordinate frame 100. In addition, the pupil positions of a right eye are located within a camera coordinate frame 100 for the right eye. In some embodiments, the camera coordinate frame 100 may include the location of the camera relative to the local coordinate frame when an image is taken.

The origin to destination coordinate frame transformers 36 may include a local-to-world coordinate transformer 104, a world-to-head coordinate transformer 106, and a head-to-camera coordinate transformer 108. The local-to-world coordinate transformer 104 may receive the local coordinate frame 72 and transform the local coordinate frame 72 to the world coordinate frame 86. The transformation of the local coordinate frame 72 to the world coordinate frame 86 may be represented as a local coordinate frame transformed to world coordinate frame 110 within the world coordinate frame 86.

The world-to-head coordinate transformer 106 may transform from the world coordinate frame 86 to the head coordinate frame 96. The world-to-head coordinate transformer 106 may transform the local coordinate frame transformed to world coordinate frame 110 to the head coordinate frame 96. The transformation may be represented as a local coordinate frame transformed to head coordinate frame 112 within the head coordinate frame 96.

The head-to-camera coordinate transformer 108 may transform from the head coordinate frame 96 to the camera coordinate frame 100. The head-to-camera coordinate transformer 108 may transform the local coordinate frame transformed to head coordinate frame 112 to a local coordinate frame transformed to camera coordinate frame 114 within the camera coordinate frame 100. The local coordinate frame transformed to camera coordinate frame 114 may be entered into the rendering engine 30. The rendering engine 30 may render the image data 68 representing the local content 28 based on the local coordinate frame transformed to camera coordinate frame 114.

Figure 10:
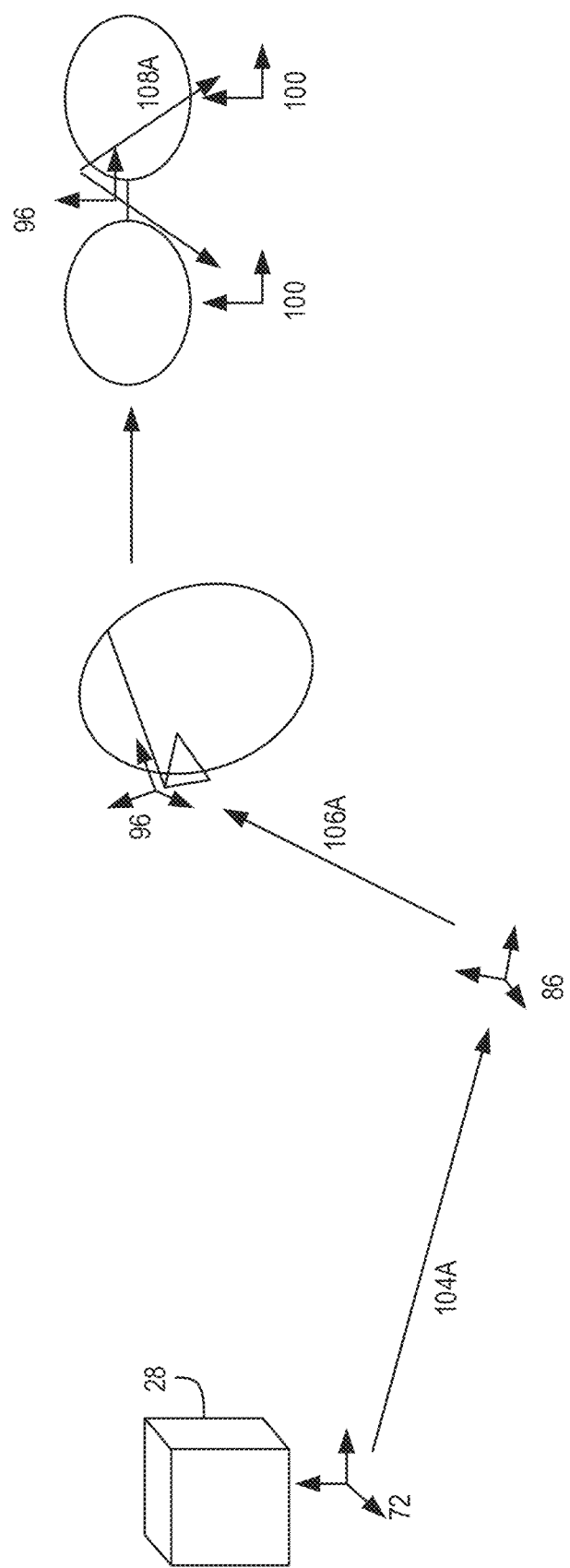
FIG. 10 is a schematic diagram illustrating an exemplary transformation of origin coordinate frames into destination coordinate frames in order to correctly render local XR content, according to some embodiments.

FIG. 10 is a spatial representation of the various origin and destination coordinate frames 34. The local coordinate frame 72, world coordinate frame 86, head coordinate frame 96, and camera coordinate frame 100 are represented in the figure. In some embodiments, the local coordinate frame associated with the XR content 28 may have a position and rotation (e.g., may provide a node and facing direction) relative to a local and/or world coordinate frame and/or PCF when the virtual content is placed in the real world so the virtual content may be viewed by the user. Each camera may have its own camera coordinate frame 100 encompassing all pupil positions of one eye. Reference numerals 104A and 106A represent the transformations that are made by the local-to-world coordinate transformer 104, world-to-head coordinate transformer 106, and head-to-camera coordinate transformer 108 in FIG. 9, respectively.

Figure 11:
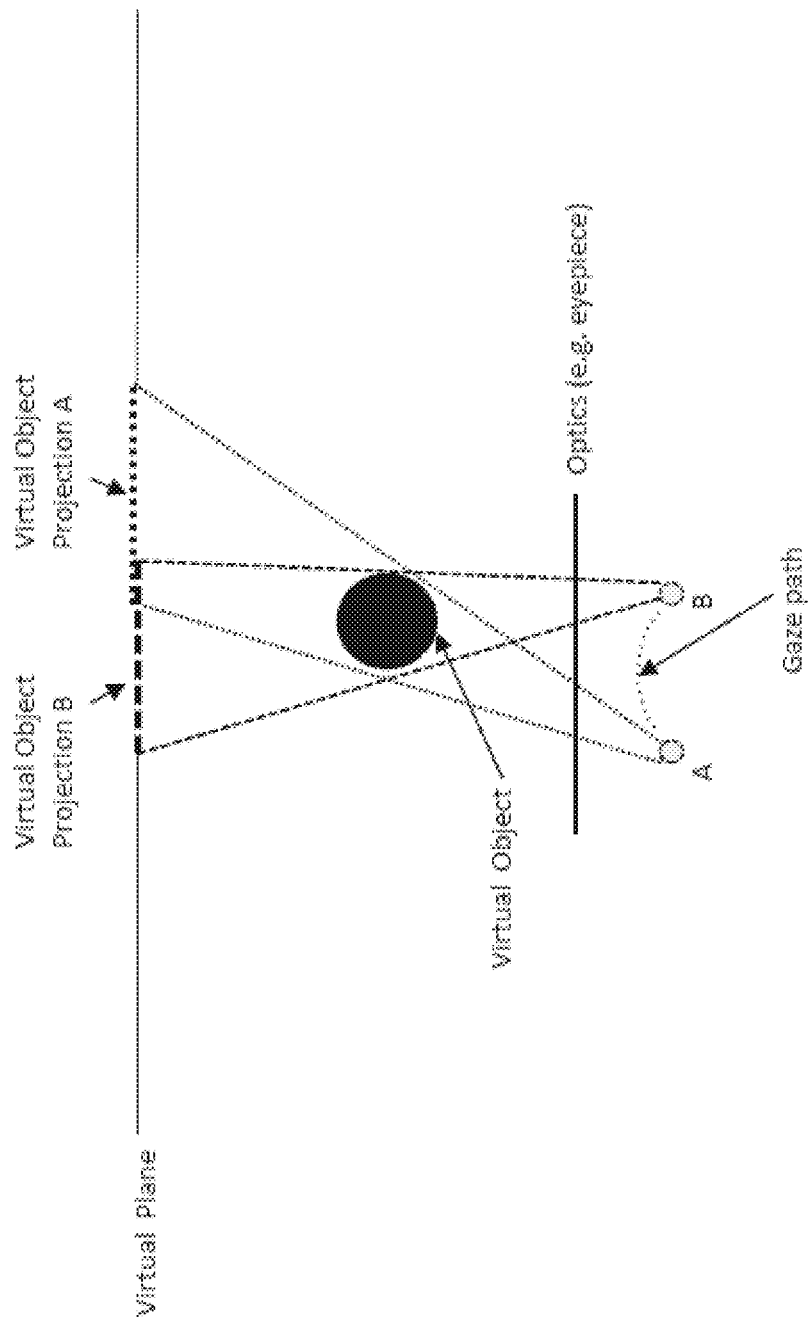
FIG. 11 is a top plan view illustrating pupil-based coordinate frames, according to some embodiments.

FIG. 11 depicts a camera render protocol for transforming from a head coordinate frame to a camera coordinate frame, according to some embodiments. In the illustrated example, a pupil for a single eye moves from position A to B. A virtual object that is meant to appear stationary will project onto a depth plane at one of the two positions A or B depending on the position of the pupil (assuming that the camera is configured to use a pupil-based coordinate frame). As a result, using a pupil coordinate frame transformed to a head coordinate frame will cause jitter in a stationary virtual object as the eye moves from position A to position B. This situation is referred to as view dependent display or projection.

Figure 12:
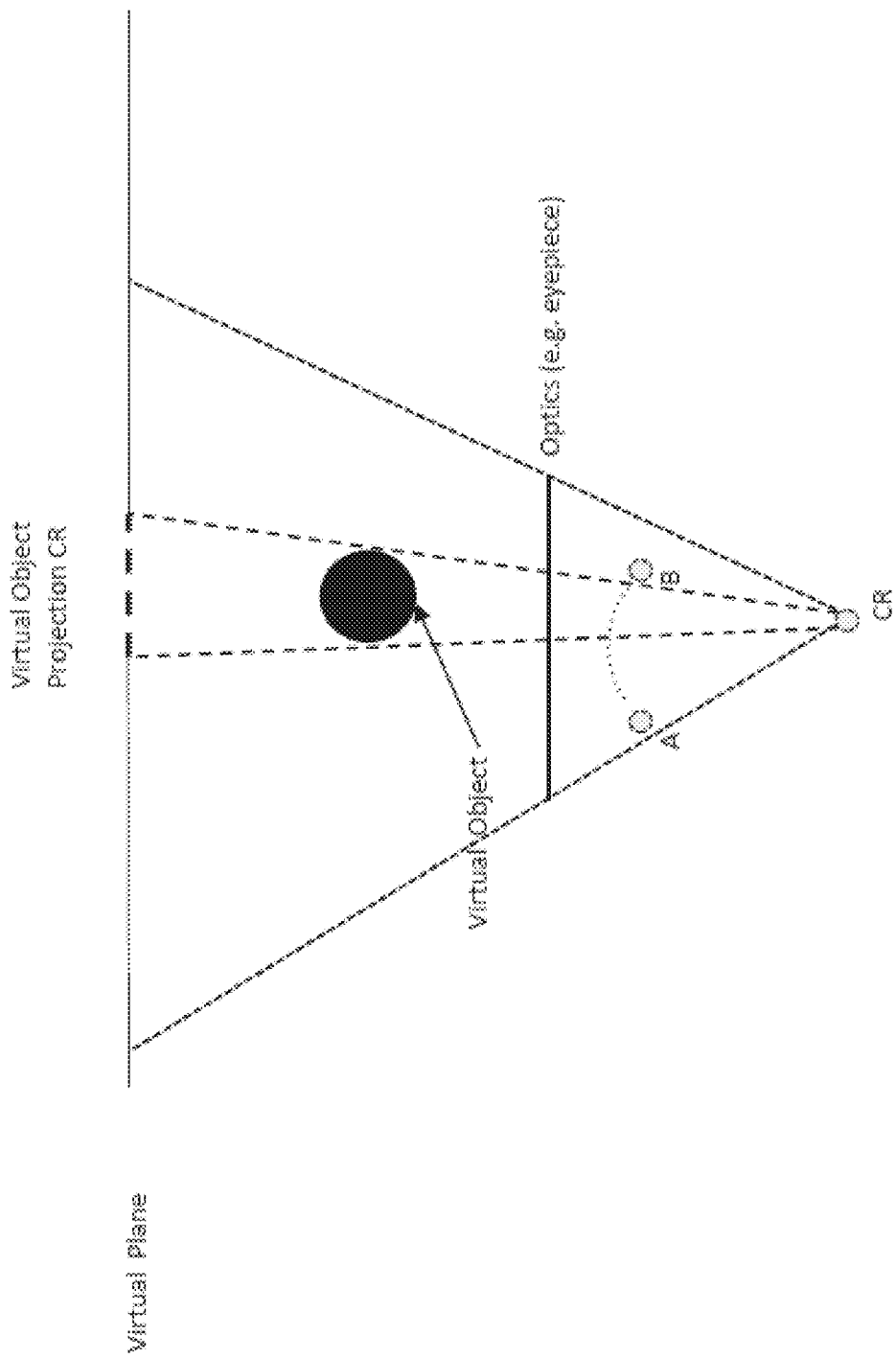
FIG. 12 is a top plan view illustrating a camera coordinate frame that includes all pupil positions, according to some embodiments.

As depicted in FIG. 12, a camera coordinate frame (e.g., CR) is positioned and encompasses all pupil positions and object projection will now be consistent regardless of pupil positions A and B. The head coordinate frame transforms to the CR frame, which is referred to as view independent display or projection. An image reprojection may be applied to the virtual content to account for a change in eye position, however, as the rendering is still in the same position, jitter is minimized.

Figure 13:
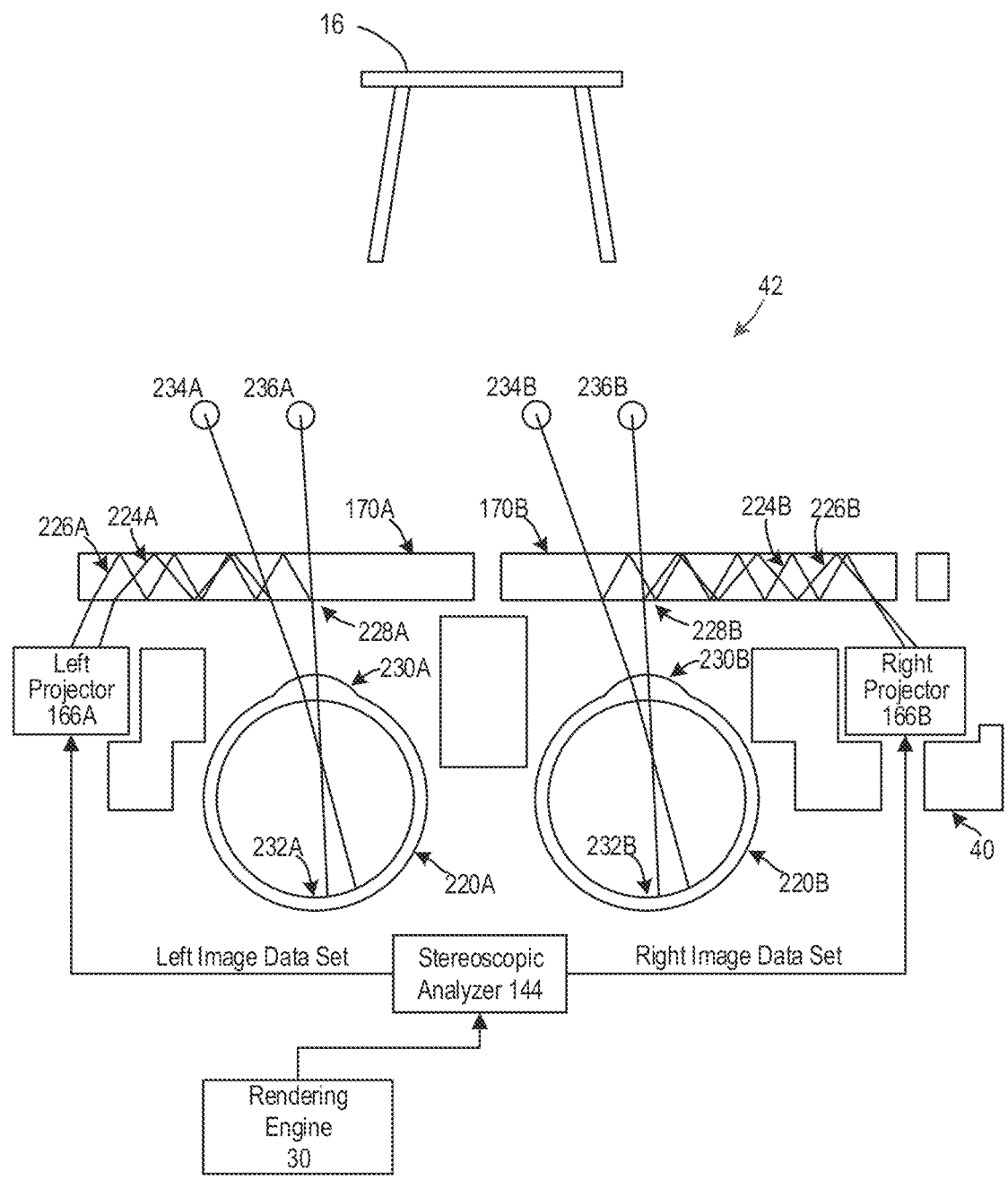
FIG. 13 is a schematic diagram of the display system of FIG. 9, according to some embodiments.

FIG. 13 illustrates the display system 42 in more detail. The display system 42 includes a stereoscopic analyzer 144 that is connected to the rendering engine 30 and forms part of the vision data and algorithms.

The display system 42 further includes left and right projectors 166A and 166B and left and right waveguides 170A and 170B. The left and right projectors 166A and 166B are connected to power supplies. Each projector 166A and 166B has a respective input for image data to be provided to the respective projector 166A or 166B. The respective projector 166A or 166B, when powered, generates light in two-dimensional patterns and emanates the light therefrom. The left and right waveguides 170A and 170B are positioned to receive light from the left and right projectors 166A and 166B, respectively. The left and right waveguides 170A and 1706 are transparent waveguides.

In use, a user mounts the head mountable frame 40 to their head. Components of the head mountable frame 40 may, for example, include a strap (not shown) that wraps around the back of the head of the user. The left and right waveguides 170A and 170B are then located in front of left and right eyes 220A and 220B of the user.

The rendering engine 30 enters the image data that it receives into the stereoscopic analyzer 144. The image data is three-dimensional image data of the local content 28 in FIG. 8. The image data is projected onto a plurality of virtual planes. The stereoscopic analyzer 144 analyzes the image data to determine left and right image data sets based on the image data for projection onto each depth plane. The left and right image data sets are data sets that represent two-dimensional images that are projected in three-dimensions to give the user a perception of a depth.

The stereoscopic analyzer 144 enters the left and right image data sets into the left and right projectors 166A and 166B. The left and right projectors 166A and 166B then create left and right light patterns. The components of the display system 42 are shown in plain view, although it should be understood that the left and right patterns are two-dimensional patterns when shown in front elevation view. Each light pattern includes a plurality of pixels. For purposes of illustration, light rays 224A and 226A from two of the pixels are shown leaving the left projector 166A and entering the left waveguide 170A. The light rays 224A and 226A reflect from sides of the left waveguide 170A. It is shown that the light rays 224A and 226A propagate through internal reflection from left to right within the left waveguide 170A, although it should be understood that the light rays 224A and 226A also propagate in a direction into the paper using refractory and reflective systems.

The light rays 224A and 226A exit the left light waveguide 170A through a pupil 228A and then enter a left eye 220A through a pupil 230A of the left eye 220A. The light rays 224A and 226A then fall on a retina 232A of the left eye 220A. In this manner, the left light pattern falls on the retina 232A of the left eye 220A. The user is given the perception that the pixels that are formed on the retina 232A are pixels 234A and 236A that the user perceives to be at some distance on a side of the left waveguide 170A opposing the left eye 220A. Depth perception is created by manipulating the focal length of the light.

In a similar manner, the stereoscopic analyzer 144 enters the right image data set into the right projector 166B. The right projector 166B transmits the right light pattern, which is represented by pixels in the form of light rays 224B and 226B. The light rays 224B and 226B reflect within the right waveguide 170B and exit through a pupil 228B. The light rays 224B and 226B then enter through a pupil 230B of the right eye 220B and fall on a retina 232B of a right eye 220B. The pixels of the light rays 224B and 226B are perceived as pixels 134B and 236B behind the right waveguide 170B.

The patterns that are created on the retinas 232A and 232B are individually perceived as left and right images. The left and right images differ slightly from one another due to the functioning of the stereoscopic analyzer 144. The left and right images are perceived in a mind of the user as a three-dimensional rendering.

As mentioned, the left and right waveguides 170A and 170B are transparent. Light from a real-life object such as the table 16 on a side of the left and right waveguides 170A and 170B opposing the eyes 220A and 220B can project through the left and right waveguides 170A and 170B and fall on the retinas 232A and 232B.

Persistent Coordinate Frame (PCF)

Described herein are methods and apparatus for providing spatial persistence across user instances within a shared space. Without spatial persistence, virtual content placed in the physical world by a user in a session may not exist or may be misplaced in the user's view in a different session. Without spatial persistence, virtual content placed in the physical world by one user may not exist or may be out of place in a second user's view, even if the second user is intended to be sharing an experience of the same physical space with the first user.

The inventors have recognized and appreciated that spatial persistence may be provided through persistent coordinate frames (PCFs). A PCF may be defined based on one or more points, representing features recognized in the physical world (e.g., corners, edges). The features may be selected such that they are likely to be the same from a user instance to another user instance of an XR system.

Further, drift during tracking, which causes the computed tracking path (e.g., camera trajectory) to deviate from the actual tracking path, can cause the location of virtual content, when rendered with respect to a local map that is based solely on a tracking map to appear out of place. A tracking map for the space may be refined to correct the drifts as an XR device collects more information of the scene overtime. However, if virtual content is placed on a real object before a map refinement and saved with respect to the world coordinate frame of the device derived from the tracking map, the virtual content may appear displaced, as if the real object has been moved during the map refinement. PCFs may be updated according to map refinement because the PCFs are defined based on the features and are updated as the features move during map refinements.

A PCF may comprise six degrees of freedom with translations and rotations relative to a map coordinate system. A PCF may be stored in a local and/or remote storage medium. The translations and rotations of a PCF may be computed relative to a map coordinate system depending on, for example, the storage location. For example, a PCF used locally by a device may have translations and rotations relative to a world coordinate frame of the device. A PCF in the cloud may have translations and rotations relative to a canonical coordinate frame of a canonical map.

PCFs may provide a sparse representation of the physical world, providing less than all of the available information about the physical world, such that they may be efficiently processed and transferred. Techniques for processing persistent spatial information may include creating dynamic maps based on one or more coordinate systems in real space across one or more sessions, generating persistent coordinate frames (PCF) over the sparse maps, which may be exposed to XR applications via, for example, an application programming interface (API).

Figure 14:
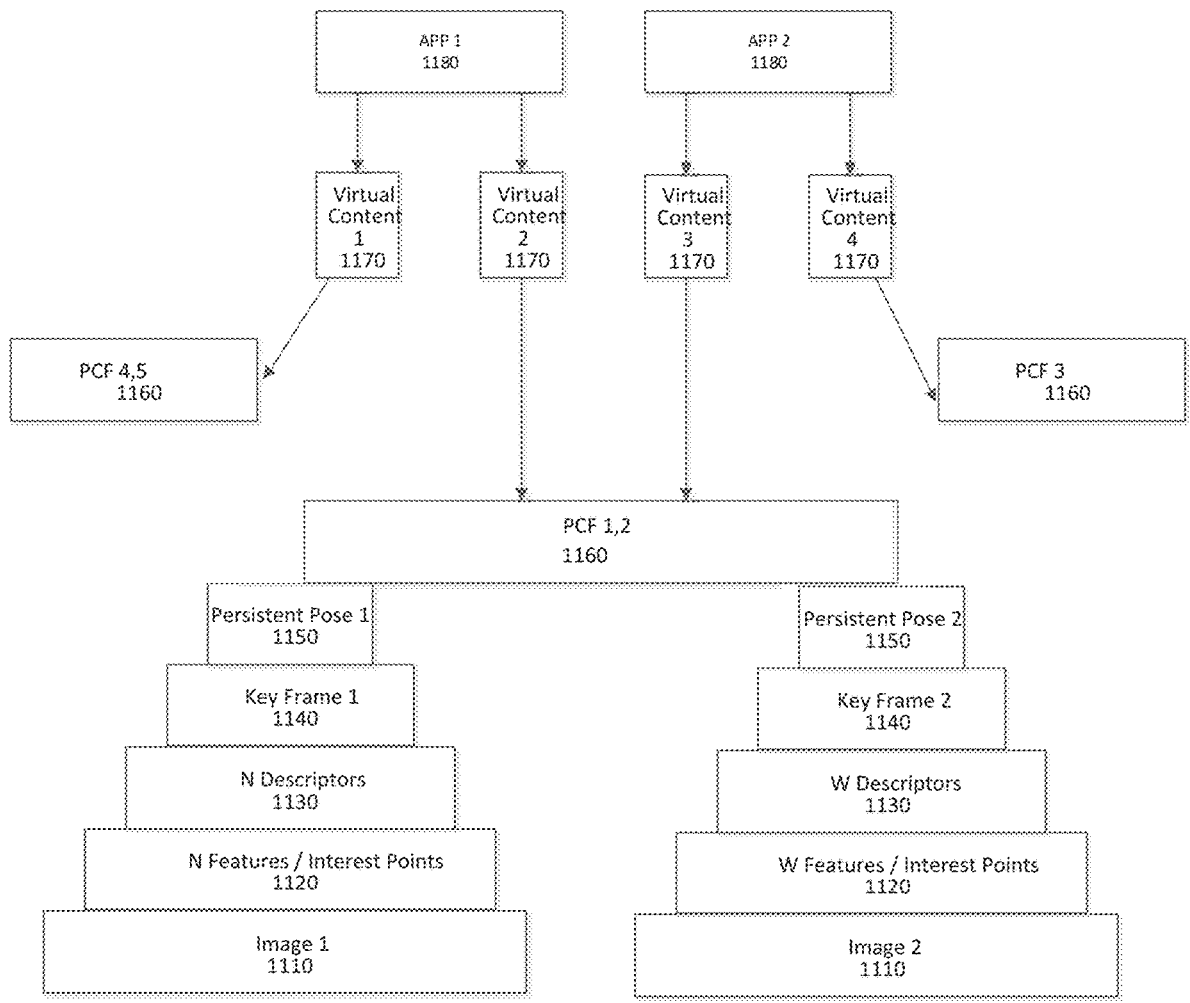
FIG. 14 is a block diagram illustrating the creation of a persistent coordinate frame (PCF) and the attachment of XR content to the PCF, according to some embodiments.

FIG. 14 is a block diagram illustrating the creation of a persistent coordinate frame (PCF) and the attachment of XR content to the PCF, according to some embodiments. Each block may represent digital information stored in a computer memory. In the case of applications 1180, the data may represent computer-executable instructions. In the case of virtual content 1170, the digital information may define a virtual object, as specified by the application 1180, for example. In the case of the other boxes, the digital information may characterize some aspect of the physical world.

In the illustrated embodiment, one or more PCFs are created from images captured with sensors on a wearable device. In the embodiment of FIG. 14, the sensors are visual image cameras. These cameras may be the same cameras used for forming a tracking map. Accordingly, some of the processing suggested by FIG. 14 may be performed as part of updating a tracking map. However, FIG. 14 illustrates that information that provides persistence is generated in addition to the tracking map.

In order to derive a 3D PCF, two images 1110 from two cameras mounted to a wearable device in a configuration that enables stereoscopic image analysis are processed together. FIG. 14 illustrates an Image 1 and an Image 2, each derived from one of the cameras. A single image from each camera is illustrated for simplicity. However, each camera may output a stream of image frames and the processing illustrated in FIG. 14 may be performed for multiple image frames in the stream.

Accordingly, Image 1 and Image 2 may each be one frame in a sequence of image frames. Processing as depicted in FIG. 14 may be repeated on successive image frames in the sequence until image frames containing feature points providing a suitable image from which to form persistent spatial information is processed. Alternatively or additionally, the processing of FIG. 14 might be repeated as a user moves such that the user is no longer close enough to a previously identified PCF to reliably use that PCF for determining positions with respect to the physical world. For example, an XR system may maintain a current PCF for a user. When that distance exceeds a threshold, the system may switch to a new current PCF, closer to the user, which may be generated according to the process of FIG. 14, using image frames acquired in the user's current location.

Even when generating a single PCF, a stream of image frames may be processed to identify image frames depicting content in the physical world that is likely stable and can be readily identified by a device in the vicinity of the region of the physical world depicted in the image frame. In the embodiment of FIG. 14, this processing begins with the identification of features 1120 in the image. Features may be identified, for example, by finding locations of gradients in the image above a threshold or other characteristics, which may correspond to a corner of an object, for example. In the embodiment illustrated, the features are points, but other recognizable features, such as edges, may alternatively or additionally be used.

In the embodiment illustrated, a fixed number, N, of features 1120 are selected for further processing. Those feature points may be selected based on one or more criteria, such as magnitude of the gradient, or proximity to other feature points. Alternatively or additionally, the feature points may be selected heuristically, such as based on characteristics that suggest the feature points are persistent. For example, heuristics may be defined based on the characteristics of feature points that likely correspond to a corner of a window or a door or a large piece of furniture. Such heuristics may take into account the feature point itself and what surrounds it. As a specific example, the number of feature points per image may be between 100 and 500 or between 150 and 250, such as 200.

Regardless of the number of feature points selected, descriptors 1130 may be computed for the feature points. In this example, a descriptor is computed for each selected feature point, but a descriptor may be computed for groups of feature points or for a subset of the feature points or for all features within an image. The descriptor characterizes a feature point such that feature points representing the same object in the physical world are assigned similar descriptors. The descriptors may facilitate alignment of two frames, such as may occur when one map is localized with respect to another. Rather than searching for a relative orientation of the frames that minimizes the distance between feature points of the two images, an initial alignment of the two frames may be made by identifying feature points with similar descriptors. Alignment of the image frames may be based on aligning points with similar descriptors, which may entail less processing than computing an alignment of all the feature points in the images.

The descriptors may be computed as a mapping of the feature points or, in some embodiments a mapping of a patch of an image around a feature point, to a descriptor. The descriptor may be a numeric quantity. U.S. patent application Ser. No. 16/190,948 describes computing descriptors for feature points and is hereby incorporated herein by reference in its entirety.

In the example of FIG. 14, a descriptor 1130 is computed for each feature point in each image frame. Based on the descriptors and/or the feature points and/or the image itself, the image frame may be identified as a key frame 1140. In the embodiment illustrated, a key frame is an image frame meeting certain criteria that is then selected for further processing. In making a tracking map, for example, image frames that add meaningful information to the map may be selected as key frames that are integrated into the map. On the other hand, image frames that substantially overlap a region for which an image frame has already been integrated into the map may be discarded such that they do not become key frames. Alternatively or additionally, key frames may be selected based on the number and/or type of feature points in the image frame. In the embodiment of FIG. 14, key frames 1150 selected for inclusion in a tracking map may also be treated as key frames for determining a PCF, but different or additional criteria for selecting key frames for generation of a PCF may be used.

Though FIG. 14 shows that a key frame is used for further processing, information acquired from an image may be processed in other forms. For example, the feature points, such as in a key rig, may alternatively or additionally be processed. Moreover, though a key frame is described as being derived from a single image frame, it is not necessary that there be a one-to-one relationship between a key frame and an acquired image frame. A key frame, for example, may be acquired from multiple image frames, such as by stitching together or aggregating the image frames such that only features appearing in multiple images are retained in the key frame.

A key frame may include image information and/or metadata associated with the image information. In some embodiments, images captured by the cameras 44, 46 (FIG. 9) may be computed into one or more key frames (e.g., key frames 1, 2). In some embodiments, a key frame may include a camera pose. In some embodiments, a key frame may include one or more camera images captured at the camera pose. In some embodiments, an XR system may determine a portion of the camera images captured at the camera pose as not useful and thus not include the portion in a key frame. Therefore, using key frames to align new images with earlier knowledge of a scene reduces the use of computational resource of the XR system. In some embodiments, a key frame may include an image, and/or image data, at a location with a direction/angle. In some embodiments, a key frame may include a location and a direction from which one or more map points may be observed. In some embodiments, a key frame may include a coordinate frame with an ID. U.S. patent application Ser. No. 15/877,359 describes key frames and is hereby incorporated herein by reference in its entirety.

Some or all of the key frames 1140 may be selected for further processing, such as the generation of a persistent pose 1150 for the key frame. The selection may be based on the characteristics of all, or a subset of, the feature points in the image frame. Those characteristics may be determined from processing the descriptors, features and/or image frame, itself. As a specific example, the selection may be based on a cluster of feature points identified as likely to relate to a persistent object.

Each key frame is associated with a pose of the camera at which that key frame was acquired. For key frames selected for processing into a persistent pose, that pose information may be saved along with other metadata about the key frame, such as a WIFI fingerprint and/or GPS coordinates at the time of acquisition and/or at the location of acquisition.

The persistent poses are a source of information that a device may use to orient itself relative to previously acquired information about the physical world. For example, if the key frame from which a persistent pose was created is incorporated into a map of the physical world, a device may orient itself relative to that persistent pose using a sufficient number of feature points in the key frame that are associated with the persistent pose. The device may align a current image that it takes of its surroundings to the persistent pose. This alignment may be based on matching the current image to the image 1110, the features 1120, and/or the descriptors 1130 that gave rise to the persistent pose, or any subset of that image or those features or descriptors. In some embodiments, the current image frame that is matched to the persistent pose may be another key frame that has been incorporated into the device's tracking map.

Information about a persistent pose may be stored in a format that facilitates sharing among multiple applications, which may be executing on the same or different devices. In the example of FIG. 14, some or all of the persistent poses may be reflected as a persistent coordinate frames (PCFs) 1160. Like a persistent pose, a PCF may be associated with a map and may comprise a set of features, or other information, that a device can use to determine its orientation with respect to that PCF. The PCF may include a transformation that defines its transformation with respect to the origin of its map, such that, by correlating its position to a PCF, the device can determine its position with respect to any objects in the physical world reflected in the map.

As the PCF provides a mechanism for determining locations with respect to the physical objects, an application, such as applications 1180, may define positions of virtual objects with respect to one or more PCFs, which serve as anchors for the virtual content 1170. FIG. 14 illustrates, for example, that App 1 has associated its virtual content 2 with PCF 1.2. Likewise, App 2 has associated its virtual content 3 with PCF 1.2. App 1 is also shown associating its virtual content 1 to PCF 4.5, and App 2 is shown associating its virtual content 4 with PCF 3. In some embodiments, PCF 3 may be based on Image 3 (not shown), and PCF 4.5 may be based on Image 4 and Image 5 (not shown) analogously to how PCF 1.2 is based on Image 1 and Image 2. When rendering this virtual content, a device may apply one or more transformations to compute information, such as the location of the virtual content with respect to the display of the device and/or the location of physical objects with respect to the desired location of the virtual content. Using the PCFs as reference may simplify such computations.

In some embodiments, a persistent pose may be a coordinate location and/or direction that has one or more associated key frames. In some embodiments, a persistent pose may be automatically created after the user has traveled a certain distance, e.g., three meters. In some embodiments, the persistent poses may act as reference points during localization. In some embodiments, the persistent poses may be stored in a passable world (e.g., the passable world module 538).

In some embodiments, a new PCF may be determined based on a pre-defined distance allowed between adjacent PCFs. In some embodiments, one or more persistent poses may be computed into a PCF when a user travels a pre-determined distance, e.g., five meters. In some embodiments, PCFs may be associated with one or more world coordinate frames and/or canonical coordinate frames, e.g., in the passable world. In some embodiments, PCFs may be stored in a local and/or remote database depending on, for example, security settings.

Figure 15:
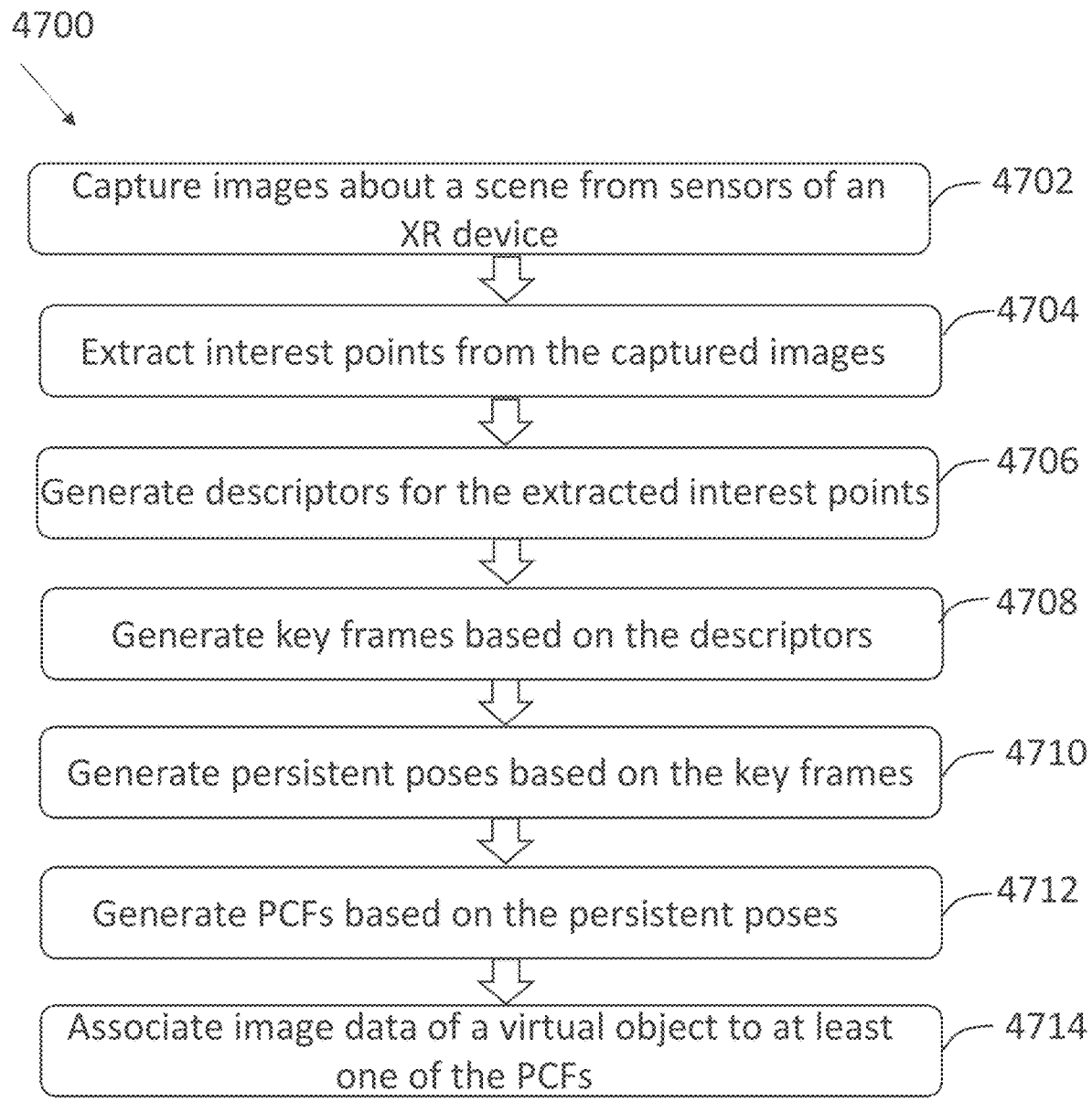
FIG. 15 is a flow chart illustrating a method of establishing and using a PCF, according to some embodiments.

FIG. 15 illustrates a method 4700 of establishing and using a persistence coordinate frame, according to some embodiments. The method 4700 may start from capturing (Act 4702) images (e.g., Image 1 and Image 2 in FIG. 14) about a scene using one or more sensors of an XR device. Multiple cameras may be used and one camera may generate multiple images, for example, in a stream.

The method 4700 may include extracting (4704) interest points (e.g., map points 702 in FIG. 7, features 1120 in FIG. 14) from the captured images, generating (Act 4706) descriptors (e.g., descriptors 1130 in FIG. 14) for the extracted interest points, and generating (Act 4708) key frames (e.g., key frames 1140) based on the descriptors. In some embodiments, the method may compare interest points in the key frames, and form pairs of key frames that share a predetermined amount of interest points. The method may reconstruct parts of the physical world using individual pairs of key frames. Mapped parts of the physical world may be saved as 3D features (e.g., keyrig 704 in FIG. 7). In some embodiments, a selected portion of the pairs of key frames may be used to build 3D features. In some embodiments, results of the mapping may be selectively saved. Key frames not used for building 3D features may be associated with the 3D features through poses, for example, representing distances between key frames with a covariance matrix between poses of keyframes. In some embodiments, pairs of key frames may be selected to build the 3D features such that distances between each two of the build 3D features are within a predetermined distance, which may be determined to balance the amount of computation needed and the level of accuracy of a resulting model. Such approaches enable providing a model of the physical world with the amount of data that is suitable for efficient and accurate computation with an XR system. In some embodiments, a covariance matrix of two images may include covariances between poses of the two images (e.g., six degrees of freedom).

The method 4700 may include generating (Act 4710) persistent poses based on the key frames. In some embodiments, the method may include generating the persistent poses based on the 3D features reconstructed from pairs of key frames. In some embodiments, a persistent pose may be attached to a 3D feature. In some embodiments, the persistent pose may include a pose of a key frame used to construct the 3D feature. In some embodiments, the persistent pose may include an average pose of key frames used to construct the 3D feature. In some embodiments, persistent poses may be generated such that distances between neighboring persistent poses are within a predetermined value, for example, in the range of one meter to five meters, any value in between, or any other suitable value. In some embodiments, the distances between neighboring persistent poses may be represented by a covariance matrix of the neighboring persistent poses.

The method 4700 may include generating (Act 4712) PCFs based on the persistent poses. In some embodiments, a PCF may be attached to a 3D feature. In some embodiments, a PCF may be associated with one or more persistent poses. In some embodiments, a PCF may include a pose of one of the associated persistent poses. In some embodiments, a PCF may include an average pose of the poses of the associated persistent poses. In some embodiments, PCFs may be generated such that distances between neighboring PCFs are within a predetermined value, for example, in the range of three meters to ten meters, any value in between, or any other suitable value. In some embodiments, the distances between neighboring PCFs may be represented by a covariance matrix of the neighboring PCFs. In some embodiments, PCFs may be exposed to XR applications via, for example, an application programming interface (API) such that the XR applications can access a model of the physical world through the PCFs without accessing the model itself.

The method 4700 may include associating (Act 4714) image data of a virtual object to be displayed by the XR device to at least one of the PCFs. In some embodiments, the method may include computing translations and orientations of the virtual object with respect to the associated PCF. It should be appreciated that it is not necessary to associate a virtual object to a PCF generated by the device placing the virtual object. For example, a device may retrieve saved PCFs in a canonical map in a cloud and associate a virtual object to a retrieved PCF. It should be appreciated that the virtual object may move with the associated PCF as the PCF is adjusted overtime.

Figure 16:
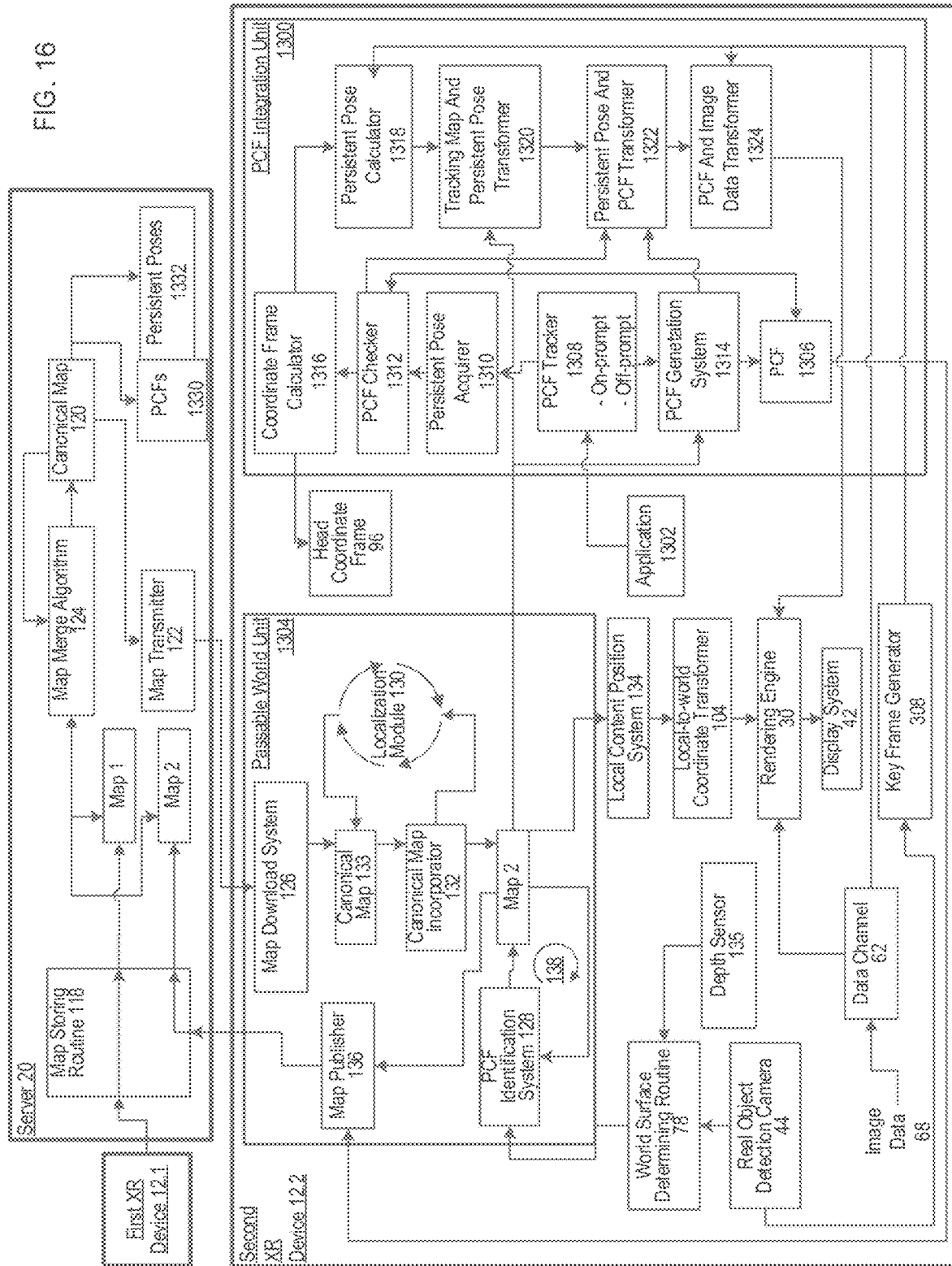
FIG. 16 is a block diagram of the XR system of FIG. 8, including a second XR device, according to some embodiments.

FIG. 16 illustrates the first XR device 12.1 and vision data and algorithms of a second XR device 12.2 and the server 20, according to some embodiments. The components illustrated in FIG. 16 may operate to perform some or all of the operations associated with generating, updating, and/or using spatial information, such as persistent poses, persistent coordinate frames, tracking maps, or canonical maps, as described herein. Although not illustrated, the first XR device 12.1 may be configured the same as the second XR device 12.2. The server 20 may have a map storing routine 118, a canonical map 120, a map transmitter 122, and a map merge or stitch algorithm 124.

The second XR device 12.2, which may be in the same scene as the first XR device 12.1, may include a persistent coordinate frame (PCF) integration unit 1300, an application 1302 that generates the image data 68 that may be used to render a virtual object, and a frame embedding generator 308 (See FIG. 21). In some embodiments, a map download system 126, PCF identification system 128, Map 2, localization module 130, canonical map incorporator 132, canonical map 133, and map publisher 136 may be grouped into a passable world unit 1304. The PCF integration unit 1300 may be connected to the passable world unit 1304 and other components of the second XR device 12.2 to allow for the retrieval, generation, use, upload, and download of PCFs.

A map, comprising PCFs, may enable more persistence in a changing world. In some embodiments, localizing a tracking map including, for example, matching features for images, may include selecting features that represent persistent content from the map constituted by PCFs, which enables fast matching and/or localizing. For example, a world where people move into and out of the scene and objects such as doors move relative to the scene, requires less storage space and transmission rates, and enables the use of individual PCFs and their relationships relative to one another (e.g., integrated constellation of PCFs) to map a scene.

In some embodiments, the PCF integration unit 1300 may include PCFs 1306 that were previously stored in a data store on a storage unit of the second XR device 12.2, a PCF tracker 1308, a persistent pose acquirer 1310, a PCF checker 1312, a PCF generation system 1314, a coordinate frame calculator 1316, a persistent pose calculator 1318, and three transformers, including a tracking map and persistent pose transformer 1320, a persistent pose and PCF transformer 1322, and a PCF and image data transformer 1324.

In some embodiments, the PCF tracker 1308 may have an on-prompt and an off-prompt that are selectable by the application 1302. The application 1302 may be executable by a processor of the second XR device 12.2 to, for example, display a virtual content. The application 1302 may have a call that switches the PCF tracker 1308 on via the on-prompt. The PCF tracker 1308 may generate PCFs when the PCF tracker 1308 is switched on. The application 1302 may have a subsequent call that can switch the PCF tracker 1308 off via the off-prompt. The PCF tracker 1308 terminates PCF generation when the PCF tracker 1308 is switched off.

In some embodiments, the server 20 may include a plurality of persistent poses 1332 and a plurality of PCFs 1330 that have previously been saved in association with a canonical map 120. The map transmitter 122 may transmit the canonical map 120 together with the persistent poses 1332 and/or the PCFs 1330 to the second XR device 12.2.

The persistent poses 1332 and PCFs 1330 may be stored in association with the canonical map 133 on the second XR device 12.2. When Map 2 localizes to the canonical map 133, the persistent poses 1332 and the PCFs 1330 may be stored in association with Map 2.

In some embodiments, the persistent pose acquirer 1310 may acquire the persistent poses for Map 2. The PCF checker 1312 may be connected to the persistent pose acquirer 1310. The PCF checker 1312 may retrieve PCFs from the PCFs 1306 based on the persistent poses retrieved by the persistent pose acquirer 1310. The PCFs retrieved by the PCF checker 1312 may form an initial group of PCFs that are used for image display based on PCFs.

In some embodiments, the application 1302 may require additional PCFs to be generated. For example, if a user moves to an area that has not previously been mapped, the application 1302 may switch the PCF tracker 1308 on. The PCF generation system 1314 may be connected to the PCF tracker 1308 and begin to generate PCFs based on Map 2 as Map 2 begins to expand. The PCFs generated by the PCF generation system 1314 may form a second group of PCFs that may be used for PCF-based image display.

The coordinate frame calculator 1316 may be connected to the PCF checker 1312. After the PCF checker 1312 retrieved PCFs, the coordinate frame calculator 1316 may invoke the head coordinate frame 96 to determine a head-pose of the second XR device 12.2. The coordinate frame calculator 1316 may also invoke the persistent pose calculator 1318. The persistent pose calculator 1318 may be directly or indirectly connected to the frame embedding generator 308. In some embodiments, an image/frame may be designated a key frame after a threshold distance from the previous key frame, e.g., 3 meters, is traveled. The persistent pose calculator 1318 may generate a persistent pose based on a plurality, for example three, key frames. In some embodiments, the persistent pose may be essentially an average of the coordinate frames of the plurality of key frames.

The tracking map and persistent pose transformer 1320 may be connected to Map 2 and the persistent pose calculator 1318. The tracking map and persistent pose transformer 1320 may transform Map 2 to the persistent pose to determine the persistent pose at an origin relative to Map 2.

The persistent pose and PCF transformer 1322 may be connected to the tracking map and persistent pose transformer 1320 and further to the PCF checker 1312 and the PCF generation system 1314. The persistent pose and PCF transformer 1322 may transform the persistent pose (to which the tracking map has been transformed) to the PCFs from the PCF checker 1312 and the PCF generation system 1314 to determine the PCFs relative to the persistent pose.

The PCF and image data transformer 1324 may be connected to the persistent pose and PCF transformer 1322 and to the data channel 62. The PCF and image data transformer 1324 transforms the PCFs to the image data 68. The rendering engine 30 may be connected to the PCF and image data transformer 1324 to display the image data 68 to the user relative to the PCFs.

The PCF integration unit 1300 may store the additional PCFs that are generated with the PCF generation system 1314 within the PCFs 1306. The PCFs 1306 may be stored relative to persistent poses. The map publisher 136 may retrieve the PCFs 1306 and the persistent poses associated with the PCFs 1306 when the map publisher 136 transmits Map 2 to the server 20, the map publisher 136 also transmits the PCFs and persistent poses associated with Map 2 to the server 20. When the map storing routine 118 of the server 20 stores Map 2, the map storing routine 118 may also store the persistent poses and PCFs generated by the second viewing device 12.2. The map merge or stitch algorithm 124 may create the canonical map 120 with the persistent poses and PCFs of Map 2 associated with the canonical map 120 and stored within the persistent poses 1332 and PCFs 1330, respectively.

The first XR device 12.1 may include a PCF integration unit similar to the PCF integration unit 1300 of the second XR device 12.2. When the map transmitter 122 transmits the canonical map 120 to the first XR device 12.1, the map transmitter 122 may transmit the persistent poses 1332 and PCFs 1330 associated with the canonical map 120 and originating from the second XR device 12.2. The first XR device 12.1 may store the PCFs and the persistent poses within a data store on a storage device of the first XR device 12.1. The first XR device 12.1 may then make use of the persistent poses and the PCFs originating from the second XR device 12.2 for image display relative to the PCFs. Additionally or alternatively, the first XR device 12.1 may retrieve, generate, make use, upload, and download PCFs and persistent poses in a manner similar to the second XR device 12.2 as described above.

In the illustrated example, the first XR device 12.1 generates a local tracking map (referred to hereinafter as "Map 1") and the map storing routine 118 receives Map 1 from the first XR device 12.1. The map storing routine 118 then stores Map 1 on a storage device of the server 20 as the canonical map 120.

The second XR device 12.2 includes a map download system 126, an anchor identification system 128, a localization module 130, a canonical map incorporator 132, a local content position system 134, and a map publisher 136.

In use, the map transmitter 122 sends the canonical map 120 to the second XR device 12.2 and the map download system 126 downloads and stores the canonical map 120 as a canonical map 133 from the server 20.

The anchor identification system 128 is connected to the world surface determining routine 78. The anchor identification system 128 identifies anchors based on objects detected by the world surface determining routine 78. The anchor identification system 128 generates a second map (Map 2) using the anchors. As indicated by the cycle 138, the anchor identification system 128 continues to identify anchors and continues to update Map 2. The locations of the anchors are recorded as three-dimensional data based on data provided by the world surface determining routing 78. The world surface determining routine 78 receives images from the real object detection camera 44 and depth data from depth sensors 135 to determine the locations of surfaces and their relative distance from the depth sensors 135.

The localization module 130 is connected to the canonical map 133 and Map 2. The localization module 130 repeatedly attempts to localize Map 2 to the canonical map 133. The canonical map incorporator 132 is connected to the canonical map 133 and Map 2. When the localization module 130 localizes Map 2 to the canonical map 133, the canonical map incorporator 132 incorporates the canonical map 133 into anchors of Map 2. Map 2 is then updated with missing data that is included in the canonical map.

The local content position system 134 is connected to Map 2. The local content position system 134 may, for example, be a system wherein a user can locate local content in a particular location within a world coordinate frame. The local content then attaches itself to one anchor of Map 2. The local-to-world coordinate transformer 104 transforms the local coordinate frame to the world coordinate frame based on the settings of the local content position system 134. The functioning of the rendering engine 30, display system 42, and data channel 62 have been described with reference to FIG. 2.

The map publisher 136 uploads Map 2 to the server 20. The map storing routine 118 of the server 20 then stores Map 2 within a storage medium of the server 20.

The map merge or stitch algorithm 124 merges or stitches Map 2 with the canonical map 120. When more than two maps, for example, three or four maps relating to the same or adjacent regions of the physical world, have been stored, the map merge or stitch algorithm 124 merges or stitches all the maps into the canonical map 120 to render a new canonical map 120. The map transmitter 122 then transmits the new canonical map 120 to any and all devices 12.1 and 12.2 that are in an area represented by the new canonical map 120. When the devices 12.1 and 12.2 localize their respective maps to the canonical map 120, the canonical map 120 becomes the promoted map.

Figure 17:
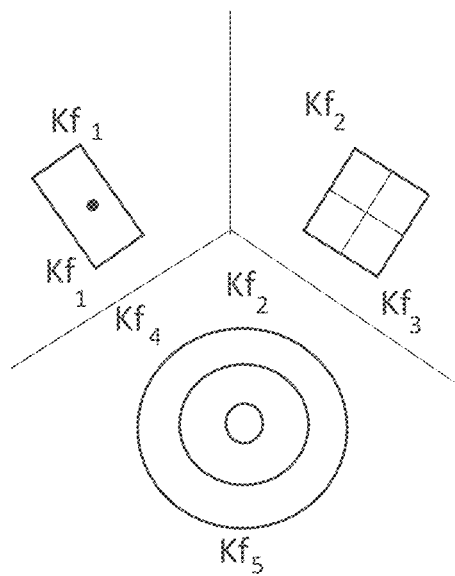
FIG. 17 is a schematic diagram illustrating a room and key frames that are established for various areas in the room, according to some embodiments.

FIG. 17 illustrates an example of generating key frames for a map of a scene, according to some embodiments. In the illustrated example, a first key frame, KF1, is generated for a door on a left wall of the room. A second key frame, KF2, is generated for an area in a corner where a floor, the left wall, and a right wall of the room meet. A third key frame, KF3, is generated for an area of a window on the right wall of the room. A fourth key frame, KF4, is generated for an area at a far end of a rug on a floor of the wall. A fifth key frame, KF5, is generated for an area of the rug closest to the user.

Figure 18:
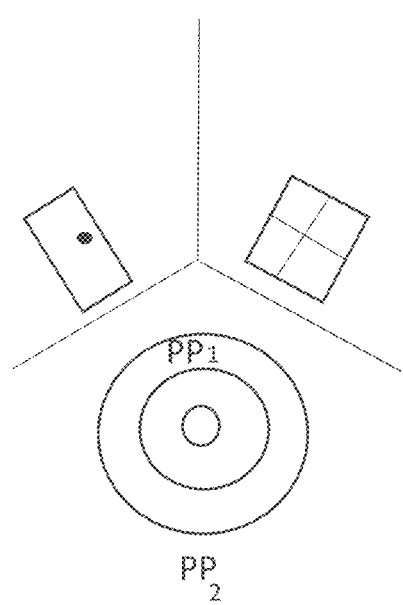
FIG. 18 is a schematic diagram illustrating the establishment of persistent poses based on the key frames, according to some embodiments.

FIG. 18 illustrates an example of generating persistent poses for the map of FIG. 17, according to some embodiments. In some embodiments, a new persistent pose is created when the device measures a threshold distance traveled, and/or when an application requests a new persistent pose (PP). In some embodiments, the threshold distance may be 3 meters, 5 meters, 20 meters, or any other suitable distance. Selecting a smaller threshold distance (e.g., 1 m) may result in an increase in compute load since a larger number of PPs may be created and managed compared to larger threshold distances. Selecting a larger threshold distance (e.g., 40 m) may result in increased virtual content placement error since a smaller number of PPs would be created, which would result in fewer PCFs being created, which means the virtual content attached to the PCF could be a relatively large distance (e.g., 30 m) away from the PCF, and error increases with increasing distance from a PCF to the virtual content.

In some embodiments, a PP may be created at the start of a new session. This initial PP may be thought of as zero, and can be visualized as the center of a circle that has a radius equal to the threshold distance. When the device reaches the perimeter of the circle, and, in some embodiments, an application requests a new PP, a new PP may be placed at the current location of the device (at the threshold distance). In some embodiments, a new PP will not be created at the threshold distance if the device is able to find an existing PP within the threshold distance from the device's new position. In some embodiments, when a new PP (e.g., PP1150 in FIG. 14) is created, the device attaches one or more of the closest key frames to the PP. In some embodiments, the location of the PP relative to the key frames may be based on the location of the device at the time a PP is created. In some embodiments, a PP will not be created when the device travels a threshold distance unless an application requests a PP.

In some embodiments, an application may request a PCF from the device when the application has virtual content to display to the user. The PCF request from the application may trigger a PP request, and a new PP would be created after the device travels the threshold distance. FIG. 18 illustrates a first persistent pose PP1 which may have the closest key frames, (e.g., KF1, KF2, and KF3) attached by, for example, computing relative poses between the key frames to the persistent pose. FIG. 18 also illustrates a second persistent pose PP2 which may have the closest key frames (e.g., KF4 and KF5) attached.

Figure 19:
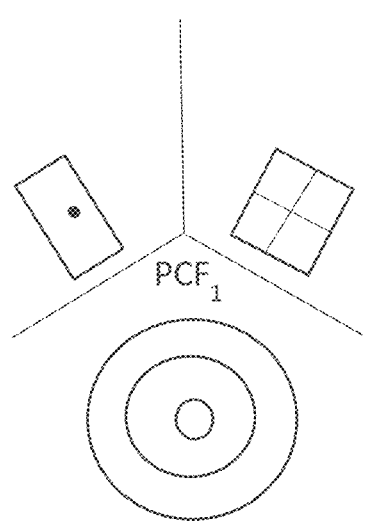
FIG. 19 is a schematic diagram illustrating the establishment of a persistent coordinate frame (PCF) based on the persistent poses, according to some embodiments.

FIG. 19 illustrates an example of generating a PCF for the map of FIG. 17, according to some embodiments. In the illustrated example, a PCF may include PP1 and PP2. As described above, the PCF may be used for displaying image data relative to the PCF. In some embodiments, each PCF may have coordinates in another coordinate frame (e.g., a world coordinate frame) and a PCF descriptor, for example, uniquely identifying the PCF. In some embodiments, the PCF descriptor may be computed based on feature descriptors of features in frames associated with the PCF. In some embodiments, various constellations of PCFs may be combined to represent the real world in a persistent manner and that requires less data and less transmission of data.

FIGS. 20A to 20C are schematic diagrams illustrating an example of establishing and using a persistent coordinate frame. FIG. 20A shows two users 4802A, 4802B with respective local tracking maps 4804A, 4804B that have not localized to a canonical map. The origins 4806A, 4806B for individual users are depicted by the coordinate system (e.g., a world coordinate system) in their respective areas. These origins of each tracking map may be local to each user, as the origins are dependent on the orientation of their respective devices when tracking was initiated.

As the sensors of the user device scan the environment, the device may capture images that, as described above in connection with FIG. 14, may contain features representing persistent objects such that those images may be classified as key frames, from which a persistent pose may be created. In this example, the tracking map 4802A includes a persistent pose (PP) 4808A; the tracking 4802B includes a PP 4808B. Also as described above in connection with FIG. 14, some of the PP's may be classified as PCFs which are used to determine the orientation of virtual content for rendering it to the user. FIG. 20B shows that XR devices worn by respective users 4802A, 4802B may create local PCFs 4810A, 4810B based on the PP 4808A, 4808B. FIG. 20C shows that persistent content 4812A, 4812B (e.g., a virtual content) may be attached to the PCFs 4810A, 4810B by respective XR devices.

In this example, virtual content may have a virtual content coordinate frame, that may be used by an application generating virtual content, regardless of how the virtual content should be displayed. The virtual content, for example, may be specified as surfaces, such as triangles of a mesh, at particular locations and angles with respect to the virtual content coordinate frame. To render that virtual content to a user, the locations of those surfaces may be determined with respect to the user that is to perceive the virtual content.

Attaching virtual content to the PCFs may simplify the computation involved in determining locations of the virtual content with respect to the user. The location of the virtual content with respect to a user may be determined by applying a series of transformations. Some of those transformations may change, and may be updated frequently. Others of those transformations may be stable and may be updated infrequently or not at all. Regardless, the transformations may be applied with relatively low computational burden such that the location of the virtual content can be updated with respect to the user frequently, providing a realistic appearance to the rendered virtual content.

In the example of FIGS. 20A-20C, user 1's device has a coordinate system that can be related to the coordinate system that defines the origin of the map by the transformation $rig1\_T\_w1$. User 2's device has a similar transformation $rig2\_T\_w2$. These transformations may be expressed as six degrees of transformation, specifying translation and rotation to align the device coordinate systems with the map coordinate systems. In some embodiments, the transformation may be expressed as two separate transformations, one specifying translation and the other specifying rotation. Accordingly, it should be appreciated that the transformations may be expressed in a form that simplifies computation or otherwise provides an advantage.

Transformations between the origins of the tracking maps and the PCFs identified by the respective user devices are expressed as $pcf1\_T\_w1$ and $pcf2\_T\_w2$. In this example the PCF and the PP are identical, such that the same transformation also characterizes the PP's.

The location of the user device with respect to the PCF can therefore be computed by the serial application of these transformations, such as $rig1\_T\_pcf1=(rig1\_T\_w1)*(pcf1\_T\_w1)$.

As shown in FIG. 20C, the virtual content is located with respect to the PCFs, with a transformation of $obj1\_T\_pcf1$. This transformation may be set by an application generating the virtual content that may receive information from a world reconstruction system describing physical objects with respect to the PCF. To render the virtual content to the user, a transformation to the coordinate system of the user's device is computed, which may be computed by relating the virtual content coordinate frame to the origin of the tracking map through the transformation $obj1\_t\_w1=(obj1\_T\_pcf1)*(pcf1\_T\_w1)$. That transformation may then be related to the user's device through further transformation $rig1\_T\_w1$.

The location of the virtual content may change, based on output from an application generating the virtual content. When that changes, the end-to-end transformation, from a source coordinate system to a destination coordinate system, may be recomputed. Additionally, the location and/or headpose of the user may change as the user moves. As a result, the transformation $rig1\_T\_w1$ may change, as would any end-to-end transformation that depends on the location or headpose of the user.

The transformation $rig1\_T\_w1$ may be updated with motion of the user based on tracking the position of the user with respect to stationary objects in the physical world. Such tracking may be performed by a headphone tacking component processing a sequence of images, as described above, or other component of the system. Such updates may be made by determining pose of the user with respect to a stationary frame of reference, such as a PP.

In some embodiments, the location and orientation of a user device may be determined relative to the nearest persistent pose, or, in this example, a PCF, as the PP is used as a PCF. Such a determination may be made by identifying in current images captured with sensors on the device feature points that characterize the PP. Using image processing techniques, such as stereoscopic image analysis, the location of the device with respect to those feature points may be determined. From this data, the system could calculate the change in transformation associated with the user's motions based on the relationship $rig1\_T\_pcf1=(rig1\_T\_w1)*(pcf1\_T\_w1)$.

A system may determine and apply transformations in an order that is computationally efficient. For example, the need to compute rig1_T_w1 from a measurement yielding rig1_T_pcf1 might be avoided by tracking user pose and defining the location of virtual content relative to the PP or a PCF built on a persistent pose. In this way the transformation from a source coordinate system of the virtual content to the destination coordinate system of the user's device may be based on the measured transformation according to the expression (rig1_T_pcf1)*(obj1_t_pcf1), with the first transformation being measured by the system and the latter transformation being supplied by an application specifying virtual content for rendering. In embodiments in which the virtual content is positioned with respect to the origin of the map, the end-to-end transformation may relate the virtual object coordinate system to the PCF coordinate system based on a further transformation between the map coordinates and the PCF coordinates. In embodiments in which the virtual content is positioned with respect to a different PP or PCF than the one against which user position is being tracked, a transformation between the two may be applied. Such a transformation may be fixed and may be determined, for example, from a map in which both appear.

A transform-based approach may be implemented, for example, in a device with components that process sensor data to build a tracking map. As part of that process, those components may identify feature points that may be used as persistent poses, which in turn may be turned into PCFs. Those components may limit the number of persistent poses generated for the map, to provide a suitable spacing between persistent poses, while allowing the user, regardless of location in the physical environment, to be close enough to a persistent pose location to accurately compute the user's pose, as described above in connection with FIGS. 17-19. As the closest persistent pose to a user is updated, as a result of user movement, refinements to the tracking map or other causes, any of the transformations that are used to compute the location of virtual content relative to the user that depend on the location of the PP (or PCF if being used) may be updated and stored for use, at least until the user moves away from that persistent pose. Nonetheless, by computing and storing transformations, the computational burden each time the location of virtual content is update may be relatively low, such that it may be performed with relatively low latency.

FIGS. 20A-20C illustrate positioning with respect to a tracking map, and each device had its own tracking map. However, transformations may be generated with respect to any map coordinate system. Persistence of content across user sessions of an XR system may be achieved by using a persistent map. Shared experiences of users may also be facilitated by using a map to which multiple user devices may be oriented.

In some embodiments, described in greater detail below, the location of virtual content may be specified in relation to coordinates in a canonical map, formatted such that any of multiple devices may use the map. Each device might maintain a tracking map and may determine the change of pose of the user with respect to the tracking map. In this example, a transformation between the tracking map and the canonical map may be determined through a process of "localization"—which may be performed by matching structures in the tracking map (such as one or more persistent poses) to one or more structures of the canonical map (such as one or more PCFs).

Described in greater below are techniques for creating and using canonical maps in this way.

Deep Key Frame

Techniques as described herein rely on comparison of image frames. For example, to establish the position of a device with respect to a tracking map, a new image may be captured with sensors worn by the user and an XR system may search, in a set of images that were used to create the tracking map, images that share at least a predetermined amount of interest points with the new image. As an example of another scenario involving comparisons of image frames, a tracking map might be localized to a canonical map by first finding image frames associated with a persistent pose in the tracking map that is similar to an image frame associated with a PCF in the canonical map. Alternatively, a transformation between two canonical maps may be computed by first finding similar image frames in the two maps.

Deep key frames provide a way to reduce the amount of processing required to identify similar image frames. For example, in some embodiments, the comparison may be between image features in a new 2D image (e.g., "2D features") and 3D features in the map. Such a comparison may be made in any suitable way, such as by projecting the 3D images into a 2D plane. A conventional method such as Bag of Words (BoW) searches the 2D features of a new image in a database including all 2D features in a map, which may require significant computing resources especially when a map represents a large area. The conventional method then locates the images that share at least one of the 2D features with the new image, which may include images that are not useful for locating meaningful 3D features in the map. The conventional method then locates 3D features that are not meaningful with respect to the 2D features in the new image.

The inventors have recognized and appreciated techniques to retrieve images in the map using less memory resource (e.g., a quarter of the memory resource used by BoW), higher efficiency (e.g., 2.5 ms processing time for each key frame, 100 µs for comparing against 500 key frames), and higher accuracy (e.g., 20% better retrieval recall than BoW for 1024-dimensional model, 5% better retrieval recall than BoW for 256-dimensional model).

To reduce computation, a descriptor may be computed for an image frame that may be used to compare an image frame to other image frames. The descriptors may be stored instead of or in addition to the image frames and feature points. In a map in which persistent poses and/or PCFs may be generated from image frames, the descriptor of the image frame or frames from which each persistent pose or PCF was generated may be stored as part of the persistent pose and/or PCF.

In some embodiments, the descriptor may be computed as a function of feature points in the image frame. In some embodiments, a neural network is configured to compute a unique frame descriptor to represent an image. The image may have a resolution higher than 1 Megabyte such that enough details of a 3D environment within a field-of-view of a device worn by a user is captured in the image. The frame descriptor may be much shorter, such as a string of numbers, for example, in the range of 128 Bytes to 512 Bytes or any number in between.

In some embodiments, the neural network is trained such that the computed frame descriptors indicate similarity between images. Images in a map may be located by identifying, in a database comprising images used to generate the map, the nearest images that may have frame descriptors within a predetermined distance to a frame descriptor for a new image. In some embodiments, the distances between images may be represented by a difference between the frame descriptors of the two images.

FIG. 21 is a block diagram illustrating a system for generating a descriptor for an individual image, according to some embodiments. In the illustrated example, a frame embedding generator 308 is shown. The frame embedding generator 308, in some embodiments, may be used within the server 20, but may alternatively or additionally execute in whole or in part within one of the XR devices 12.1 and 12.2, or any other device processing images for comparison to other images.

In some embodiments, the frame embedding generator may be configured to generate a reduced data representation of an image from an initial size (e.g., 76,800 bytes) to a final size (e.g., 256 bytes) that is nonetheless indicative of the content in the image despite a reduced size. In some embodiments, the frame embedding generator may be used to generate a data representation for an image which may be a key frame or a frame used in other ways. In some embodiments, the frame embedding generator 308 may be configured to convert an image at a particular location and orientation into a unique string of numbers (e.g., 256 bytes). In the illustrated example, an image 320 taken by an XR device may be processed by feature extractor 324 to detect interest points 322 in the image 320. Interest points may be or may not be derived from feature points identified as described above for features 1120 (FIG. 14) or as otherwise described herein. In some embodiments, interest points may be represented by descriptors as described above for descriptors 1130 (FIG. 14), which may be generated using a deep sparse feature method. In some embodiments, each interest point 322 may be represented by a string of numbers (e.g., 32 bytes). There may, for example, be n features (e.g., 100) and each feature is represented by a string of 32 bytes.

In some embodiments, the frame embedding generator 308 may include a neural network 326. The neural network 326 may include a multi-layer perceptron unit 312 and a maximum (max) pool unit 314. In some embodiments, the multi-layer perceptron (MLP) unit 312 may comprise a multi-layer perceptron, which may be trained. In some embodiments, the interest points 322 (e.g., descriptors for the interest points) may be reduced by the multi-layer perceptron 312, and may output as weighted combinations 310 of the descriptors. For example, the MLP may reduce n features to m feature that is less than n features.

In some embodiments, the MLP unit 312 may be configured to perform matrix multiplication. The multi-layer perceptron unit 312 receives the plurality of interest points 322 of an image 320 and converts each interest point to a respective string of numbers (e.g., 256). For example, there may be 100 features and each feature may be represented by a string of 256 numbers. A matrix, in this example, may be created having 100 horizontal rows and 256 vertical columns. Each row may have a series of 256 numbers that vary in magnitude with some being smaller and others being larger. In some embodiments, the output of the MLP may be an n×256 matrix, where n represents the number of interest points extracted from the image. In some embodiments, the output of the MLP may be an m×256 matrix, where m is the number of interest points reduced from n.

Figure 25:
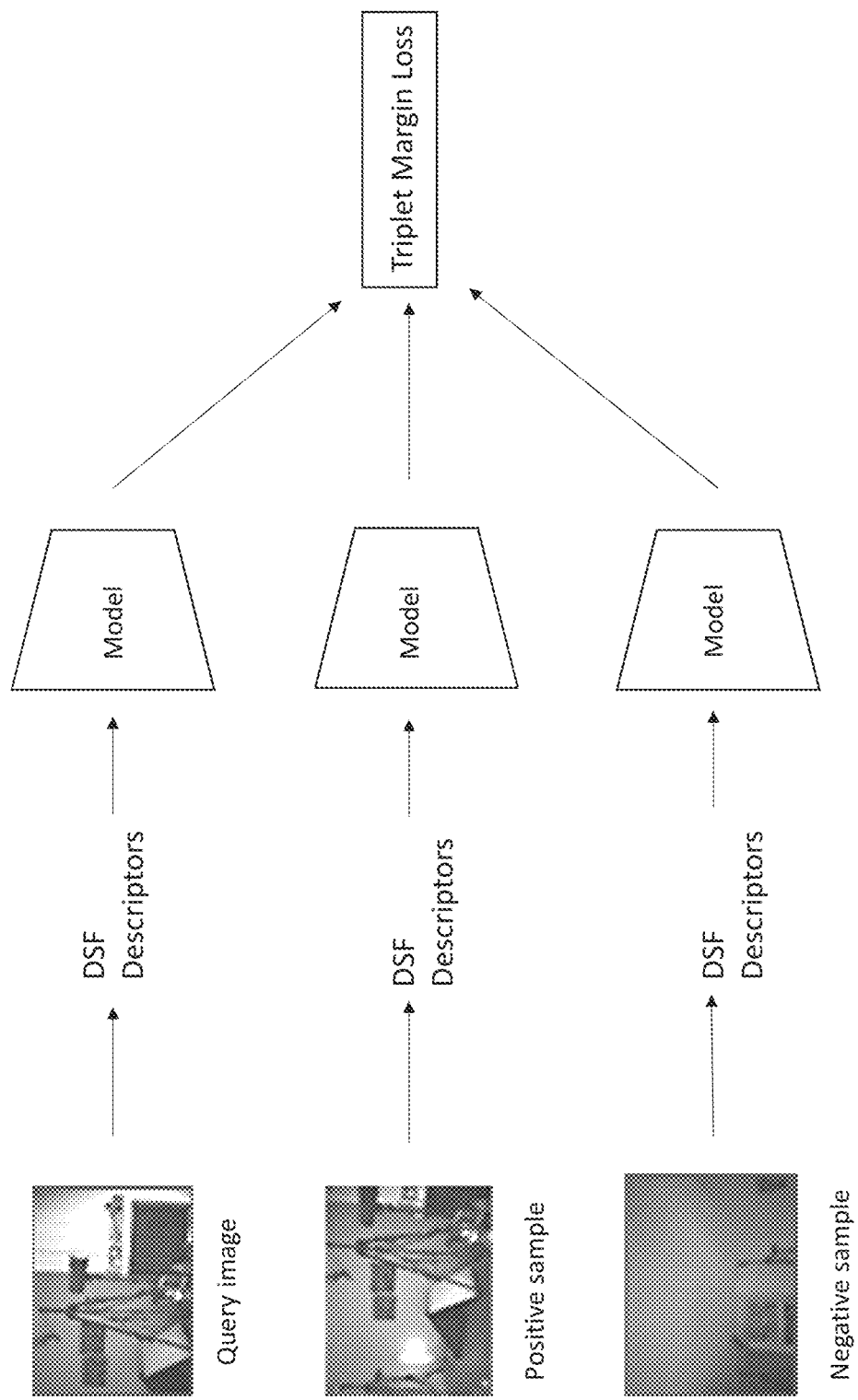
FIG. 25 is a block diagram illustrating a method of training a neural network, according to some embodiments.

In some embodiments, the MLP 312 may have a training phase, during which model parameters for the MLP are determined, and a use phase. In some embodiments, the MLP may be trained as illustrated in FIG. 25. The input training data may comprise data in sets of three, the set of three comprising 1) a query image, 2) a positive sample, and 3) a negative sample. The query image may be considered the reference image.

In some embodiments, the positive sample may comprise an image that is similar to the query image. For example, in some embodiments, similar may be having the same object in both the query and positive sample image but viewed from a different angle. In some embodiments, similar may be having the same object in both the query and positive sample images but having the object shifted (e.g., left, right, up, down) relative to the other image.

In some embodiments, the negative sample may comprise an image that is dissimilar to the query image. For example, in some embodiments, a dissimilar image may not contain any objects that are prominent in the query image or may contain only a small portion of a prominent object in the query image (e.g., <10%, 1%). A similar image, in contrast, may have most of an object (e.g., >50%, or >75%) in the query image, for example.

In some embodiments, interest points may be extracted from the images in the input training data and may be converted to feature descriptors. These descriptors may be computed both for the training images as shown in FIG. 25 and for extracted features in operation of frame embedding generator 308 of FIG. 21. In some embodiments, a deep sparse feature (DSF) process may be used to generate the descriptors (e.g., DSF descriptors) as described in U.S. patent application Ser. No. 16/190,948. In some embodiments, DSF descriptors are n×32 dimension. The descriptors may then be passed through the model/MLP to create a 256-byte output. In some embodiments, the model/MLP may have the same structure as MLP 312 such that once the model parameters are set through training, the resulting trained MLP may be used as MLP 312.

In some embodiments, the feature descriptors (e.g., the 256-byte output from the MLP model) may then be sent to a triplet margin loss module (which may only be used during the training phase, not during use phase of the MLP neural network). In some embodiments, the triplet margin loss module may be configured to select parameters for the model so as to reduce the difference between the 256-byte output from the query image and the 256-byte output from the positive sample, and to increase the difference between the 256-byte output from the query image and the 256-byte output from the negative sample. In some embodiments, the training phase may comprise feeding a plurality of triplet input images into the learning process to determine model parameters. This training process may continue, for example, until the differences for positive images is minimized and the difference for negative images is maximized or until other suitable exit criteria are reached.

Referring back to FIG. 21, the frame embedding generator 308 may include a pooling layer, here illustrated as maximum (max) pool unit 314. The max pool unit 314 may analyze each column to determine a maximum number in the respective column. The max pool unit 314 may combine the maximum value of each column of numbers of the output matrix of the MLP 312 into a global feature string 316 of, for example, 256 numbers. It should be appreciated that images processed in XR systems might, desirably, have high-resolution frames, with potentially millions of pixels. The global feature string 316 is a relatively small number that takes up relatively little memory and is easily searchable compared to an image (e.g., with a resolution higher than 1 Megabyte). It is thus possible to search for images without analyzing each original frame from the camera and it is also cheaper to store 256 bytes instead of complete frames.

Figure 22:
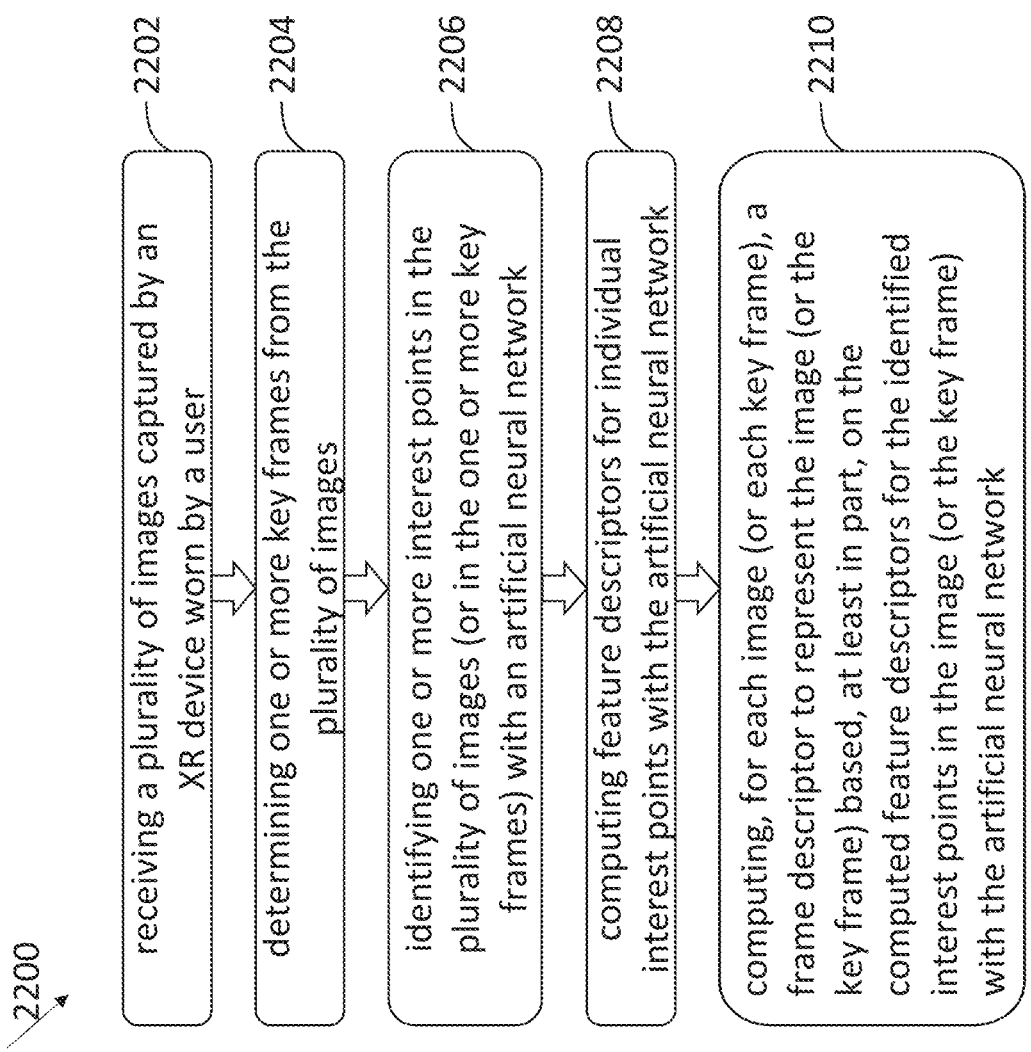
FIG. 22 is a flow chart illustrating a method of computing an image descriptor, according to some embodiments.

FIG. 22 is a flow chart illustrating a method 2200 of computing an image descriptor, according to some embodiments. The method 2200 may start from receiving (Act 2202) a plurality of images captured by an XR device worn by a user. In some embodiments, the method 2200 may include determining (Act 2204) one or more key frames from the plurality of images. In some embodiments, Act 2204 may be skipped and/or may occur after step 2210 instead.

The method 2200 may include identifying (Act 2206) one or more interest points in the plurality of images with an artificial neural network, and computing (Act 2208) feature descriptors for individual interest points with the artificial neural network. The method may include computing (Act 2210), for each image, a frame descriptor to represent the image based, at least in part, on the computed feature descriptors for the identified interest points in the image with the artificial neural network.

Figure 23:
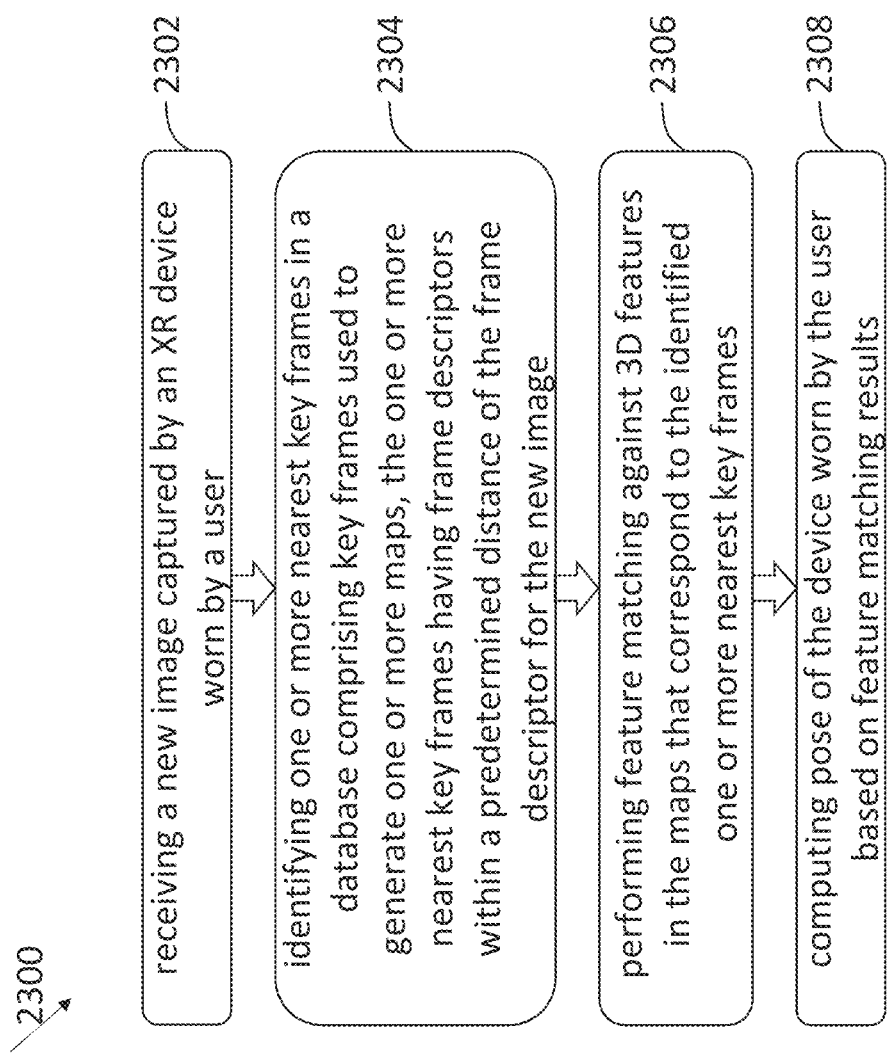
FIG. 23 is a flow chart illustrating a method of localization using image descriptors, according to some embodiments.

FIG. 23 is a flow chart illustrating a method 2300 of localization using image descriptors, according to some embodiments. In this example, a new image frame, depicting the current location of the XR device may be compared to image frames stored in connection with points in a map (such as a persistent pose or a PCF as described above). The method 2300 may start from receiving (Act 2302) a new image captured by an XR device worn by a user. The method 2300 may include identifying (Act 2304) one or more nearest key frames in a database comprising key frames used to generate one or more maps. In some embodiments, a nearest key frame may be identified based on coarse spatial information and/or previously determined spatial information. For example, coarse spatial information may indicate that the XR device is in a geographic region represented by a 50 m×50 m area of a map. Image matching may be performed only for points within that area. As another example, based on tracking, the XR system may know that an XR device was previously proximate a first persistent pose in the map and was moving in a direction of a second persistent pose in the map. That second persistent pose may be considered the nearest persistent pose and the key frame stored with it may be regarded as the nearest key frame. Alternatively or additionally, other metadata, such as GPS data or WIFI fingerprints, may be used to select a nearest key frame or set of nearest key frames.

Regardless of how the nearest key frames are selected, frame descriptors may be used to determine whether the new image matches any of the frames selected as being associated with a nearby persistent pose. The determination may be made by comparing a frame descriptor of the new image with frame descriptors of the closest key frames, or a subset of key frames in the database selected in any other suitable way, and selecting key frames with frame descriptors that are within a predetermined distance of the frame descriptor of the new image. In some embodiments, a distance between two frame descriptors may be computed by obtaining the difference between two strings of numbers that may represent the two frame descriptors. In embodiments in which the strings are processed as strings of multiple quantities, the difference may be computed as a vector difference.

Once a matching image frame is identified, the orientation of the XR device relative to that image frame may be determined. The method 2300 may include performing (Act 2306) feature matching against 3D features in the maps that correspond to the identified nearest key frames, and computing (Act 2308) pose of the device worn by the user based on the feature matching results. In this way, the computationally intensive matching of features points in two images may be performed for as few as one image that has already been determined to be a likely match for the new image.

Figure 24:
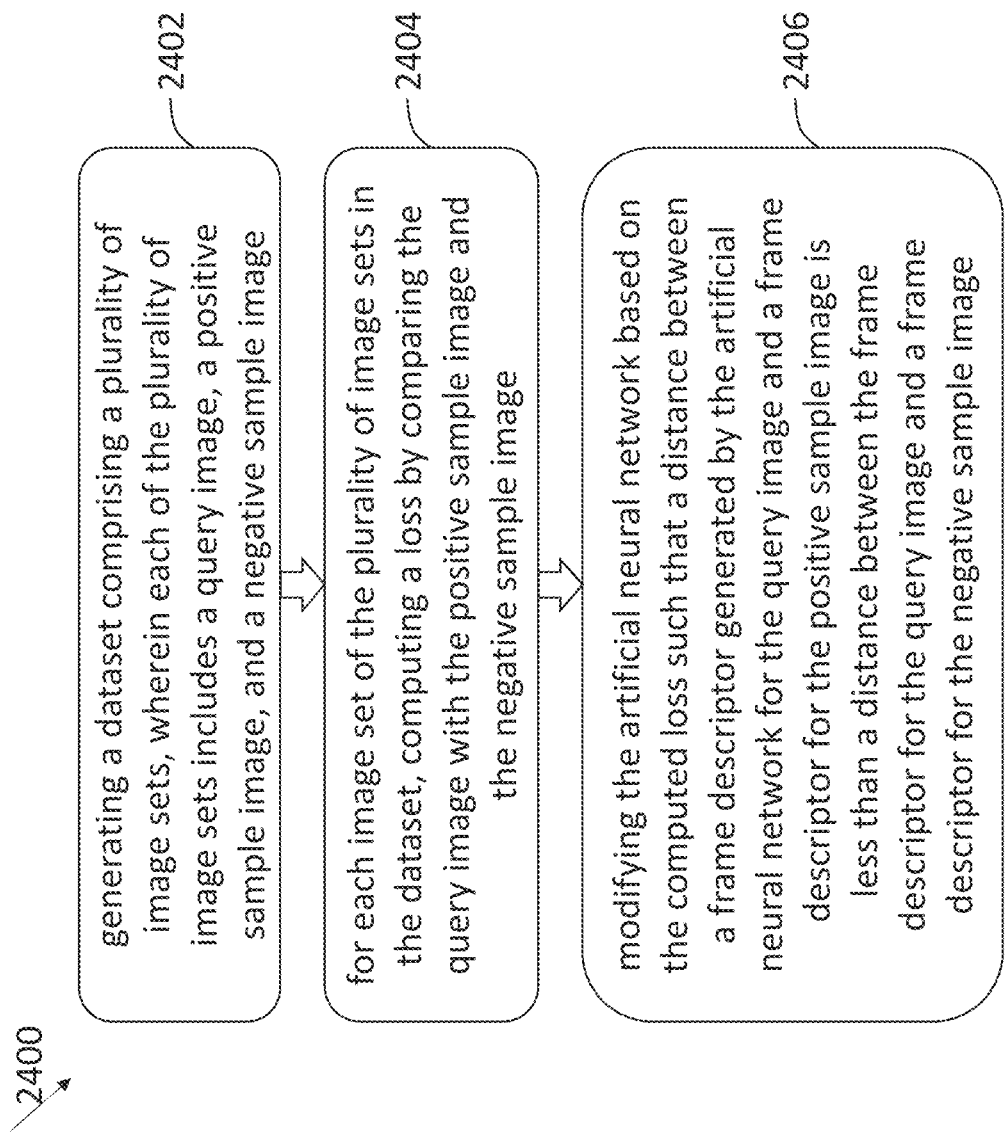
FIG. 24 is a flow chart illustrating a method of training a neural network, according to some embodiments.

FIG. 24 is a flow chart illustrating a method 2400 of training a neural network, according to some embodiments. The method 2400 may start from generating (Act 2402) a dataset comprising a plurality of image sets. Each of the plurality of image sets may include a query image, a positive sample image, and a negative sample image. In some embodiments, the plurality of image sets may include synthetic recording pairs configured to, for example, teach the neural network basic information such as shapes. In some embodiments, the plurality of image sets may include real recording pairs, which may be recorded from a physical world.

In some embodiments, inliers may be computed by fitting a fundamental matrix between two images. In some embodiments, sparse overlap may be computed as the intersection over union (IoU) of interest points seen in both images. In some embodiments, a positive sample may include at least twenty interest points, serving as inliers, that are the same as in the query image. A negative sample may include less than ten inlier points. A negative sample may have less than half of the sparse points overlapping with the sparse points of the query image.

The method 2400 may include computing (Act 2404), for each image set, a loss by comparing the query image with the positive sample image and the negative sample image. The method 2400 may include modifying (Act 2406) the artificial neural network based on the computed loss such that a distance between a frame descriptor generated by the artificial neural network for the query image and a frame descriptor for the positive sample image is less than a distance between the frame descriptor for the query image and a frame descriptor for the negative sample image.

It should be appreciated that although methods and apparatus configured to generate global descriptors for individual images are described above, methods and apparatus may be configured to generate descriptors for individual maps. For example, a map may include a plurality of key frames, each of which may have a frame descriptor as described above. A max pool unit may analyze the frame descriptors of the map's key frames and combines the frame descriptors into a unique map descriptor for the map.

Further, it should be appreciated that other architectures may be used for processing as described above. For example, separate neural networks are described for generating DSF descriptors and frame descriptors. Such an approach is computationally efficient. However, in some embodiments, the frame descriptors may be generated from selected feature points, without first generating DSF descriptors.

Ranking and Merging Maps

Described herein are methods and apparatus for ranking and merging or stitching a plurality of environment maps in an X Reality (XR) system. Map merging or stitching may enable maps representing overlapping portions of the physical world to be combined to represent a larger area. Ranking maps may enable efficiently performing techniques as described herein, including map merging or stitching, that involve selecting a map from a set of maps based on similarity. In some embodiments, for example, a set of canonical maps formatted in a way that they may be accessed by any of a number of XR devices, may be maintained by the system. These canonical maps may be formed by merging or stitching selected tracking maps from those devices with other tracking maps or previously stored canonical maps. The canonical maps may be ranked, for example, for use in selecting one or more canonical maps to merge or stitch with a new tracking map and/or to select one or more canonical maps from the set to use within a device.

To provide realistic XR experiences to users, the XR system must know the user's physical surroundings in order to correctly correlate locations of virtual objects in relation to real objects. Information about a user's physical surroundings may be obtained from an environment map for the user's location.

The inventors have recognized and appreciated that an XR system could provide an enhanced XR experience to multiple users sharing a same world, comprising real and/or virtual content, by enabling efficient sharing of environment maps of the real/physical world collected by multiple users, whether those users are present in the world at the same or different times. However, there are significant challenges in providing such a system. Such a system may store multiple maps generated by multiple users and/or the system may store multiple maps generated at different times. For operations that might be performed with a previously generated map, such as localization, for example as described above, substantial processing may be required to identify a relevant environment map of a same world (e.g., same real-world location) from all the environment maps collected in an XR system. In some embodiments, there may only be a small number of environment maps a device could access, for example for localization. In some embodiments, there may be a large number of environment maps a device could access. The inventors have recognized and appreciated techniques to quickly and accurately rank the relevance of environment maps out of all possible environment maps, such as the universe of all canonical maps 120 in FIG. 28, for example. A high-ranking map may then be selected for further processing, such as to render virtual objects on a user display realistically interacting with the physical world around the user or merging or stitching map data collected by that user with stored maps to create larger or more accurate maps.

In some embodiments, a stored map that is relevant to a task for a user at a location in the physical world may be identified by filtering stored maps based on multiple criteria. Those criteria may indicate comparisons of a tracking map, generated by the wearable device of the user in the location, to candidate environment maps stored in a database. The comparisons may be performed based on metadata associated with the maps, such as a Wi-Fi fingerprint detected by the device generating the map and/or set of BSS ID's to which the device was connected while forming the map. The comparisons may also be performed based on compressed or uncompressed content of the map. Comparisons based on a compressed representation may be performed, for example, by comparison of vectors computed from map content. Comparisons based on un-compressed maps may be performed, for example, by localizing the tracking map within the stored map, or vice versa. Multiple comparisons may be performed in an order based on computation time needed to reduce the number of candidate maps for consideration, with comparisons involving less computation being performed earlier in the order than other comparisons requiring more computation.

Figure 26:
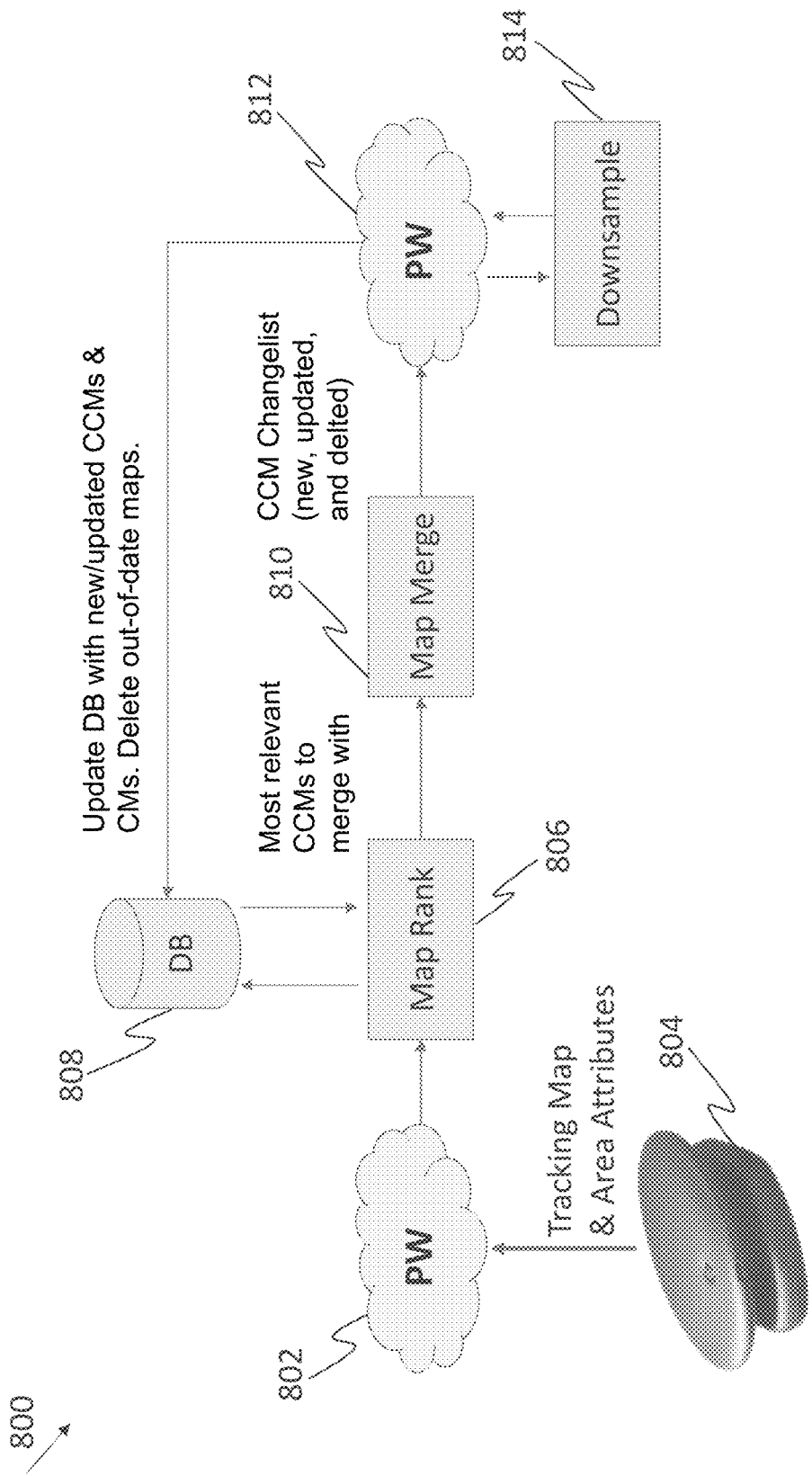
FIG. 26 is a schematic diagram illustrating an AR system configured to rank and merge a plurality of environment maps, according to some embodiments.

FIG. 26 depicts an AR system 800 configured to rank and merge or stitch one or more environment maps, according to some embodiments. The AR system may include a passable world model 802 of an AR device. Information to populate the passable world model 802 may come from sensors on the AR device, which may include computer executable instructions stored in a processor 804 (e.g., a local data processing module 570 in FIG. 4), which may perform some or all of the processing to convert sensor data into a map. Such a map may be a tracking map, as it can be built as sensor data is collected as the AR device operates in a region. Along with that tracking map, area attributes may be supplied so as to indicate the area that the tracking map represents. These area attributes may be a geographic location identifier, such as coordinates presented as latitude and longitude or an ID used by the AR system to represent a location. Alternatively or additionally, the area attributes may be measured characteristics that have a high likelihood of being unique for that area. The area attributes, for example, may be derived from parameters of wireless networks detected in the area. In some embodiments, the area attribute may be associated with a unique address of an access-point the AR system is nearby and/or connected to. For example, the area attribute may be associated with a MAC address or basic service set identifiers (BSSIDs) of a 5G base station/router, a Wi-Fi router, and the like.

In the example of FIG. 26, the tracking maps may be merged or stitched with other maps of the environment. A map rank portion 806 receives tracking maps from the device PW 802 and communicates with a map database 808 to select and rank environment maps from the map database 808. Higher ranked, selected maps are sent to a map merge or stitch portion 810.

The map merge or stitch portion 810 may perform merge or stitch processing on the maps sent from the map rank portion 806. Merge processing may entail merging or stitching the tracking map with some or all of the ranked maps and transmitting the new, merged or stitched maps to a passable world model 812. The map merge or stitch portion may merge or stitch maps by identifying maps that depict overlapping portions of the physical world. Those overlapping portions may be aligned such that information in both maps may be aggregated into a final map. Canonical maps may be merged or stitched with other canonical maps and/or tracking maps.

The aggregation may entail extending one map with information from another map. Alternatively or additionally, aggregation may entail adjusting the representation of the physical world in one map, based on information in another map. A later map, for example, may reveal that objects giving rise to feature points have moved, such that the map may be updated based on later information. Alternatively, two maps may characterize the same region with different feature points and aggregating may entail selecting a set of feature points from the two maps to better represent that region. Regardless of the specific processing that occurs in the merging or stitching process, in some embodiments, PCFs from all maps that are merged or stitched may be retained, such that applications positioning content with respect to them may continue to do so. In some embodiments, merging or stitching of maps may result in redundant persistent poses, and some of the persistent poses may be deleted. When a PCF is associated with a persistent pose that is to be deleted, merging or stitching maps may entail modifying the PCF to be associated with a persistent pose remaining in the map after merging or stitching.

In some embodiments, as maps are extended and or updated, they may be refined. Refinement may entail computation to reduce internal inconsistency between feature points that likely represent the same object in the physical world. Inconsistency may result from inaccuracies in the poses associated with key frames supplying feature points that represent the same objects in the physical world. Such inconsistency may result, for example, from an XR device computing poses relative to a tracking map, which in turn is built based on estimating poses, such that errors in pose estimation accumulate, creating a "drift" in pose accuracy over time. By performing a bundle adjustment or other operation to reduce inconsistencies of the feature points from multiple key frames, the map may be refined.

Upon a refinement, the location of a persistent point relative to the origin of a map may change. Accordingly, the transformation associated with that persistent point, such as a persistent pose or a PCF, may change. In some embodiments, the XR system, in connection with map refinement (whether as part of a merge or stitch operation or performed for other reasons) may re-compute transformations associated with any persistent points that have changed. These transformations might be pushed from a component computing the transformations to a component using the transformation such that any uses of the transformations may be based on the updated location of the persistent points.

Passable world model 812 may be a cloud model, which may be shared by multiple AR devices. Passable world model 812 may store or otherwise have access to the environment maps in map database 808. In some embodiments, when a previously computed environment map is updated, the prior version of that map may be deleted so as to remove out of date maps from the database. In some embodiments, when a previously computed environment map is updated, the prior version of that map may be archived enabling retrieving/viewing prior versions of an environment. In some embodiments, permissions may be set such that only AR systems having certain read/write access may trigger prior versions of maps being deleted/archived.

These environment maps created from tracking maps supplied by one or more AR devices/systems may be accessed by AR devices in the AR system. The map rank portion 806 also may be used in supplying environment maps to an AR device. The AR device may send a message requesting an environment map for its current location, and map rank portion 806 may be used to select and rank environment maps relevant to the requesting device.

In some embodiments, the AR system 800 may include a downsample portion 814 configured to receive the merged or stitched maps from the cloud PW 812. The received merged or stitched maps from the cloud PW 812 may be in a storage format for the cloud, which may include high resolution information, such as a large number of PCFs per square meter or multiple image frames or a large set of feature points associated with a PCF. The downsample portion 814 may be configured to downsample the cloud format maps to a format suitable for storage on AR devices. The device format maps may have less data, such as fewer PCFs or less data stored for each PCF to accommodate the limited local computing power and storage space of AR devices.

Figure 27:
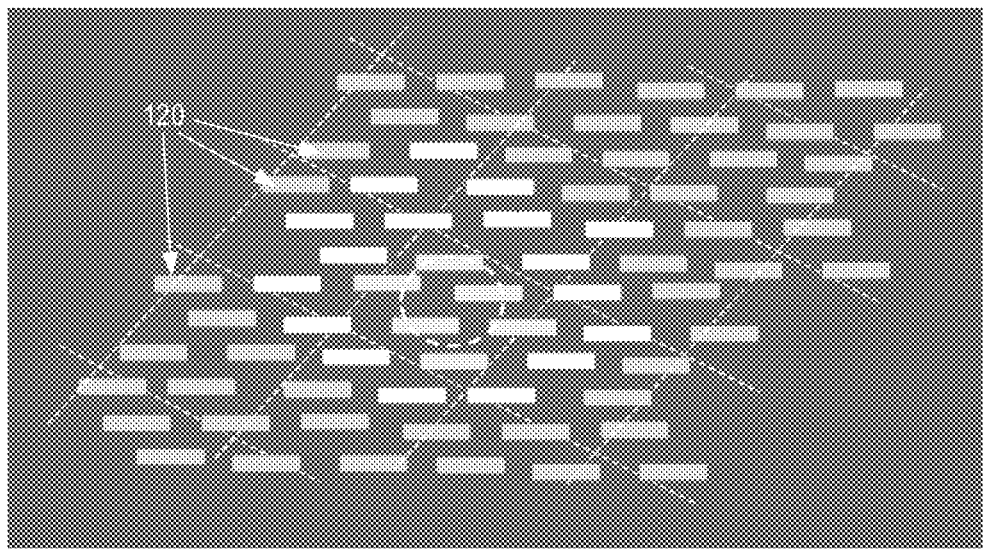
FIG. 27 is a simplified block diagram illustrating a plurality of canonical maps stored on a remote storage medium, according to some embodiments.

FIG. 27 is a simplified block diagram illustrating a plurality of canonical maps 120 that may be stored in a remote storage medium, for example, a cloud. Each canonical map 120 may include a plurality of canonical map identifiers indicating the canonical map's location within a physical space, such as somewhere on the planet earth. These canonical map identifiers may include one or more of the following identifiers: area identifiers represented by a range of longitudes and latitudes, frame descriptors (e.g., global feature string 316 in FIG. 21), Wi-Fi fingerprints, feature descriptors (e.g., feature descriptors 310 in FIG. 21), and device identities indicating one or more devices that contributed to the map.

In the illustrated example, the canonical maps 120 are disposed geographically in a two-dimensional pattern as they may exist on a surface of the earth. The canonical maps 120 may be uniquely identifiable by corresponding longitudes and latitudes because any canonical maps that have overlapping longitudes and latitudes may be merged or stitched into a new canonical map.

Figure 28:
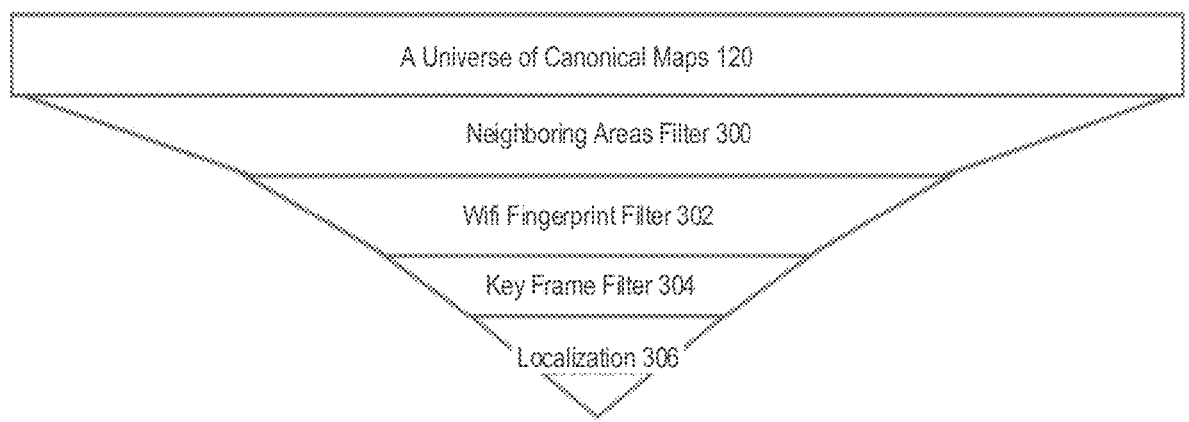
FIG. 28 is a schematic diagram illustrating a method of selecting canonical maps to, for example, localize a new tracking map in one or more canonical maps and/or obtain PCFs from the canonical maps, according to some embodiments.

FIG. 28 is a schematic diagram illustrating a method of selecting canonical maps, which may be used for localizing a new tracking map to one or more canonical maps, according to some embodiment. The method may start from accessing (Act 120) a universe of canonical maps 120, which may be stored, as an example, in a database in a passable world (e.g., the passable world module 538). The universe of canonical maps may include canonical maps from all previously visited locations. An XR system may filter the universe of all canonical maps to a small subset or just a single map. It should be appreciated that, in some embodiments, it may not be possible to send all the canonical maps to a viewing device due to bandwidth restrictions. Selecting a subset selected as being likely candidates for matching the tracking map to send to the device may reduce bandwidth and latency associated with accessing a remote database of maps.

The method may include filtering (Act 300) the universe of canonical maps based on areas with predetermined size and shapes. In the illustrated example in FIG. 27, each square may represent an area. Each square may cover 50 m×50 m. Each square may have six neighboring areas. In some embodiments, Act 300 may select at least one matching canonical map 120 covering longitude and latitude that include that longitude and latitude of the position identifier received from an XR device, as long as at least one map exists at that longitude and latitude. In some embodiments, the Act 300 may select at least one neighboring canonical map covering longitude and latitude that are adjacent the matching canonical map. In some embodiments, the Act 300 may select a plurality of matching canonical maps and a plurality of neighboring canonical maps. The Act 300 may, for example, reduce the number of canonical maps approximately ten times, for example, from thousands to hundreds to form a first filtered selection. Alternatively or additionally, criteria other than latitude and longitude may be used to identify neighboring maps. An XR device, for example, may have previously localized with a canonical map in the set as part of the same session. A cloud service may retain information about the XR device, including maps previously localized to. In this example, the maps selected at Act 300 may include those that cover an area adjacent to the map to which the XR device localized to.

The method may include filtering (Act 302) the first filtered selection of canonical maps based on Wi-Fi fingerprints. The Act 302 may determine a latitude and longitude based on a Wi-Fi fingerprint received as part of the position identifier from an XR device. The Act 302 may compare the latitude and longitude from the Wi-Fi fingerprint with latitude and longitude of the canonical maps 120 to determine one or more canonical maps that form a second filtered selection. The Act 302 may reduce the number of canonical maps approximately ten times, for example, from hundreds to tens of canonical maps (e.g., 50) that form a second selection. For example, a first filtered selection may include 130 canonical maps and the second filtered selection may include 50 of the 130 canonical maps and may not include the other 80 of the 130 canonical maps.

The method may include filtering (Act 304) the second filtered selection of canonical maps based on key frames.

The Act 304 may compare data representing an image captured by an XR device with data representing the canonical maps 120. In some embodiments, the data representing the image and/or maps may include feature descriptors (e.g., DSF descriptors in FIG. 25) and/or global feature strings (e.g., 316 in FIG. 21). The Act 304 may provide a third filtered selection of canonical maps. In some embodiments, the output of Act 304 may only be five of the 50 canonical maps identified following the second filtered selection, for example. The map transmitter 122 then transmits the one or more canonical maps based on the third filtered selection to the viewing device. The Act 304 may reduce the number of canonical maps for approximately ten times, for example, from tens to single digits of canonical maps (e.g., 5) that form a third selection. In some embodiments, an XR device may receive canonical maps in the third filtered selection, and attempt to localize into the received canonical maps.

For example, the Act 304 may filter the canonical maps 120 based on the global feature strings 316 of the canonical maps 120 and the global feature string 316 that is based on an image that is captured by the viewing device (e.g., an image that may be part of the local tracking map for a user). Each one of the canonical maps 120 in FIG. 27 thus has one or more global feature strings 316 associated therewith. In some embodiments, the global feature strings 316 may be acquired when an XR device submits images or feature details to the cloud and the cloud processes the image or feature details to generate global feature strings 316 for the canonical maps 120.

In some embodiments, the cloud may receive feature details of a live/new/current image captured by a viewing device, and the cloud may generate a global feature string 316 for the live image. The cloud may then filter the canonical maps 120 based on the live global feature string 316. In some embodiments, the global feature string may be generated on the local viewing device. In some embodiments, the global feature string may be generated remotely, for example on the cloud. In some embodiments, a cloud may transmit the filtered canonical maps to an XR device together with the global feature strings 316 associated with the filtered canonical maps. In some embodiments, when the viewing device localizes its tracking map to the canonical map, it may do so by matching the global feature strings 316 of the local tracking map with the global feature strings of the canonical map.

It should be appreciated that an operation of an XR device may not perform all of the Acts (300, 302, 304). For example, if a universe of canonical map is relatively small (e.g., 500 maps), an XR device attempting to localize may filter the universe of canonical maps based on Wi-Fi fingerprints (e.g., Act 302) and Key Frame (e.g., Act 304), but omit filtering based on areas (e.g., Act 300). Moreover, it is not necessary that maps in their entireties be compared. In some embodiments, for example, a comparison of two maps may result in identifying common persistent points, such as persistent poses or PCFs that appear in both the new map the selected map from the universe of maps. In that case, descriptors may be associated with persistent points, and those descriptors may be compared.

Figure 29:
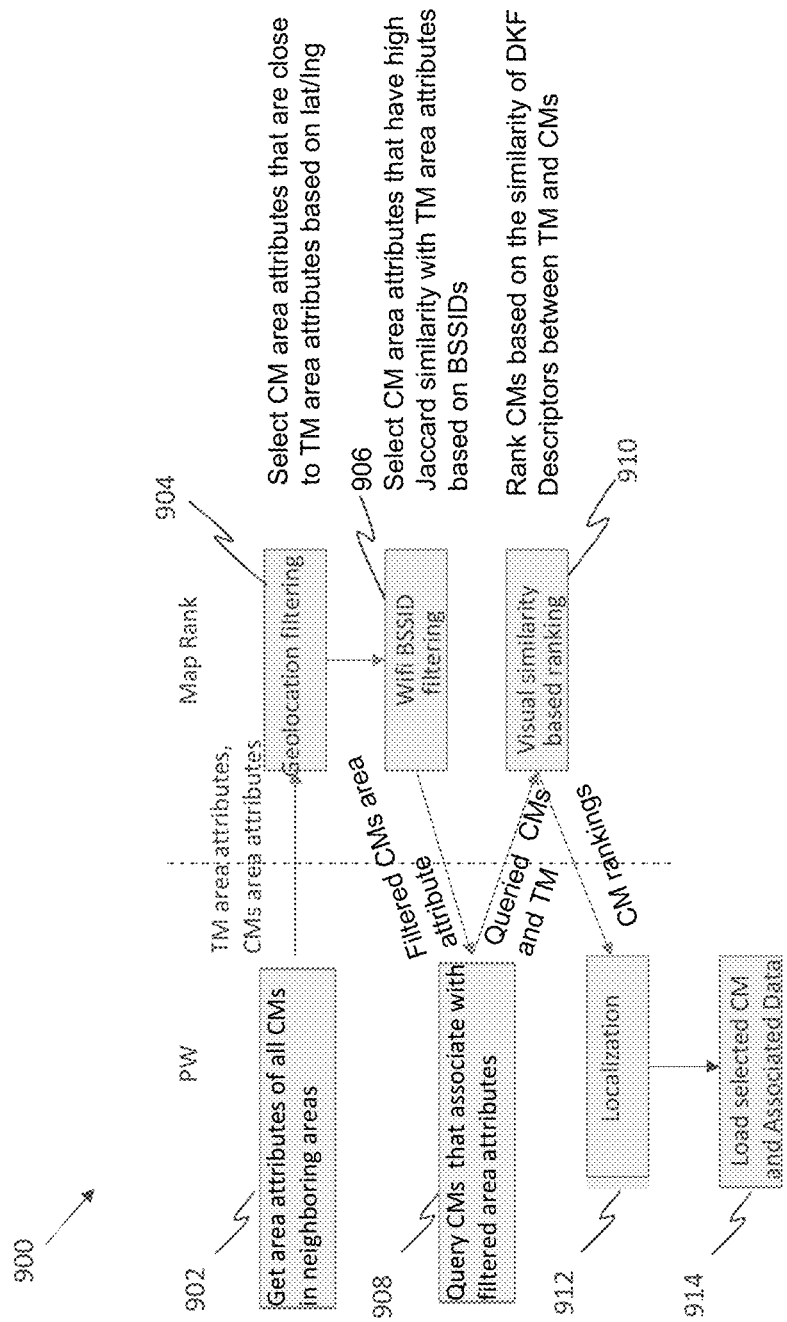
FIG. 29 is flow chart illustrating a method of selecting a plurality of ranked environment maps, according to some embodiments.

FIG. 29 is flow chart illustrating a method 900 of selecting one or more ranked environment maps, according to some embodiments. In the illustrated embodiment, the ranking is performed for a user's AR device that is creating a tracking map. Accordingly, the tracking map is available for use in ranking environment maps. In embodiments in which the tracking map is not available, some or all of portions of the selection and ranking of environment maps that do not expressly rely on the tracking map may be used.

The method 900 may start at Act 902, where a set of maps from a database of environment maps (which may be formatted as canonical maps) that are in the neighborhood of the location where the tracking map was formed may be accessed and then filtered for ranking. Additionally, at Act 902, at least one area attribute for the area in which the user's AR device is operating is determined. In scenarios in which the user's AR device is constructing a tracking map, the area attributes may correspond to the area over which the tracking map was created. As a specific example, the area attributes may be computed based on received signals from access points to computer networks while the AR device was computing the tracking map.

Figure 30:
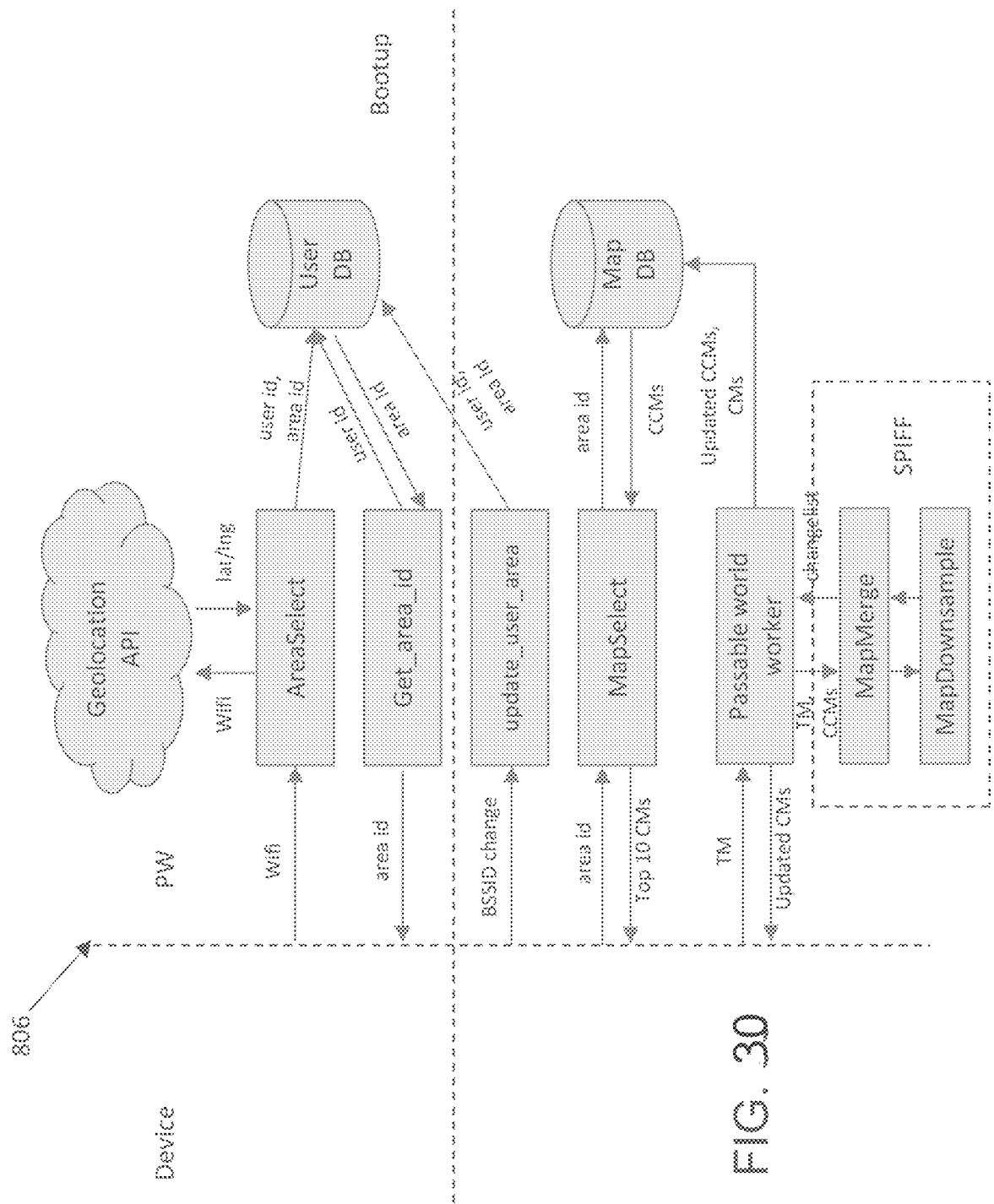
FIG. 30 is a schematic diagram illustrating an exemplary map rank portion of the AR system of FIG. 26, according to some embodiments.

FIG. 30 depicts an exemplary map rank portion 806 of the AR system 800, according to some embodiments. The map rank portion 806 may be executing in a cloud computing environment, as it may include portions executing on AR devices and portions executing on a remote computing system such as a cloud. The map rank portion 806 may be configured to perform at least a portion of the method 900.

Figures 31A, 31B:
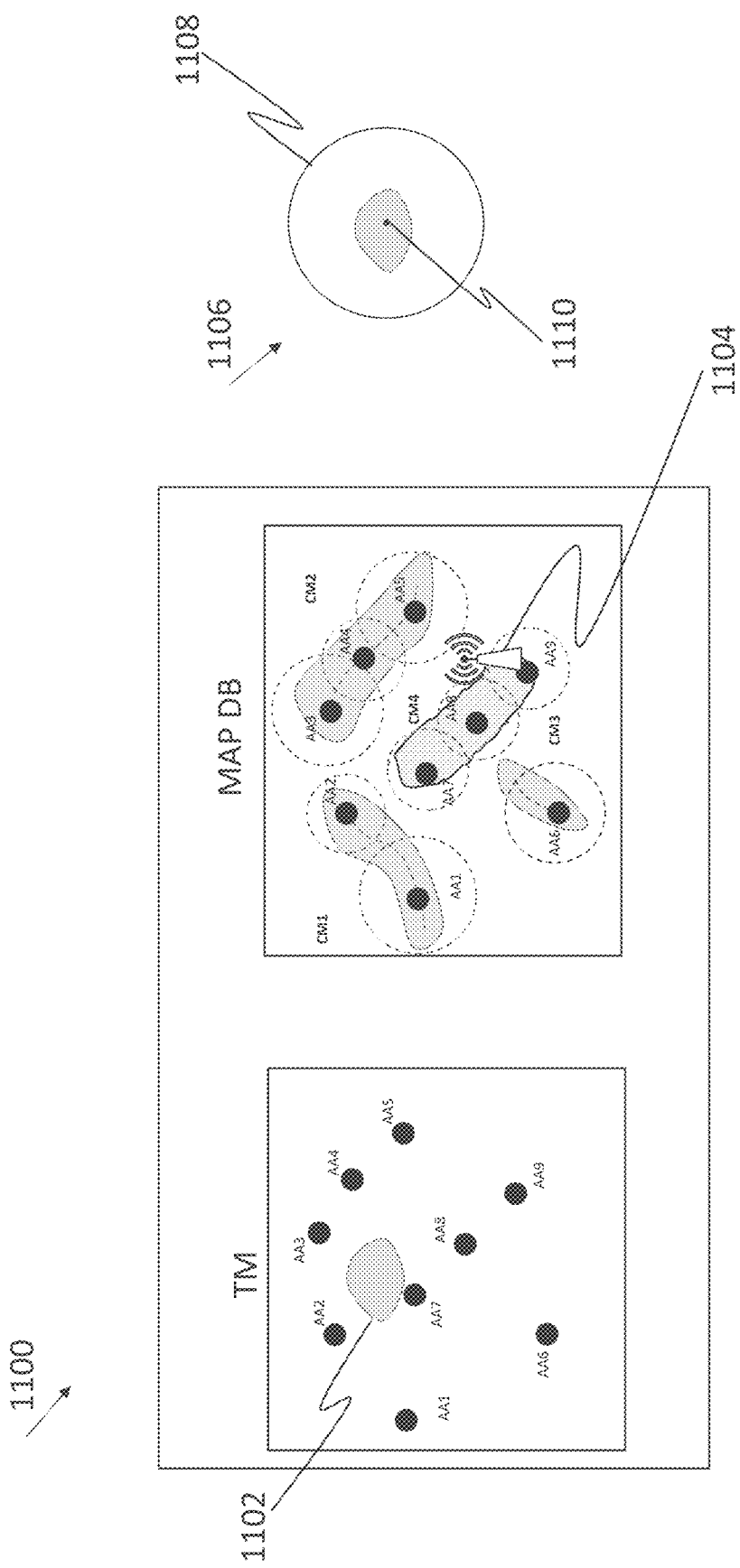
FIG. 31A is a schematic diagram illustrating an example of area attributes of a tracking map (TM) and environment maps in a database, according to some embodiments.
FIG. 31B is a schematic diagram illustrating an example of determining a geographic location of a tracking map (TM) for geolocation filtering of FIG. 29, according to some embodiments.

FIG. 31A depicts an example of area attributes AA1-AA8 of a tracking map (TM) 1102 and environment maps CM1-CM4 in a database, according to some embodiments. As illustrated, an environment map may be associated to multiple area attributes. The area attributes AA1-AA8 may include parameters of wireless networks detected by the AR device computing the tracking map 1102, for example, basic service set identifiers (BSSIDs) of networks to which the AR device are connected and/or the strength of the received signals of the access points to the wireless networks through, for example, a network tower 1104. The parameters of the wireless networks may comply with protocols including Wi-Fi and 5G NR. In the example illustrated in FIG. 32, the area attributes are a fingerprint of the area in which the user AR device collected sensor data to form the tracking map.

FIG. 31B depicts an example of the determined geographic location 1106 of the tracking map 1102, according to some embodiments. In the illustrated example, the determined geographic location 1106 includes a centroid point 1110 and an area 1108 circling around the centroid point. It should be appreciated that the determination of a geographic location of the present application is not limited to the illustrated format. A determined geographic location may have any suitable formats including, for example, different area shapes. In this example, the geographic location is determined from area attributes using a database relating area attributes to geographic locations. Databases are commercially available, for example, databases that relate Wi-Fi fingerprints to locations expressed as latitude and longitude and may be used for this operation.

In the embodiment of FIG. 29, a map database, containing environment maps may also include location data for those maps, including latitude and longitude covered by the maps. Processing at Act 902 may entail selecting from that database a set of environment maps that covers the same latitude and longitude determined for the area attributes of the tracking map.

Act 904 is a first filtering of the set of environment maps accessed in Act 902. In Act 902, environment maps are retained in the set based on proximity to the geolocation of the tracking map. This filtering step may be performed by comparing the latitude and longitude associated with the tracking map and the environment maps in the set.

Figure 32:
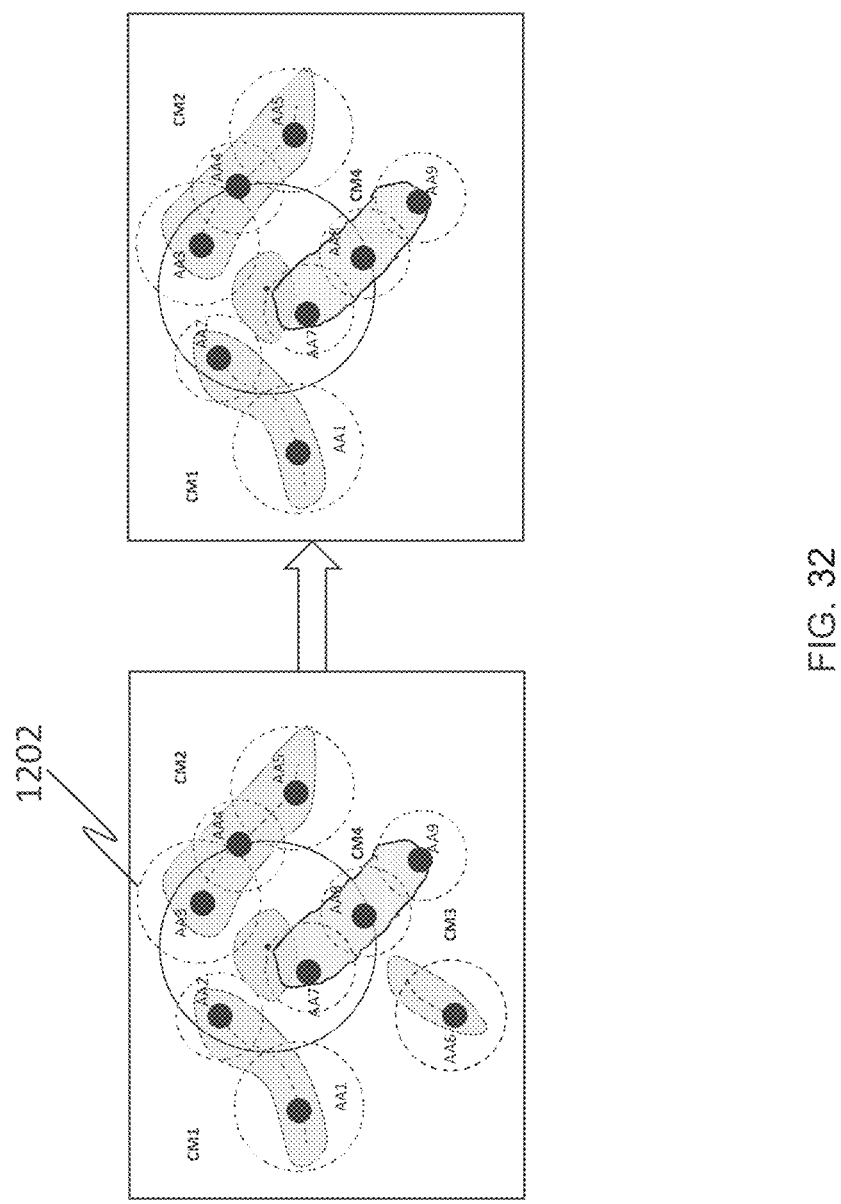
FIG. 32 is a schematic diagram illustrating an example of geolocation filtering of FIG. 29, according to some embodiments.

FIG. 32 depicts an example of Act 904, according to some embodiments. Each area attribute may have a corresponding geographic location 1202. The set of environment maps may include the environment maps with at least one area attribute that has a geographic location overlapping with the determined geographic location of the tracking map. In the illustrated example, the set of identified environment maps includes environment maps CM1, CM2, and CM4, each of which has at least one area attribute that has a geographic location overlapping with the determined geographic location of the tracking map 1102. The environment map CM3 associated with the area attribute AA6 is not included in the set because it is outside the determined geographic location of the tracking map.

Other filtering steps may also be performed on the set of environment maps to reduce/rank the number of environment maps in the set that is ultimately processed (such as for map merge or stitch or to provide passable world information to a user device). The method 900 may include filtering (Act 906) the set of environment maps based on similarity of one or more identifiers of network access points associated with the tracking map and the environment maps of the set of environment maps. During the formation of a map, a device collecting sensor data to generate the map may be connected to a network through a network access point, such as through Wi-Fi or similar wireless communication protocol. The access points may be identified by BSSID. The user device may connect to multiple different access points as it moves through an area collecting data to form a map. Likewise, when multiple devices supply information to form a map, the devices may have connected through different access points, so there may be multiple access points used in forming the map for that reason too. Accordingly, there may be multiple access points associated with a map, and the set of access points may be an indication of location of the map. Strength of signals from an access point, which may be reflected as an RSSI value, may provide further geographic information. In some embodiments, a list of BSSID and RSSI values may form the area attribute for a map.

Figure 33:
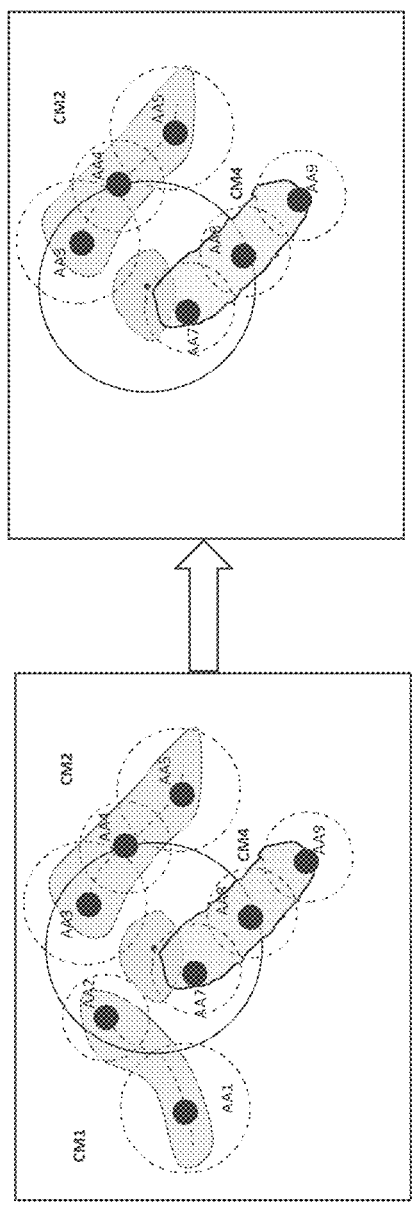
FIG. 33 is a schematic diagram illustrating an example of Wi-Fi BSSID filtering of FIG. 29, according to some embodiments.

In some embodiments, filtering the set of environment maps based on similarity of the one or more identifiers of the network access points may include retaining in the set of environment maps environment maps with the highest Jaccard similarity to the at least one area attribute of the tracking map based on the one or more identifiers of network access points. FIG. 33 depicts an example of Act 906, according to some embodiments. In the illustrated example, a network identifier associated with the area attribute AA7 may be determined as the identifier for the tracking map 1102. The set of environment maps after Act 906 includes environment map CM2, which may have area attributes within higher Jaccard similarity to AA7, and environment map CM4, which also include the area attributes AA7. The environment map CM1 is not included in the set because it has the lowest Jaccard similarity to AA7.

Processing at Acts 902-906 may be performed based on metadata associated with maps and without actually accessing the content of the maps stored in a map database. Other processing may involve accessing the content of the maps. Act 908 indicates accessing the environment maps remaining in the subset after filtering based on metadata. It should be appreciated that this act may be performed either earlier or later in the process, if subsequent operations can be performed with accessed content.

The method 900 may include filtering (Act 910) the set of environment maps based on similarity of metrics representing content of the tracking map and the environment maps of the set of environment maps. The metrics representing content of the tracking map and the environment maps may include vectors of values computed from the contents of the maps. For example, the Deep Key Frame descriptor, as described above, computed for one or more key frames used in forming a map may provide a metric for comparison of maps, or portions of maps. The metrics may be computed from the maps retrieved at Act 908 or may be pre-computed and stored as metadata associated with those maps. In some embodiments, filtering the set of environment maps based on similarity of metrics representing content of the tracking map and the environment maps of the set of environment maps, may include retaining in the set of environment maps environment maps with the smallest vector distance between a vector of characteristics of the tracking map and vectors representing environment maps in the set of environment maps.

The method 900 may include further filtering (Act 912) the set of environment maps based on degree of match between a portion of the tracking map and portions of the environment maps of the set of environment maps. The degree of match may be determined as a part of a localization process. As a non-limiting example, localization may be performed by identifying critical points in the tracking map and the environment map that are sufficiently similar as they could represent the same portion of the physical world. In some embodiments, the critical points may be features, feature descriptors, key frames/key rigs, persistent poses, and/or PCFs. The set of critical points in the tracking map might then be aligned to produce a best fit with the set of critical points in the environment map. A mean square distance between the corresponding critical points might be computed and, if below a threshold for a particular region of the tracking map, used as an indication that the tracking map and the environment map represent the same region of the physical world.

Figure 34:
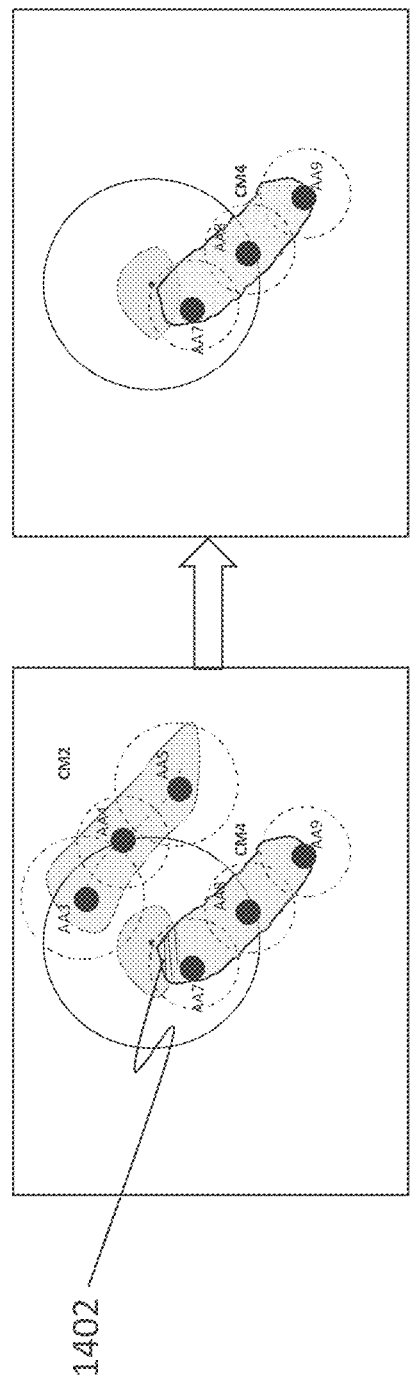
FIG. 34 is a schematic diagram illustrating an example of use of localization of FIG. 29, according to some embodiments.

In some embodiments, filtering the set of environment maps based on degree of match between a portion of the tracking map and portions of the environment maps of the set of environment maps may include computing a volume of a physical world represented by the tracking map that is also represented in an environment map of the set of environment maps, and retaining in the set of environment maps environment maps with a larger computed volume than environment maps filtered out of the set. FIG. 34 depicts an example of Act 912, according to some embodiments. In the illustrated example, the set of environment maps after Act 912 includes environment map CM4, which has an area 1402 matched with an area of the tracking map 1102. The environment map CM1 is not included in the set because it has no area matched with an area of the tracking map 1102.

In some embodiments, the set of environment maps may be filtered in the order of Act 906, Act 910, and Act 912. In some embodiments, the set of environment maps may be filtered based on Act 906, Act 910, and Act 912, which may be performed in an order based on processing required to perform the filtering, from lowest to highest. The method 900 may include loading (Act 914) the set of environment maps and data.

In the illustrated example, a user database stores area identities indicating areas that AR devices were used in. The area identities may be area attributes, which may include parameters of wireless networks detected by the AR devices when in use. A map database may store multiple environment maps constructed from data supplied by the AR devices and associated metadata. The associated metadata may include area identities derived from the area identities of the AR devices that supplied data from which the environment maps were constructed. An AR device may send a message to a PW module indicating a new tracking map is created or being created. The PW module may compute area identifiers for the AR device and updates the user database based on the received parameters and/or the computed area identifiers. The PW module may also determine area identifiers associated with the AR device requesting the environment maps, identify sets of environment maps from the map database based on the area identifiers, filter the sets of environment maps, and transmit the filtered sets of environment maps to the AR devices. In some embodiments, the PW module may filter the sets of environment maps based on one or more criteria including, for example, a geographic location of the tracking map, similarity of one or more identifiers of network access points associated with the tracking map and the environment maps of the set of environment maps, similarity of metrics representing contents of the tracking map and the environment maps of the set of environment maps, and degree of match between a portion of the tracking map and portions of the environment maps of the set of environment maps.

Figure 35:
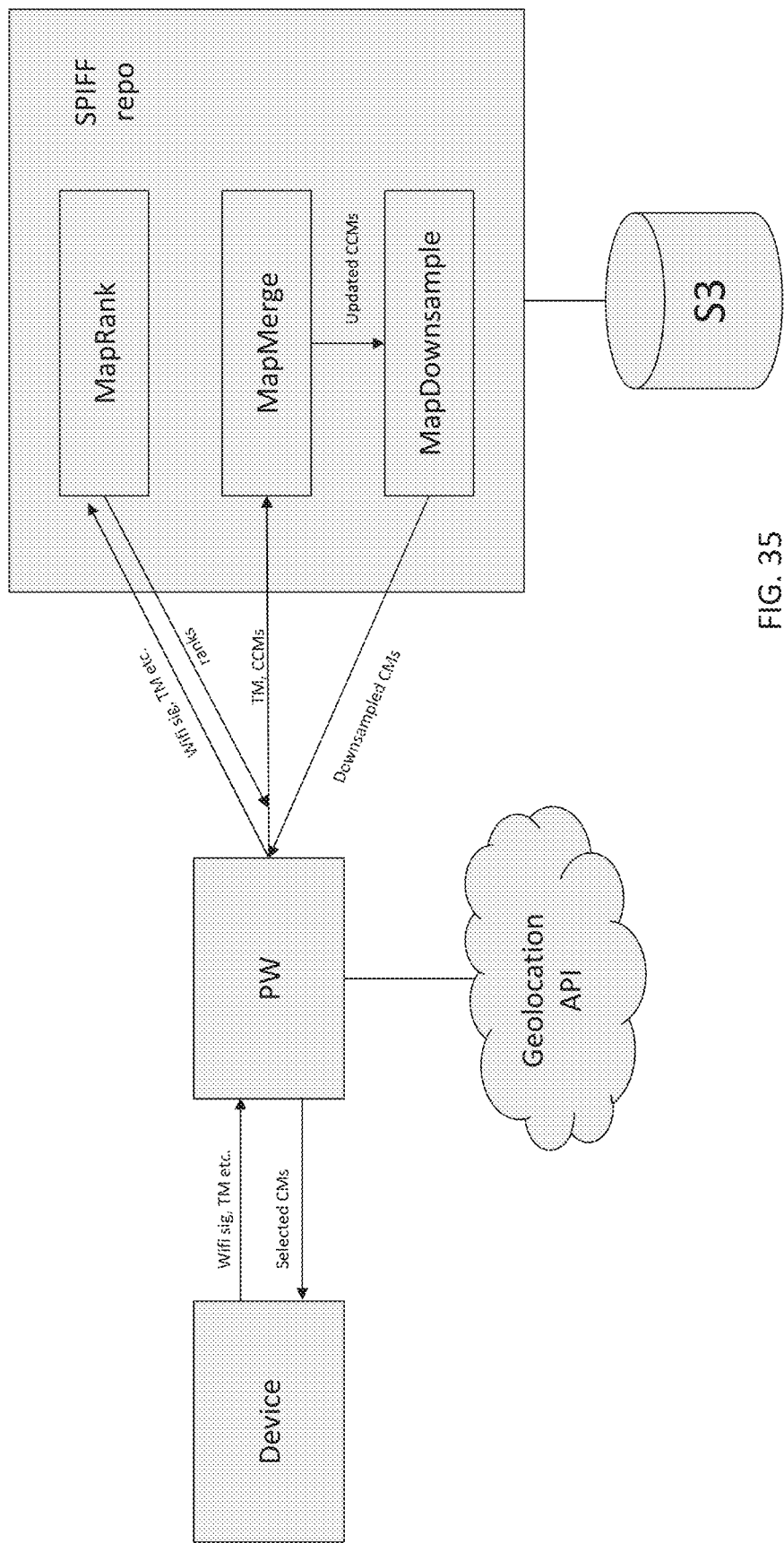
FIGS. 35 and 36 are block diagrams of an XR system configured to rank and merge a plurality of environment maps, according to some embodiments.
Figure 36:
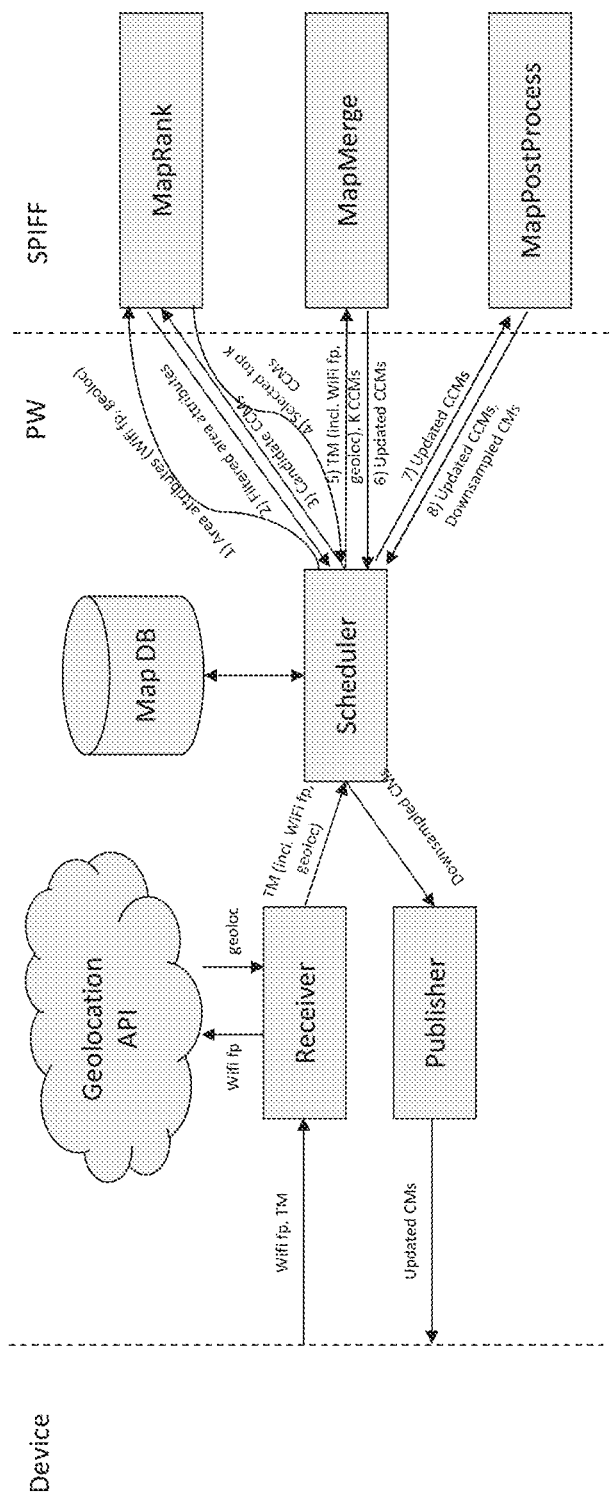

FIGS. 35 and 36 are schematic diagrams illustrating an XR system configured to rank and merge or stitch a plurality of environment maps, according to some embodiments. In some embodiments, a passable world (PW) may determine when to trigger ranking and/or merging or stitching the maps. In some embodiments, determining a map to be used may be based at least partly on deep key frames described above in relation to FIGS. 21-25, according to some embodiments.

Figure 37:
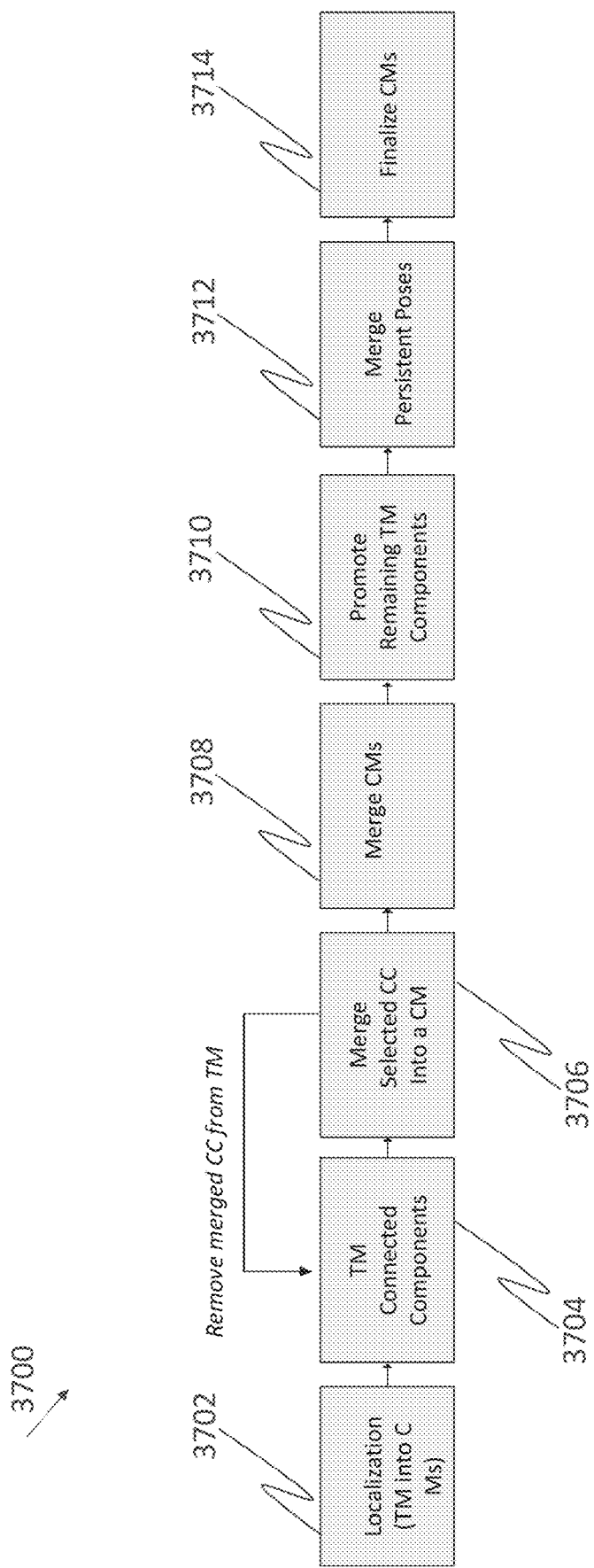
FIG. 37 is a block diagram illustrating a method of creating environment maps of a physical world, in a canonical form, according to some embodiments.

FIG. 37 is a block diagram illustrating a method 3700 of creating environment maps of a physical world, according to some embodiments. The method 3700 may start from localizing (Act 3702) a tracking map captured by an XR device worn by a user to a group of canonical maps (e.g., canonical maps selected by the method of FIG. 28 and/or the method 900 of FIG. 29). The Act 3702 may include localizing keyrigs of the tracking map into the group of canonical maps. The localization result of each keyrig may include the keyrig's localized pose and a set of 2D-to-3D feature correspondences.

In some embodiments, the method 3700 may include splitting (Act 3704) a tracking map into connected components, which may enable merging or stitching maps robustly by merging or stitching connected pieces. Each connected component may include keyrigs that are within a predetermined distance. The method 3700 may include merging or stitching (Act 3706) the connected components that are larger than a predetermined threshold into one or more canonical maps, and removing the merged or stitched connected components from the tracking map.

In some embodiments, the method 3700 may include merging or stitching (Act 3708) canonical maps of the group that are merged or stitched with the same connected components of the tracking map. In some embodiments, the method 3700 may include promoting (Act 3710) the remaining connected components of the tracking map that has not been merged or stitched with any canonical maps to be a canonical map. In some embodiments, the method 3700 may include merging or stitching (Act 3712) persistent poses and/or PCFs of the tracking maps and the canonical maps that are merged or stitched with at least one connected component of the tracking map. In some embodiments, the method 3700 may include finalizing (Act 3714) the canonical maps by, for example, fusing map points and pruning redundant keyrigs.

Figure 38A:
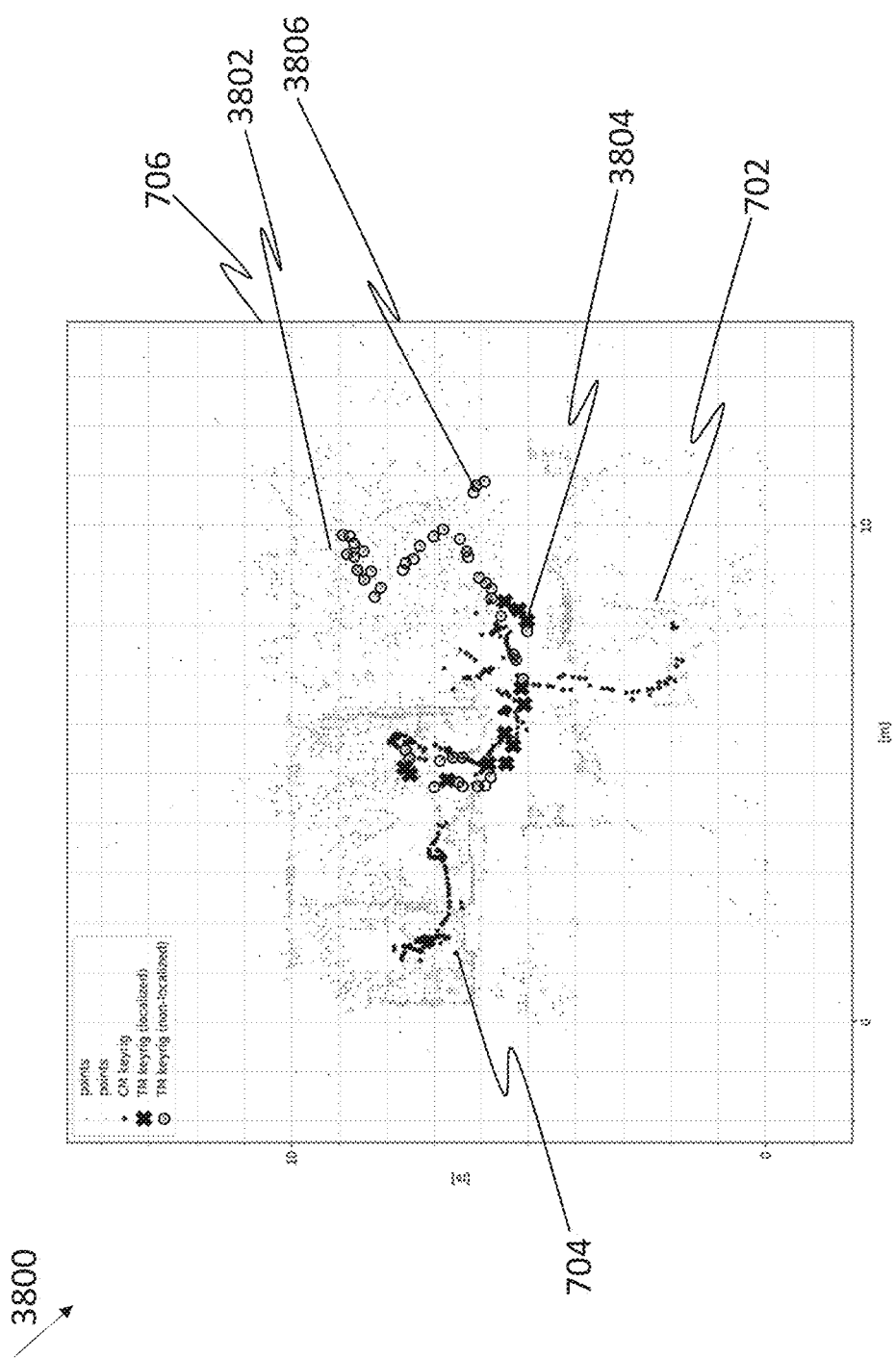
FIGS. 38A and 38B are schematic diagrams illustrating an environment map created in a canonical form by updating the tracking map of FIG. 7 with a new tracking map, according to some embodiments.
Figure 38B:
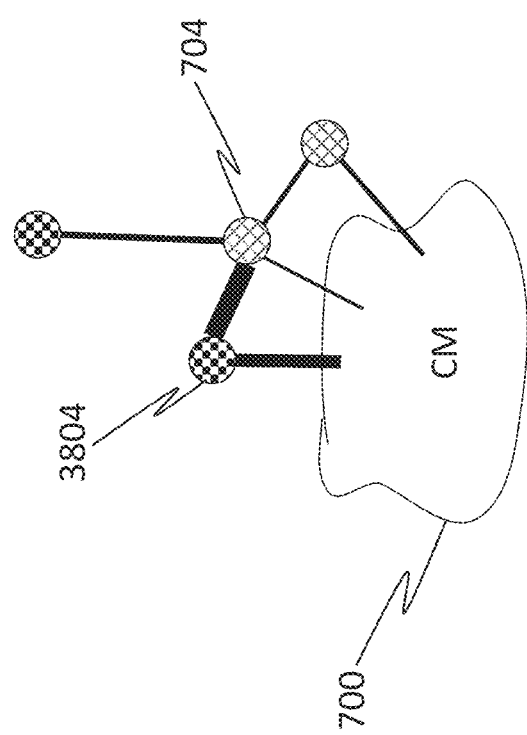

FIGS. 38A and 38B illustrate an environment map 3800 created by updating a canonical map 700, which may be promoted from the tracking map 700 (FIG. 7) with a new tracking map, according to some embodiments. As illustrated and described with respect to FIG. 7, the canonical map 700 may provide a floor plan 706 of reconstructed physical objects in a corresponding physical world, represented by points 702. In some embodiments, a map point 702 may represent a feature of a physical object that may include multiple features. A new tracking map may be captured about the physical world and uploaded to a cloud to merge or stitch with the map 700. The new tracking map may include map points 3802, and keyrigs 3804, 3806. In the illustrated example, keyrigs 3804 represent keyrigs that are successfully localized to the canonical map by, for example, establishing a correspondence with a keyrig 704 of the map 700 (as illustrated in FIG. 38B). On the other hand, keyrigs 3806 represent keyrigs that have not been localized to the map 700. Keyrigs 3806 may be promoted to a separate canonical map in some embodiments.

Figure 39A:
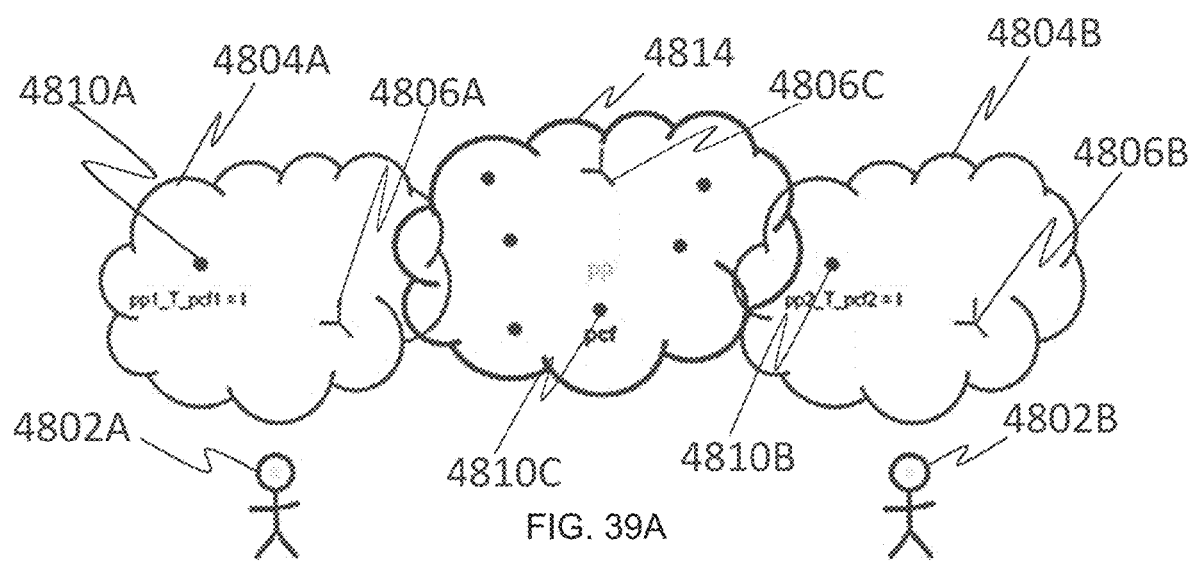
FIGS. 39A to 39F are schematic diagrams illustrating an example of merging maps, according to some embodiments.

FIGS. 39A to 39F are schematic diagrams illustrating an example of a cloud-based persistent coordinate system providing a shared experience for users in the same physical space. FIG. 39A shows that a canonical map 4814, for example, from a cloud, is received by the XR devices worn by the users 4802A and 4802B of FIGS. 20A-20C. The canonical map 4814 may have a canonical coordinate frame 4806C. The canonical map 4814 may have a PCF 4810C with a plurality of associated PPs (e.g., 4818A, 4818B in FIG. 39C).

Figure 39B:
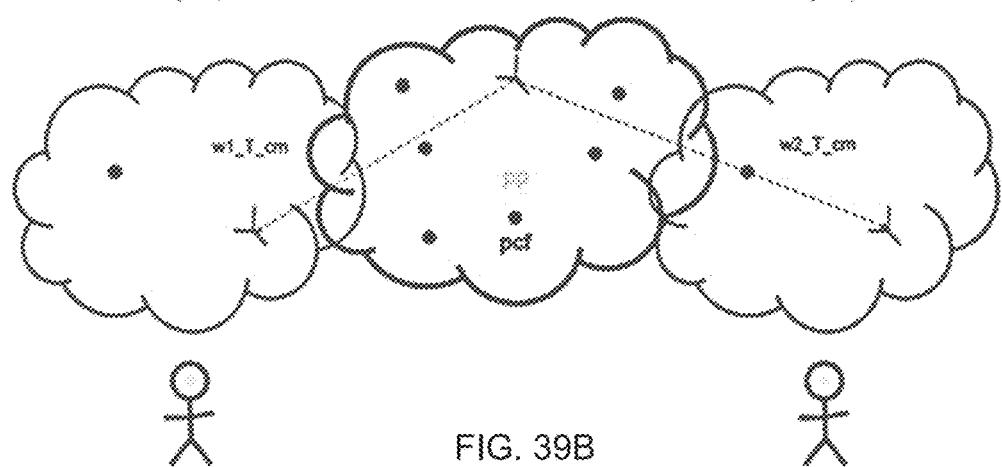

FIG. 39B shows that the XR devices established relationships between their respective world coordinate system 4806A, 4806B with the canonical coordinate frame 4806C. This may be done, for example, by localizing to the canonical map 4814 on the respective devices. Localizing the tracking map to the canonical map may result, for each device, a transformation between its local world coordinate system and the coordinate system of the canonical map.

Figure 39C:
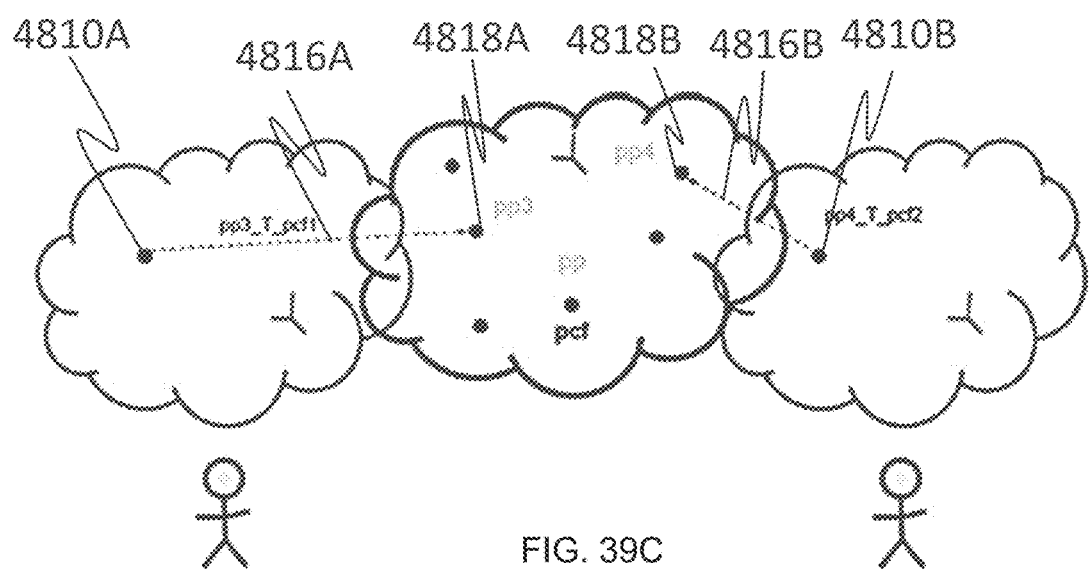

FIG. 39C shows that, as a result of localization, a transformation can be computed (e.g., transformation 4816A, 4816B) between a local PCF (e.g., PCFs 4810A, 4810B) on the respective device to a respective persistent pose (e.g., PPs 4818A, 4818B) on the canonical map. With these transformations, each device may use its local PCFs, which can be detected locally on the device by processing images detected with sensors on the device, to determine where with respect to the local device to display virtual content attached to the PPs 4818A, 4818B or other persistent points of the canonical map. Such an approach may accurately position virtual content with respect to each user and may enable each user to have the same experience of the virtual content in the physical space.

Figure 39D:
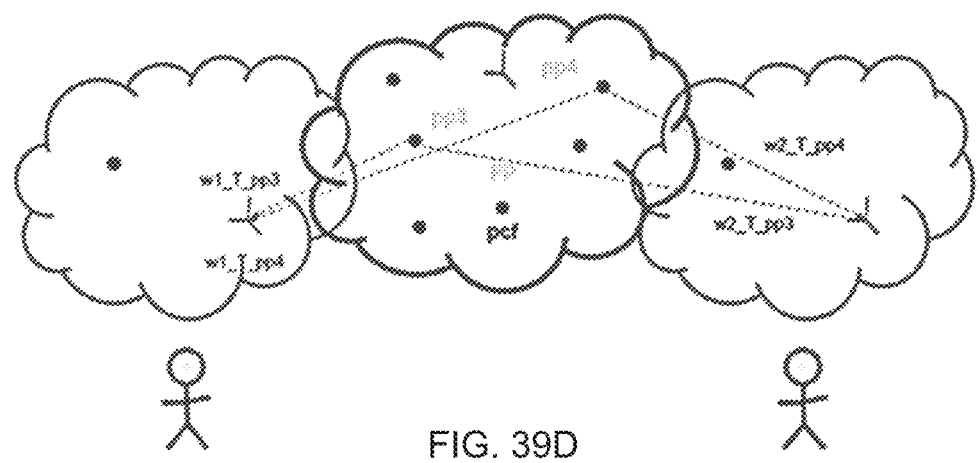
Figure 39E:
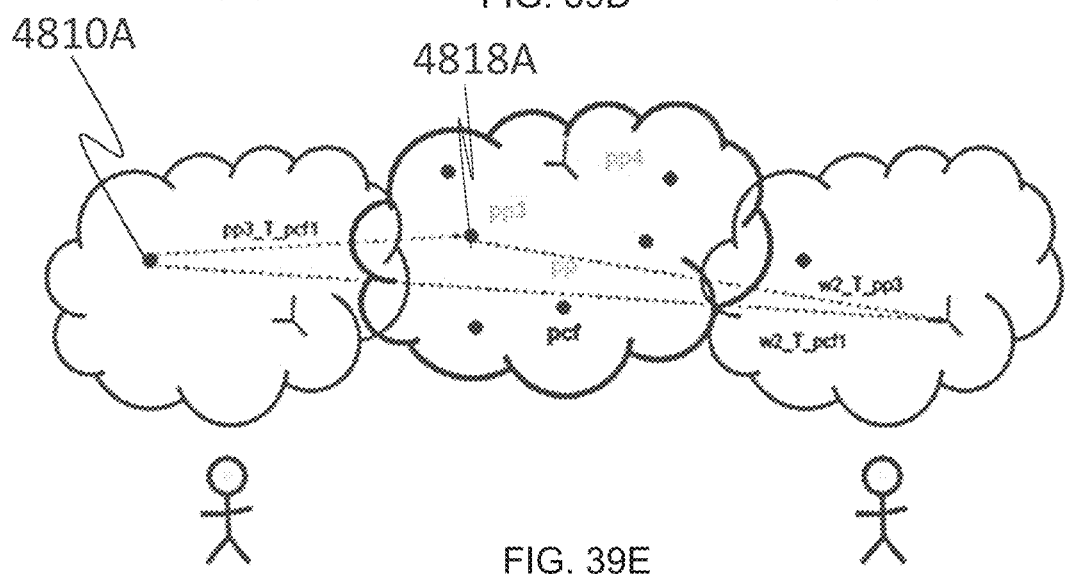
Figure 39F:
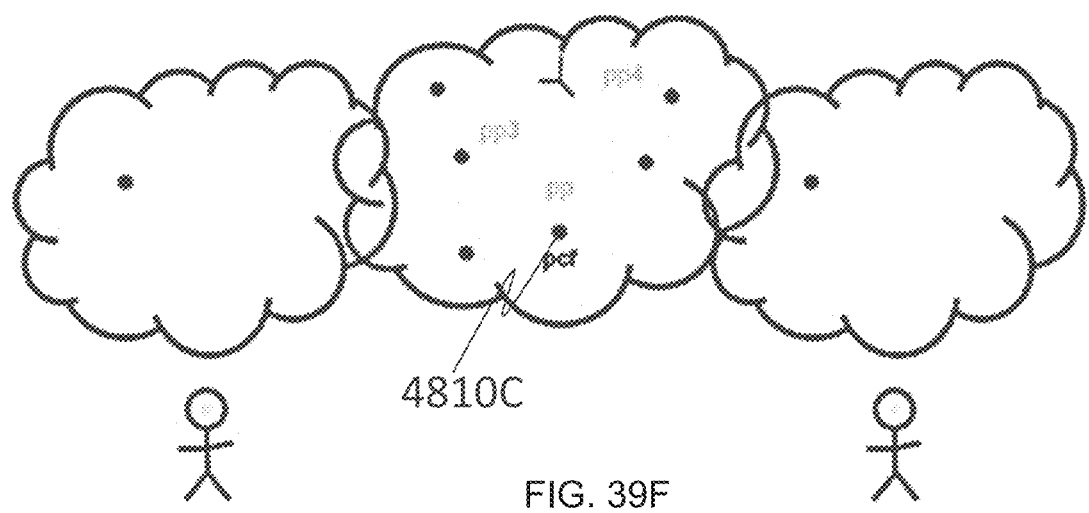

FIG. 39D shows a persistent pose snapshot from the canonical map to the local tracking maps. As can be seen, the local tracking maps are connected to one another via the persistent poses. FIG. 39E shows that the PCF 4810A on the device worn by the user 4802A is accessible in the device worn by the user 4802B through PPs 4818A. FIG. 39F shows that the tracking maps 4804A, 4804B and the canonical 4814 may merge or stitch. In some embodiments, some PCFs may be removed as a result of merging or stitching. In the illustrated example, the merged or stitched map includes the PCF 4810C of the canonical map 4814 but not the PCFs 4810A, 4810B of the tracking maps 4804A, 4804B. The PPs previously associated with the PCFs 4810A, 4810B may be associated with the PCF 4810C after the maps merge or stitch.

EXAMPLES

Figure 40:
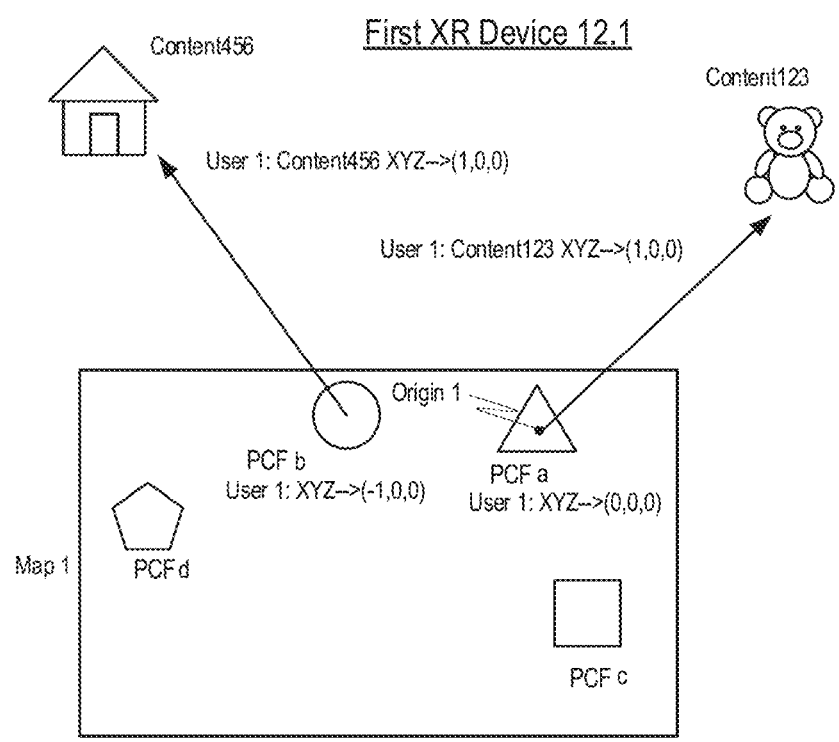
FIG. 40 is a two-dimensional representation of a three-dimensional first local tracking map (Map 1), which may be generated by the first XR device of FIG. 9, according to some embodiments.
Figure 41:
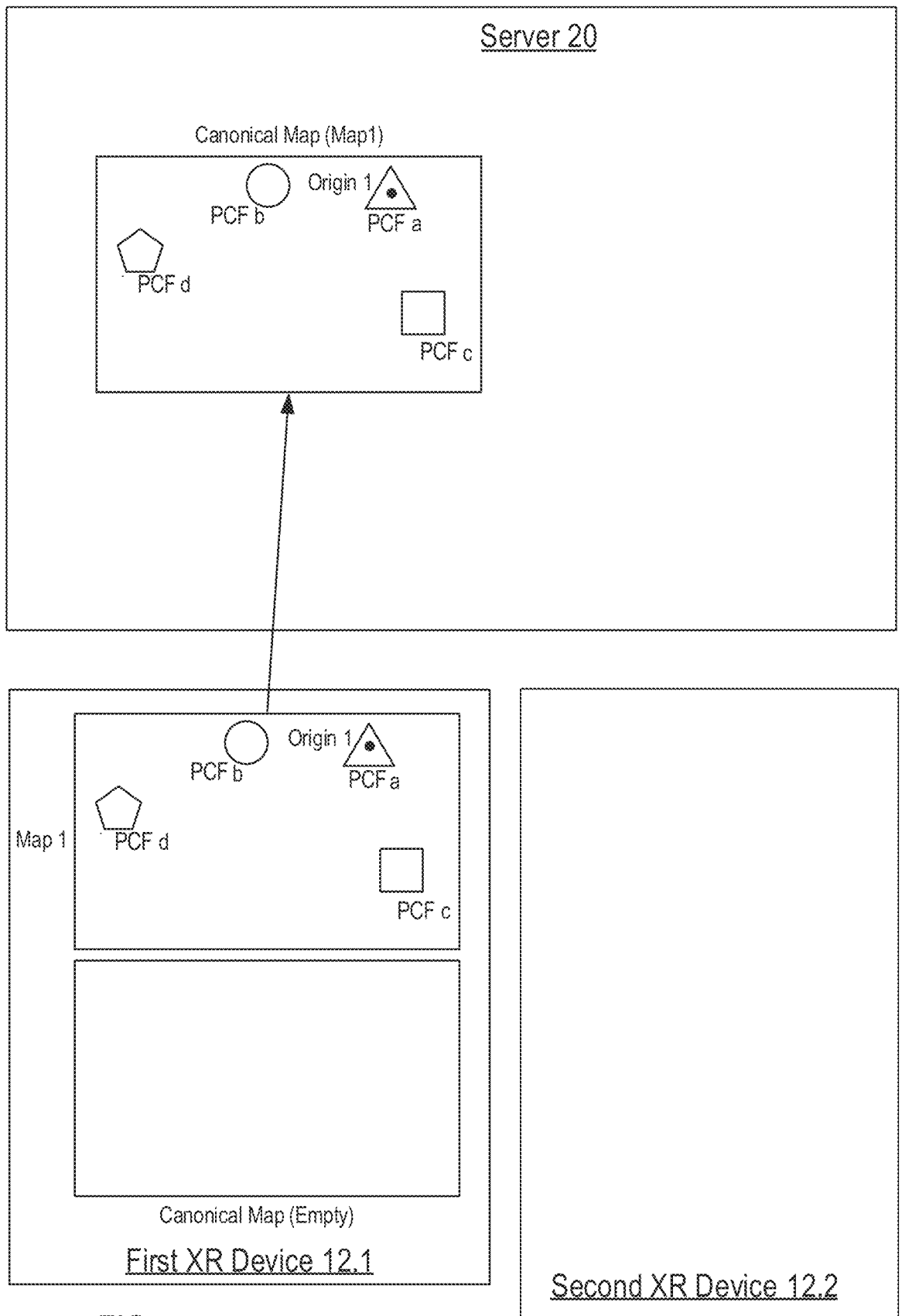
FIG. 41 is a block diagram illustrating uploading Map 1 from the first XR device to the server of FIG. 9, according to some embodiments.

FIGS. 40 and 41 illustrate an example of using a tracking map by the first XR device 12.1 of FIG. 9. FIG. 40 is a two-dimensional representation of a three-dimensional first local tracking map (Map 1), which may be generated by the first XR device of FIG. 9, according to some embodiments. FIG. 41 is a block diagram illustrating uploading Map 1 from the first XR device to the server of FIG. 9, according to some embodiments.

FIG. 40 illustrates Map 1 and virtual content (Content123 and Content456) on the first XR device 12.1. Map 1 has an origin (Origin 1). Map 1 includes a number of PCFs (PCF a to PCF d). From the perspective of the first XR device 12.1, PCF a, by way of example, is located at the origin of Map 1 and has X, Y, and Z coordinates of (0,0,0) and PCF b has X, Y, and Z coordinates (−1,0,0). Content123 is associated with PCF a. In the present example, Content123 has an X, Y, and Z relationship relative to PCF a of (1,0,0). Content456 has a relationship relative to PCF b. In the present example, Content456 has an X, Y, and Z relationship of (1,0,0) relative to PCF b.

In FIG. 41, the first XR device 12.1 uploads Map 1 to the server 20. In this example, as the server stores no canonical map for the same region of the physical world represented by the tracking map, and the tracking map is stored as an initial canonical map. The server 20 now has a canonical map based on Map 1. The first XR device 12.1 has a canonical map that is empty at this stage. The server 20, for purposes of discussion, and in some embodiments, includes no other maps other than Map 1. No maps are stored on the second XR device 12.2.

The first XR device 12.1 also transmits its Wi-Fi signature data to the server 20. The server 20 may use the Wi-Fi signature data to determine a rough location of the first XR device 12.1 based on intelligence gathered from other devices that have, in the past, connected to the server 20 or other servers together with the GPS locations of such other devices that have been recorded. The first XR device 12.1 may now end the first session (See FIG. 8) and may disconnect from the server 20.

Figure 42:
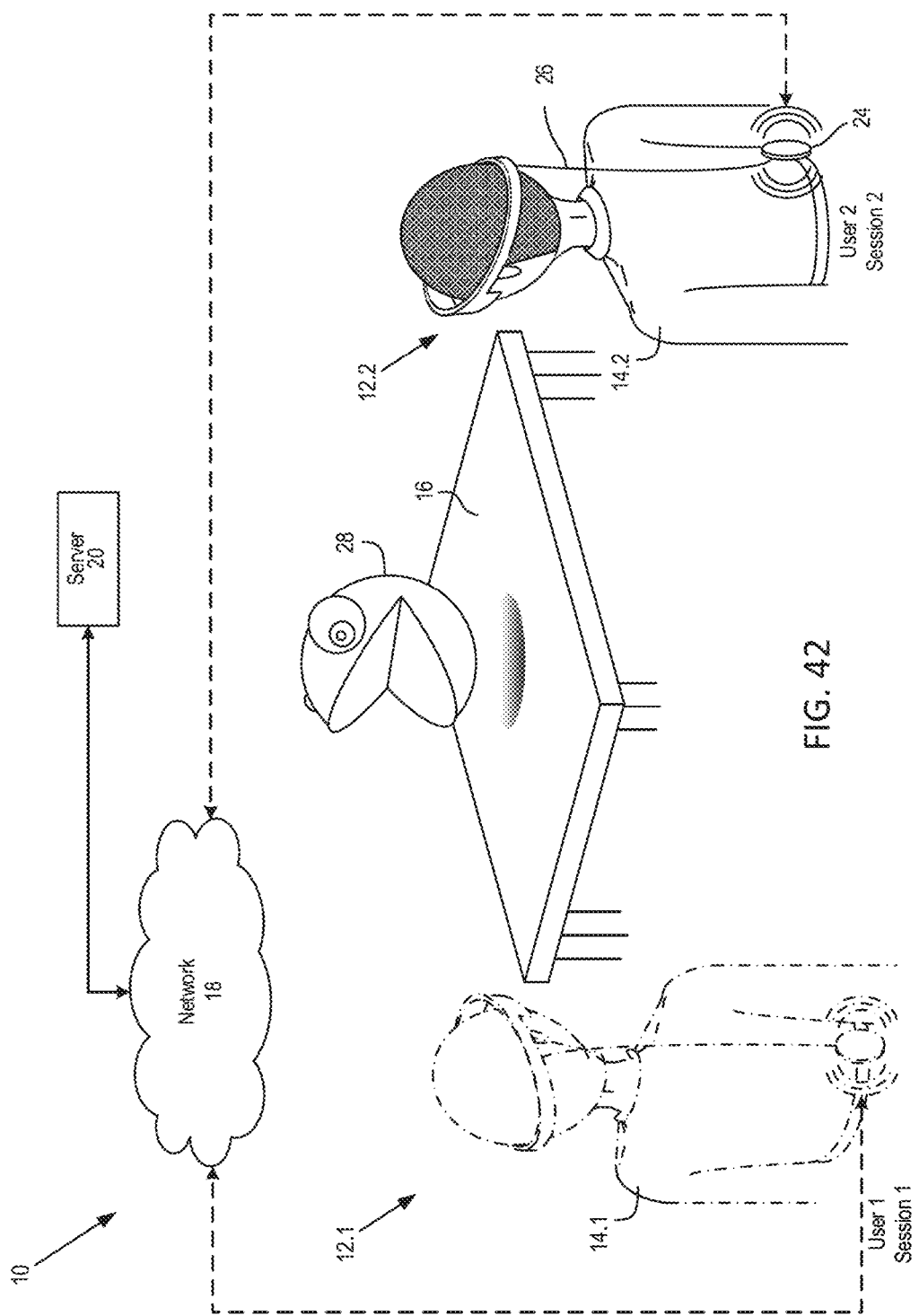
FIG. 42 is a schematic diagram illustrating the XR system of FIG. 16, showing the second user has initiated a second session using a second XR device of the XR system after the first user has terminated a first session, according to some embodiments.
Figure 43A:
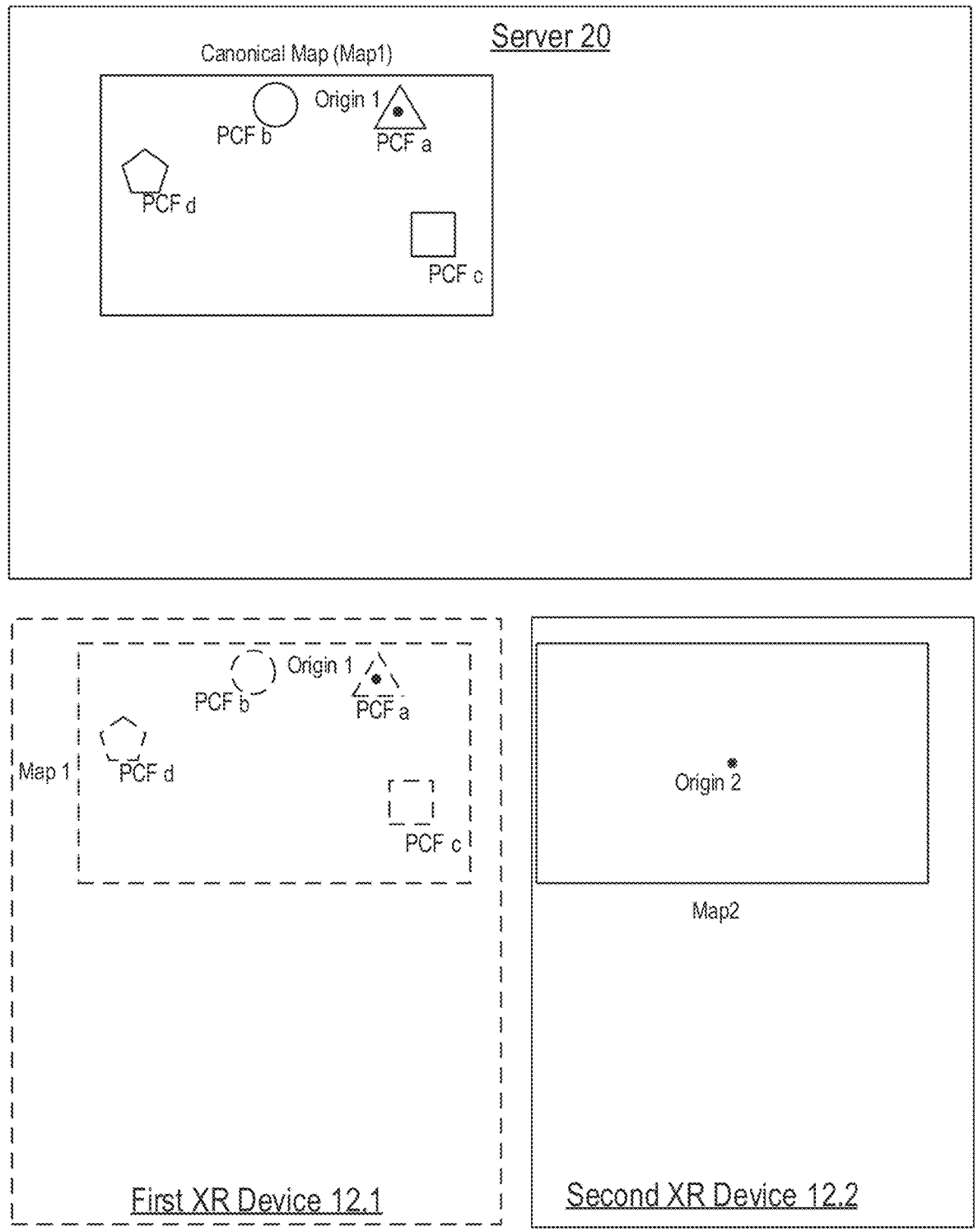
FIG. 43A is a block diagram illustrating a new session for the second XR device of FIG. 42, according to some embodiments.

FIG. 42 is a schematic diagram illustrating the XR system of FIG. 16, showing the second user 14.2 has initiated a second session using a second XR device of the XR system after the first user 14.1 has terminated a first session, according to some embodiments. FIG. 43A is a block diagram showing the initiation of a second session by a second user 14.2. The first user 14.1 is shown in phantom lines because the first session by the first user 14.1 has ended. The second XR device 12.2 begins to record objects. Various systems with varying degrees of granulation may be used by the server 20 to determine that the second session by the second XR device 12.2 is in the same vicinity of the first session by the first XR device 12.1. For example, Wi-Fi signature data, global positioning system (GPS) positioning data, GPS data based on Wi-Fi signature data, or any other data that indicates a location may be included in the first and second XR devices 12.1 and 12.2 to record their locations. Alternatively, the PCFs that are identified by the second XR device 12.2 may show a similarity to the PCFs of Map 1.

As shown in FIG. 43B, the second XR device boots up and begins to collect data, such as images 1110 from one or more cameras 44, 46. As shown in FIG. 14, in some embodiments, an XR device (e.g., the second XR device 12.2) may collect one or more images 1110 and perform image processing to extract one or more features/interest points 1120. Each feature may be converted to a descriptor 1130. In some embodiments, the descriptors 1130 may be used to describe a key frame 1140, which may have the position and direction of the associated image attached. One or more key frames 1140 may correspond to a single persistent pose 1150, which may be automatically generated after a threshold distance from the previous persistent pose 1150, e.g., 3 meters. One or more persistent poses 1150 may correspond to a single PCF 1160, which may be automatically generated after a pre-determined distance, e.g., every 5 meters. Over time as the user continues to move around the user's environment, and the XR device continues to collect more data, such as images 1110, additional PCFs (e.g., PCF 3 and PCF 4, 5) may be created. One or more applications 1180 may run on the XR device and provide virtual content 1170 to the XR device for presentation to the user. The virtual content may have an associated content coordinate frame which may be placed relative to one or more PCFs. As shown in FIG. 43B, the second XR device 12.2 creates three PCFs. In some embodiments, the second XR device 12.2 may try to localize into one or more canonical maps stored on the server 20.

Figure 43C:
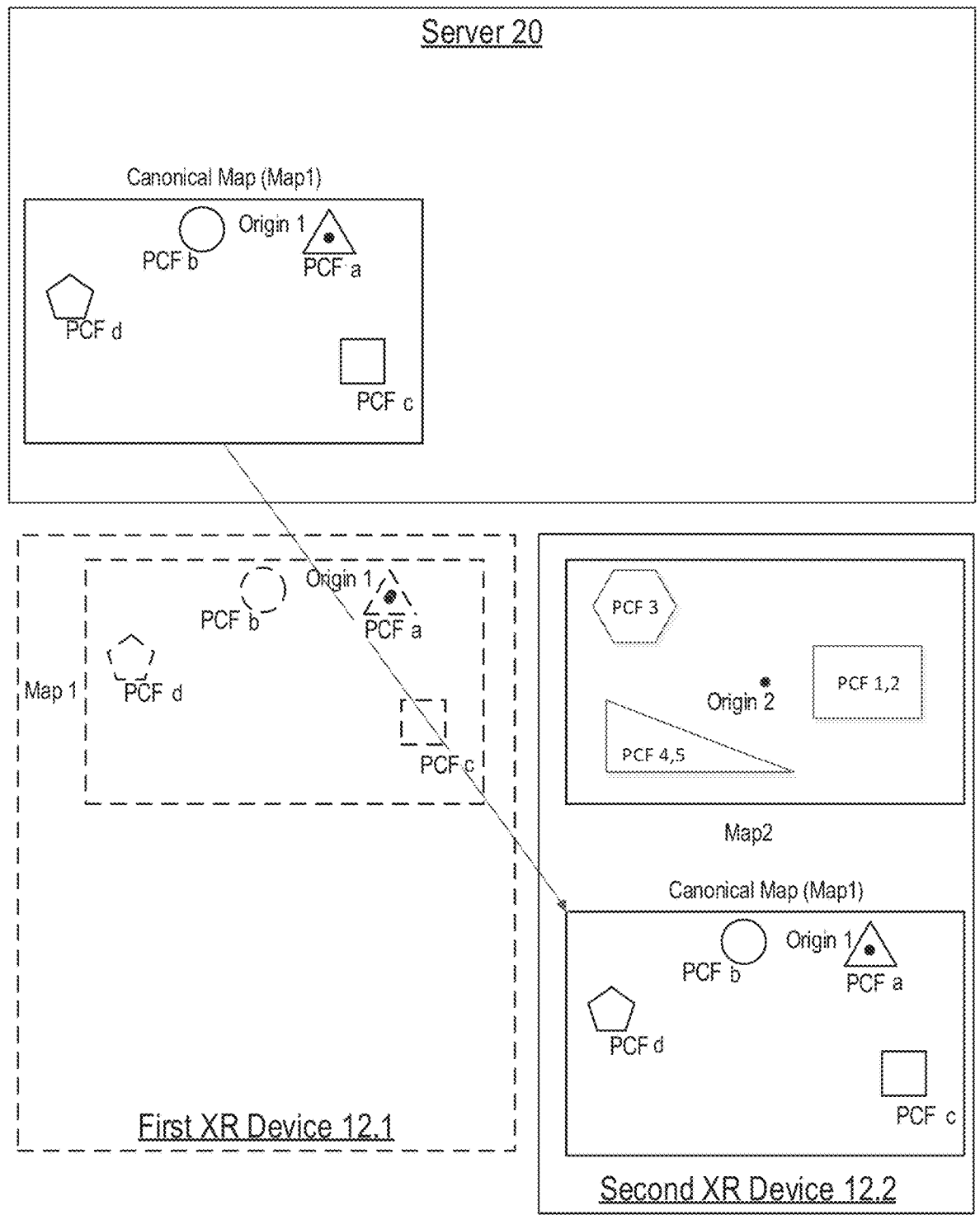
FIG. 43C is a block diagram illustrating downloading a canonical map from the server to the second XR device of FIG. 42, according to some embodiments.

In some embodiments, as shown in FIG. 43C, the second XR device 12.2 may download the canonical map 120 from the server 20. Map 1 on the second XR device 12.2 includes PCFs a to d and Origin 1. In some embodiments, the server 20 may have multiple canonical maps for various locations and may determine that the second XR device 12.2 is in the same vicinity as the vicinity of the first XR device 12.1 during the first session and sends the second XR device 12.2 the canonical map for that vicinity.

Figure 44:
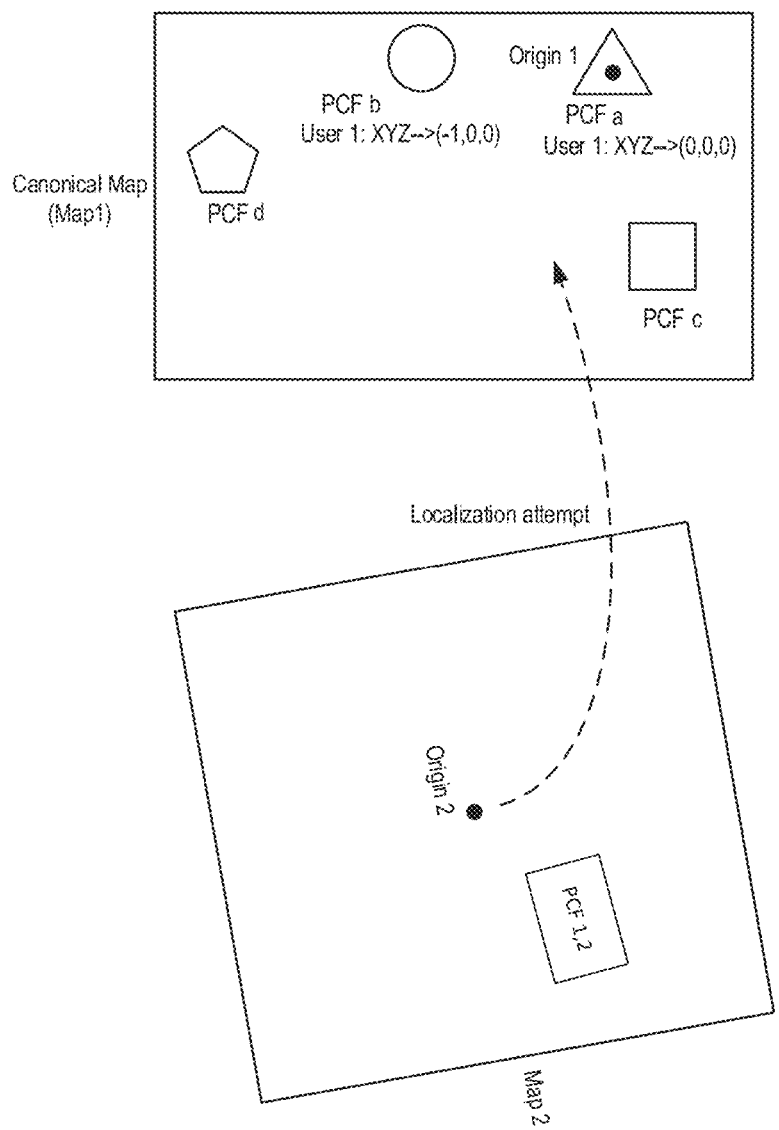
FIG. 44 is a schematic diagram illustrating a localization attempt to localize to a canonical map a second tracking map (Map 2), which may be generated by the second XR device of FIG. 42, according to some embodiments.

FIG. 44 shows the second XR device 12.2 beginning to identify PCFs for purposes of generating Map 2. The second XR device 12.2 has only identified a single PCF, namely PCF 1,2. The X, Y, and Z coordinates of PCF 1,2 for the second XR device 12.2 may be (1,1,1). Map 2 has its own origin (Origin 2), which may be based on the headpose of device 2 at device start-up for the current headpose session. In some embodiments, the second XR device 12.2 may immediately attempt to localize Map 2 to the canonical map. In some embodiments, Map 2 may not be able to localize into Canonical Map (Map 1) (i.e., localization may fail) because the system does not recognize any or enough overlap between the two maps. Localization may be performed by identifying a portion of the physical world represented in a first map that is also represented in a second map, and computing a transformation between the first map and the second map required to align those portions. In some embodiments, the system may localize based on PCF comparison between the local and canonical maps. In some embodiments, the system may localize based on persistent pose comparison between the local and canonical maps. In some embodiments, the system may localize based on key frame comparison between the local and canonical maps.

FIG. 45 shows Map 2 after the second XR device 12.2 has identified further PCFs (PCF 1,2, PCF 3, PCF 4,5) of Map 2. The second XR device 12.2 again attempts to localize Map 2 to the canonical map. Because Map 2 has expanded to overlap with at least a portion of the Canonical Map, the localization attempt will succeed. In some embodiments, the overlap between the local tracking map, Map 2, and the Canonical Map may be represented by PCFs, persistent poses, key frames, or any other suitable intermediate or derivative construct.

Furthermore, the second XR device 12.2 has associated Content123 and Content456 to PCFs 1,2 and PCF 3 of Map 2. Content123 has X, Y, and Z coordinates relative to PCF 1,2 of (1,0,0). Similarly, the X, Y, and Z coordinates of Content456 relative to PCF 3 in Map 2 are (1,0,0).

Figure 46A:
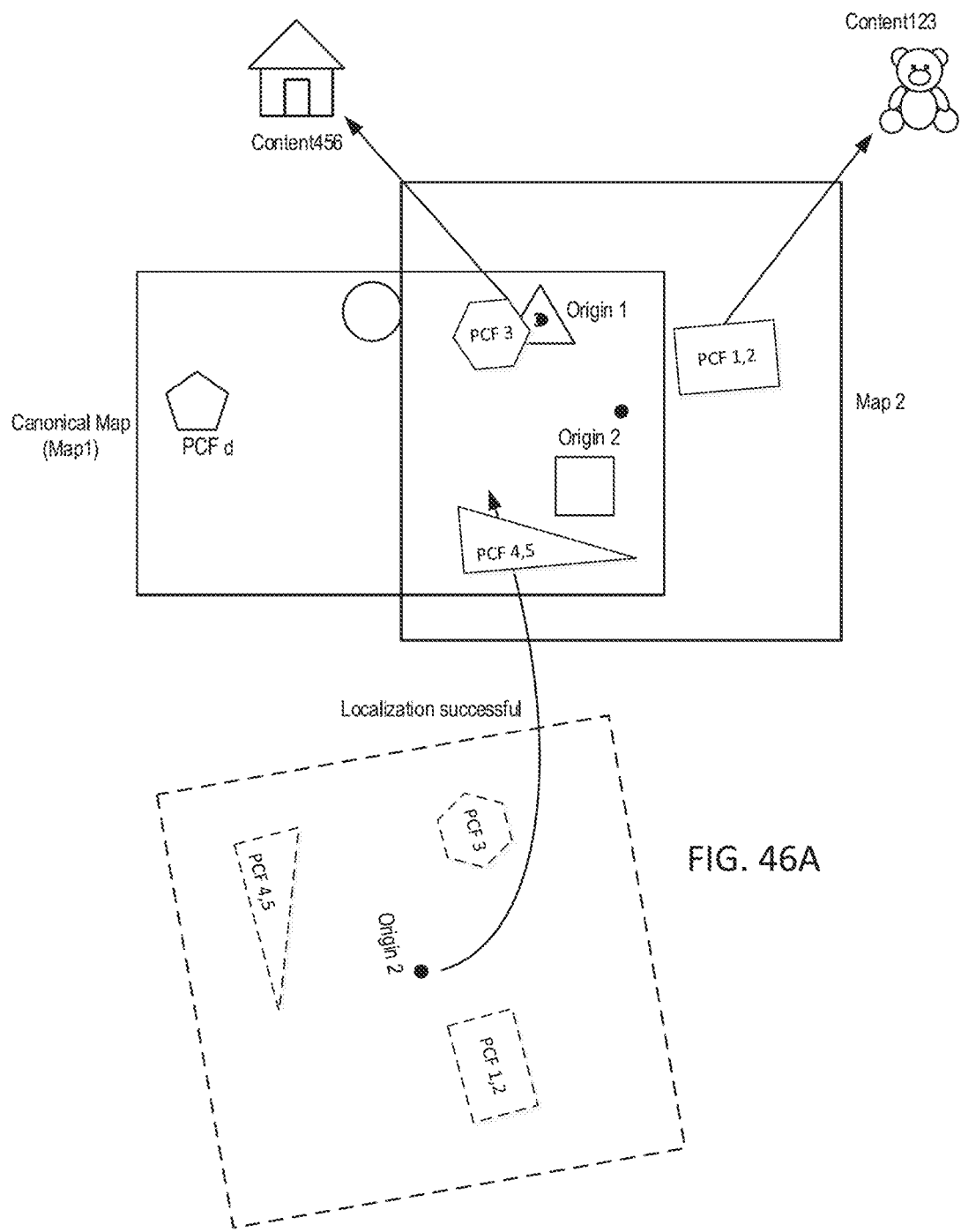

FIGS. 46A and 46B illustrate a successful localization of Map 2 to the canonical map. Localization may be based on matching features in one map to the other. With an appropriate transformation, here involving both translation and rotation of one map with respect to the other, the overlapping area/volume/section of the maps 1410 represent the common parts to Map 1 and the canonical map. Since Map 2 created PCFs 3 and 4,5 before localizing, and the Canonical map created PCFs a and c before Map 2 was created, different PCFs were created to represent the same volume in real space (e.g., in different maps).

Figure 47:
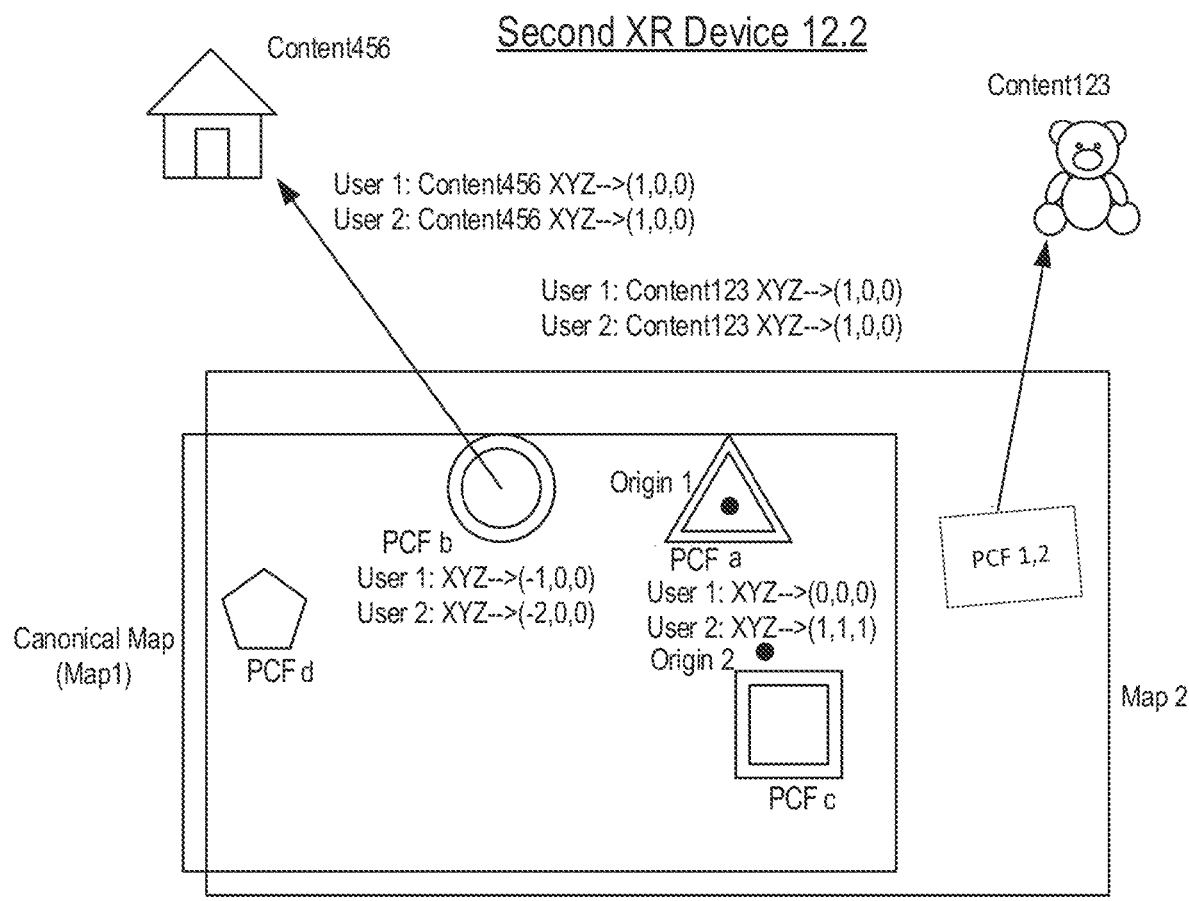
FIG. 47 is a schematic diagram illustrating a canonical map generated by including one or more PCFs from the canonical map of FIG. 46A into Map 2 of FIG. 45, according to some embodiments.

As shown in FIG. 47, the second XR device 12.2 expands Map 2 to include PCFs a-d from the Canonical Map. The inclusion of PCFs a-d represents the localization of Map 2 to the Canonical Map. In some embodiments, the XR system may perform an optimization step to remove duplicate PCFs from overlapping areas, such as the PCFs in 1410, PCF 3 and PCF 4,5. After Map 2 localizes, the placement of virtual content, such as Content456 and Content123 will be relative to the closest updated PCFs in the updated Map 2. The virtual content appears in the same real-world location relative to the user, despite the changed PCF attachment for the content, and despite the updated PCFs for Map 2.

Figure 48:
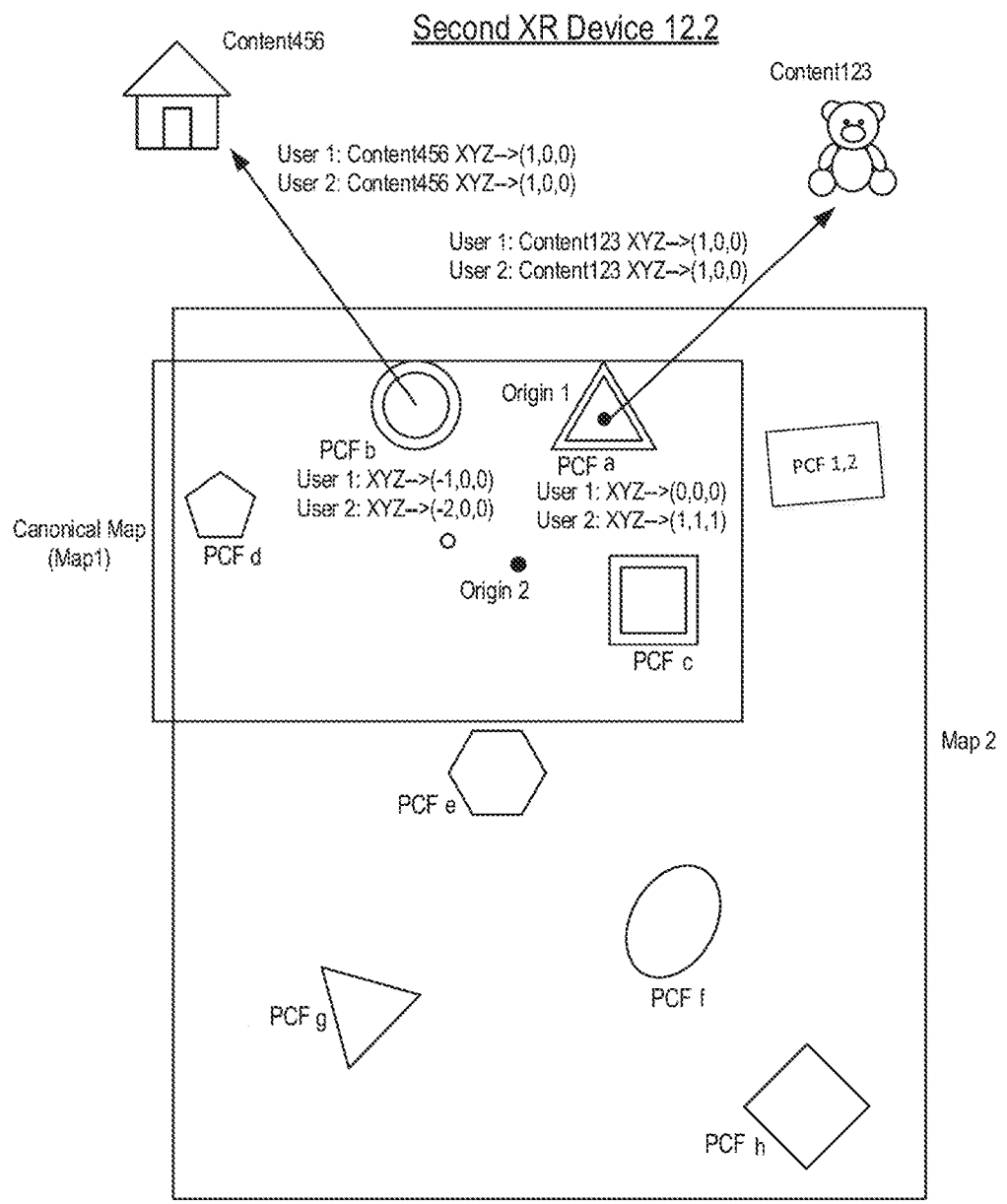
FIG. 48 is a schematic diagram illustrating the canonical map of FIG. 47 with further expansion of Map 2 on the second XR device, according to some embodiments.

As shown in FIG. 48, the second XR device 12.2 continues to expand Map 2 as further PCFs (e.g., PCFs e, f, g, and h) are identified by the second XR device 12.2, for example as the user walks around the real world. It can also be noted that Map 1 has not expanded in FIGS. 47 and 48.

Figure 49:
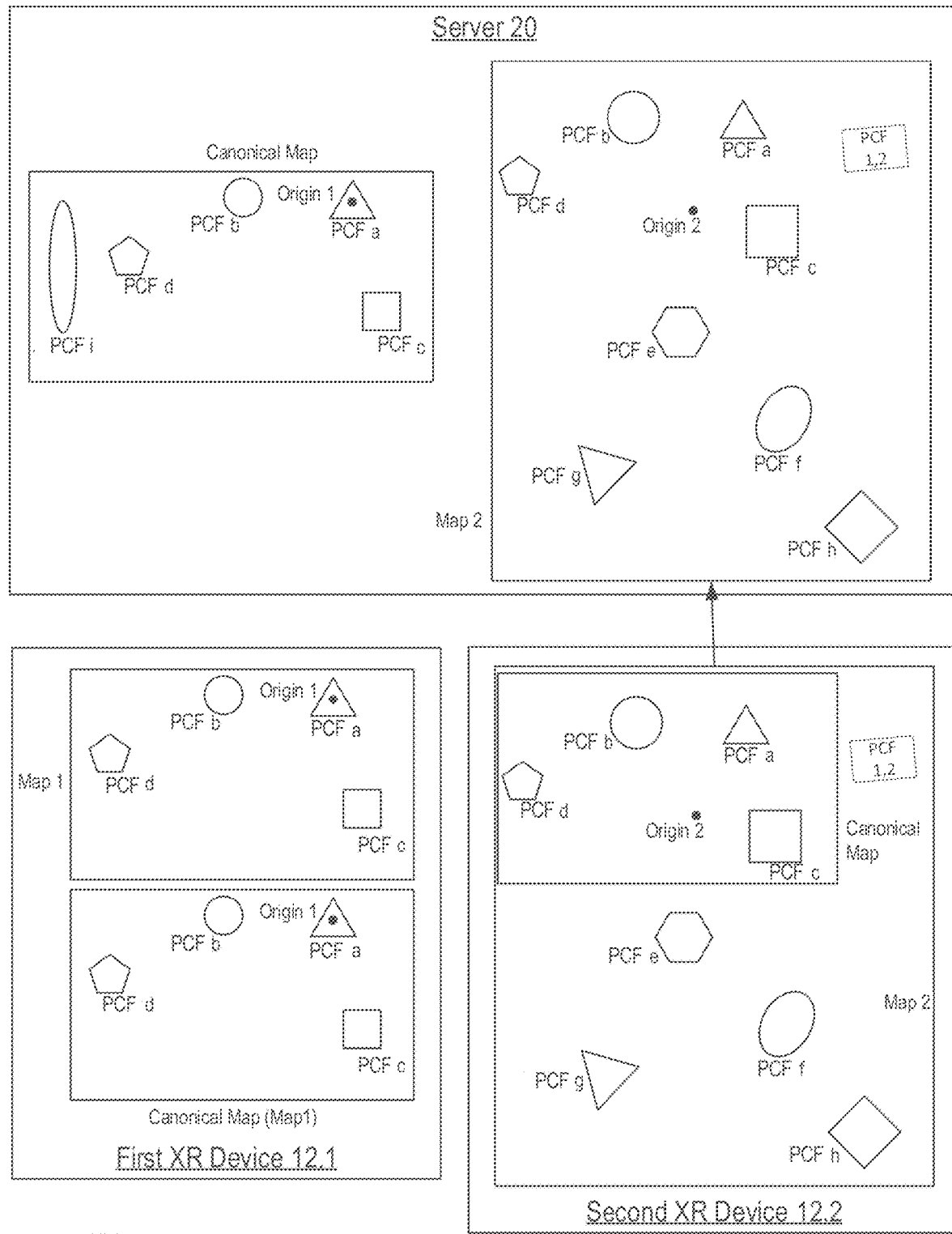
FIG. 49 is a block diagram illustrating uploading Map 2 from the second XR device to the server, according to some embodiments.

Referring to FIG. 49, the second XR device 12.2 uploads Map 2 to the server 20. The server 20 stores Map 2 together with the canonical map. In some embodiments, Map 2 may upload to the server 20 when the session ends for the second XR device 12.2.

The canonical map within the server 20 now includes PCF i which is not included in Map 1 on the first XR device 12.1. The canonical map on the server 20 may have expanded to include PCF i when a third XR device (not shown) uploaded a map to the server 20 and such a map included PCF i.

Figure 50:
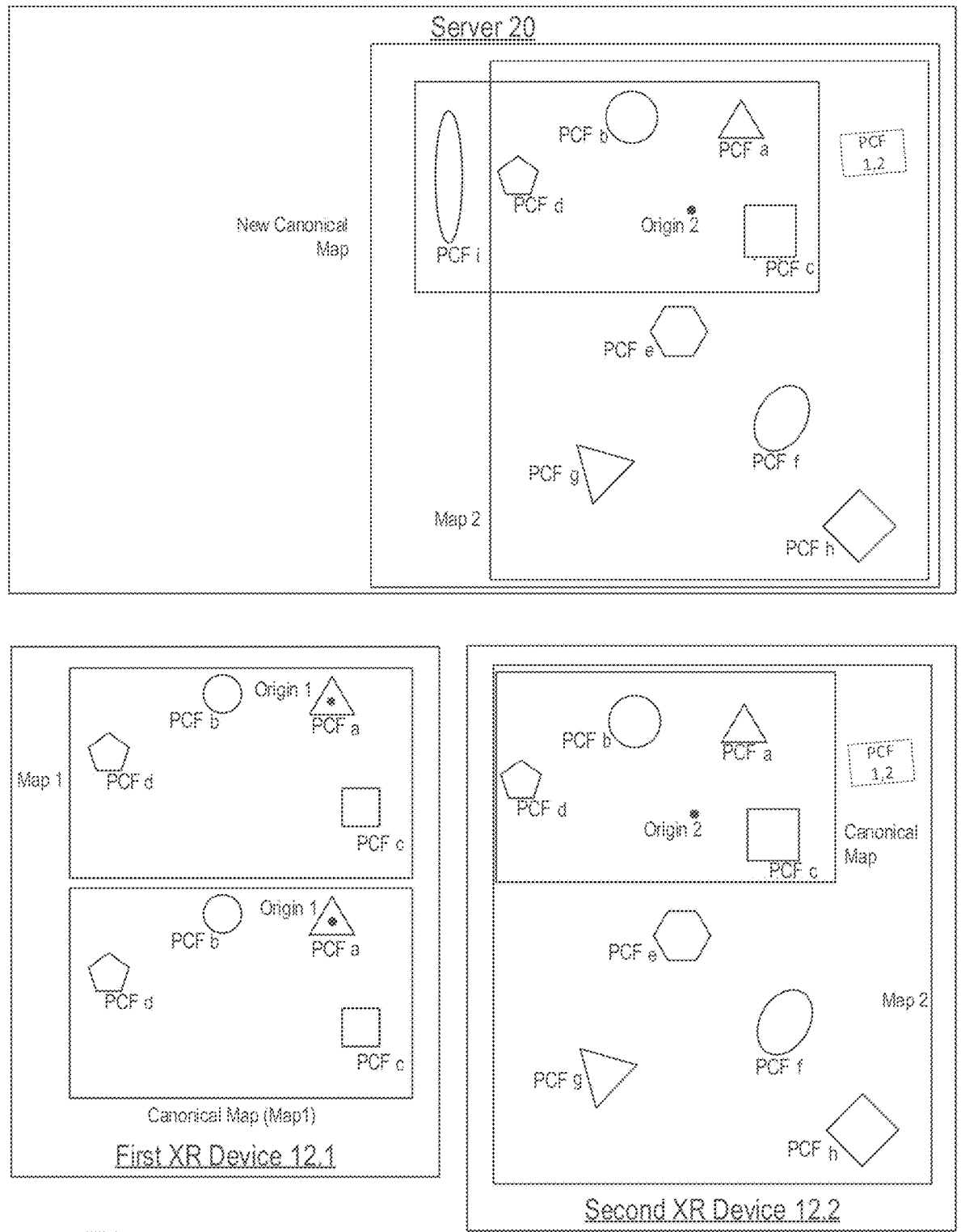
FIG. 50 is a block diagram illustrating merging Map 2 with the canonical map, according to some embodiments.

In FIG. 50, the server 20 merges or stitches Map 2 with the canonical map to form a new canonical map. The server 20 determines that PCFs a to d are common to the canonical map and Map 2. The server expands the canonical map to include PCFs e to h and PCF 1,2 from Map 2 to form a new canonical map. The canonical maps on the first and second XR devices 12.1 and 12.2 are based on Map 1 and are outdated.

Figure 51:
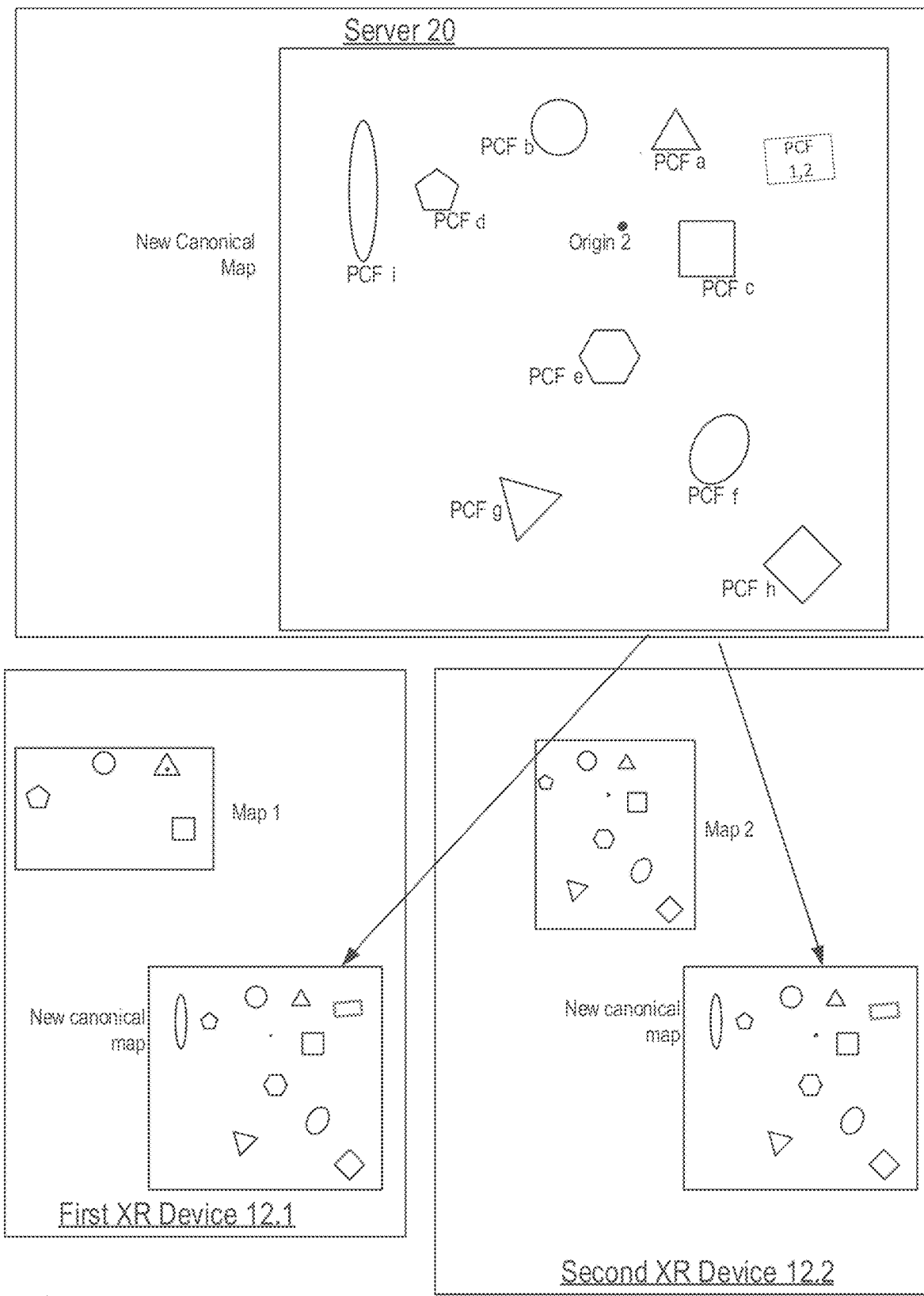
FIG. 51 is a block diagram illustrating transmission of a new canonical map from the server to the first and second XR devices, according to some embodiments.

In FIG. 51, the server 20 transmits the new canonical map to the first and second XR devices 12.1 and 12.2. In some embodiments, this may occur when the first XR device 12.1 and second device 12.2 try to localize during a different or new or subsequent session. The first and second XR devices 12.1 and 12.2 proceed as described above to localize their respective local maps (Map1 and Map 2 respectively) to the new canonical map.

Figure 52:
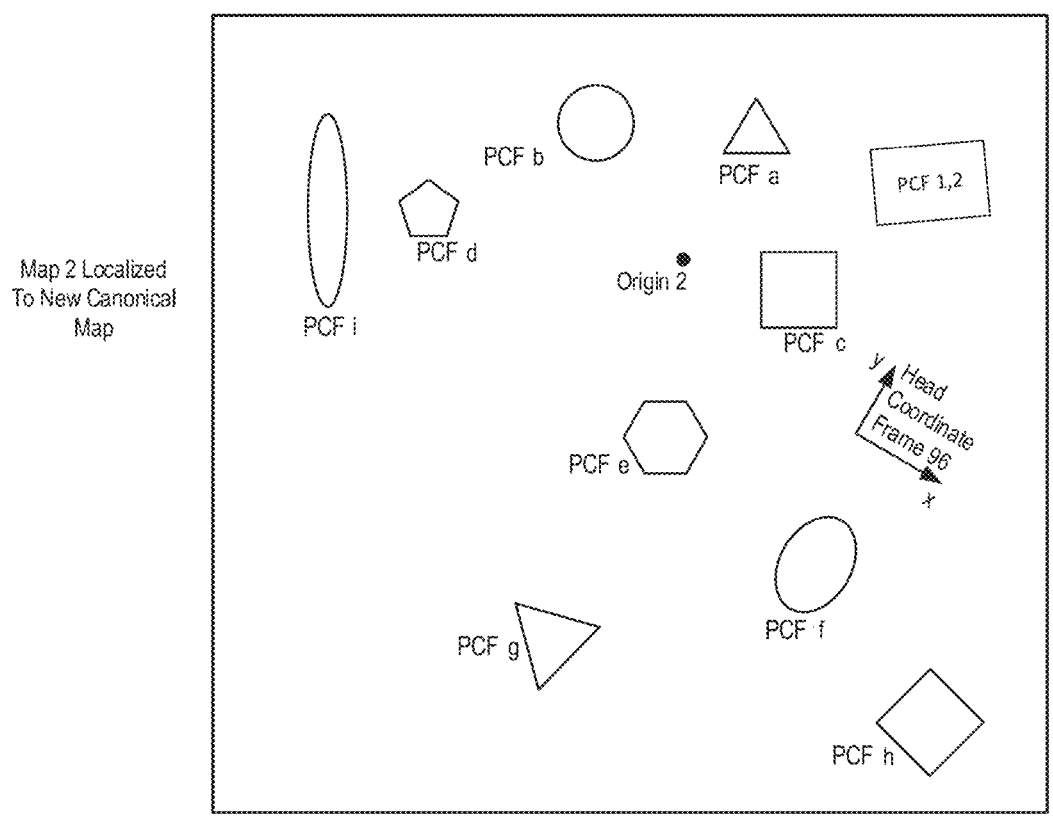
FIG. 52 is block diagram illustrating a two-dimensional representation of Map 2 and a head coordinate frame of the second XR device that is referenced to Map 2, according to some embodiments.

As shown in FIG. 52, the head coordinate frame 96 or "headpose" is related to the PCFs in Map 2. In some embodiments, the origin of the map, Origin 2, is based on the headpose of second XR device 12.2 at the start of the session. As PCFs are created during the session, the PCFs are placed relative to the world coordinate frame, Origin 2. The PCFs of Map 2 serve as a persistent coordinate frames relative to a canonical coordinate frame, where the world coordinate frame may be a previous session's world coordinate frame (e.g., Map 1's Origin 1 in FIG. 40). These coordinate frames are related by the same transformation used to localize Map 2 to the canonical map, as discussed above in connection with FIG. 46B.

The transformation from the world coordinate frame to the head coordinate frame 96 has been previously discussed with reference to FIG. 9. The head coordinate frame 96 shown in FIG. 52 only has two orthogonal axes that are in a particular coordinate position relative to the PCFs of Map 2, and at particular angles relative to Map 2. It should however be understood that the head coordinate frame 96 is in a three-dimensional location relative to the PCFs of Map 2 and has three orthogonal axes within three-dimensional space.

Figure 53:
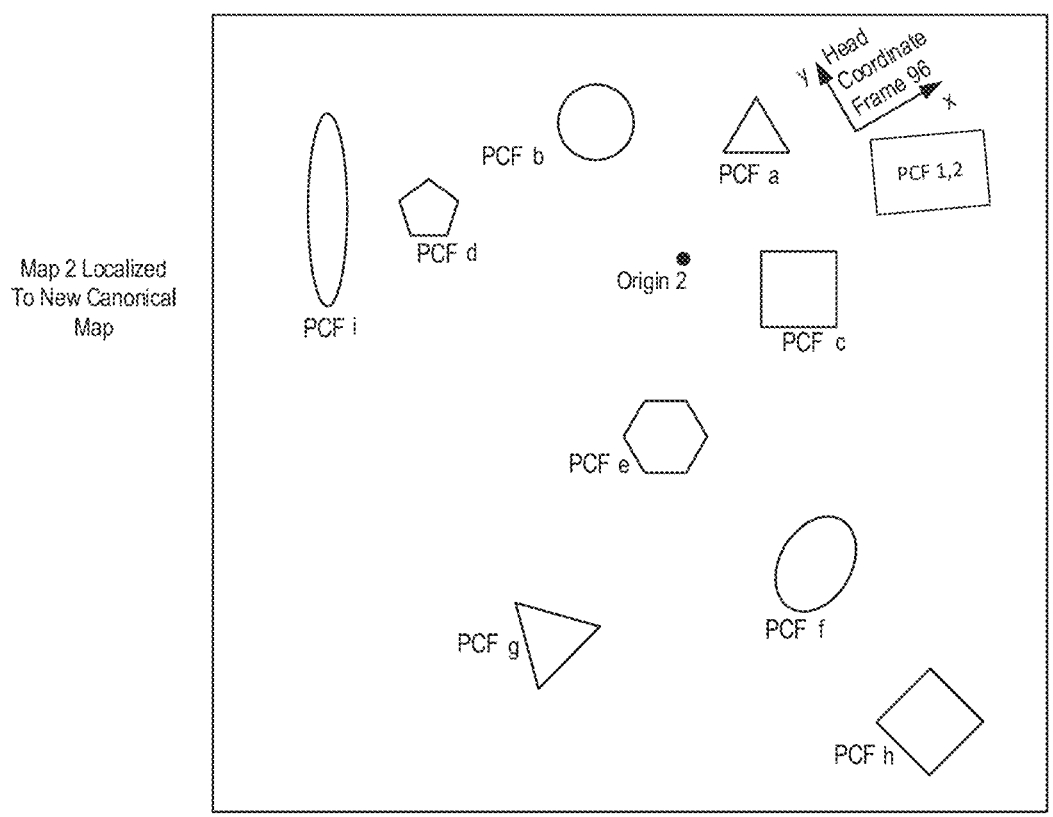
FIG. 53 is a block diagram illustrating, in two-dimensions, adjustment of the head coordinate frame which can occur in six degrees of freedom, according to some embodiments.

In FIG. 53, the head coordinate frame 96 has moved relative to the PCFs of Map 2. The head coordinate frame 96 has moved because the second user 14.2 has moved their head. The user can move their head in six degrees of freedom (6dof). The head coordinate frame 96 can thus move in 6dof, namely in three-dimensions from its previous location in FIG. 52 and about three orthogonal axes relative to the PCFs of Map 2. The head coordinate frame 96 is adjusted when the real object detection camera 44 and inertial measurement unit 48 in FIG. 9 respectively detect real objects and motion of the head unit 22. More information regarding headpose tracking is disclosed in U.S. patent application Ser. No. 16/221,065 entitled "Enhanced Pose Determination for Display Device" and is hereby incorporated by reference in its entirety.

Figure 54:
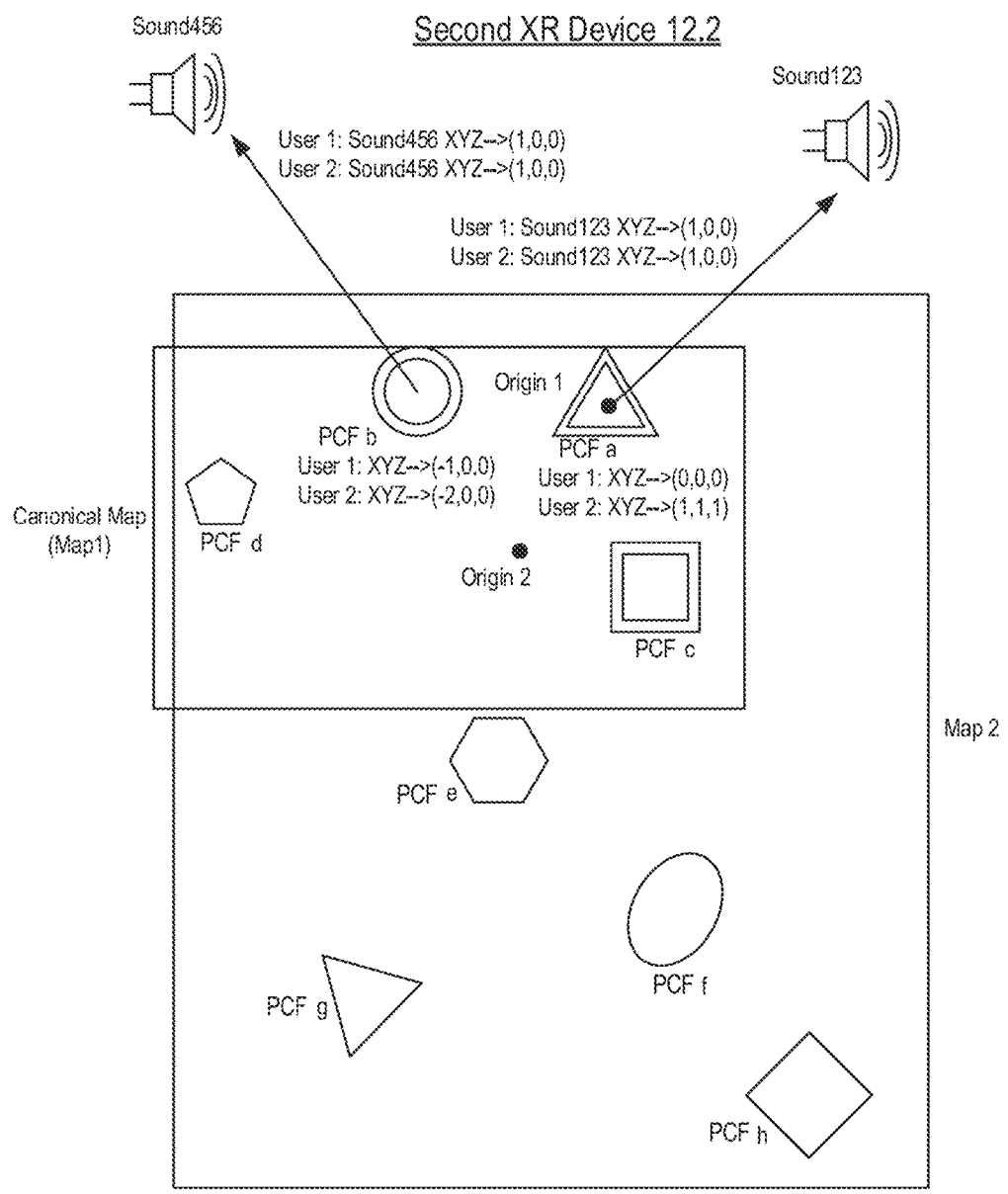
FIG. 54 a block diagram illustrating a canonical map on the second XR device wherein sound is localized relative to PCFs of Map 2, according to some embodiments.

FIG. 54 shows that sound may be associated with one or more PCFs. A user may, for example, wear headphones or earphones with stereoscopic sound. The location of sound through headphones can be simulated using conventional techniques. The location of sound may be located in a stationary position so that, when the user rotates their head to the left, the location of sound rotates to the right so that the user perceives the sound coming from the same location in the real world. In the present example, location of sound is represented by Sound123 and Sound456. For purposes of discussion, FIG. 54 is similar to FIG. 48 in its analysis. When the first and second users 14.1 and 14.2 are located in the same room at the same or different times, they perceive Sound123 and Sound456 coming from the same locations within the real world.

Figure 55:
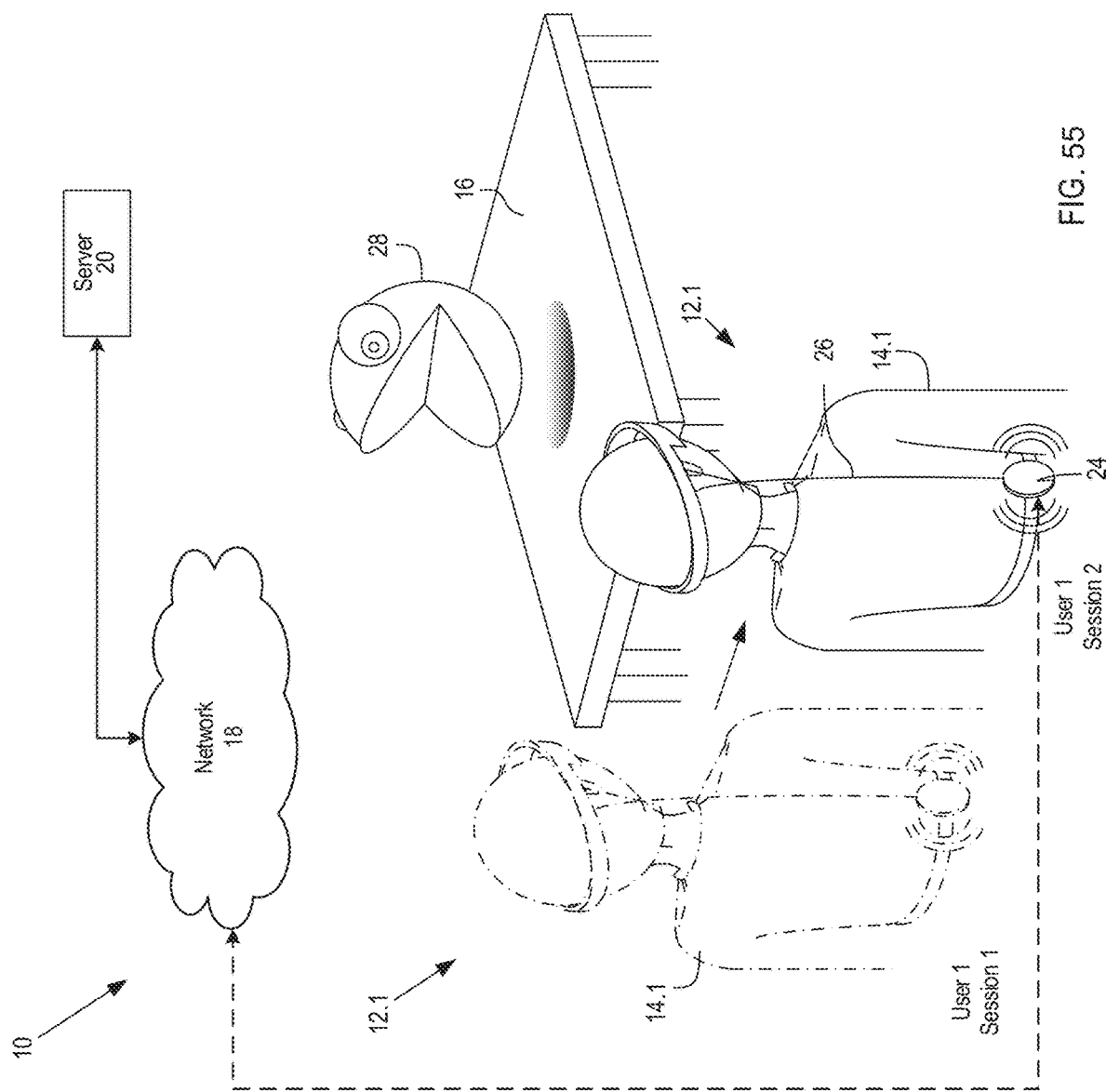
FIGS. 55 and 56 are a perspective view and a block diagram illustrating use of the XR system when the first user has terminated a first session and the first user has initiated a second session using the XR system, according to some embodiments.
Figure 56:
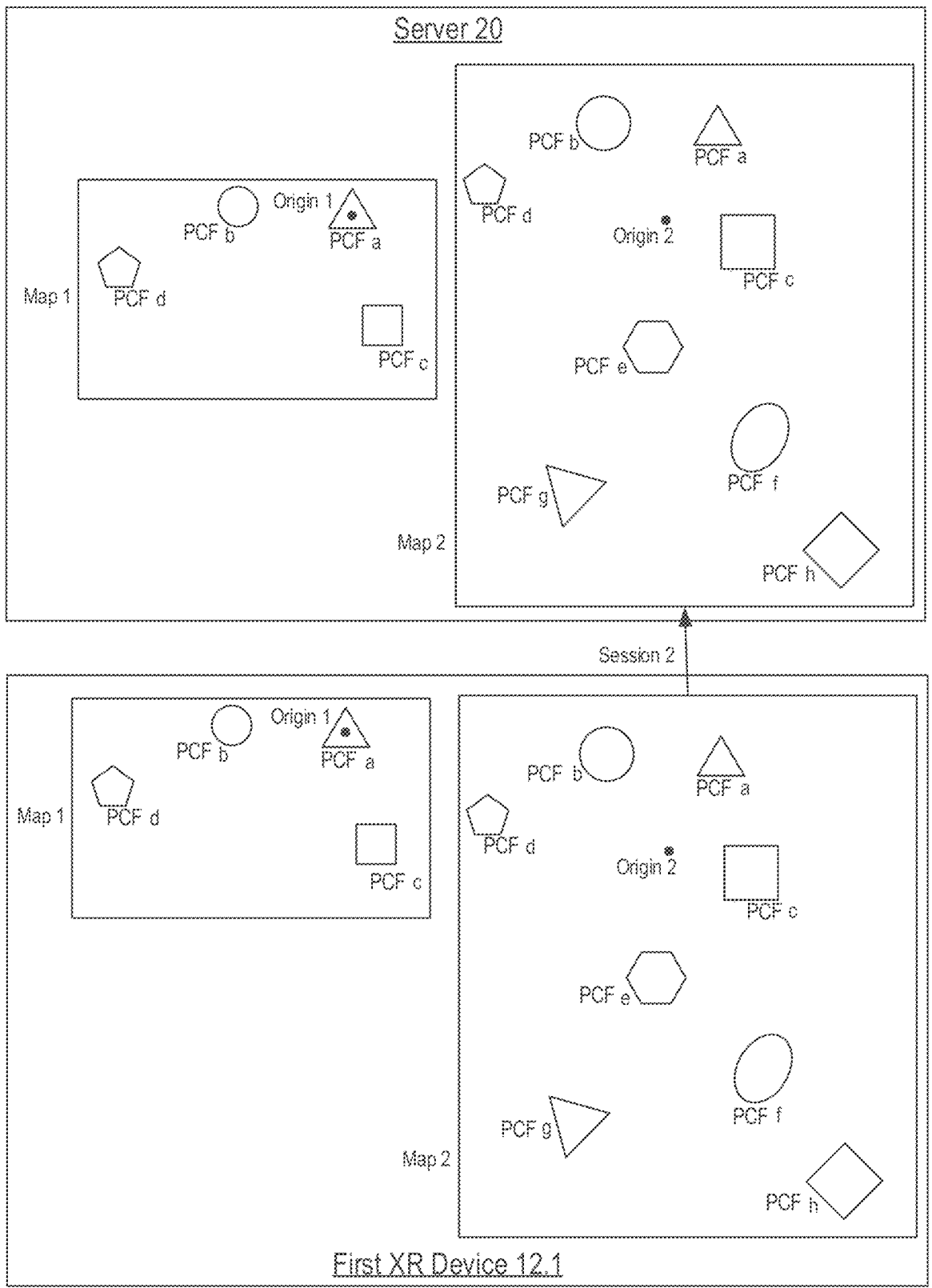

FIGS. 55 and 56 illustrate a further implementation of the technology described above. The first user 14.1 has initiated a first session as described with reference to FIG. 8. As shown in FIG. 55, the first user 14.1 has terminated the first session as indicated by the phantom lines. At the end of the first session, the first XR device 12.1 uploaded Map 1 to the server 20. The first user 14.1 has now initiated a second session at a later time than the first session. The first XR device 12.1 does not download Map 1 from the server 20 because Map 1 is already stored on the first XR device 12.1. If Map 1 is lost, then the first XR device 12.1 downloads Map 1 from the server 20. The first XR device 12.1 then proceeds to build PCFs for Map 2, localizes to Map 1, and further develops a canonical map as described above. Map 2 of the first XR device 12.1 is then used for relating local content, a head coordinate frame, local sound, etc. as described above.

Figure 57:
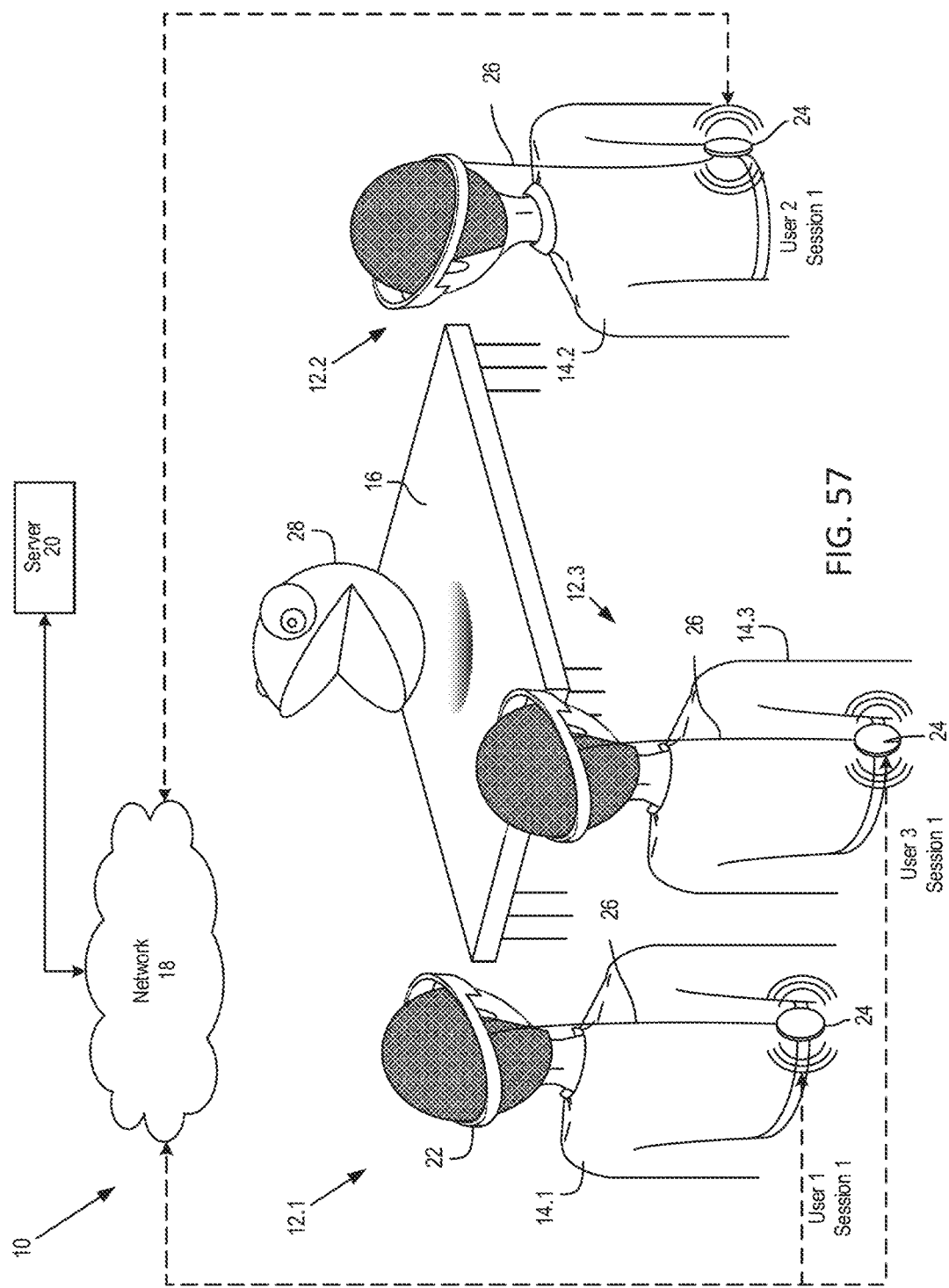
FIGS. 57 and 58 are a perspective view and a block diagram illustrating use of the XR system when three users are simultaneously using the XR system in the same session, according to some embodiments.
Figure 58:
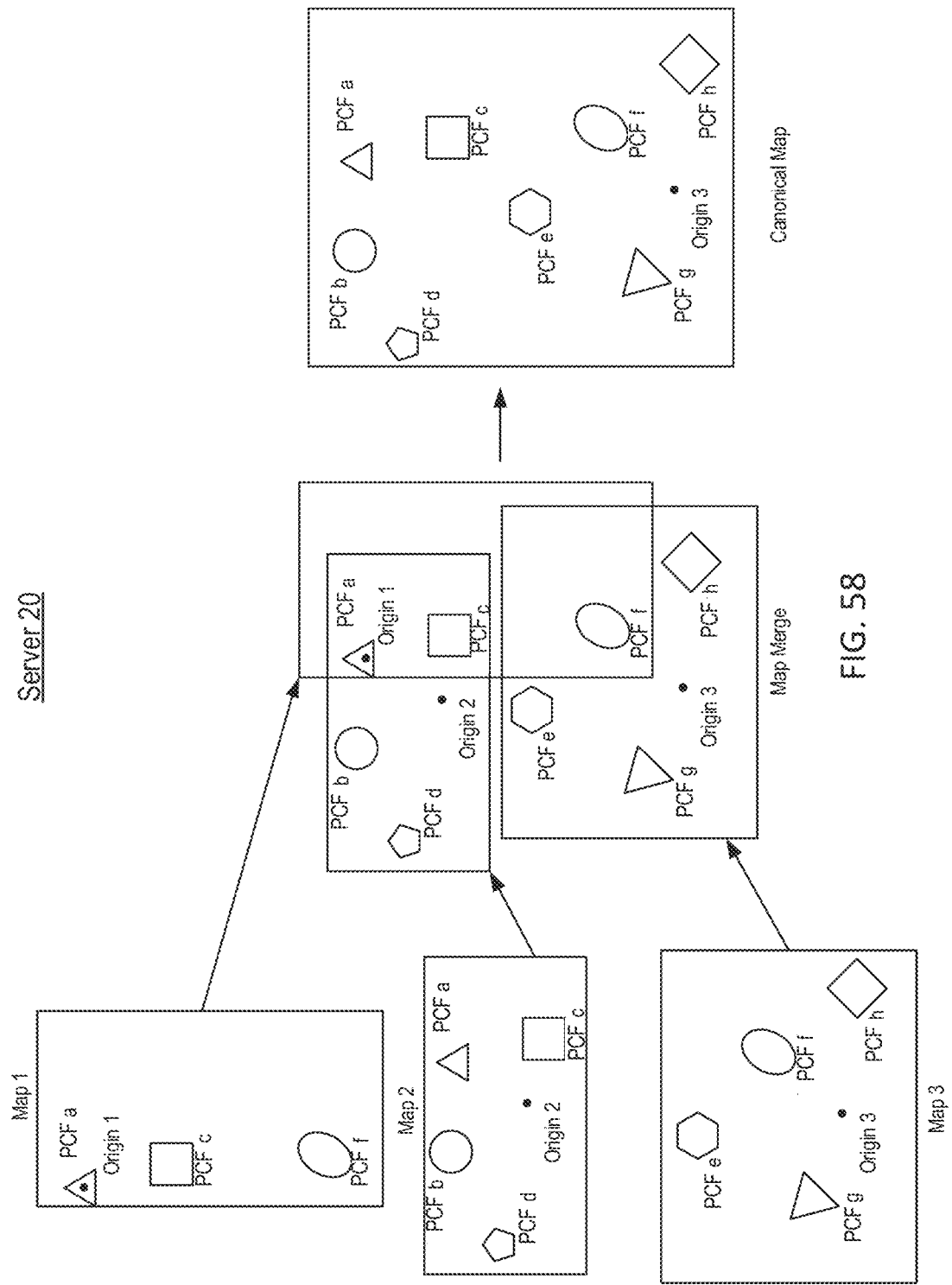

Referring to FIGS. 57 and 58, it may also be possible that more than one user interacts with the server in the same session. In the present example, the first user 14.1 and the second user 14.2 are joined by a third user 14.3 with a third XR device 12.3. Each XR device 12.1, 12.2, and 12.3 begins to generate its own map, namely Map 1, Map 2, and Map 3, respectively. As the XR devices 12.1, 12.2, and 12.3 continue to develop Maps 1, 2, and 3, the maps are incrementally uploaded to the server 20. The server 20 merges or stitches Maps 1, 2, and 3 to form a canonical map. The canonical map is then transmitted from the server 20 to each one of the XR devices 12.1, 12.2 and 12.3.

Figure 59:
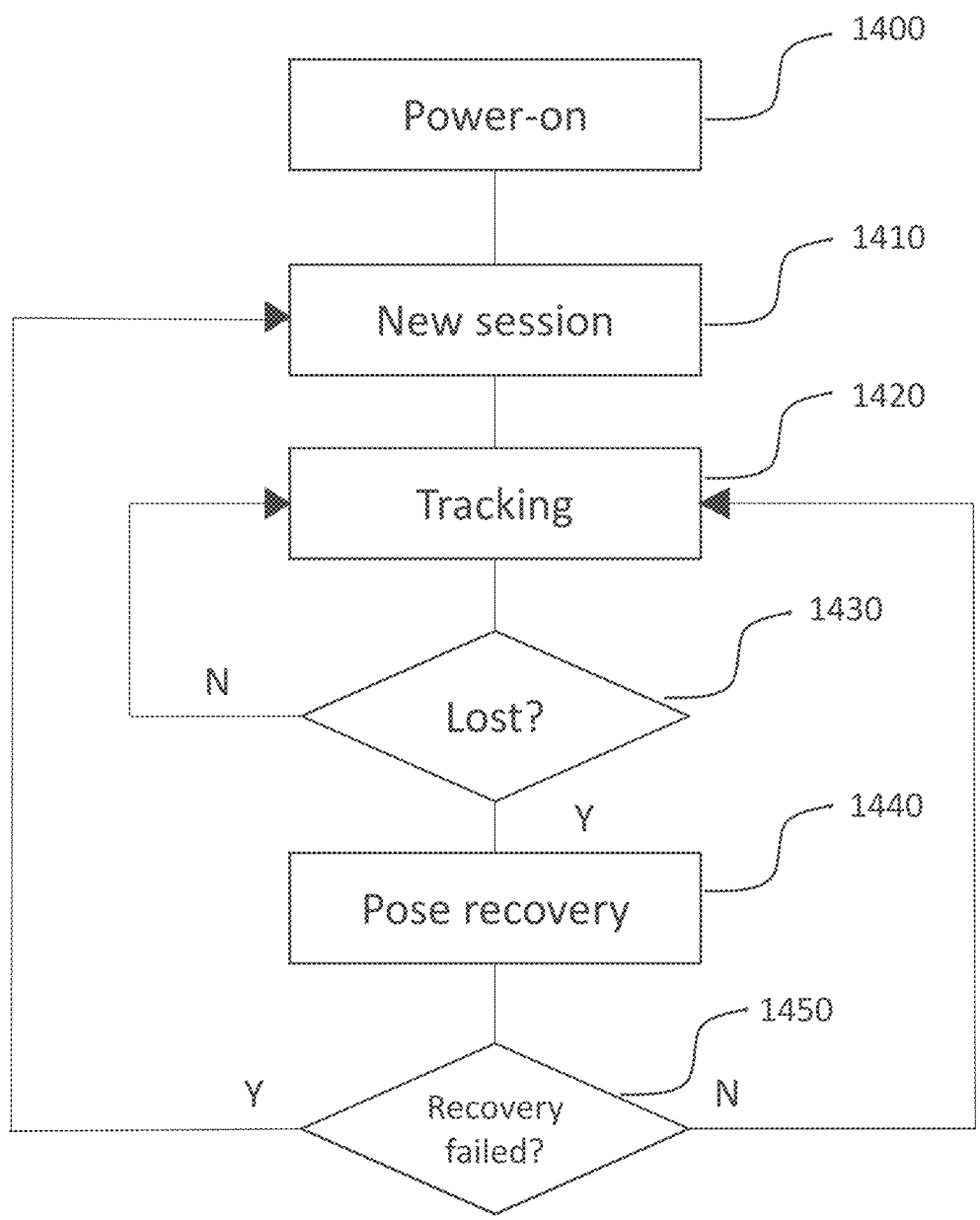
FIG. 59 is a flow chart illustrating a method of recovering and resetting a headpose, according to some embodiments.

FIG. 59 illustrates aspects of a viewing method to recover and/or reset headpose, according to some embodiments. In the illustrated example, at Act 1400, the viewing device is powered on. At Act 1410, in response to being powered on, a new session is initiated. In some embodiments, a new session may include establishing headpose. One or more capture devices on a head-mounted frame secured to a head of a user capture surfaces of an environment by first capturing images of the environment and then determining the surfaces from the images. In some embodiments, surface data may be combined with a data from a gravitational sensor to establish headpose. Other suitable methods of establishing headpose may be used.

At Act 1420, a processor of the viewing device enters a routine for tracking of headpose. The capture devices continue to capture surfaces of the environment as the user moves their head to determine an orientation of the head-mounted frame relative to the surfaces.

At Act 1430, the processor determines whether headpose has been lost. Headpose may become lost due to "edge" cases, such as too many reflective surfaces, low light, blank walls, being outdoor, etc. that may result in low feature acquisition, or because of dynamic cases such as a crowd that moves and forms part of the map. The routine at 1430 allows for a certain amount of time, for example 10 seconds, to pass to allow enough time to determine whether headpose has been lost. If headpose has not been lost, then the processor returns to 1420 and again enters tracking of headpose.

If headpose has been lost at Act 1430, the processor enters a routine at 1440 to recover headpose. If headpose is lost due to low light, then a message such as the following message is displayed to the user through a display of the viewing device:

THE SYSTEM IS DETECTING A LOW LIGHT CONDITION. PLEASE MOVE TO AN AREA WHERE THERE IS MORE LIGHT.

The system will continue to monitor whether there is sufficient light available and whether headpose can be recovered. The system may alternatively determine that low texture of surfaces is causing headpose to be lost, in which case the user is given the following prompt in the display as a suggestion to improve capturing of surfaces:

THE SYSTEM CANNOT DETECT ENOUGH SURFACES WITH FINE TEXTURES. PLEASE MOVE TO AN AREA WHERE THE SURFACES ARE LESS ROUGH IN TEXTURE AND MORE REFINED IN TEXTURE.

At Act 1450, the processor enters a routine to determine whether headpose recovery has failed. If headpose recovery has not failed (i.e., headpose recovery has succeeded), then the processor returns to Act 1420 by again entering tracking of headpose. If headpose recovery has failed, the processor returns to Act 1410 to establish a new session. As part of the new session, all cached data is invalidated, whereafter headpose is established anew. Any suitable method of head tracking may be used in combination with the process described in FIG. 59. U.S. patent application Ser. No. 16/221,065 describes head tracking and is hereby incorporated by reference in its entirety.

Remote Localization

Various embodiments may utilize remote resources to facilitate persistent and consistent cross reality experiences between individual and/or groups of users. The inventors have recognized and appreciated that the benefits of operation of an XR device with canonical maps as described herein can be achieved without downloading a set of canonical maps, such as is illustrated in FIG. 30. The benefit, for example, may be achieved by sending feature and pose information to a remote service that maintains a set of canonical maps. A device seeking to use a canonical map to position virtual content in locations specified relative to the canonical map may receive from the remote service one or more transformations between the features and the canonical maps. Those transformations may be used on the device, which maintains information about the positions of those features in the physical world, to position virtual content in locations specified with respect to canonical map or to otherwise identify locations in the physical world that are specified with respect to the canonical map.

In some embodiments, spatial information is captured by an XR device and communicated to a remote service, such as a cloud-based service, which uses the spatial information to localize the XR device to a canonical map used by applications or other components of an XR system to specify the location of virtual content with respect to the physical world. Once localized, transforms that link a tracking map maintained by the device to the canonical map can be communicated to the device. The transforms may be used, in conjunction with the tracking map, to determine a position in which to render virtual content specified with respect to the canonical map, or otherwise identify locations in the physical world that are specified with respect to the canonical map.

The inventors have realized that the data needed to be exchanged between a device and a remote localization service can be quite small relative to communicating map data, as might occur when a device communicates a tracking map to a remote service and receives from that service a set of canonical maps for device-based localization). In some embodiments, performing localization functions on cloud resources requires only small amount of information to be transmitted from the device to the remote service. It is not a requirement, for example, that a full tracking map be communicated to the remote service to perform localization. In some embodiments, features and pose information, such as might be stored in connection with a persistent pose, as described above, might be transmitted to the remote server. In embodiments in which features are represented by descriptors, as described above, the information uploaded may be even smaller.

The results returned to the device from the localization service may be one or more transformations that relate the uploaded features to portions of a matching canonical map. Those transformations may be used within the XR system, in conjunction with its tracking map, for identifying locations of virtual content or otherwise identifying locations in the physical world. In embodiments in which persistent spatial information, such as PCFs as described above, are used to specify locations with respect to a canonical map, the localization service may download to the device transformations between the features and one or more PCFs after a successful localization.

As a result, network bandwidth consumed by communications between an XR device and a remote service for performing localization may be low. The system may therefore support frequent localization, enabling each device interacting with the system to quickly obtain information for positioning virtual content or performing other location-based functions. As a device moves within the physical environment, it may repeat requests for updated localization information. Additionally, a device may frequently obtain updates to the localization information, such as when the canonical maps change, such as through merging or stitching of additional tracking maps to expand the map or increase their accuracy.

Further, uploading features and downloading transformations can enhance privacy in an XR system that shares map information among multiple users by increasing the difficulty of obtaining maps by spoofing. An unauthorized user, for example, may be thwarted from obtaining a map from the system by sending a fake request for a canonical map representing a portion of the physical world in which that unauthorized user is not located. An unauthorized user would be unlikely to have access to the features in the region of the physical world for which it is requesting map information if not physically present in that region. In embodiments in which feature information is formatted as feature descriptions, the difficulty in spoofing feature information in a request for map information would be compounded. Further, when the system returns a transformation intended to be applied to a tracking map of a device operating in the region about which location information is requested, the information returned by the system is likely to be of little or no use to an imposter.

According to one embodiment, a localization service is implemented as a cloud based micro-service. In some examples, implementing a cloud-based localization service can help save device compute resources and may enable computations required for localization to be performed with very low latency. Those operations can be supported by nearly infinite compute power or other computing resources available by provisioning additional cloud resources, ensuring scalability of the XR system to support numerous devices. In one example, many canonical maps can be maintained in memory for nearly instant access, or alternatively stored in high availability devices reducing system latency.

Further, performing localization for multiple devices in a cloud service may enable refinements to the process. Localization telemetry and statistics can provide information on which canonical maps to have in active memory and/or high availability storage. Statistics for multiple devices may be used, for example, to identify most frequently accessed canonical maps.

Additional accuracy may also be achieved as a result of processing in a cloud environment or other remote environment with substantial processing resources relative to a remote device. For example, localization can be made on higher density canonical maps in the cloud relative to processing performed on local devices. Maps may be stored in the cloud, for example, with more PCFs or a greater density of feature descriptors per PCF, increasing the accuracy of a match between a set of features from a device and a canonical map.

Figure 61:
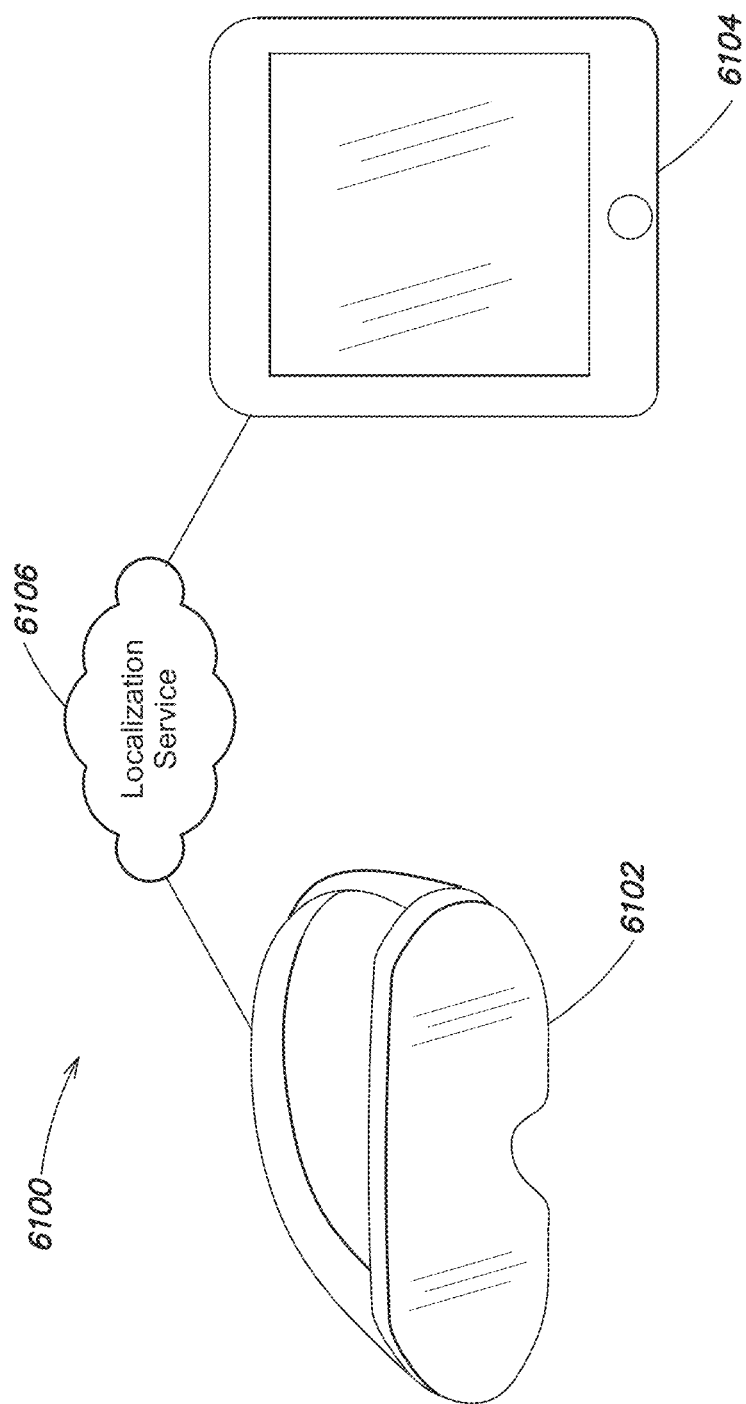
FIG. 61 is a schematic diagram of an example XR system in which any of multiple devices may access a localization service, according to some embodiments.

FIG. 61 is a schematic diagram of an XR system 6100. The user devices that display cross reality content during user sessions can come in a variety of forms. For example, a user device can be a wearable XR device (e.g., 6102) or a handheld mobile device (e.g., 6104). As discussed above, these devices can be configured with software, such as applications or other components, and/or hardwired to generate local position information (e.g., a tracking map) that can be used to render virtual content on their respective displays.

Virtual content positioning information may be specified with respect to global location information, which may be formatted as a canonical map containing one or more PCFs, for example. According to some embodiments, for example the embodiment shown in FIG. 61, the system 6100 is configured with cloud-based services that support the functioning and display of the virtual content on the user device.

In one example, localization functions are provided as a cloud-based service 6106, which may be a micro-service. Cloud-based service 6106 may be implemented on any of multiple computing devices, from which computing resources may be allocated to one or more services executing in the cloud. Those computing devices may be interconnected with each other and accessibly to devices, such as a wearable XR device 6102 and hand-held device 6104. Such connections may be provided over one or more networks.

In some embodiments, the cloud-based service 6106 is configured to accept descriptor information from respective user devices and "localize" the device to a matching canonical map or maps. For example, the cloud-based localization service matches descriptor information received to descriptor information for respective canonical map(s). The canonical maps may be created using techniques as described above that create canonical maps by merging or stitching maps provided by one or more devices that have image sensors or other sensors that acquire information about a physical world. However, it is not a requirement that the canonical maps be created by the devices that access them, as such maps may be created by a map developer, for example, who may publish the maps by making them available to localization service 6106.

According to some embodiments, the cloud service handles canonical map identification, and may include operations to filter a repository of canonical maps to a set of potential matches. Filtering may be performed as illustrated in FIG. 29, or by using any subset of the filter criteria and other filter criteria instead of or in addition to the filter criteria shown in FIG. 29. In one embodiment, geographic data can be used to limit a search for matching canonical map to maps representing areas proximate to the device requesting localization. For example, area attributes such as Wi-Fi signal data, Wi-Fi fingerprint information, GPS data, and/or other device location information can be used as a coarse filter on stored canonical maps, and thereby limit analysis of descriptors to canonical maps known or likely to be in proximity to the user device. Similarly, location history of each device may be maintained by the cloud service such that canonical maps in the vicinity of the device's last location are preferentially searched. In some examples, filtering can include the functions discussed above with respect to FIGS. 31B, 32, 33, and 34.

Figure 62:
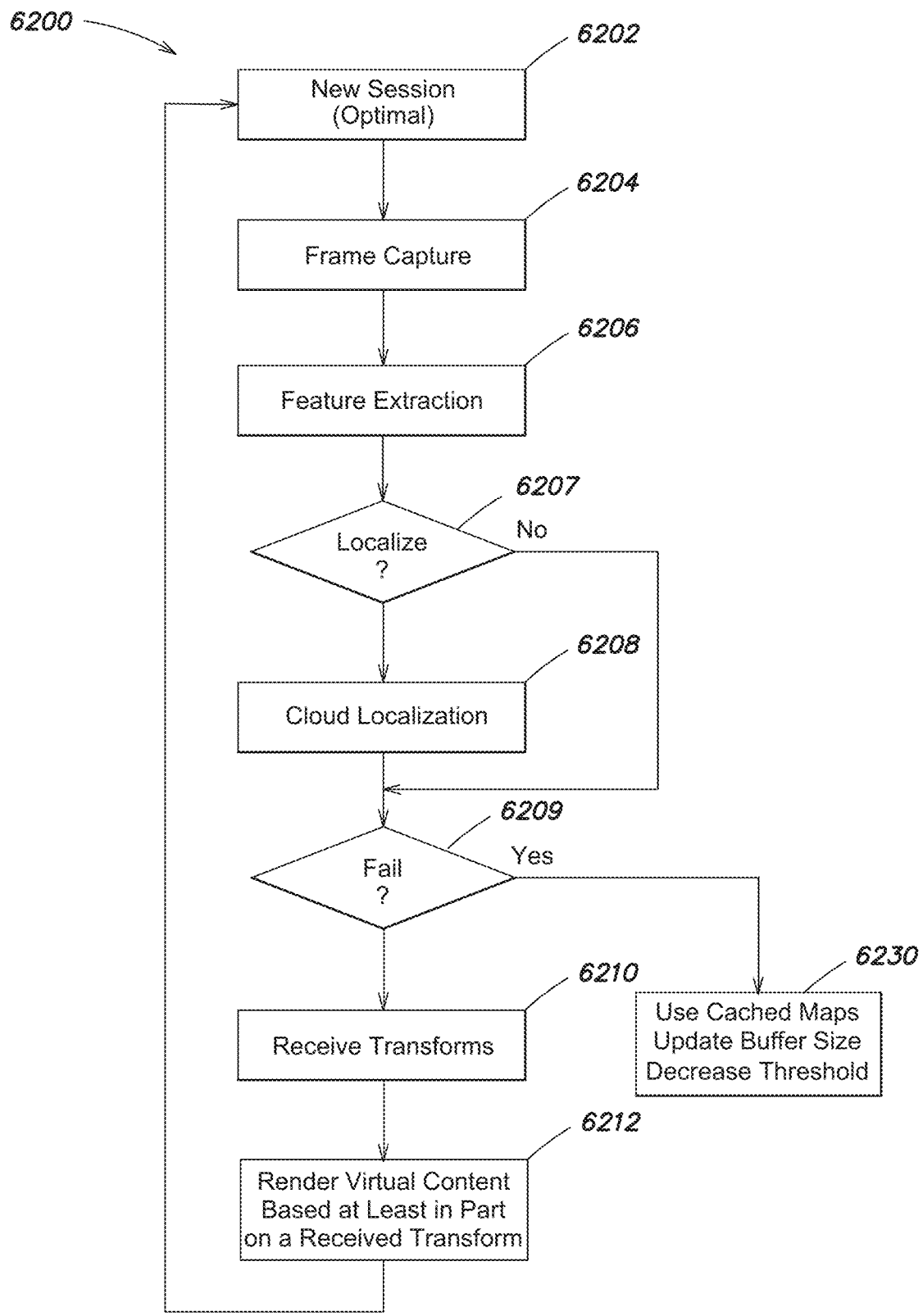
FIG. 62 is an example process flow for operation of a portable device as part of an XR system that provides cloud-based localization, according to some embodiments.

FIG. 62 is an example process flow that can be executed by a device to use a cloud-based service to localize the device's position with canonical map(s) and receive transform information specifying one or more transformations between the device local coordinate system and the coordinate system of a canonical map. Various embodiments and examples may describe the one or more transforms as specifying transforms from a first coordinate frame to a second coordinate frame. Other embodiments include transforms from the second coordinate frame to the first coordinate frame. In yet other embodiments, the transforms enable transition from one coordinate frame to another, the resulting coordinate frames depend only on the desired coordinate frame output (including, for example, the coordinate frame in which to display content). In yet further embodiments, the coordinate system transforms may enable determination of a first coordinate frame from the second coordinate frame and the second coordinate frame from the first coordinate frame.

According to some embodiments, information reflecting a transform for each persistent pose defined with respect to the canonical map can be communicated to device.

According to one embodiment, process 6200 can begin at 6202 with a new session. Starting new session on the device may initiate capture of image information to build a tracking map for the device. Additionally, the device may send a message, registering with a server of a localization service, prompting the server to create a session for that device.

In some embodiments, starting a new session on a device optionally may include sending adjustment data from the device to the localization service. The localization service returns to the device one or more transforms computed based on the set of features and associated poses. If the poses of the features are adjusted based on device-specific information before computation of the transformation and/or the transformations are adjusted based on device-specific information after computation of the transformation, rather than perform those computations on the device, the device specific information might be sent to the localization service, such that the localization service may apply the adjustments. As a specific example, sending device-specific adjustment information may include capturing calibration data for sensors and/or displays. The calibration data may be used, for example, to adjust the locations of feature points relative to a measured location. Alternatively or additionally, the calibration data may be used to adjust the locations at which the display is commanded to render virtual content so as to appear accurately positioned for that particular device. This calibration data may be derived, for example, from multiple images of the same scene taken with sensors on the device. The locations of features detected in those images may be expressed as a function of sensor location, such that multiple images yield a set of equations that may be solved for the sensor location. The computed sensor location may be compared to a nominal position, and the calibration data may be derived from any differences. In some embodiments, intrinsic information about the construction of the device may also enable calibration data to be computed for the display, in some embodiments.

In embodiments in which calibration data is generated for the sensors and/or display, the calibration data may be applied at any point in the measurement or display process. In some embodiments, the calibration data may be sent to the localization server, which may store the calibration data in a data structure established for each device that has registered with the localization server and is therefore in a session with the server. The localization server may apply the calibration data to any transformations computed as part of a localization process for the device supplying that calibration data. The computational burden of using the calibration data for greater accuracy of sensed and/or displayed information is thus borne by the calibration service, providing a further mechanism to reduce processing burden on the devices.

Once the new session is established, process 6200 may continue at 6204 with capture of new frames of the device's environment. Each frame can be processed to generate descriptors (including for example, DSF values discussed above) for the captured frame at 6206. These values may be computed using some or all of the techniques described above, including techniques as discussed above with respect to FIGS. 14, 22 and 23. As discussed, the descriptors may be computed as a mapping of the feature points or, in some embodiments mapping of a patch of an image around a feature point, to a descriptor. The descriptor may have a value that enables efficient matching between newly acquired frames/images and stored maps. Moreover, the number of features extracted from an image may be limited to a maximum number of features points per image, such as 200 feature points per image. The feature points may be selected to represent interest points, as described above. Accordingly, acts 6204 and 6206 may be performed as part of a device process of forming a tracking map or otherwise periodically collecting images of the physical world around the device, or may be, but need not be, separately performed for localization.

Feature extraction at 6206 may include appending pose information to the extracted features at 6206. The pose information may be a pose in the device's local coordinate system. In some embodiments, the pose may be relative to a reference point in the tracking map, such as a persistent pose, as discussed above. Alternatively or additionally, the pose may be relative to the origin of a tracking map of the device. Such an embodiment may enable the localization service as described herein to provide localization services for a wide range of devices, even if they do not utilize persistent poses. Regardless, pose information may be appended to each feature or each set of features, such that the localization service may use the pose information for computing a transformation that can be returned to the device upon matching the features to features in a stored map.

The process 6200 may continue to decision block 6207 where a decision is made whether to request localization. One or more criteria may be applied to determine whether to request localization. The criteria may include passage of time, such that a device may request localization after some threshold amount of time. For example, if localization has not been attempted within a threshold amount of time, the process may continue from decision block 6207 to act 6208 where localization is requested from the cloud. That threshold amount of time may be between ten and thirty seconds, such as twenty-five seconds, for example. Alternatively or additionally, localization may be triggered by motion of a device. A device executing the process 6200 may track its motion using an IMU and/or its tracking map, and initiate localization upon detection motion exceeding a threshold distance from the location where the device last requested localization. The threshold distance may be between one and ten meters, such as between three and five meters, for example. As yet a further alternative, localization may be triggered in response to an event, such as when a device creates a new persistent pose or the current persistent pose for the device changes, as described above.

In some embodiments, decision block 6207 may be implemented such that the thresholds for triggering localization may be established dynamically. For example, in environments in which features are largely uniform such that there may be a low confidence in matching a set of extracted features to features of a stored map, localization may be requested more frequently to increase the chances that at least one attempt at localization will succeed. In such a scenario, the thresholds applied at decision block 6207 may be decreased. Similarly, in an environment in which there are relatively few features, the thresholds applied at decision block 6207 may be decreased so as to increase the frequency of localization attempts.

Regardless of how the localization is triggered, when triggered, the process 6200 may proceed to act 6208 where the device sends a request to the localization service, including data used by the localization service to perform localization. In some embodiments, data from multiple image frames may be provided for a localization attempt. The localization service, for example, may not deem localization successful unless features in multiple image frames yield consistent localization results. In some embodiments, process 6200 may include saving feature descriptors and appended pose information into a buffer. The buffer may, for example, be a circular buffer, storing sets of features extracted from the most recently captured frames. Accordingly, the localization request may be sent with a number of sets of features accumulated in the buffer. In some settings, a buffer size is implemented to accumulate a number of sets of data that will be more likely to yield successful localization. In some embodiments, a buffer size may be set to accumulate features from two, three, four, five, six, seven, eight, nine, or ten frames, for example). Optionally, the buffer size can have a baseline setting which can be increased responsive to localization failures. In some examples, increasing the buffer size and corresponding number of sets of features transmitted reduces the likelihood that subsequent localization functions fail to return a result.

Regardless of how the buffer size is set, the device may transfer the contents of the buffer to the localization service as part of a localization request. Other information may be transmitted in conjunction with the feature points and appended pose information. For example, in some embodiments, geographic information may be transmitted. The geographic information may include, for example, GPS coordinates or a wireless signature associated with the devices tracking map or current persistent pose.

In response to the request sent at 6208, a cloud localization service may analyze the feature descriptors to localize the device into a canonical map or other persistent map maintained by the service. For example, the descriptors are matched to a set of features in a map to which the device is localized. The cloud-based localization service may perform localization as described above with respect to device-based localization (e.g., can rely on any of the functions discussed above for localization including, map ranking, map filtering, location estimation, filtered map selection, examples in FIGS. 44-46, and/or discussed with respect to a localization module, PCF and/or PP identification and matching etc.). However, instead of communicating identified canonical maps to a device (e.g., in device localization), the cloud-based localization service may proceed to generate transforms based on the relative orientation of feature sets sent from the device and the matching features of the canonical maps. The localization service may return these transforms to the device, which may be received at block 6210.

In some embodiments, the canonical maps maintained by the localization service may employ PCFs, as described above. In such embodiments, the feature points of the canonical maps that match the feature points sent from the device may have positions specified with respect to one or more PCFs. Accordingly, the localization service may identify one or more canonical maps and may compute a transformation between the coordinate frame represented in the poses sent with the request for localization and the one or more PCFs. In some embodiments, identification of the one or more canonical maps is assisted by filtering potential maps based on geographic data for a respective device. For example, once filtered to a candidate set (e.g., by GPS coordinate, among other options) the candidate set of canonical maps can be analyzed in detail to determine matching feature points or PCFs as described above.

The data returned to the requesting device at act 6210 may be formatted as a table of persistent pose transforms. The table can be accompanied by one or more canonical map identifiers, indicating the canonical maps to which the device was localized by the localization service. However, it should be appreciated that the localization information may be formatted in other ways, including as a list of transforms, with associated PCF and/or canonical map identifiers.

Regardless of how the transforms are formatted, at act 6212 the device may use these transforms to compute the location at which to render virtual content for which a location has been specified by an application or other component of the XR system relative to any of the PCFs. This information may alternatively or additionally be used on the device to perform any location-based operation in which a location is specified based on the PCFs.

In some scenarios, the localization service may be unable to match features sent from a device to any stored canonical map or may not be able to match a sufficient number of the sets of features communicated with the request for the localization service to deem a successful localization occurred. In such a scenario, rather than returning transformations to the device as described above in connection with act 6210, the localization service may indicate to the device that localization failed. In such a scenario, the process 6200 may branch at decision block 6209 to act 6230, where the device may take one or more actions for failure processing. These actions may include increasing the size of the buffer holding feature sets sent for localization. For example, if the localization service does not deem a successful localization unless three sets of features match, the buffer size may be increased from five to six, increasing the chances that three of the transmitted sets of features can be matched to a canonical map maintained by the localization service.

Alternatively or additionally, failure processing may include adjusting an operating parameter of the device to trigger more frequent localization attempts. The threshold time between localization attempts and/or the threshold distance may be decreased, for example. As another example, the number of feature points in each set of features may be increased. A match between a set of features and features stored within a canonical map may be deemed to occur when a sufficient number of features in the set sent from the device match features of the map. Increasing the number of features sent may increase the chances of a match. As a specific example, the initial feature set size may be 50, which may be increased to 100, 150, and then 200, on each successive localization failure. Upon successful match, the set size may then be returned to its initial value.

Failure processing may also include obtaining localization information other than from the localization service. According to some embodiments, the user device can be configured to cache canonical maps. Cached maps permit devices to access and display content where the cloud is unavailable. For example, cached canonical maps permit device based localization in the event of communication failure or other unavailability.

According to various embodiments, FIG. 62 describes a high-level flow for a device initiating cloud-based localization. In other embodiments, various ones or more of the illustrated steps can be combined, omitted, or invoke other processes to accomplish localization and ultimately visualization of virtual content in a view of a respective device.

Further, it should be appreciated that, though the process 6200 shows the device determining whether to initiate localization at decision block 6207, the trigger for initiating localization may come from outside the device, including from the localization service. The localization service, for example, may maintain information about each of the devices that is in a session with it. That information, for example, may include an identifier of a canonical map to which each device most recently localized. The localization service, or other components of the XR system, may update canonical maps, including using techniques as described above in connection with FIG. 26. When a canonical map is updated, the localization service may send a notification to each device that most recently localized to that map. That notification may serve as a trigger for the device to request localization and/or may include updated transformations, recomputed using the most recently sent sets of features from the device.

Figure 63A:
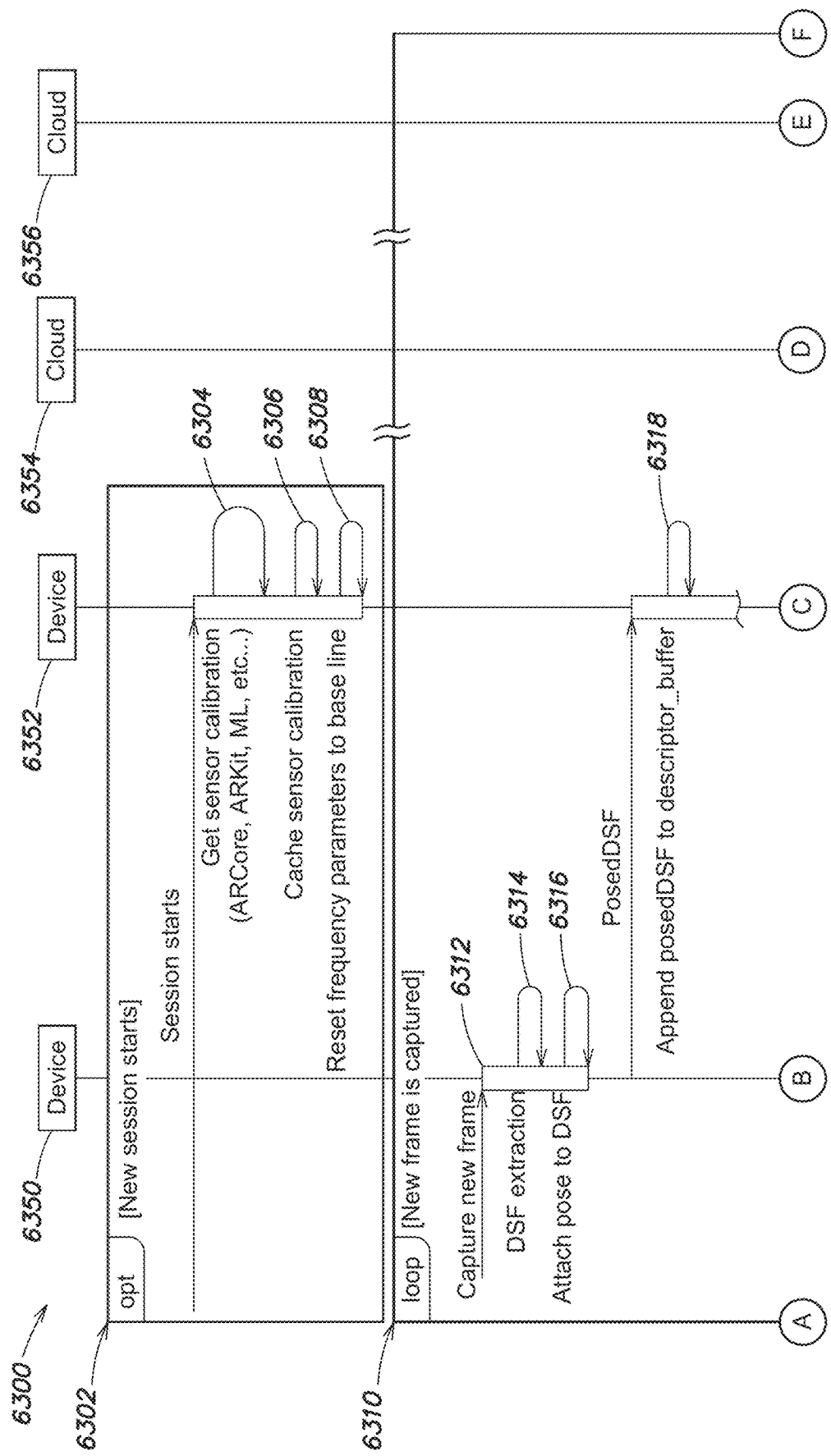
FIGS. 63A, B, and C are an example process flow for cloud-based localization, according to some embodiments.

FIGS. 63A, B, and C are an example process flow showing operations and communication between a device and cloud services. Shown at blocks 6350, 6352 6354, and 6456 are example architecture and separation between components participating in the cloud-based localization process. For example, the modules, components, and/or software that are configured to handle perception on the user device are shown at 6350 (e.g., 660, FIG. 6A). Device functionality for persisted world operations is shown at 6352 (including, for example, as described above and with respect to persisted world module (e.g., 662, FIG. 6A)). In other embodiments, the separation between 6350 and 6352 is not needed and the communication shown can be between processes executing on the device.

Similarly, shown at block 6354 is a cloud process configured to handle functionality associated with passable world/passable world modeling (e.g., 802, 812, FIG. 26). Shown at block 6356 is a cloud process configured to handle functionality associated with localizing a device, based on information sent from a device, to one or more maps of a repository of stored canonical maps.

In the illustrated embodiment, process 6300 begins at 6302 when a new session starts. At 6304 sensor calibration data is obtained. The calibration data obtained can be dependent on the device represented at 6350 (e.g., number of cameras, sensors, positioning devices, etc.). Once the sensor calibration is obtained for the device, the calibrations can be cached at 6306. If device operation resulted in a change in frequency parameters (e.g., collection frequency, sampling frequency, matching frequency, among other options) the frequency parameters are reset to baseline at 6308.

Once the new session functions are complete (e.g., calibration, steps 6302-6306) process 6300 can continue with capture of a new frame 6312. Features and their corresponding descriptors are extracted from the frame at 6314. In some examples, descriptors can comprise DSF's, as discussed above. According to some embodiments, the descriptors can have spatial information attached to them to facilitate subsequent processing (e.g., transform generation). Pose information (e.g., information, specified relative to the device's tracking map for locating the features in the physical world as discussed above) generated on the device can be appended to the extracted descriptors at 6316.

At 6318, the descriptor and pose information is added to a buffer. New frame capture and addition to the buffer shown in steps 6312-6318 is executed in a loop until a buffer size threshold is exceeded at 6319. Responsive to a determination that the buffer size has been met, a localization request is communicated from the device to the cloud at 6320. According to some embodiments, the request can be handled by a passable world service instantiated in the cloud (e.g., 6354). In further embodiments, functional operations for identifying candidate canonical maps can be segregated from operations for actual matching (e.g., shown as blocks 6354 and 6356). In one embodiment, a cloud service for map filtering and/or map ranking can be executed at 6354 and process the received localization request from 6320. According to one embodiment, the map ranking operations are configured to determine a set of candidate maps at 6322 that are likely to include a device's location.

In one example, the map ranking function includes operations to identify candidate canonical maps based on geographic attributes or other location data (e.g., observed or inferred location information). For example, other location data can include Wi-Fi signatures or GPS information.

According to other embodiments, location data can be captured during a cross reality session with the device and user. Process 6300 can include additional operations to populate a location for a given device and/or session (not shown). For example, the location data may be stored as device area attribute values and the attribute values used to select candidate canonical maps proximate to the device's location.

Any one or more of the location options can be used to filter sets of canonical maps to those likely to represent an area including the location of a user device. In some embodiments, the canonical maps may cover relatively large regions of the physical world. The canonical maps may be segmented into areas such that selection of a map may entail selection of a map area. A map area, for example may be on the order of tens of meters squared. Thus, the filtered set of canonical maps may be a set of areas of the maps.

According to some embodiments, a localization snapshot can be built from the candidate canonical maps, posed features, and sensor calibration data. For example, an array of candidate canonical maps, posed features, and sensor calibration information can be sent with a request to determine specific matching canonical maps. Matching to a canonical map can be executed based on descriptors received from a device and stored PCF data associated with the canonical maps.

In some embodiments, a set of features from the device is compared to sets of features stored as part of the canonical map. The comparison may be based on the feature descriptors and/or pose. For example, a candidate set of features of a canonical map may be selected based on the number of features in the candidate set that have descriptors similar enough to the descriptors of the feature set from the device that they could be the same feature. The candidate set, for example, may be features derived from an image frame used in forming the canonical map.

In some embodiments, if the number of similar features exceeds a threshold, further processing may be performed on the candidate set of features. Further processing may determine the degree to which the set of posed features from the device can be aligned with the features of the candidate set. The set of features from the canonical map, like the features from the device, may be posed.

In some embodiments, features are formatted as a highly dimensional embedding (e.g., DSF, etc.) and may be compared using a nearest neighbor search. In one example, the system is configured (e.g., by executing process 6200 and/or 6300) to find the top two nearest neighbors using Euclidian distance, and may execute a ratio test. If the closest neighbor is much closer than the second closest neighbor, the system considers the closest neighbor to be a match. "Much closer" in this context may be determined, for example, by the ratio of Euclidean distance relative to the second nearest neighbor is more than a threshold times the Euclidean distance relative to the nearest neighbor. Once a feature from the device is considered to be a "match" to a feature in canonical map, the system may be configured to use the pose of the matching features to compute a relative transformation. The transformation developed from the pose information may be used to indicate the transformation required to localize the device to the canonical map.

The number of inliers may serve as an indication of the quality of the match. For example, in the case of DSF matching, the number of inliers reflects the number of features that were matched between received descriptor information and stored/canonical maps. In further embodiments, inliers may be determined in this embodiment by counting the number of features in each set that "match."

An indication of the quality of a match may alternatively or additionally be determined in other ways. In some embodiments, for example, when a transformation is computed to localize a map from a device, which may contain multiple features, to a canonical map, based on relative pose of matching features, statistics of the transformation computed for each of multiple matching features may serve as quality indication. A large variance, for example, may indicate a poor quality of match. Alternatively or additionally, the system may compute, for a determined transformation, a mean error between features with matching descriptors. The mean error may be computed for the transformation, reflecting the degree of positional mismatch. A mean squared error is a specific example of an error metric. Regardless of the specific error metric, if the error is below a threshold, the transformation may be determined to be usable for the features received from the device, and the computed transformation is used for localizing the device. Alternatively or additionally, the number of inliers may also be used in determining whether there is a map that matches a device's positional information and/or descriptors received from a device.

As noted above, in some embodiments, a device may send multiple sets of features for localization. Localization may be deemed successful when at least a threshold number of sets of features match, with an error below a threshold, and/or a number of inliers above a threshold, a set of features from the canonical map. That threshold number, for example, may be three sets of features. However, it should be appreciated that the threshold used for determining whether a sufficient number of sets of features have suitable values may be determined empirically or in other suitable ways. Likewise, other thresholds or parameters of the matching process, such as degree of similarity between feature descriptors to be deemed matching, the number of inliers for selection of a candidate set of features, and/or the magnitude of the mismatch error, may similarly be determined empirically or in other suitable ways.

Figure 63B:
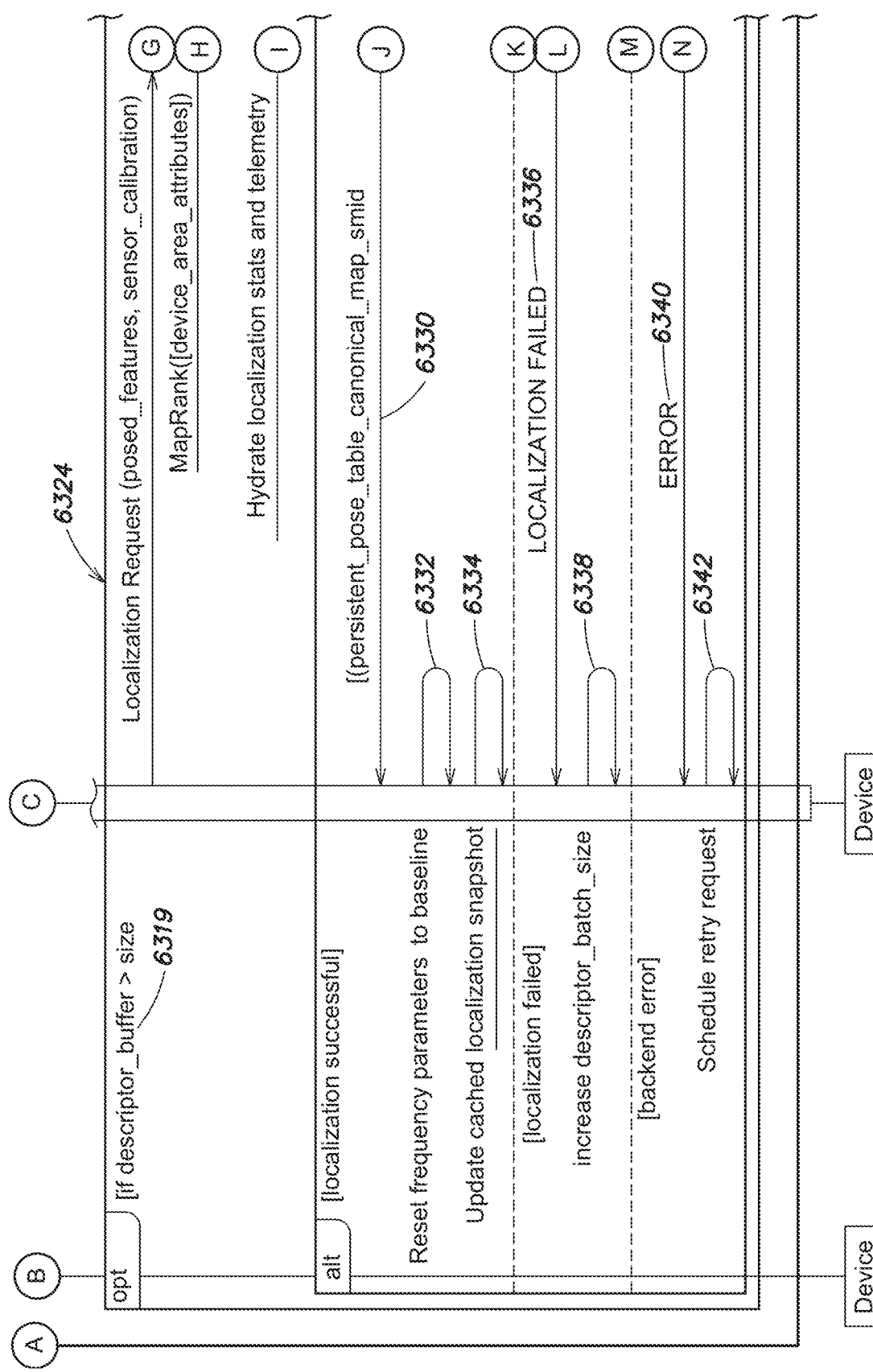
Figure 63C:
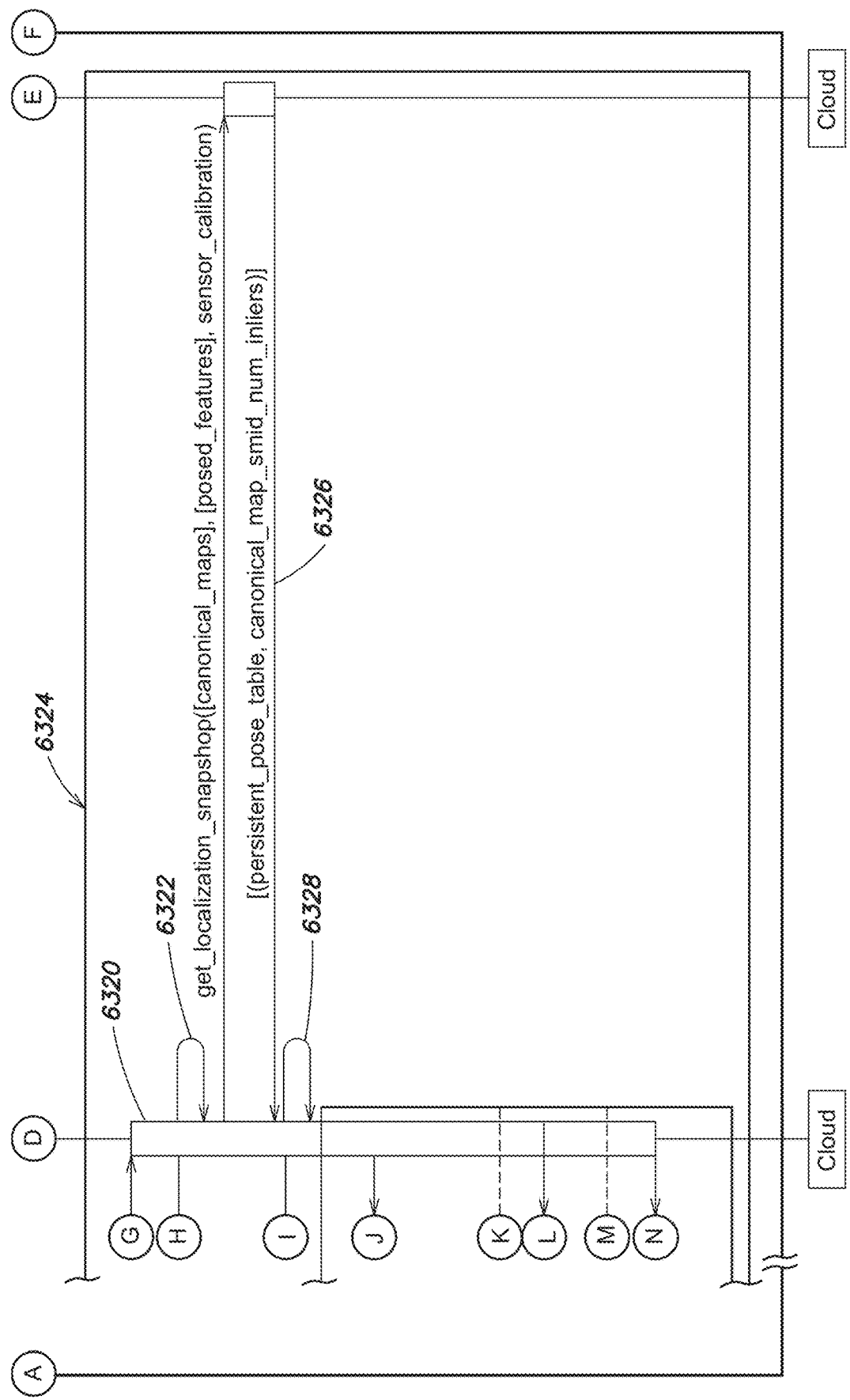

Once a match is determined, a set of persistent map features associated with the matched canonical map or maps is identified. In embodiments in which the matching is based on areas of maps, the persistent map features may be the map features in the matching areas. The persistent map features may be persistent poses or PCFs as described above. In the example of FIG. 63, the persistent map features are persistent poses.

Regardless of the format of the persistent map features, each persistent map feature may have a predetermined orientation relative to the canonical map in which it is a part. This relative orientation may be applied to the transformation computed to align the set of features from the device with the set of features from the canonical map to determine a transformation between the set of features from the device and the persistent map feature. Any adjustments, such as might be derived from calibration data, may then be applied to this computed transformation. The resulting transformation may be the transformation between the local coordinate frame of the device and the persistent map feature. This computation may be performed for each persistent map feature of a matching map area, and the results may be stored in a table, denoted as the persistent_pose_table in 6326.

In one example, block 6326 returns a table of persistent pose transforms, canonical map identifiers, and number of inliers. According to some embodiments, the canonical map ID is an identifier for uniquely identifying a canonical map and a version of the canonical map (or area of a map, in embodiments in which localization is based on map areas).

In various embodiments, the computed localization data can be used to populate localization statistics and telemetry maintained by the localization service at 6328. This information may be stored for each device, and may be updated for each localization attempt, and may be cleared when the device's session ends. For example, which maps were matched by a device can be used to refine map ranking operations. For example, maps covering the same area to which the device previously matched may be prioritized in the ranking. Likewise, maps covering adjacent areas may be give higher priority over more remote areas. Further, the adjacent maps might be prioritized based on a detected trajectory of the device over time, with map areas in the direction of motion being given higher priority over other map areas. The localization service may use this information, for example, upon a subsequent localization request from the device to limit the maps or map areas searched for candidate sets of features in the stored canonical maps. If a match, with low error metrics and/or a large number or percentage of inliers, is identified in this limited area, processing of maps outside the area may be avoided.

Process 6300 can continue with communication of information from the cloud (e.g., 6354) to the user device (e.g., 6352). According to one embodiment, a persistent pose table and canonical map identifiers are communicated to the user device at 6330. In one example, the persistent pose table can be constructed of elements including at least a string identifying a persistent pose ID and a transform linking the device's tracking map and the persistent pose. In embodiments in which the persistent map features are PCFs the table may, instead, indicate transformations to the PCFs of the matching maps.

If localization fails at 6336, process 6300 continues by adjusting parameters that may increase the amount of data sent from a device to the localization service to increases the chances that localization will succeed. Failure, for example, may be indicated when no sets of features in the canonical map can be found with more than a threshold number of similar descriptors or when the error metric associated with all transformed sets of candidate features is above a threshold. As an example of a parameter that may be adjusted, the size constraint for the descriptor buffer may be increased (of 6319). For example, where the descriptor buffer size is five, localization failure can trigger an increase to at least six sets of features, extracted from at least six image frames. In some embodiments, process 6300 can include a descriptor buffer increment value. In one example, the increment value can be used to control the rate of increase in the buffer size, for example, responsive to localization failures. Other parameters, such as parameters controlling the rate of localization requests, may be changed upon a failure to find matching canonical maps.

In some embodiments, execution of 6300 can generate an error condition at 6340, which includes execution where the localization request fails to work, rather than return a no match result. An error, for example, may occur as a result of a network error making the storage holding a database of canonical maps unavailable to a server executing the localization service or a received request for localization services containing incorrectly formatted information. In the event of an error condition, in this example, the process 6300 schedules a retry of the request at 6342.

When a localization request is successful, any parameters adjusted in response to a failure may be reset. At 6332, process 6300 can continue with an operation to reset frequency parameters to any default or baseline. In some embodiments 6332 is executed regardless of any changes thus ensuring baseline frequency is always established.

The received information can be used by the device at 6334 to update a cache localization snapshot. According to various embodiments, the respective transforms, canonical maps identifiers, and other localization data can be stored by the device and used to relate locations specified with respect to the canonical maps, or persistent map features of them such as persistent poses or PCFs to locations determined by the device with respect to its local coordinate frame, such as might be determined from its tracking map.

Various embodiments of processes for localization in the cloud can implement any one or more of the preceding steps and be based on the preceding architecture. Other embodiments may combine various ones or more of the preceding steps, execute steps simultaneously, in parallel, or in another order.

According to some embodiments, localization services in the cloud in the context of cross reality experiences can include additional functionality. For example, canonical map caching may be executed to resolve issues with connectivity. In some embodiments, the device may periodically download and cache canonical maps to which it has localized. If the localization services in the cloud are unavailable, the device may run localizations itself (e.g., as discussed above—including with respect to FIG. 26). In other embodiments, the transformations returned from localization requests can be chained together and applied in subsequent sessions. For example, a device may cache a train of transformations and use the sequence of transformations to establish localization.

Various embodiments of the system can use the results of localization operations to update transformation information. For example, the localization service and/or a device can be configured to maintain state information on a tracking map to canonical map transformations. The received transformations can be averaged over time. According to one embodiment, the averaging operations can be limited to occur after a threshold number of localizations are successful (e.g., three, four, five, or more times). In further embodiments, other state information can be tracked in the cloud, for example, by a passable world module. In one example, state information can include a device identifier, tracking map ID, canonical map reference (e.g., version and ID), and the canonical map to tracking map transform. In some examples, the state information can be used by the system to continuously update and get more accurate canonical map to tracking map transforms with every execution of the cloud-based localization functions.

Additional enhancements to cloud-based localization can include communicating to devices outliers in the sets of features that did not match features in the canonical maps. The device may use this information, for example, to improve its tracking map, such as by removing the outliers from the sets of features used to build its tracking map. Alternatively or additionally, the information from the localization service may enable the device to limit bundle adjustments for its tracking map to computing adjustments based on inlier features or to otherwise impose constraints on the bundle adjustment process.

According to another embodiment, various sub-processes or additional operations can be used in conjunction and/or as alternatives to the processes and/or steps discussed for cloud-based localization. For example, candidate map identification may include accessing canonical maps based on area identifiers and/or area attributes stored with respective maps.

Dense Map Merge

Described herein are methods and apparatus for efficiently generating and sharing 3D reconstructions that enable use of an XR system in large scale environments and with immersive multi-user experiences, even with user devices of limited computational resources. 3D reconstructions may include 3D representations of physical environments, which may be used for XR functions such as visual occlusion, physics-based interactions with virtual objects, and/or environmental reasoning.

The inventors have recognized and appreciated methods and apparatus that build, store, and share large scale 3D reconstruction. These techniques may operate in conjunction with systems that enable multiple devices to share pose information through a collection of maps. The maps used to provide pose information, such as shared canonical maps described above, may be sparse maps. Sparse maps may represent the physical world based on only a subset of information about the world, such as the sets of features used in the shared canonical maps and tracking maps described above.

The sparse maps may provide a common frame of reference for both devices collecting dense information about the 3D environment and shared processing resources, processing that dense information from multiple devices into a large-scale dense representation of the 3D environment. Those shared processing resources may be implemented as a cloud service, as described above in connection with sparse map construction and localization.

For example, each device that localizes to a canonical map may obtain a set of persistent poses, providing location and orientation information (which, in some embodiments, may be formatted as PCFs as described above). The persistent poses may be related to the local coordinate frame of the device through a transformation generated through a localization process, as described above. Dense information about the 3D environment collected on each of multiple devices may be posed such that it has information associated with a location and orientation with respect to a frame of reference. As a result of transformations generated through the localization process, the poses of the dense information may be related to the shared persistent poses. This transformation may be applied on the device or in the cloud. When the posed dense information is processed in the cloud, a cloud processing component can group dense information about the same region of the 3D environment for processing together. Such a cloud processing component, referred to as a dense map merge or stitch component herein, may process the groups of dense information separately to construct multiple portions of a large-scale reconstruction of the 3D environment. In some embodiments, dense information collected on multiple devices referenced to the same persistent location in a shared sparse map may be processed together to form a portion of the large-scale dense reconstruction.

That large scale reconstruction may serve as a shared dense map. Portable devices may access the shared dense map, such that the devices can obtain dense information about the 3D environment with low delay and less processing than would otherwise be required to reconstruct that dense information from sensor data.

Pose information derived through a sparse map may also aid in managing interactions between devices and a cloud service such that each device obtains dense map information applicable to its location. In embodiments in which there are multiple sparse maps managed by a cloud service, for example, there may be multiple dense maps, each with dense information referenced to the persistent poses of one of the sparse maps. Localization of a device with respect to a sparse map, as described above, may result in identification of a dense map, corresponding to that sparse map, containing dense information applicable to the device in its current location.

In some embodiments, devices in the system may include a caching structure for efficient access to shared 3D reconstructions built on the cloud. Each device, for example, may retrieve and store an applicable dense map associated with its location, as determined through the localization process. The device may then access dense information in the shared map from local storage faster than over a network.

In some embodiments, devices may cache only portions of a shared dense map. The cached portions also may be identified based on information generated during sparse map localization. In embodiments in which dense maps contain surface information posed with respect to persistent poses in a sparse map, localization results expressed relative to a persistent pose in the shared sparse map enable selection of surface information relevant to each device. Each device, as it localizes with respect to a persistent pose from the shared sparse map, may update its cache so as to include the dense map portions referenced to the same persistent pose. In some embodiments, the device may maintain a cache to include dense map portions referenced to the same persistent pose against which localization was achieved, and optionally, neighboring persistent poses.

Devices may combine cached dense map information with local 3D reconstruction built on the device to provide efficient and accurate access to dense map information. As the devices operate, they may locally perform 3D reconstructions. These locally generated 3D reconstructions may be sent to the cloud for merging or stitching into the shared dense maps. In some scenarios, a device may select to use its locally generated 3D reconstruction rather than a shared dense map. For example, a device may use its locally generated 3D representation if it has a local dense representation of a portion of the 3D environment for which it has no cached portion of the shared dense map, the device may use its local dense representation. In scenarios in which the device has updated its local dense representation for which it has cached a portion of the shared dense map after that portion of the shared dense map was updated in the cloud, the device may use its local dense representation.

In some embodiments, devices may update a 3D environment representation downloaded from the cloud with a subset of historical depth and pose information accumulated while the 3D representation is being built on the cloud, as well as new pose and depth information. Consequently, each device can have a shared but also tailor-made 3D reconstruction reflecting up-to-date real-world geometries. In some embodiments, devices may include a filesystem that stores the downloaded shared reconstruction and the local reconstruction in a way that avoids duplicated environment mapping when entering a previously explored space. Once the environment representation from the cloud is updated to reflect historical depth and pose information accumulated by a device, that accumulated information may be deleted from the device. Alternatively or additionally, once the device detects changes in a region of the environment represented by a portion of the downloaded representation, that portion of the downloaded representation may be updated.

In some embodiments, devices may have low computational overhead based on the way the 3D reconstruction is built on the cloud. The 3D representations may be divided into smaller volumes such that individual devices can first download from the cloud volumes visible to the devices, which provides real time performance on device, minimizes the network bandwidth needed when fetching shared reconstruction, and makes it scalable for very large environments. Alternatively or additionally, in some embodiments, surface information in a 3D reconstruction may be formatted to facilitate separate processing of information on surfaces that are likely to be persistent. As a result, low computer resources, such as computation and network bandwidth, may be used for persistent surfaces.

These techniques may be applied to shared reconstructions and/or local reconstructions. For example, identifiable objects, such as planar surface geometries, may be assigned persistent unique identifiers across multiple sessions such that virtual content can be associated with and persisted by the objects with persistent unique identifiers.

In some embodiments, each device may build its own local reconstruction using pose tracking and depth image information captured by the device in real time. The depth information, or other representation of surfaces in the vicinity of the device, may be posed. Initially, that information may be posed with respect to a local coordinate frame of the tracking map of the device. However, these local reconstructions may be posed relative to the persistent poses shared by devices in the system through a localization process, such as persistent coordinate frames of the canonical maps as described above. It should be appreciated that processing to transform depth information posed relative to a device coordinate frame to depth information posed relative to a shared coordinate frame may be performed on the device or on the cloud. As described above, information sufficient to compute a suitable transformation (such as a set of features posed with respect to the local coordinate frame or a tracking map of the device) is sent from the deice to the cloud in connection with using, building, or maintaining canonical sparse maps. In some embodiments, the transformation may be applied to depth information on the device. In some embodiments, the transformation may alternatively or additionally be applied in the cloud. Depth information may similarly be sent to the cloud in connection with such information such that the transformation is applied by computing resources in the cloud. Alternatively or additionally, it is also described above that a transformation may be sent to each device and applied on the device.

When the device is connected to a network, each depth image, which is or can be associated to a coordinate frame of a shared sparse map, may be uploaded to the cloud. Cloud processing can then identify depth images representing the same portions of the physical world. A high-quality 3D reconstruction can be built on the cloud, using those uploaded depth images.

As a specific example, the dense map may be built in connection with a sparse map merge or stitch function as described above. Depth images captured on each device may be posed relative to persistent coordinate frames in the tracking maps of the respective devices. When the tracking maps are sent to the cloud for merging or stitching into a merged or stitched sparse map, the depth images may similarly be sent. Sparse map merge or stitch processing may identify that devices have tracking maps with persistent coordinate frames representing overlapping portions of the 3D environment. When multiple devices have overlapping persistent coordinate frames, the persistent coordinate frames may be combined and still stay persistent afterwards. A portion of the 3D reconstruction may be built from the depth information, from multiple devices, that is associated to any of the persistent coordinate frames that are combined.

A 3D representation in the 3D reconstruction can be divided into smaller volumes, and these smaller volumes may be fetched by devices. The shared and/or local reconstruction can be periodically stored to the device's filesystem so that when a device enters an identified space, the corresponding data can be loaded from the device's filesystem to the device's memory that may be accessed by XR applications.

In some embodiments, when a device enters an explored space and its filesystem has a local reconstruction of the space, the device can fetch 3D representations of the space from the filesystem. Additionally or alternatively, when the space has been reconstructed on the cloud, the device can directly fetch 3D representations of the space from the shared reconstruction on the cloud, or from its filesystem if the 3D representations of the space have been previously fetched and stored, without building 3D reconstruction of the space again from scratch. In some embodiments, devices may adjust downloaded 3D representations of the space using a subset of the pose and depth data accumulated after the 3D representations of the space have been built on the cloud.

Figure 64:
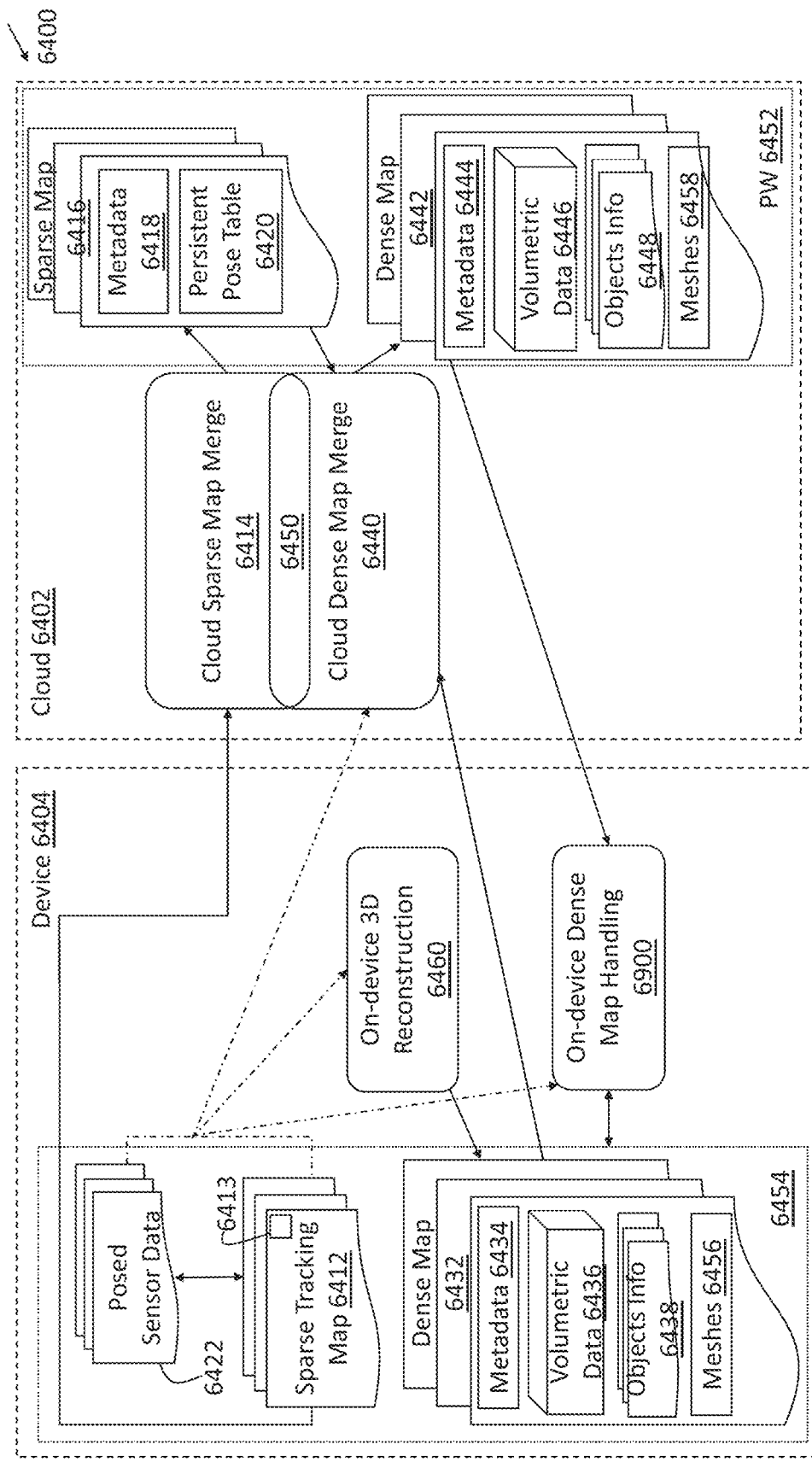
FIG. 64 is a block diagram of an XR system that provides 3D reconstruction for large scale environments, according to some embodiments.

FIG. 64 is a block diagram of an XR system 6400 that provides large scale 3D environment reconstruction, according to some embodiments. The XR system 6400 may include a cloud 6402 and one or more devices 6404 that may communicate with the cloud 6402 through a network. In this example, a single device is illustrated for simplicity, but multiple devices with like components (e.g., the components shown in FIG. 64) may interact with the cloud.

The device 6404 may include an on-device 3D reconstruction component 6460 (e.g., 516 in FIG. 3) configured to generate local 3D reconstruction of environments visited by the device, and an on-device dense map handling component 6900 configured to merge or stitch a downloaded shared 3D reconstruction with a local (e.g., on device) 3D reconstruction. The device 6404 may include a caching structure 6454 that may store environment information including, for example, posed sensor data 6422, sparse tracking maps 6412, and local dense maps 6432 (See FIG. 73). In some embodiments, the posed sensor data 6422 may be acquired from a depth sensor, but in other embodiments may be acquired from vision sensors or other sensors outputting data from which surfaces might be identified. Metadata may be stored in association with this environment information or may form a portion of the environment information. For example, sparse tracking map 6412 may include a persistent pose table 6413, listing persistent poses in the tracking map and unique identifiers for each persistent pose and/or other information as described above. As another example, posed sensor data 6422 may include sensor data that has associated with the data defining a pose relative to a persistent pose of the device's tracking map and a unique id of that persistent pose.

The cloud 6402 may include a cloud sparse map merge or stitch component 6414 configured to merge or stitch sparse maps, as described above. The sparse maps that are merged or stitched may include sparse tracking maps received from the devices 6404, which may be merged or stitched with each other and/or with shared sparse maps on the cloud. Cloud 6402 may also include a cloud dense map merge or stitch component 6440 configured to merge or stitch dense maps. Portions of local dense maps sent from devices 6404 may be merged or stitched with each other and/or with shared dense maps already stored on the cloud. In some embodiments, the information may include or be limited to depth images and detected planes, along with metadata, such as poses for the images and planes. Further, the information sent may be a subset of the information of this type maintained on the device. For example, only information associated with one or more persistent poses in the device's tracking map may be sent at one time.

The cloud dense map merge or stitch component 6440 may share components 6450 with the cloud sparse map merge or stitch component 6414. The cloud 6402 may include a passable world component 6452 that may store the shared sparse maps 6416 and the shared dense maps 6442.

In some embodiments, each device 6404 may build a sparse tracking map 6412 as the device moves around a physical environment. The device may maintain one or more sparse tracking maps. Each sparse tracking map 6412 may include persistent poses, identifiable by descriptors (e.g., PP ID), and a persistent pose table that indicates correspondence between the persistent poses and their descriptors. Each posed sensor data 6422 may include image data, a descriptor of a persistent pose of a sparse tracking map that is associated with the depth image, and a transformation between the persistent pose and a headpose of the device when the depth image is captured.

Local sparse tracking maps 6412 may be sent to the cloud 6402 through a network by a device 6404 for functions such as localizing the device in large scale environments, and building shared sparse maps for large scale environments. The cloud sparse map merge or stitch component 6414 may generate shared sparse maps 6416 based on one or more local sparse tracking maps 6412 sent to the cloud by one or more devices 6404. In some embodiments, the cloud sparse map merge or stitch component 6414 may include components configured to perform portions of method 3700 of FIG. 37 and/or process 6300 of FIG. 63.

In some embodiments, each shared sparse map 6416 may include metadata 6418 and persistent pose table 6420. The metadata 6418 may include a map identifier (e.g., map ID) for the shared sparse map such that the shared sparse map can be accessed by any device in the system based on the map identifier. In some embodiments, the map identifier may include a unique descriptor (e.g., a 128-bit identifier) that indicates a corresponding unique area of a 3D environment, and a version descriptor that indicates when the map was built and/or last updated. The persistent pose table 6420 may include merged or stitched persistent poses, created based on persistent poses from sparse tracking maps and identifiable by persistent pose descriptors. The persistent pose table 6420 may also include a persistent pose table that indicates correspondences between the merged or stitched persistent poses and their descriptors.

In some embodiments, each device 6404 may build a local dense map 6432 indicating surface information about portions of a physical environment. The device may maintain one or more local dense maps. The on-device 3D reconstruction component 6460 may generate local dense maps 6432 based at least in part on posed sensor data 6422 (e.g., depth maps 512 of FIG. 3) and sparse tracking maps 6412 (e.g., tracking map 700 of FIG. 7). For example, depth information associated with the same persistent coordinate frame of the tracking map may be processed together to form a 3D reconstruction of a region of the 3D environment in the vicinity of the location represented by that persistent coordinate frame. The local dense maps 6432 may include surface information, which may be represented in one or more formats. In the illustrated example the surface information is represented as volumetric data 6436 (e.g., volumetric information 662*a*), meshes 6456 (e.g., meshes 662*c*), and objects information 6438 (e.g., planes 662*d*). The dense maps may also include metadata 6434 (e.g., volumetric metadata 662*b*).

Portions of local dense maps 6432 may be sent to the cloud 6402 through a network by a device 6404 for functions such as building shared dense maps for large scale environments. The cloud dense map merge or stitch component 6440 may generate shared dense maps 6442 based on information sent to the cloud by one or more devices 6404. In some embodiments, information for the shared dense maps 6442 may be generated based on posed sensor data 6422 and local sparse maps 6412. Alternatively or additionally, shared dense maps 6442 may be generated based on portions of local dense maps 6432. Component 6440 may enable dense maps to be generated and shared in the XR system. Component 6440 may persist the 3D reconstruction on the cloud for future accesses such that no redundant 3D reconstruction is built. In some scenarios, such as when the shared dense maps 6442 are generated based on posed sensor data 6422 and local sparse maps 6412, component 6440 may relieve the devices from computationally intensive 3D reconstruction, In some embodiments, each shared dense map 6442 may include metadata 6444, volumetric data 6446, meshes 6458, and objects information 6448. The metadata 6444 may include a map identifier (e.g., map ID) for the shared dense map such that the shared dense map can be accessed by any device in the system based on the map identifier. In some embodiments, the map identifier may include a unique descriptor (e.g., a 128-bit identifier) that indicates a corresponding unique area of a physical environment. For a same unique area of a physical environment, a corresponding sparse map and a corresponding dense map may have a same unique descriptor. The map identifier may also include a version descriptor that indicates when the map was built and/or last updated.

Shared dense maps 6442 may be accessed by one or more devices 6404 in the XR system. A device 6404 may download one or more shared dense maps 6442 corresponding to its location. In embodiments in which the dense maps are segmented into smaller volumes, the devices may download information for one, or a small number of those smaller volumes. The on-device dense map handling component 6900 may receive the downloaded shared dense maps 6442. The on-device dense map handling component 6900 may update portions of the downloaded shared dense maps 6442 based at least in part on posed sensor data 6422 and sparse tracking maps 6412 that may be captured when the portions of the downloaded shared dense maps are being built on the cloud and/or after the portions have been built. The on-device dense map handling component 6900 may store the updated dense map as a new local dense map 6432. Component 6900 enables the devices 6404 to have 3D reconstruction that corresponds to real-time changes. (See FIG. 69).

FIG. 65A is a block diagram of at least a portion 6500 of the cloud sparse map merge or stitch component 6414, according to some embodiments. The at least a portion 6500 of the cloud sparse map merge or stitch component 6414 may include a persistent pose merger or stitching component 6508 configured to combine persistent poses from multiple sparse maps, for example, sparse tracking maps 6502, 6504, and 6506 as illustrated. The persistent pose merger or stitching component 6508 may provide a merged or stitched sparse map 6510 based on the sparse maps to be merged or stitched, which in this example are sparse tracking maps 6502, 6504, and 6506. In some embodiments, other types of sparse maps, such as previously stored maps may also be inputs to merge or stitch processing. Each sparse tracking map may include a device coordinate frame that is local to the device building the tracking map. The merged or stitched sparse map may include a canonical coordinate frame that is shared by the maps stored on the cloud. The merged or stitched sparse map 6510 may include a merged or stitched persistent pose table in a coordinate frame of the merged or stitched sparse map.

The portion 6500 of cloud sparse map merge or stitch component 6414 may include a sparse map localization component 6512 configured to provide localization results 6514 for one or more sparse tracking maps to a merged or stitched sparse map and/or a shared sparse map already stored on the cloud. The localization results 6514 may include transformations between coordinate frames used by individual sparse maps and the canonical coordinate frame. In some embodiments, the sparse map localization component 6520 may also provide map identifiers for the sparse tracking maps and the merged or stitched sparse map.

It should be appreciated that although the persistent pose merger or stitching component 6508 and the sparse map localization component 6512 are illustrated, the cloud sparse map merge or stitch component 6414 may include alternative and/or additional components. For example, transformations that may be used to relate depth information collected in a device's local coordinate frame to a canonical coordinate frame may be computed in other ways. For example, as described above, a transformation is provided as a result of a localization process that may be performed for the device more frequently than a tracking map is sent to the cloud for merging or stitching. The transformations generated as a result of localization against a stored map may be used to relate dense information collected on the device to a shared dense map that also has a frame of reference that can be related to that of the stored map. As another example, it should be appreciated that the processing illustrated in FIG. 65A need not be performed concurrently. For example, the persistent poses of the local tracking maps that are merged or stitched into persistent poses in the merged or stitched sparse map may be identified over time as individual tracking maps are merged or stitched into the merged or stitched sparse map.

Figure 65B:
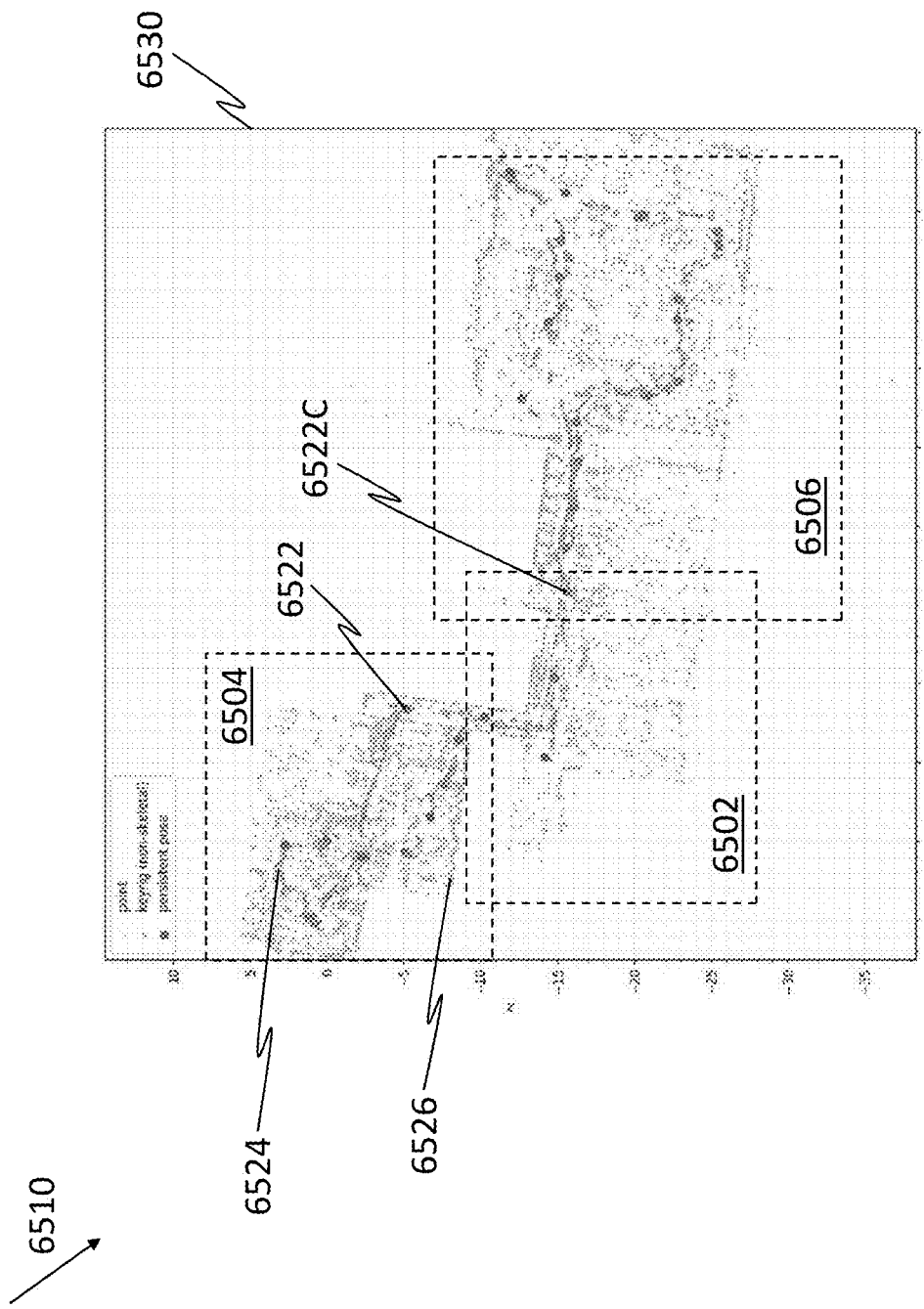
FIG. 65B is a visualization diagram illustrating some information of a merged shared sparse map provided by the cloud sparse map merge component of FIG. 65A, according to some embodiments.
Figure 65C:
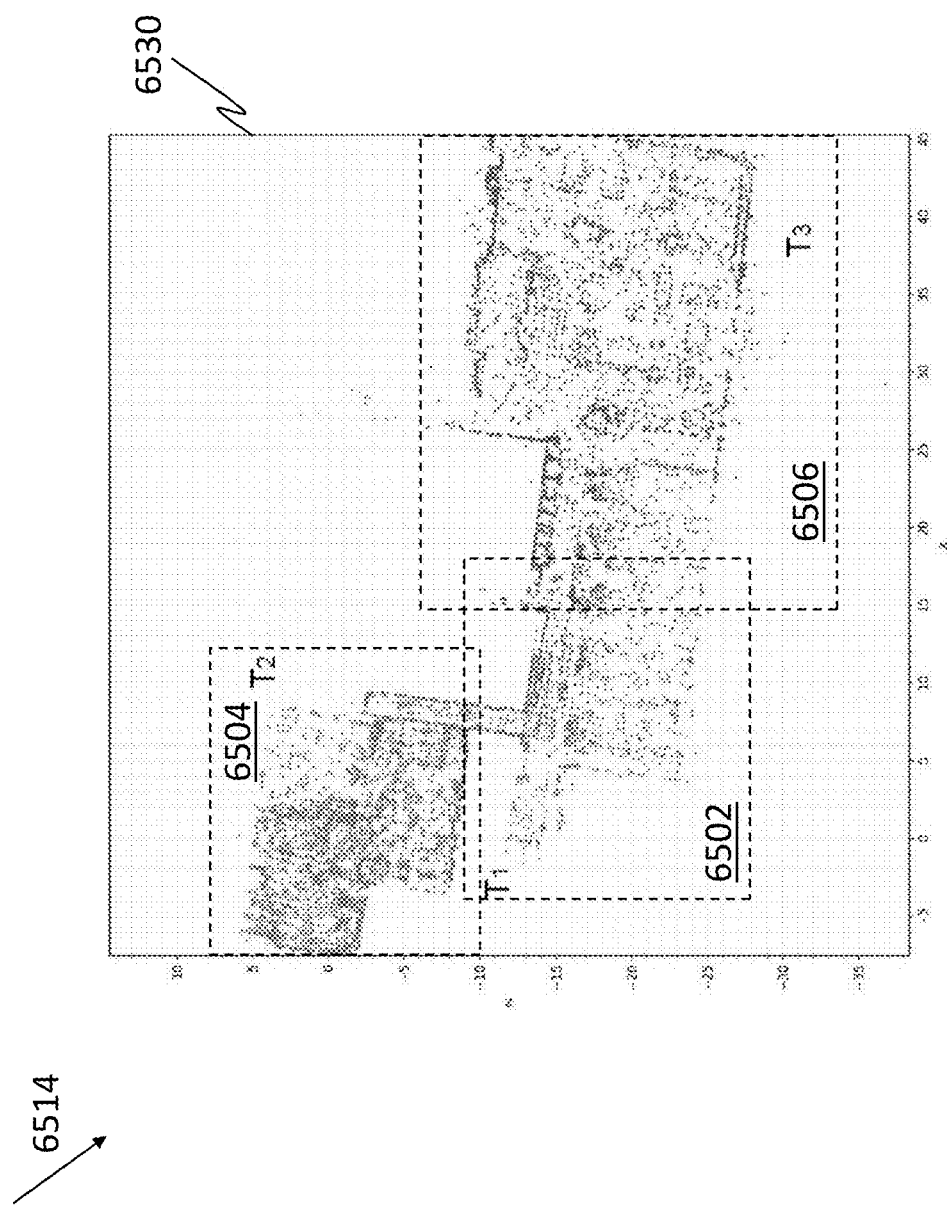
FIG. 65C is another visualization diagram illustrating some information of a merged shared sparse map of FIG. 65B, according to some embodiments.

FIG. 65B is a schematic diagram illustrating a merged or stitched sparse map 6510 provided by the persistent pose merger or stitching component 6508, according to some embodiments. FIG. 65C is another schematic diagram of the merged or stitched sparse map 6510, illustrating the localization results 6514 provided by the sparse map localization component 6414, according to some embodiments.

In the example illustrated in FIG. 65A, the persistent pose merger or stitching component 6508 may receive the three sparse tracking maps 6502, 6504, and 6506 of a physical environment 6530. The three sparse tracking maps 6502, 6504, and 6506 may be captured by one device over three different sessions, or by three devices over individual device sessions, or any suitable combination of number of devices and number of sessions. Each sparse tracking map may include persistent poses 6522, each of which may have one or more keyrigs 6524 associated with it. Each sparse tracking map may also include feature points 6526 extracted from images such as keyrigs 6524. The features may be, as described above represented as descriptors and may be posed.

Each persistent pose includes stored information, such as the features, that a device can compare to current image information to determine whether the device is in the vicinity of a location represented by the persistent pose. Multiple persistent poses that represent locations that are close together may be redundant, if a device may determine its location with respect to any of the persistent poses. The persistent pose merger or stitching component 6508 may combine the persistent poses from each sparse tracking map by, for example, removing redundant persistent pose. For example, sparse tracking map 6502 may include a persistent pose 6522C, which may also be included in sparse tracking map 6506. The persistent pose merger or stitching component 6508 may remove one of the persistent poses 6522C such that the resulting persistent pose table for the merged or stitched sparse map 6510 may include only one merged or stitched persistent pose corresponding to 6522C. The cloud sparse map merge or stitch component 6414 may provide three transformations: T1 for sparse tracking map 6502 to the merged or stitched sparse map 6510, T2 for sparse tracking map 6504 to the merged or stitched sparse map 6510, and T3 for sparse tracking map 6506 to the merged or stitched sparse map 6510.

Figure 66:
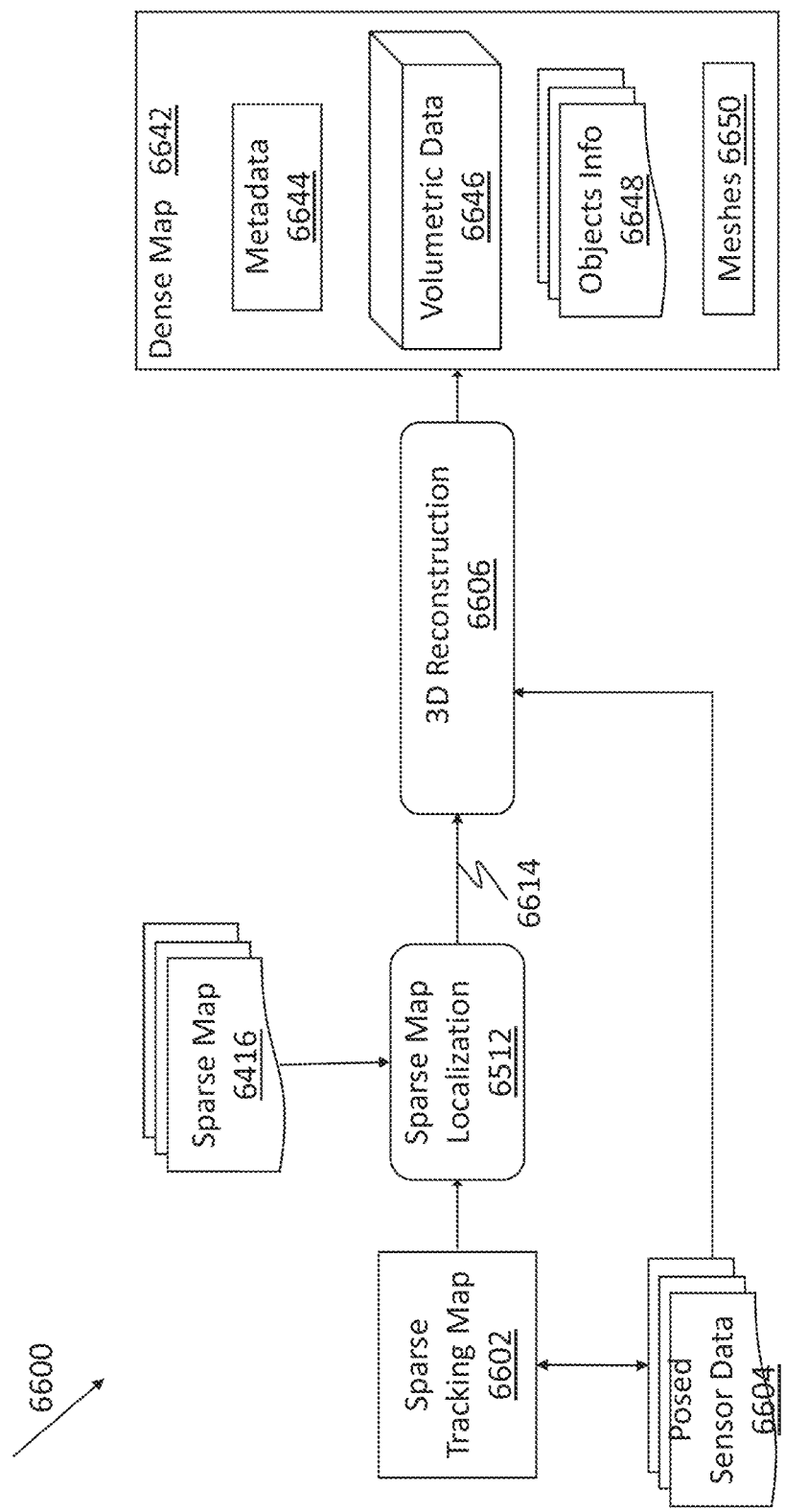
FIG. 66 is a block diagram of an example of the cloud dense map merge component of the XR system of FIG. 64, according to some embodiments.
Figure 67:
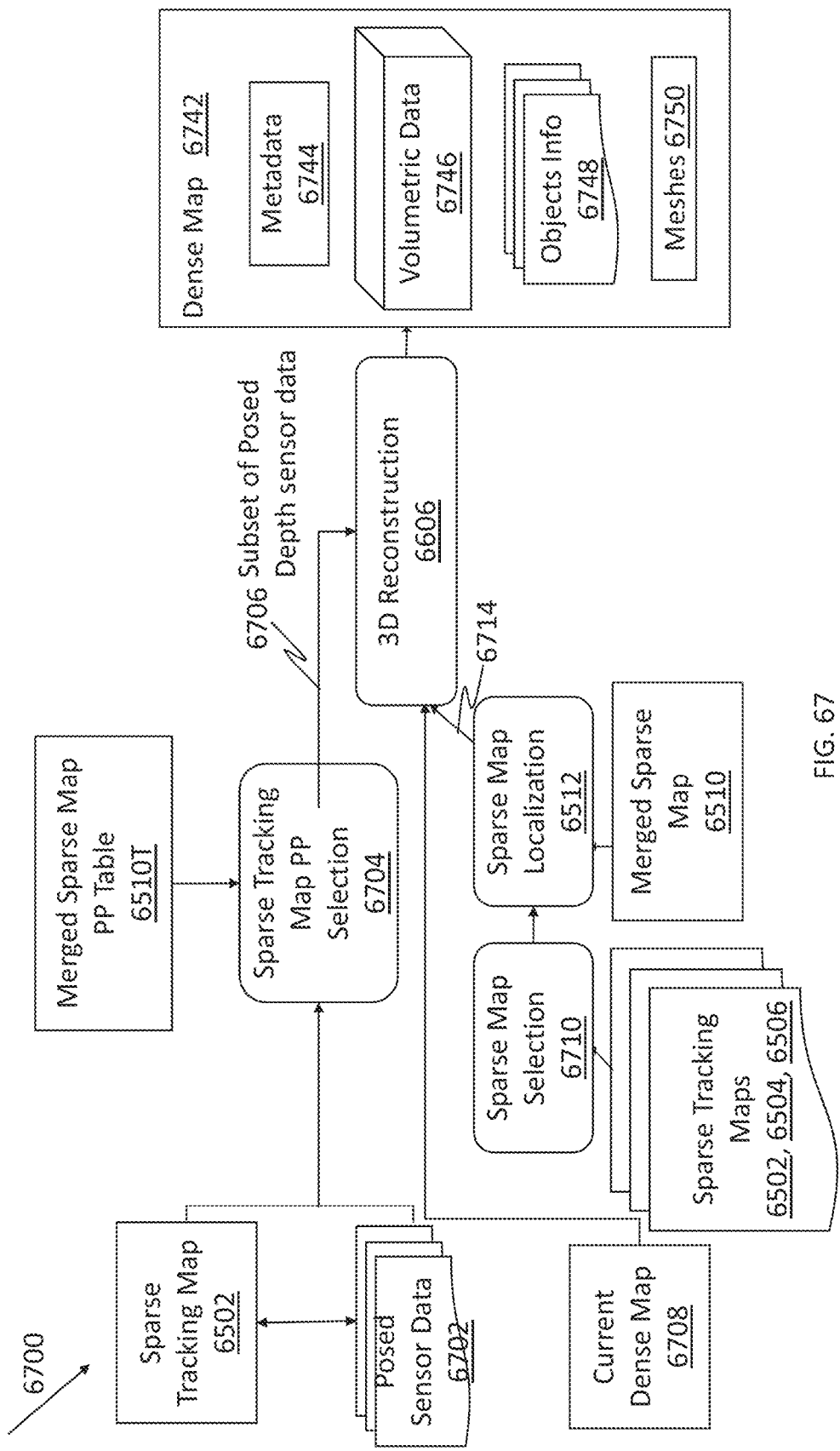
FIG. 67 is block diagram of another example of the cloud dense map merge component of the XR system of FIG. 64, according to some embodiments.

FIG. 66 and FIG. 67 are block diagrams of examples 6600 and 6700 of the cloud dense map merge or stitch component 6440. The cloud dense map merge or stitch component 6440 may receive and/or generate collections of surface information. The collections of surface information may include posed sensor captured data such as depth images and the depth images' pose. The pose may be expressed in the form of a pose relative to a persistent pose of a sparse tracking map and the identifier for the persistent pose, which in some embodiments may include the identifier of the corresponding sparse tracking map. However, as an XR system as described herein may compute and apply transformations between local and shared coordinate frames, depth information, and other surface information, may be posed with respect to other coordinate frames by applying appropriate transformations.

The cloud sparse map merge or stitch component 6414 may identify one or more shared sparse maps that overlap with the sparse tracking map, and merge or stitch the sparse tracking map with one or more shared sparse maps. For this newly generated merged or stitched shared sparse map, the cloud dense map merge or stitch component 6440 may build a corresponding shared dense map based on the merged or stitched persistent poses of the merged or stitched shared sparse map and depth images associated with those merged or stitched persistent poses. The cloud dense map merge or stitch component 6440 may convert the depth images' poses to be relative to a merged or stitched persistent pose based on a computed transformation between a device coordinate frame local to the device and the canonical coordinate frame such that each depth image may have a camera frustum in the canonical coordinate frame. Consequently, the cloud dense map merge or stitch component 6440 may use the depth images and their poses for building 3D reconstructions in the canonical coordinate frame.

A merged or stitched dense map may be constructed from surface information collected by multiple devices. That surface information may be formatted in any of multiple ways. Surface information, may be formatted as posed depth images. The depth images may provide volumetric data, which may be formatted to indicate for each of multiple voxels defining a volume whether a surface was detected in a location represented by that voxel. Alternatively or additionally, surface information may be represented as objects, such as planes or meshes. In some embodiments, a dense map merge or stitch component may process surface information received in different formats.

In the example shown in FIG. 66, surface information is provided as posed sensor data 6604, which are posed with respect to sparse tracking map 6602. All or a part of a sparse tracking map 6602 may also be provided as part of the specification of surface information. In the illustrated scenario, a cloud dense map merge or stitch component 6600 may include the sparse map localization component 6512 and a 3D reconstruction component 6606. The sparse map localization 6512 may provide localization results 6614 for a received sparse tracking map 6602 to one or more shared sparse maps 6416. The localization results 6614 and depth images 6606 posed relative to the sparse tracking map 6602 enable the pose of the depth images to be related to that of a shared sparse map 6416. A transformation to pose the depth images related to a coordinate frame of the shared sparse maps may be applied by 3D reconstruction component 6606 or by another component (not shown) prior to passing the depth images to 3D reconstruction component 6606. Regardless of where the transformation is applied, 3D reconstruction component 6606 may generate one or more shared dense maps 6642 in a coordinate frame of the shared sparse maps.

In the example shown in FIG. 67, surface information is provided in the form of posed sensor data 6702 with associated tracking maps, which may be represented as a persistent poste table for the tracking map. In some embodiments, surface information may alternatively or additionally be provided in other forms, such as depth images and/or as dense information that has already been reconstructed locally on the devices. In this example, locally generated dense information is indicated as a current dense map 6708, and may have the same format as a shared dense map 6742.

The specific processing performed to merge or stitch surface information from one or more devices may depend on the specific format of the surface information. In this example, a cloud dense map merge or stitch component 6700 may include a sparse tracking map persistent pose selection component 6704, a sparse map selection component 6710, the sparse map localization component 6512, and the 3D reconstruction component 6606.

The sparse tracking map persistent pose selection component 6704 may select a subset 6706 of the received posed depth sensor data 6702. The selection may be based on received sparse tracking map 6502 and a merged or stitched persistent pose table 6510T of the merged or stitched sparse map 6510. In some embodiments, the subset of posed sensor data 6702 is selected such that the posed sensor data of the subset is posed relative to a persistent pose (PP) in the merged or stitched sparse map PP table 6510T. These persistent poses may be, for example, persistent poses of the sparse tracking map 6502 that have been promoted to merged or stitched persisted poses of the merged or stitched sparse map 6510. Posed depth sensor data 6702 associated with PPs in the merged or stitched sparse map PP table 6510T may be selected for inclusion in subset 6706. Posed sensor data not supplying data within the subset 6706 may be deleted because the poses of those posed sensor data may not be converted to be in the canonical coordinate frame.

In embodiments in which multiple merged or stitched sparse maps are maintained, sparse map selection component 6710 may select a sparse tracking map based on the information supplied by the device for localization. The sparse map localization component 6512 may provide localization results 6714 for the selected sparse tracking map to the merged or stitched sparse map. Merged sparse map 6510 also may be provided as an input to 3D reconstruction component 6606, facilitating 3D reconstruction based on surface information that is posed relative to the merged or stitched sparse map or any other frame of reference for which a transform to or from the coordinate frame of the merged or stitched sparse map is available. The 3D reconstruction 6606 may compute one or more dense maps 6742 based on the subset 6706 of posed depth sensor data, the localization results 6714, and/or other inputs.

3D reconstruction may alternatively or additionally be based, for example, on other data about the 3D environment around one or more devices supplying input for dense map merge or stitch. For example, a current dense map 6708 from a device may be supplied to 3D reconstruction component 6606. In some embodiments, a device may supply all or parts of its current dense map 6708 that may include object information. In embodiments in which the dense map 6708 has a frame of reference relative to the local coordinate frame on the device, the device may also provide information such that its local coordinate frame may be related to the coordinate frame used for merged or stitched sparse maps 6510 shared by devices interacting with the XR system.

Figure 68:
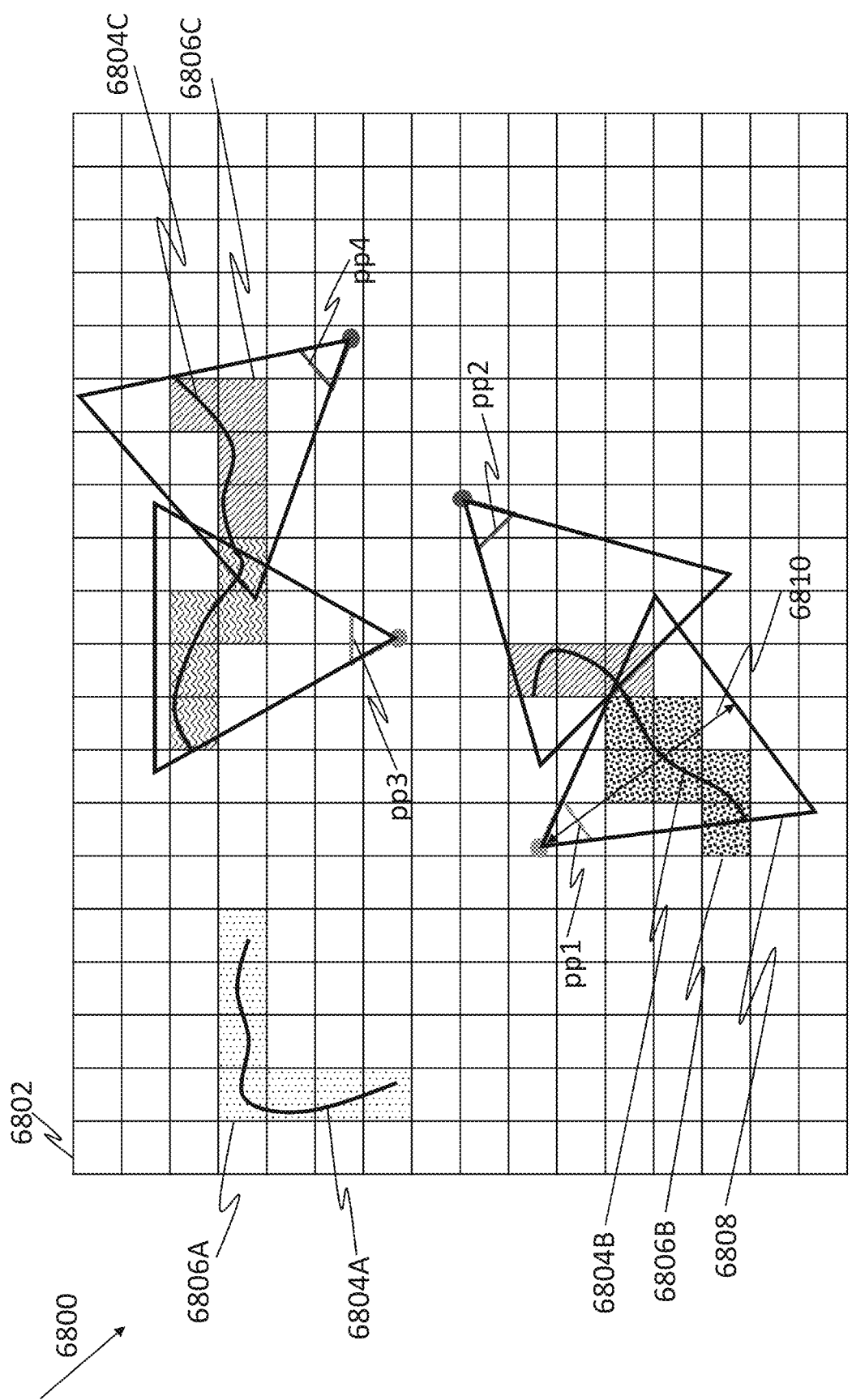
FIG. 68 is a simplified schematic diagram illustrating a merged shared dense map provided by the cloud dense map merge component of the XR system of FIG. 64, according to some embodiments.

FIG. 68 is a simplified schematic diagram illustrating a merged or stitched dense map 6800 provided by the cloud dense map merge or stitch component 6440, according to some embodiments. The merged or stitched dense map 6800 is illustrated in a voxel grid comprising voxels 6802. The voxel grid may include filled voxels that contain signed distance values to surfaces nearby, and empty voxels that contain no value because no surface is in their vicinity. In the illustration, the voxel grid is shown in two dimensions for simplicity of illustration. The voxel grid may extend in a third dimension.

In the simplified example, the merged or stitched dense map 6800 may be based on one shared dense map and three uploaded dense maps. The three uploaded dense maps may be built over three different sessions by one or more devices. Before receiving the three uploaded dense maps, the shared dense map may include a filled voxel region 6806A that represents a surface 6804A in a physical environment. The filled voxel region 6806A may be reconstructed based on previously received surface information and stored on the cloud after reconstruction.

The cloud may merge or stitch this previously reconstructed shared map with the three newly received dense maps. The cloud may receive a first dense map that includes persistent pose pp1, a second dense map that includes persistent poses pp2 and pp4, and a third dense map that includes persistent pose pp3. Information that is posed relative to a persistent pose is indicated as encompassed within a corresponding camera frustum 6808. The information posed relative to a persistent pose may extend for a distance relative to the location represented by the persistent pose, here indicated as a visibility range 6810. The 3D reconstruction component 6606 may reconstruct a voxel region 6806B that represents a surface 6804B in the physical environment, and a voxel region 6806C that represents a surface 6804C in the physical environment.

It should be appreciated that the merged or stitched dense map 6800 is built based on surface information captured at different times by one or more devices. In the illustrated example, the voxel region 6806B is built based on depth images associated with pp1 and depth images associated with pp2. In this example, pp1 and pp2 may be identified as being sufficiently close together that the depth information associated with those persistent poses may represent the same objects, and so may be fused together. For example, pp1 and pp2 may be persistent poses that are merged or stitched into a persistent pose in a merged or stitched sparse tracking map. The depth information posed relative to each of pp1 and pp2 may be transformed into the coordinate frame of pp5 such that the information received as posed relative to pp1 and pp2 is all posed relative to pp5. The 3D reconstruction component 6606 may fuse posed sensor data, individual depth images or depth information in other formats such that it may be used to generate surface information. In some embodiments, the merged or stitched depth information may then be used to compute volumetric data. In this way, a larger volume in the physical world that may be represented in the merged or stitched dense map than could be represented based on depth information from any of the devices alone. For example, planes or other objects might be identified based on the computed volumetric data.

In some embodiments, objects generated locally on devices may be matched to objects generated with the merged or stitched volumetric data. In this way, the same object may be given a same object identifier, regardless of where the processing is performed to identify that object.

In other embodiments, surface information other than depth images may alternatively or additionally be merged or stitched into a shared dense map. Surfaces may be represented in other ways, such as planes or other objects and/or as meshes. Different merging or stitching techniques may be employed for different types of surface information. Merging of planes may be performed as described below to merge or stitch planes that processing indicates likely represent the same surface, such as because of similarity of location and plane normal or to add to the merged or stitched dense map all of the planes from the individual maps being merged or stitched that are not indicated as part of the same surface. Similarly, for meshes—where processing indicates that portions of two or more meshes likely represent the same portion of a surface, those meshes may be merged or stitched into a combined mesh. Conversely, meshes with no surfaces overlapping with other meshes may be added unchanged to the merged or stitched map.

In some embodiments, merging or stitching of surface information may entail removing duplicate surface information, regardless of the format in which it is represented. For example, if a dense map from a device indicates a plane in a same location as volumetric data from another device indicates a surface, that surface may be removed from the volumetric data before processing or otherwise not added to the merged or stitched dense map. Likewise, if a mesh in one dense map is determined to likely correspond to the same surfaces as a plane or volumetric data, that plane or volumetric data may be removed or otherwise not added to the merged or stitched dense map. In some embodiments in which surface information may be represented in different formats, the surface information may be processed during the merge or stitch operation in a hierarchical fashion, with surface information at lower levels of the hierarchy not being included in a merged or stitched map where the same surfaces are represented at higher levels of the hierarchy. For example, meshes may be processed first, then planes and then volumetric data.

As can be seen in FIG. 68, the voxels have a determinable location with respect to persistent locations, which may be related to locations in a merged or stitched shared sparse map. Accordingly, portions of the merged or stitched dense map representing portions of the physical world near a device that has localized to a sparse shared map may be identified. The shared dense maps on the cloud may be accessed by devices according to their localization results provided by the sparse map localization component. A device, for example, may download volumetric data computed from merged or stitched depth information and use that merged or stitched volumetric data for computing a representation of surface in the 3D environment. A device may merge or stitch that merged or stitched volumetric data with volumetric data captured with its sensors. This may be performed in dense map handling component 6900 of FIG. 64, for example.

In embodiments, in which dense maps include planes or other objects, a device may merge or stitch the objects of the downloaded shared dense maps with objects in local dense maps instead of or in addition to merging or stitching volumetric data. The on-device dense map handling component 6900 shown in FIG. 69 may receive metadata of a merged or stitched dense map, and sparse map localization results that indicate at least one transformation from the sparse tracking map to a merged or stitched sparse map. When a sparse map management component on the device determines that the device can move to the merged or stitched sparse map, the corresponding merged or stitched dense map may be indicated as a candidate for dense map localization. Based at least in part on the received metadata, a dense map management component on the device may determine whether the device should move to the merged or stitched dense map. When the dense map management component determines not to move to the merged or stitched dense map, the device would not fetch the dense map data.

When the dense map management component determines to move to the merged or stitched dense map, the device may proceed to fetch the dense map data from the cloud. The merged or stitched dense map may be divided into smaller volumes (e.g., blocks) because the merged or stitched dense map can be potentially very large. When fetching and loading the merged or stitched dense map, the device may first fetch and load those data close to the device (e.g., data that are 100 meters away have a lower priority than data that are 5 meters away). As a user wearing the device moves around, the device may continuously fetch and load data corresponding to an area visible by the device. In some embodiments, the device may fetch some data in advance based on, for example, predicted motion of the device such that data may be ready for loading when the device arrives at locations and the latency caused by fetching data from the cloud may be reduced.

A dense map merge or stitch component of the device may update portions of the merged or stitched dense map that have been loaded with the fresh local posed sensor data. When the device receives a new merged or stitched dense map from the cloud, the device may have fresh local posed sensor data that are not part of the merged or stitched dense map because the device captures sensor data in parallel to the computations happening on the cloud. Updating portions of the merged or stitched dense map prevents the device from losing this fresh data.

A dense map merge or stitch component of the device may also continuously update and correct persistent poses in the sparse tracking map based on the fresh local posed sensor data. A 3D reconstruction generated using posed sensor data tied to the updated persistent poses may similarly be updated based on any updates to the persistent poses.

Figure 69:
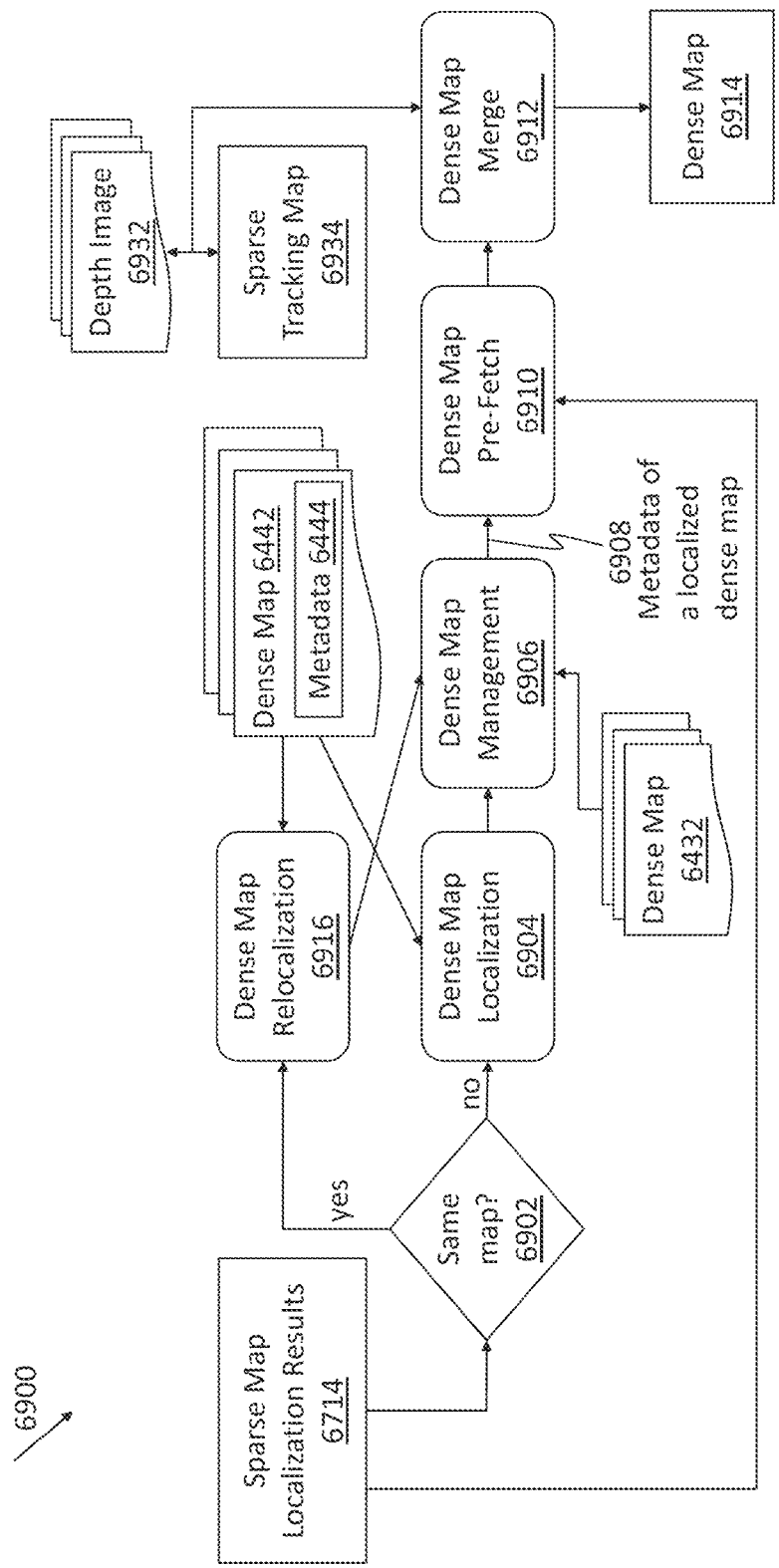
FIG. 69 is a block diagram of an example of the on-device dense map handling component of the XR system of FIG. 64, according to some embodiments.

FIG. 69 is a block diagram of an example of the on-device dense map handling component 6900, according to some embodiments. The on-device dense map handling component 6900 may include dense map localization component 6904, dense map relocalization component 6916, dense map management component 6906, dense map pre-fetch component 6910, and dense map merge or stitch component 6912. In some embodiments, the on-device dense map handling component 6900 may determine whether to enable the dense map localization component 6904 or the dense map relocalization component 6916 based on the sparse map localization results 6714.

The dense map localization component 6904 may be enabled when the sparse map localization results 6714 indicates that the device localizes to a new shared sparse map. The dense map localization component 6904 may select a shared dense map against which the device is to localize. A criterion in selection of a shared map may be overlap in coverage of the selected dense map and a shared sparse map to which the device has localized, where overlap may be determined by persistent data in common between the two maps. Other criteria may also be applied if there is more than one shared dense map with overlapping coverage, such as quality of the dense map that the device currently localizes to, and timestamp of the current dense map. Quality of a dense map may indicate the number of mesh blocks in the map. Timestamp of a dense map may indicate the time when the last depth image is fused into the dense map and/or the time when the map is created on the cloud.

A device may attempt to get new localization results periodically, for example, when a device moves 10 meters from its previous localized position so as to reduce errors accumulated in the device's trajectory. As a sparse map may cover a larger area, the sparse map localization results 6714 may often indicate that the device localizes to the same shared sparse map. The dense map relocalization component 6906 may be enabled to update the transformations between the device's sparse tracking map and the shared sparse map such that misalignments between the maps are reduced.

Figure 70:
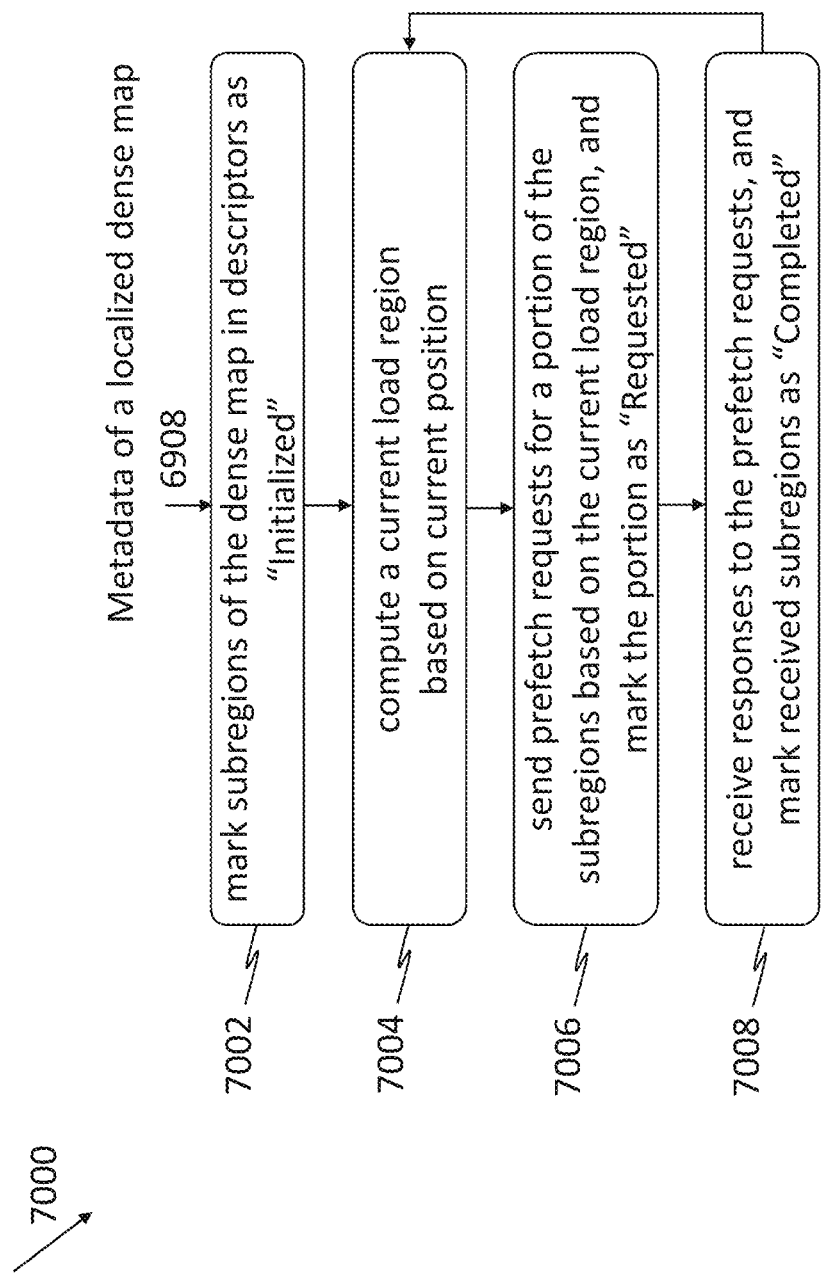
FIG. 70 is a flow chart illustrating a method of on-device dense map pre-fetch for getting dense map data from the cloud-stored merged shared dense map to device, according to some embodiments.
Figure 71:
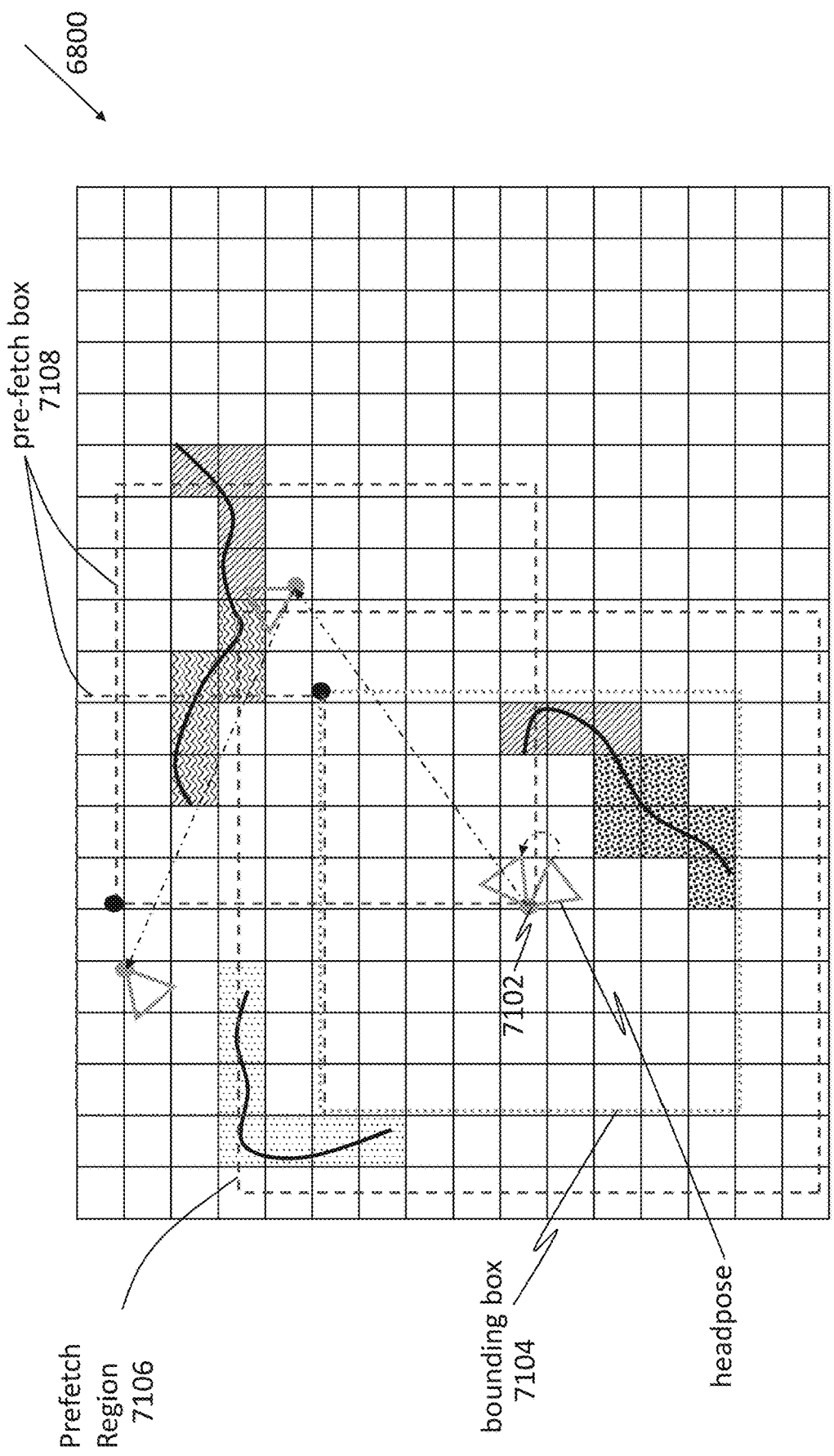
FIG. 71 is a simplified schematic diagram illustrating obtaining the cloud-stored merged shared dense map of FIG. 68 using the method of FIG. 70, according to some embodiments.

Based on metadata 6908 of the localized shared dense map, the dense map pre-fetch component 6910 may proceed to fetch portions of the localized shared dense map by, for example, performing a method 7000 illustrated in FIG. 70. FIG. 71 is a simplified schematic diagram illustrating obtaining the merged or stitched dense map 6800 using the method 7000, according to some embodiments.

The method 7000 may begin when a dense map management component determines that a device can localize to a shared dense map from the cloud, which may trigger dense map pre-fetching.

The method 7000 may include computing (act 7004) a current prefetch region 7106. Based on the device's current position (e.g., position 7102). Some or all of the prefetch data may be a load region (e.g., bounding box 7104), loaded into active RAM on the device. In some embodiments, for example, a device may maintain data in active RAM corresponding to a load region that is smaller than the prefetch region. All or a portion of the prefetch data may be stored in other memory, such as a file system implemented in solid state non-volatile memory. The load region may be changed as the device's position 7102 changes.

In some embodiments, the prefetch data may be downloaded incrementally. The method 7000 may include sending (act 7006) prefetch requests for a portion of the subregions for which the device does not already store data, with preference being given for data in the current load region. For example, subregions within the bounding box 7104 may be first requested. The requested portion of the subregions may be marked as "requested."

The method 7000 may include receiving (act 7008) responses to the prefetch requests. The responses may include data of the shared dense map such as volumetric data, meshes, and objects information. The received prefetch region may be marked as "completed." The prefetch region that are marked as "completed" may be loaded to the device's memory for XR functions such as occlusion, physics-based interactions, and environmental reasoning.

After certain criteria are met, such as the mesh blocks in the load region are all downloaded and loaded to RAM, a dense map management component may localize to this previously determined shared dense map. Thereafter, based on current location and detected motion of the device, a dense map pre-fetch component may continue to fetch and load data from the cloud to device RAM. As a result, the method 7000 may iterate the acts 7004, 7006, and 7008 based on, for example, the device's current location and any detected motion of the device. In some embodiments, after fetching all subregions in the bounding box 7104, the method 7000 may compute a new current prefetch region by, for example, enlarging the bounding box 7104 (e.g., the enlarged bounding box and/or shifting the bounding box 7104 (e.g., pre-fetch box 7108).

Figure 72:
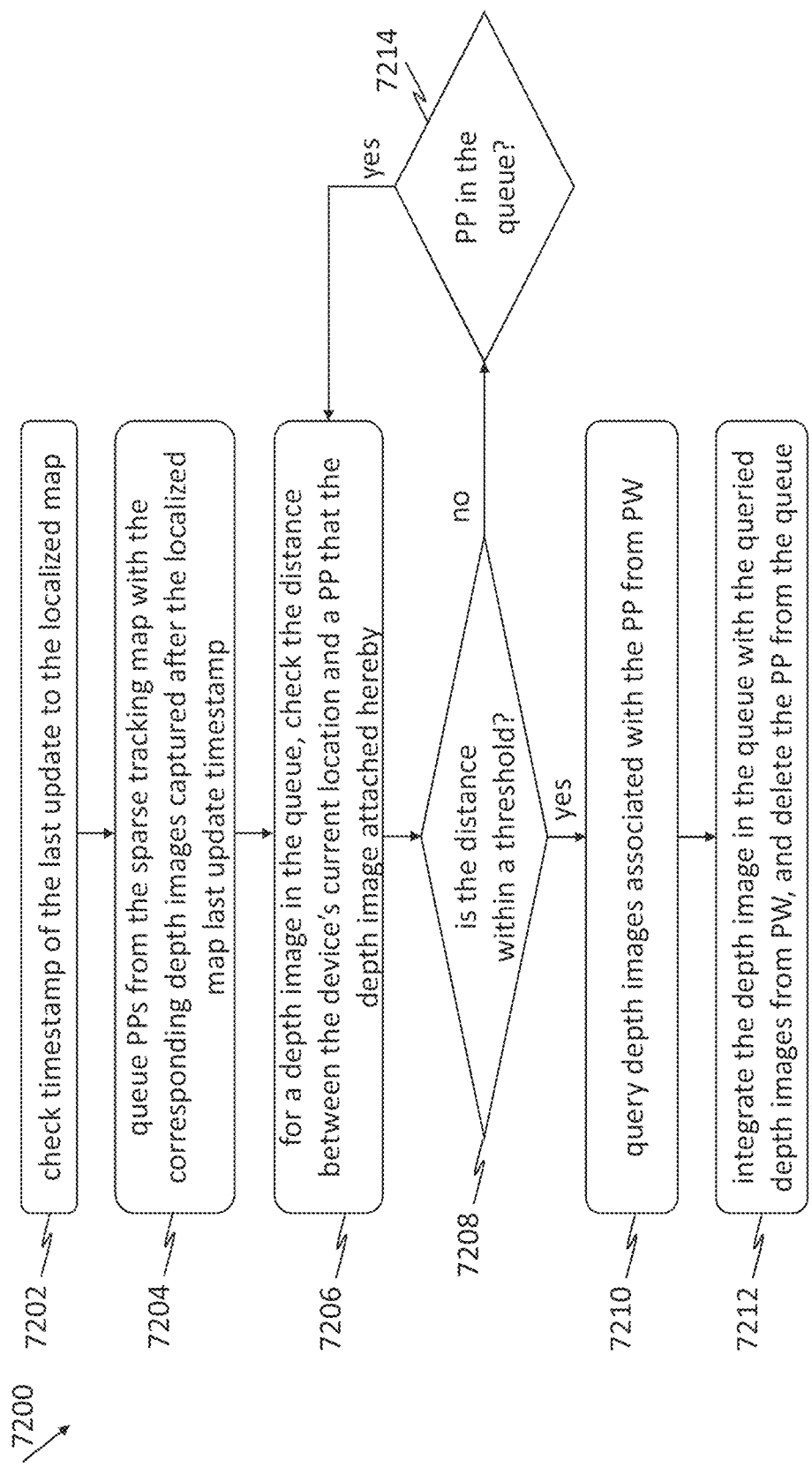
FIG. 72 is flow chart illustrating a method of merging dense maps on an XR device, according to some embodiments.

The fetched portions of the shared dense map may be loaded to the device's memory when the device enters into corresponding area in the physical environment. The dense map merge or stitch component 6912 may update the loaded portions of the shared dense map by, for example, performing a method 7200 illustrated in FIG. 72.

The method 7200 may start by checking (act 7202) timestamp of the last updated to the localized shared dense map. The method 7200 may include queuing (act 7204) persistent poses from the sparse tracking map with the corresponding depth images captured after the timestamp.

For each depth image in the queue, the method 7200 may include checking (act 7206) a distance between the device's current location and a persistent pose that the depth image is attached to. The method 7200 may include determining (act 7208) whether the distance is within a threshold (e.g., 15 meters). When it is determined that the distance is within the threshold value, the method 7200 may include querying (act 7210) all depth images associated with these persistent poses from the cloud's passable world, which may have been downloaded and stored locally on the device. The method 7200 may include integrating (act 7212) the depth image in the queue with the queried depth images from the cloud's passable world. This persistent pose may be deleted from the queue after the integration. When it is determined that the distance is above the threshold value, the persistent pose may be deleted from the queue. The method 7200 may include determining (act 7214) whether there are additional persistent poses in the queue. The acts 7206-7214 may iterate until no persistent poses are in the queue.

Geometries such as planar surfaces may be extracted as an XR device moves around. Extracting geometries takes less computing power and time than building a complete dense map. Simple geometries may be efficient and sufficient for some XR functions. The extracted geometries may be promoted to the cloud such that the geometries can be shared with any devices in the XR device as well as any virtual content attached to the shared geometries.

In some embodiments, an on-device 3D reconstruction component (e.g., 64360 may include a geometry extraction component. The geometry extraction component may extract geometries while scanning a scene with sensors, which allows a fast, efficient extraction that can accommodate dynamic environment changes. The extracted geometries may be stored on the device and/or promoted to the cloud, for example, as at least a portion of objects information of a corresponding dense map (e.g., objects information 6438, objects information 6448). The cloud may include one or more components configured to combine geometries provided by one or more devices. Each of the combined geometries on the cloud may have a unique geometry identifier such that the combined geometries and virtual content attached hereby can be shared by devices in the XR system.

In some embodiments, objects may be individually identifiable, and these identifiers may be persistent across sessions, in the same way as persistent poses. With individual identifiers, objects can be referenced independently and are distinguishable from each other. They can be classified as different instances of various types. For example, a large flat wall surface may have the same identifier over time. Conversely, the same identifier over time may refer to the same flat wall surface. The ability to refer to persistent objects may simplify processing, such as content placement. For example, a virtual screen may be placed on a large flat wall surface by referencing it via its identifier, without worrying that this identifier may point to a different entity later, e.g., the ceiling instead.

Although planes are used as an exemplary geometry in some embodiments, it should be appreciated that a geometry extraction component may detect other geometries to use in subsequent processing instead of or in addition to planes, including, for example, cylinders, cubes, lines, corners, or semantics such as glass surfaces or holes. In some embodiments, the principles described herein with respect to geometry extraction may be applicable to object extraction and the like.

In some embodiments, a transformation may be obtained for transforming object information (e.g., 6438) from a device in a coordinate frame local to the device to the shared coordinate frame of cloud merged or stitched sparse maps. In some embodiments, the transformation may use a sparse map localization result. For example, for the dense maps that contain uploaded planar surfaces, the cloud may find the corresponding local tracking sparse map using the same map unique identifier, and perform sparse map localization from this sparse map to the cloud merged or stitched sparse map. A pose may be obtained from the local tracking sparse map to the cloud merged or stitched sparse map, and used as an additional input for processing object information. In some embodiments, for dense maps that contain uploaded planar surfaces, the cloud may find the corresponding local tracking sparse map using the same map unique identifier, and extract a persistent pose table to be used as an additional input for processing object information. Each plane (which may be identified by its unique identifier) may be attached to a persistent pose in the persistent pose table of its local tracking sparse map. By finding the same persistent pose in the cloud merged or stitched sparse map, a pose may be obtained from the local tracking sparse map to the cloud merged or stitched sparse map for this plane.

The relative pose of the between the local map and the cloud map to which to the same object (such as a plane) is posed may serve as a transformation. Based on the obtained transformation, the object information from the device may be transformed from the coordinate frame local to the device to the shared coordinate frame of the cloud merged or stitched sparse maps by, for example, using poses and/or performing geometry-based matching such as bounding box matching.

An object UUID transfer mapping may be computed and accessible by devices in the XR system. The object UUID transfer mapping may indicate correspondences between cloud object information UUIDs to input object information UUIDs. The object UUID transfer mapping may enable devices to recognize persistent objects that have previously been seen by the device through, for example, UUIDs.

A device in the XR system may load a merged or stitched dense map, the object UUIDs may be those UUIDs in the merged or stitched dense map, which may be mapped back to the UUIDs the device has seen before based on the object UUID transfer mapping, and thus provide persistency from the device's viewpoint.

Figure 73:
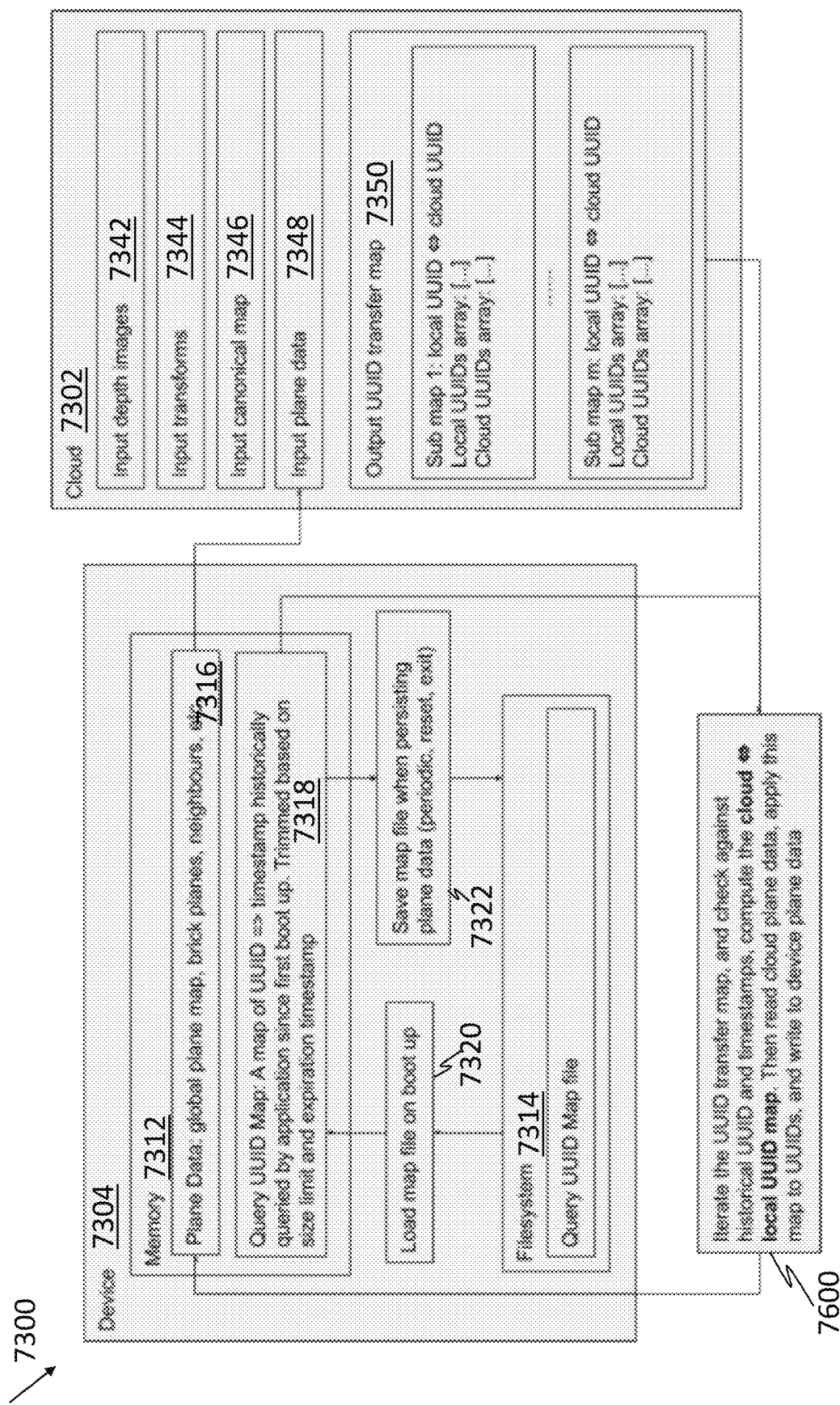
FIG. 73 is a block diagram of an XR system that provides persistent planes, according to some embodiments.

FIG. 73 is a block diagram of an XR system 7300 that provides persistent objects, such as planes, according to some embodiments. The XR system 7300 may include a cloud 7302 and one or more devices 7304. Objects may be persistent across multiple devices, for example, in embodiments in which surface information uploaded to the cloud includes object info (e.g., planes), so that the cloud components can match objects between the local dense maps, which contain object information, and cloud shared dense maps, which may also contain object information. As a specific example, the XR system 7300 may include a plane matching component 7600, which may be part of the devices 7304 and/or the cloud 7302.

The device 7304 may include one or more components configured to extract planes by, for example, detecting planar surfaces from meshes; to merge or stitch planes into one global plane when, for example, a new extracted plane connects two planes; and to split a global plane when, for example, a brick plane in the middle of the global plane is removed. For example, examples of plane extraction system are described in U.S. patent application Ser. No. 16/229,799, which is hereby incorporated herein by reference it its entirety.

The device 7304 may include memory 7312 and filesystem 7314. The memory 7312 may include local plane data 7316 and local plane ID history map 7318. The local plane data 7316 may include plane information such as boundary points of a plane, an area of a plane, and a primitive normal of a plane. For a queried plane, the plane ID history map 7318 may include correspondences between the queried plane's unique ID to any historical IDs of the plane. The historical IDs may indicate the timestamp that at least a portion of the plane was last queried across multiple sessions.

The memory 7312 and the filesystem 7314 may operate in cooperation such that shared and local geometries can be stored in the filesystem to avoid duplicated environment mapping when entering a previously explored space. In the illustrated example, portions of the local plane data 7316 and local plane ID history map 7318 may be retrieved from the filesystem 7314 based on the device's current location. When the device moves away from some real objects in the physical environment, the device 7304 may remove corresponding plane data and its ID history map from the memory 7312, and store them in the filesystem 7314. In some embodiments, although the data in the memory 7312 may be removed after the end of a session, the data in the filesystem 7314 may be persisted and ready to be loaded to the memory 7312 upon the start of a new session.

Figure 74:
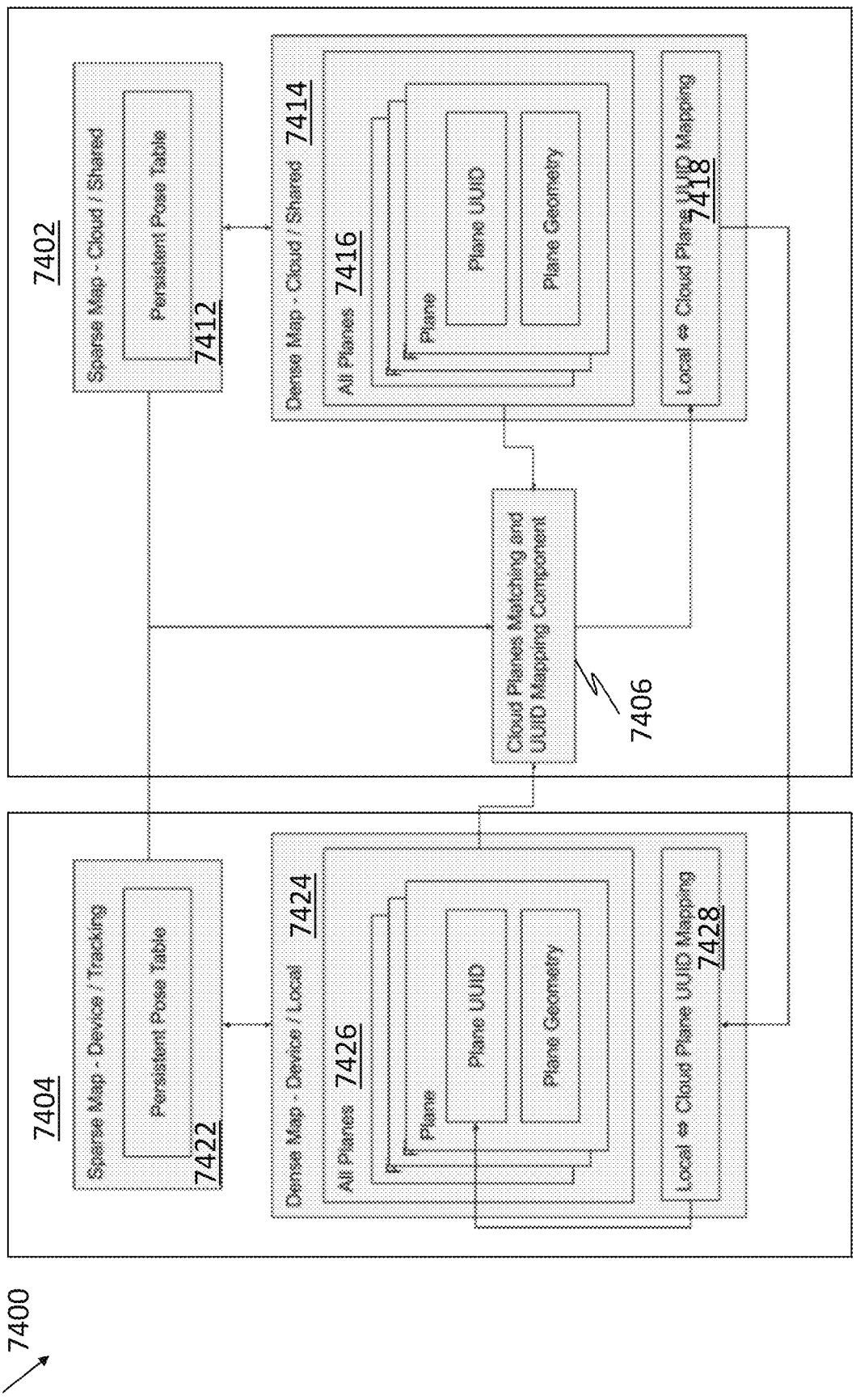
FIG. 74 is a block diagram of an XR system that provides persistent planes, according to some embodiments.

FIG. 74 is a block diagram of an XR system 7400 that provides persistence to objects, such as planes, according to some embodiments. The XR system 7400 may include a cloud 7402 and one or more devices 7404. Cloud 7402 may be implemented with the same processing resources that perform cloud based sparse map localization, as described above, or may be other compute resources. The XR system 7400 may include a plane matching component 7406. Although the plane matching component 7406 is illustrated as part of the cloud 7402, it may also be part of the devices 7404, or may be only part of the devices 7404 or only part of the cloud 7402.

The cloud 7402 may include shared sparse map 7412 that include persistent pose table, and shared dense map 7414 that include planes 7416 and a local to cloud plane UUID mapping 7418. The plane matching component 7406 may provide the local to cloud plane UUID mapping 7418 based, at least in part, on the sparse map 7412 of the cloud 7402 and planes 7416 of the dense map 7414.

The device 7404 may include sparse tracking map 7422 that include persistent pose table, and dense map 7424 that include planes 7426 and a local to cloud plane UUID mapping 7428. The local to cloud plane UUID mapping 7428 may be from a shared cloud dense map loaded by the device 7404 from the cloud 7402, for example, the local to cloud plane UUID mapping 7418. The plane matching component 7406 may provide the local to cloud plane UUID mapping 7418 based, at least in part, on the sparse map 7422 of the device 7404 and planes 7426 of the dense map 7424.

In this example embodiment, as devices provide dense information including persistent objects, such as planes, plane matching component 7406 may attempt to match the planes from the device to planes 7426 stored in the cloud. If the plane from the device has already been associated with a plane stored in the cloud, its identifier may be stored in mapping 7418, enabling matching to be performed based on identifiers.

If the plane from the device is not in mapping 7418, matching may be based on plane geometry and other information about the planes. For example, match processing may be based on persistent pose to which the planes are posed as well as the pose. Overlapping planes may be treated as matching. Upon finding a match, the association between the identifier for plane used by the device may be recorded in mapping 7418 and communicated to the device for storage in mapping 7428.

If no matching plane is identified, in some embodiments, the plane from the device may be added to the cloud store of share planes 7414 and assigned a cloud identifier. The mapping between the cloud identifier may then be stored in mapping 7418 and may likewise be communicated to the device to be stored in mapping 7428. In this way, planes, or other objects, may be identified on each device that interacts with the system as well as in the cloud.

It should also be appreciated that, in addition to adding surface information based on dense information from devices, cloud processing may remove or update dense information. For example, as indicated in FIG. 67, a device may maintain a current dense map 6708. That dense map may be expanded as more sensor data is collected and processed on the device. Updates that extend the dense map may be communicated to the cloud for merging or stitching with dense maps in the cloud. Conversely, when updates on a device indicate that a previously detected surface or object is no longer present, the update may result in removing surface information from the cloud.

Similarly, as a device operates its sensors to gather information about its 3D environment, the device may, from time to time, adjust its representation of the 3D environment.

In some embodiments, a device may from time to time adjust its sparse tracking map, such as may occur during a bundle adjustment as described above. An adjustment of the sparse tracking map may trigger an adjustment to the dense information that was posed relative to the tracking map. For example, the sensor data used to generate dense information may be posed relative to the persistent poses in the tracking map such that an adjustment of the tracking map may result in an adjustment of the sensor data. Adjusted surface information may then be generated. The adjusted surface information may replace similar surface information generated with the un-adjusted surface information. This replacement may be made on surface information local to the device as well as on the cloud.

Accordingly, a reliable representation of a 3D environment in which each of multiple devices operates may be generated and maintained, enabling the benefits of persistence with low on-device resources.

Further Considerations

Figure 60:
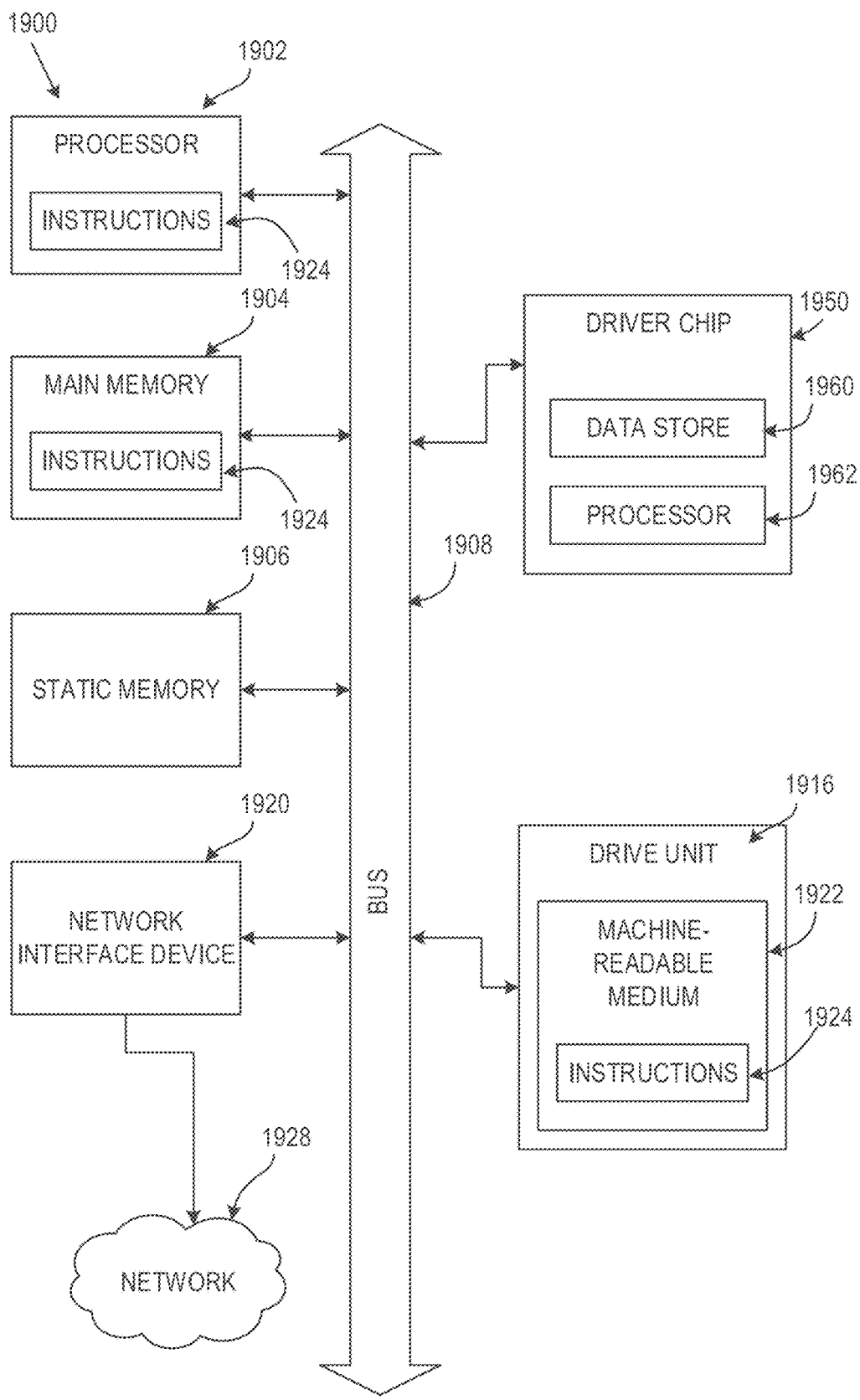
FIG. 60 is a block diagram of a machine in the form of a computer that can find application in the present invention system, according to some embodiments.

FIG. 60 shows a diagrammatic representation of a machine in the exemplary form of a computer system 1900 within which a set of instructions, for causing the machine to perform any one or more of the methodologies discussed herein, may be executed, according to some embodiments. In alternative embodiments, the machine operates as a standalone device or may be connected (e.g., networked) to other machines. Further, while only a single machine is illustrated, the term "machine" shall also be taken to include any collection of machines that individually or jointly execute a set (or multiple sets) of instructions to perform any one or more of the methodologies discussed herein.

The exemplary computer system 1900 includes a processor 1902 (e.g., a central processing unit (CPU), a graphics processing unit (GPU) or both), a main memory 1904 (e.g., read only memory (ROM), flash memory, dynamic random-access memory (DRAM) such as synchronous DRAM (SDRAM) or Rambus DRAM (RDRAM), etc.), and a static memory 1906 (e.g., flash memory, static random-access memory (SRAM), etc.), which communicate with each other via a bus 1908.

The computer system 1900 may further include a disk drive unit 1916, and a network interface device 1920.

The disk drive unit 1916 includes a machine-readable medium 1922 on which is stored one or more sets of instructions 1924 (e.g., software) embodying any one or more of the methodologies or functions described herein. The software may also reside, completely or at least partially, within the main memory 1904 and/or within the processor 1902 during execution thereof by the computer system 1900, the main memory 1904 and the processor 1902 also constituting machine-readable media.

The software may further be transmitted or received over a network 18 via the network interface device 1920.

The computer system 1900 includes a driver chip 1950 that is used to drive projectors to generate light. The driver chip 1950 includes its own data store 1960 and its own processor 1962.

While the machine-readable medium 1922 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

Having thus described several aspects of some embodiments, it is to be appreciated that various alterations, modifications, and improvements will readily occur to those skilled in the art.

As one example, embodiments are described in connection with an augmented (AR) environment. It should be appreciated that some or all of the techniques described herein may be applied in an MR environment or more generally in other XR environments, and in VR environments.

As another example, embodiments are described in connection with devices, such as wearable devices. It should be appreciated that some or all of the techniques described herein may be implemented via networks (such as cloud), discrete applications, and/or any suitable combinations of devices, networks, and discrete applications.

Further, FIG. 29 provides examples of criteria that may be used to filter candidate maps to yield a set of high-ranking maps. Other criteria may be used instead of or in addition to the described criteria. For example, if multiple candidate maps have similar values of a metric used for filtering out fewer desirable maps, characteristics of the candidate maps may be used to determine which maps are retained as candidate maps or filtered out. For example, larger or more dense candidate maps may be prioritized over smaller candidate maps.

It shall be noted that any obvious alterations, modifications, and improvements are contemplated and intended to be part of this disclosure, and are intended to be within the spirit and scope of the disclosure. Further, though advantages of the present disclosure are indicated, it should be appreciated that not every embodiment of the disclosure will include every described advantage. Some embodiments may not implement any features described as advantageous herein and in some instances. Accordingly, the foregoing description and drawings are by way of example only.

The above-described embodiments of the present disclosure can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component, including commercially available integrated circuit components known in the art by names such as CPU chips, GPU chips, microprocessor, microcontroller, or co-processor. In some embodiments, a processor may be implemented in custom circuitry, such as an ASIC, or semicustom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. Though, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format. In the embodiment illustrated, the input/output devices are illustrated as physically separate from the computing device. In some embodiments, however, the input and/or output devices may be physically integrated into the same unit as the processor or other elements of the computing device. For example, a keyboard might be implemented as a soft keyboard on a touch screen. In some embodiments, the input/output devices may be entirely disconnected from the computing device, and functionally integrated through a wireless connection.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the disclosure may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the disclosure discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present disclosure as discussed above. As used herein, the term "computer-readable storage medium" encompasses only a computer-readable medium that can be considered to be a manufacture (i.e., article of manufacture) or a machine. In some embodiments, the disclosure may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the present disclosure as discussed above. Additionally, it should be appreciated that according to one aspect of this embodiment, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present disclosure may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the disclosure may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. An extended reality or cross reality (XR) system for rendering virtual content, comprising:

a computing device communicably connected to a plurality of portable electronic devices via a network component;

a repository accessible by the computing device and the plurality of portable electronic devices; and a dense map merge component, the extended reality or cross reality system configured to perform a set of acts that comprises:

determining a representation for multiple portions of a 3D environment based at least in part upon on a set of dense maps received from the plurality of portable devices, wherein the set of dense maps is grouped into multiple subgroups based at least in part upon pose data pertaining to the set of dense maps or surface information in the set of dense maps, and storing the representation as at least a portion of a shared persistent dense map.

2. The extended reality or cross reality (XR) system of claim 1, the set of acts further comprising:

localizing a sparse map and a dense map to a canonical map that is selected from multiple canonical maps stored in a repository, wherein a coordinate system is derived from the sparse map and is used to determine a position or an orientation of an object in the dense map.

3. The extended reality or cross reality (XR) system of claim 2, the set of acts further comprising:

determining, for a canonical map, the sparse map comprising headpose data of a headpose of a portable electronic device and object information for one or more objects detected by the portable electronic device at the headposes, wherein the sparse map is oriented local to a local reference frame for the portable electronic device.

4. The extended reality or cross reality (XR) system of claim 2, the set of acts further comprising:

determining the dense map in a first processing pipeline, wherein the sparse map is determined in a second processing pipeline and is refreshed at a second refresh rate, the dense map is refreshed at a first rate slower than the second refresh rate, and the dense map comprises dense information that references to a persistent pose of a sparse map.

5. The extended reality or cross reality (XR) system of claim 2, the set of acts further comprising:

promoting the sparse map to a canonical map based at least in part upon a condition that determines an extent of overlap between the sparse map and one or more canonical maps that have been stored in the repository.

6. The extended reality or cross reality (XR) system of claim 1, wherein the set of acts further comprising:

generating, at the portable electronic device, a shared world model at least by performing a local 3D reconstruction.

7. The extended reality or cross reality (XR) system of claim 6, generating the shared world model at least by performing the local 3D reconstruction comprising:

identifying, at the portable electronic device of the plurality of portable electronic devices, a pose of a sparse map; and identifying a shared persistent dense map from a repository accessible by the computing device.

8. The extended reality or cross reality (XR) system of claim 7, generating the shared world model at least by performing the local 3D reconstruction comprising:

localizing the sparse map generated by the portable electronic device to a canonical map at least by using a transform, the transform determined for the sparse map and the canonical map based at least in part upon one or more persistent coordinate frames in the canonical map.

9. The extended reality or cross reality (XR) system of claim 8, generating the shared world model at least by performing the local 3D reconstruction comprising:

generating, at the portable electronic device, a dense map at least by determining a local pose data or local depth data of the object or a portion thereof from an image captured by the portable electronic device.

10. The extended reality or cross reality (XR) system of claim 8, wherein the dense map is generated at the portable electronic device at least further by identifying localized pose data or localized depth data relative to the canonical map, the localized pose data or localized depth data respectively transformed, by the transform, from the localized pose data or local depth data, and transmitting the localized pose data or the localized depth data.

11. The extended reality or cross reality (XR) system of claim 1, wherein the set of acts further comprising:

performing, at the dense map merge component residing on a remote server, 3D reconstruction of the 3D environment.

12. The extended reality or cross reality (XR) system of claim 1, performing the 3D reconstruction of the 3D environment comprising:

receiving, from a portable electronic device of the plurality of portable electronic devices, local pose data of a sparse map generated by the portable electronic device; and identifying a shared persistent dense map from a repository accessible by the dense map merge component.

13. The extended reality or cross reality (XR) system of claim 12, performing the 3D reconstruction of the 3D environment further comprising:

determining a transform that localizes the sparse map generated by the portable electronic device to a canonical map, wherein the transform is determined for the sparse map and the canonical map based at least in part upon one or more persistent coordinate frames in the canonical map and pose data in the sparse map.

14. The extended reality or cross reality (XR) system of claim 13, performing the 3D reconstruction of the 3D environment further comprising:

receiving, from the portable electronic device, a dense map, wherein the dense map is generated by using surface at least a portion of the collections of posed surface information and a local pose data or local depth data pertaining to an object or a portion thereof in an image captured by the portable electronic device, the local pose data and the local depth data are respectively transformed into localized pose data or localized depth data relative to the canonical map;

identifying the dense map that corresponds to the sparse map based at least in part upon a localization result of localizing the sparse map to the canonical map; and computing the representation of the 3D environment at least by merging the dense map to the shared persistent dense map as a part of the representation.

15. The extended reality or cross reality (XR) system of claim 14, the set of acts further comprising:

localizing a sparse map generated by the portable electronic device of the plurality of portable electronic device to the canonical map; and generating, at a sparse map merge component, a shared persistent sparse map for the 3D environment.

16. The extended reality or cross reality (XR) system of claim 15, generating the shared persistent sparse map comprising:

receiving, from a portable electronic device of the plurality of portable electronic devices, local pose data of the object or the portion thereof in a sparse map generated by the portable electronic device, wherein the local pose data is oriented in relation to the portable electronic device, wherein the object or the portion thereof is represented as a point node in the sparse map; and identifying at least one persistent coordinate frame for the sparse map from the canonical map based at least in part upon the local pose data of the object or the portion thereof.

17. The extended reality or cross reality (XR) system of claim 16, generating the shared persistent sparse map comprising:

localizing the sparse map to the canonical map at least by transforming the local pose data into localized pose data based at least in part upon the at least one persistent coordinate frame stored in the canonical map; and generating the shared persistent sparse map for the 3D environment at least by merging the sparse map into the shared persistent sparse map.

18. A computer program product comprising one or more non-transitory computer readable storage media having stored thereupon at least one sequence of instructions which, when executed by an extended reality or cross reality (XR) system, causes the extended reality or cross reality system to perform a set of acts, the set of acts comprising:

determining a repository accessible by the extended reality or cross reality system, the repository storing therein multiple canonical maps, wherein a canonical map stores one or more persistent coordinate frames corresponding to at least one object or one or more portions thereof;

determining a representation for multiple portions of a 3D environment based at least in part upon on a set of dense maps received from the plurality of portable devices, wherein the set of dense maps is grouped into multiple subgroups based at least in part upon pose data pertaining to the set of dense maps or surface information in the set of dense maps, and storing the representation as at least a portion of a shared persistent dense map.

19. The computer program product of claim 18, the set of acts further comprising:

localizing a sparse map and a dense map to a canonical map that is selected from multiple canonical maps stored in a repository, wherein a coordinate system is derived from the sparse map and is used to determine a position or an orientation of an object in the dense map;

determining, for a canonical map, the sparse map comprising headpose data of a headpose of a portable electronic device and object information for one or more objects detected by the portable electronic device at the headposes, wherein the sparse map is oriented local to a local reference frame for the portable electronic device;

determining the dense map in a first processing pipeline, wherein the sparse map is determined in a second processing pipeline and is refreshed at a second refresh rate, the dense map is refreshed at a first rate slower than the second refresh rate, and the dense map comprises dense information that references to a persistent pose of a sparse map; and promoting the sparse map to a canonical map based at least in part upon a condition that determines an extent of overlap between the sparse map and one or more canonical maps that have been stored in the repository.

20. The computer program product of claim 18, the set of acts further comprising:

generating, at the portable electronic device, a shared world model at least by performing a local 3D reconstruction at least by:

identifying, at the portable electronic device of the plurality of portable electronic devices, a pose of a sparse map;

identifying a shared persistent dense map from a repository accessible by the computing device;

localizing the sparse map generated by the portable electronic device to a canonical map at least by using a transform, the transform determined for the sparse map and the canonical map based at least in part upon one or more persistent coordinate frames in the canonical map; and generating, at the portable electronic device, a dense map at least by determining a local pose data or local depth data of the object or a portion thereof from an image captured by the portable electronic device.

21. An electronic device for rendering cross reality representation, the electronic device comprising:

one or more sensors configured to capture information about a three-dimensional (3D) environment, the information comprising a plurality of images;

a processor configured to execute a sequence of instructions, wherein the sequence of instructions, when executed, causes the processor to perform a set of acts, the set of acts comprising:

computing a sparse tracking map based at least in part on the plurality of images;

determining one or more collections of surface or depth information based at least in part on the information captured by the one or more sensors;

transmitting at least one of the one or more collections of surface or depth information and pose information for the at least one of the one or more collections of surface or depth information;

receiving metadata of a dense map, the metadata indicating a portion of the 3D environment represented by the dense map; and determining, based at least in part on the sparse tracking map and the metadata, whether to retrieve at least a portion of the dense map.

22. The electronic device of claim 21, wherein the metadata of the dense map comprises a quality metric, which indicates a number of mesh blocks in the dense map, and a timestamp indicating the time when a last depth image has been fused into the dense map, and determining whether to obtain at least a portion of the dense map is based at least in part on the quality metric of the dense map and quality metrics of one or more dense different maps.

23. The electronic device of claim 21, further comprising:

computing a locally merged map based at least in part on at least a portion of the dense map and the at least one of the one or more collections of surface or depth information, wherein the at least one of the one or more collections of surface or depth information is not represented in the at least the portion of the dense map.

24. The electronic device of claim 21, the set of acts further comprising:
   determining an area into which the electronic device is moving, based at least in part on a pose of the electronic device, and
   downloading surface information of the area when it is determined that the surface information of the area is available in the dense map but not on the device, wherein the dense map comprises a plurality of sub-regions associated with persistent poses in a sparse tracking map, and one or more sub-regions corresponding to the area are downloaded in an order based at least in part on respective distances between a pose of the electronic device and one or more persistent poses associated with the sub-regions.

* * * * *